US009559766B2

(12) United States Patent
Hyde et al.

(10) Patent No.: US 9,559,766 B2
(45) Date of Patent: Jan. 31, 2017

(54) DYNAMIC POINT TO POINT MOBILE NETWORK INCLUDING INTERMEDIATE DEVICE ASPECTS SYSTEM AND METHOD

(71) Applicant: Elwha LLC, Bellevue, WA (US)

(72) Inventors: Roderick A. Hyde, Redmond, WA (US); Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 364 days.

(21) Appl. No.: 13/934,389

(22) Filed: Jul. 3, 2013

(65) Prior Publication Data

US 2014/0334289 A1 Nov. 13, 2014

Related U.S. Application Data

(63) Continuation-in-part of application No. 13/891,369, filed on May 10, 2013, and a continuation-in-part of application No. 13/927,870, filed on Jun. 26, 2013.

(51) Int. Cl.
*H04B 7/15* (2006.01)
*H04W 4/00* (2009.01)
(Continued)

(52) U.S. Cl.
CPC ............... *H04B 7/15* (2013.01); *H04W 4/00* (2013.01); *H04W 4/20* (2013.01); *H04W 76/02* (2013.01)

(58) Field of Classification Search
CPC .......... H04L 45/04; H04L 45/22; H04L 45/50; H04L 12/437; H04L 12/4625; H04W 84/047
See application file for complete search history.

(56) References Cited

U.S. PATENT DOCUMENTS 6,445,916 B1 9/2002 Rahman
6,574,452 B1 6/2003 Morvan et al.
(Continued)

FOREIGN PATENT DOCUMENTS

EP 1527641 B1 5/2005
WO WO 2004/075169 A2 9/2004
(Continued)

OTHER PUBLICATIONS

"Analyst Blog Comcast to Boost Neighborhood Wi-Fi"; Zacks Equity Research; Jun. 11, 2013; 1 page; located at http://www.zacks.co,/commentary_print.php?article_id=101334&type=BLOG.
(Continued)

*Primary Examiner* — Jung Park

(57) ABSTRACT

A computationally implemented system and method that is designed to, but is not limited to: electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including second portions related at least in part to mobile electronic communication device (Continued)

functionality. In addition to the foregoing, other method aspects are described in the claims, drawings, and text forming a part of the present disclosure.

21 Claims, 63 Drawing Sheets

(51) Int. Cl.
*H04W 4/20* (2009.01)
*H04W 76/02* (2009.01)

(56) References Cited

U.S. PATENT DOCUMENTS

| | | | |
|---|---|---|---|
| 6,745,043 B1 | 6/2004 | Lester et al. | |
| 6,757,518 B2 | 6/2004 | Spratt et al. | |
| 6,954,893 B2 | 10/2005 | Ternullo et al. | |
| 7,167,443 B1 | 1/2007 | Dantu et al. | |
| 7,463,890 B2* | 12/2008 | Herz et al. | 455/445 |
| 7,831,216 B1 | 11/2010 | Yenney et al. | |
| 8,050,715 B1 | 11/2011 | Cole | |
| 8,213,362 B2 | 7/2012 | Lee et al. | |
| 8,280,428 B2 | 10/2012 | Pietraski | |
| 8,499,304 B2 | 7/2013 | De Los Reyes et al. | |
| 8,587,484 B2 | 11/2013 | Peng et al. | |
| 8,630,192 B2 | 1/2014 | Raleigh | |
| 8,665,743 B2 | 3/2014 | Zhu et al. | |
| 8,774,732 B2* | 7/2014 | Kobayakawa | 455/70 |
| 8,903,244 B2 | 12/2014 | Walter | |
| 8,966,476 B2 | 2/2015 | Doan et al. | |
| 8,988,223 B2 | 3/2015 | Puleston et al. | |
| 9,042,876 B2 | 5/2015 | Buck et al. | |
| 2003/0187570 A1 | 10/2003 | Impson et al. | |
| 2004/0142698 A1 | 7/2004 | Pietraski | |
| 2004/0196834 A1* | 10/2004 | Ofek et al. | 370/352 |
| 2004/0203558 A1 | 10/2004 | Suzuki et al. | |
| 2005/0198029 A1 | 9/2005 | Pohja et al. | |
| 2006/0069671 A1 | 3/2006 | Conley et al. | |
| 2006/0098594 A1* | 5/2006 | Ganesh | 370/328 |
| 2007/0030824 A1 | 2/2007 | Ribaudo et al. | |
| 2007/0086424 A1 | 4/2007 | Calcev et al. | |
| 2008/0008162 A1 | 1/2008 | Martinez et al. | |
| 2008/0070495 A1 | 3/2008 | Stricklen et al. | |
| 2008/0125067 A1 | 5/2008 | Bells et al. | |
| 2008/0172491 A1 | 7/2008 | Chhabra et al. | |
| 2008/0242251 A1 | 10/2008 | Kraemer et al. | |
| 2009/0005167 A1 | 1/2009 | Arrasvuori et al. | |
| 2009/0029645 A1* | 1/2009 | Leroudier | 455/7 |
| 2009/0052415 A1 | 2/2009 | Ishii et al. | |
| 2009/0089869 A1 | 4/2009 | Varghese | |
| 2009/0201846 A1* | 8/2009 | Horn et al. | 370/315 |
| 2010/0063850 A1 | 3/2010 | Daniel | |
| 2010/0241289 A1 | 9/2010 | Sandberg | |
| 2010/0278077 A1 | 11/2010 | Reunamäki et al. | |
| 2010/0290379 A1* | 11/2010 | Bahk et al. | 370/311 |
| 2011/0209064 A1* | 8/2011 | Jorgensen et al. | 715/733 |
| 2011/0275316 A1 | 11/2011 | Suumäki et al. | |
| 2011/0312278 A1 | 12/2011 | Matsushita et al. | |
| 2012/0184306 A1 | 7/2012 | Zou et al. | |
| 2012/0232968 A1 | 9/2012 | Calman et al. | |
| 2013/0012221 A1 | 1/2013 | Zou et al. | |
| 2013/0023227 A1 | 1/2013 | Yokoyama | |
| 2013/0078995 A1 | 3/2013 | Jouin | |
| 2013/0189925 A1 | 7/2013 | Staskawicz et al. | |
| 2013/0232242 A1 | 9/2013 | Millington et al. | |
| 2013/0273923 A1 | 10/2013 | Li et al. | |
| 2013/0311666 A1 | 11/2013 | Fujii | |
| 2013/0322388 A1 | 12/2013 | Ahn et al. | |
| 2014/0044007 A1 | 2/2014 | Smadi | |
| 2014/0089049 A1* | 3/2014 | Cristofaro | 705/7.32 |
| 2014/0135015 A1 | 5/2014 | Liu et al. | |
| 2014/0242961 A1 | 8/2014 | Bruins et al. | |
| 2014/0334289 A1 | 11/2014 | Hyde et al. | |
| 2014/0335781 A1 | 11/2014 | Hyde et al. | |
| 2014/0335817 A1 | 11/2014 | Hyde et al. | |
| 2014/0337841 A1 | 11/2014 | Hyde et al. | |
| 2014/0364089 A1 | 12/2014 | Lienhart et al. | |
| 2015/0147066 A1 | 5/2015 | Benjamin et al. | |

FOREIGN PATENT DOCUMENTS

| | | |
|---|---|---|
| WO | WO 2012/079629 A1 | 6/2012 |
| WO | WO 2012/091418 A2 | 7/2012 |
| WO | WO2013-013638 A1 | 1/2013 |

OTHER PUBLICATIONS

"Comcast Unveils Plans for Millions of Xfinity WiFi Hotspots"; Comcast; Jun. 10, 2013; pp. 1-2; located at http://corporate.comcast.com/news-information/news-feed/comcast-unveils-plans-for-millions-of-xfinity-wifi-hotspots-through-its-home-based-neighborhood-hotspot-initiative-2.

"How it works"; Fon; bearing a date of 2013; pp. 1-3; Fon Ltd.

"The all-new Airport Time Capsule"; Apple; printed on Jun. 26, 2013; pp. 1-6; located at http://www.apple.com/airport-time-capsule/.

PCT International Search Report; International App. No. PCT/US2014/037527; Sep. 3, 2014; pp. 1-3.

Wzorek et al.; "Choosing Path Replanning Strategies for Unmanned Aircraft Systems"; Proceedings of the Twentieth International Conference on Automated Planning and Scheduling (ICAPS 2010); bearing a date of 2010; created on Jun. 3, 2016; pp. 193-200; Association for the Advancement of Artificial Intelligence.

* cited by examiner

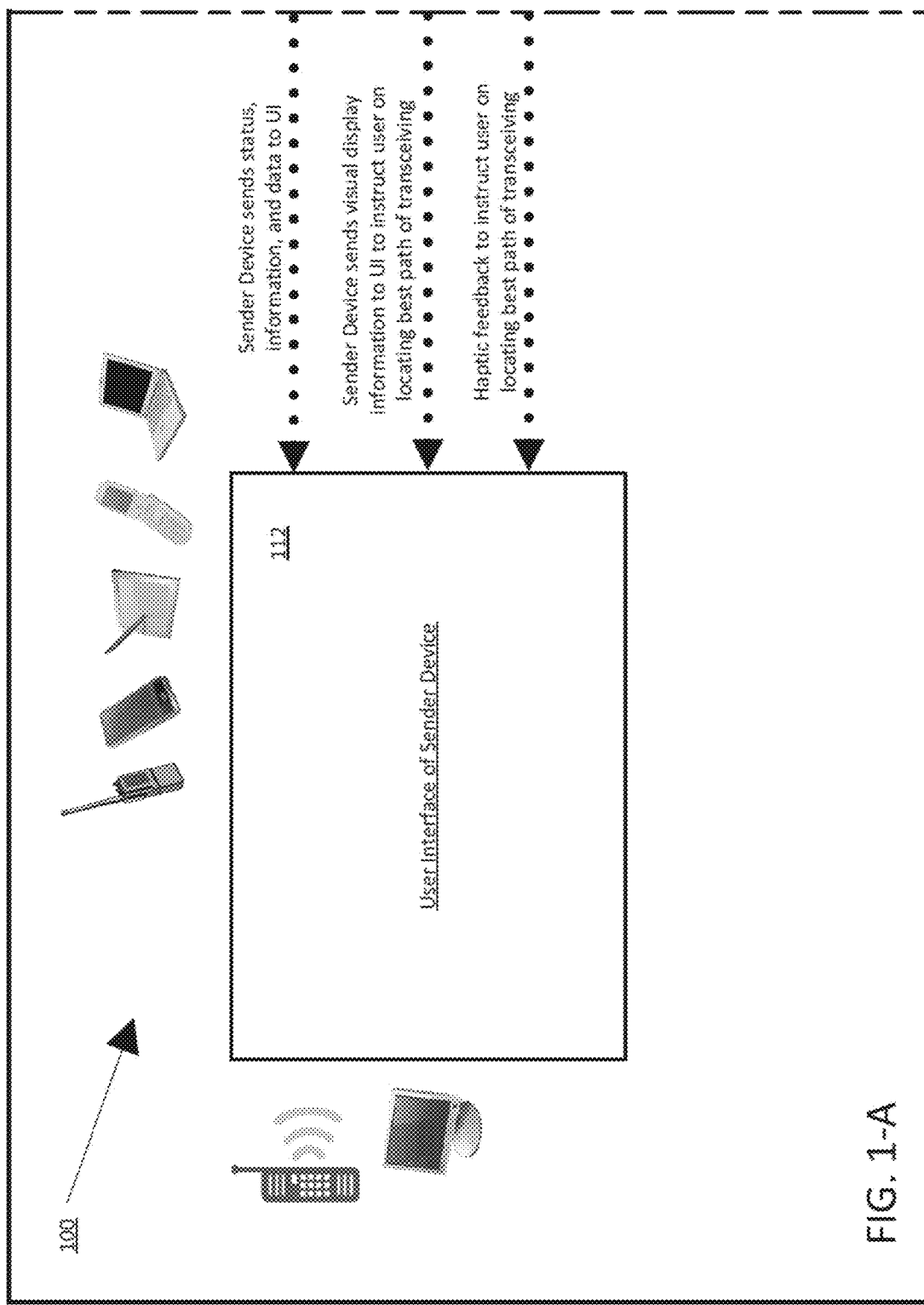
FIG. 1-A

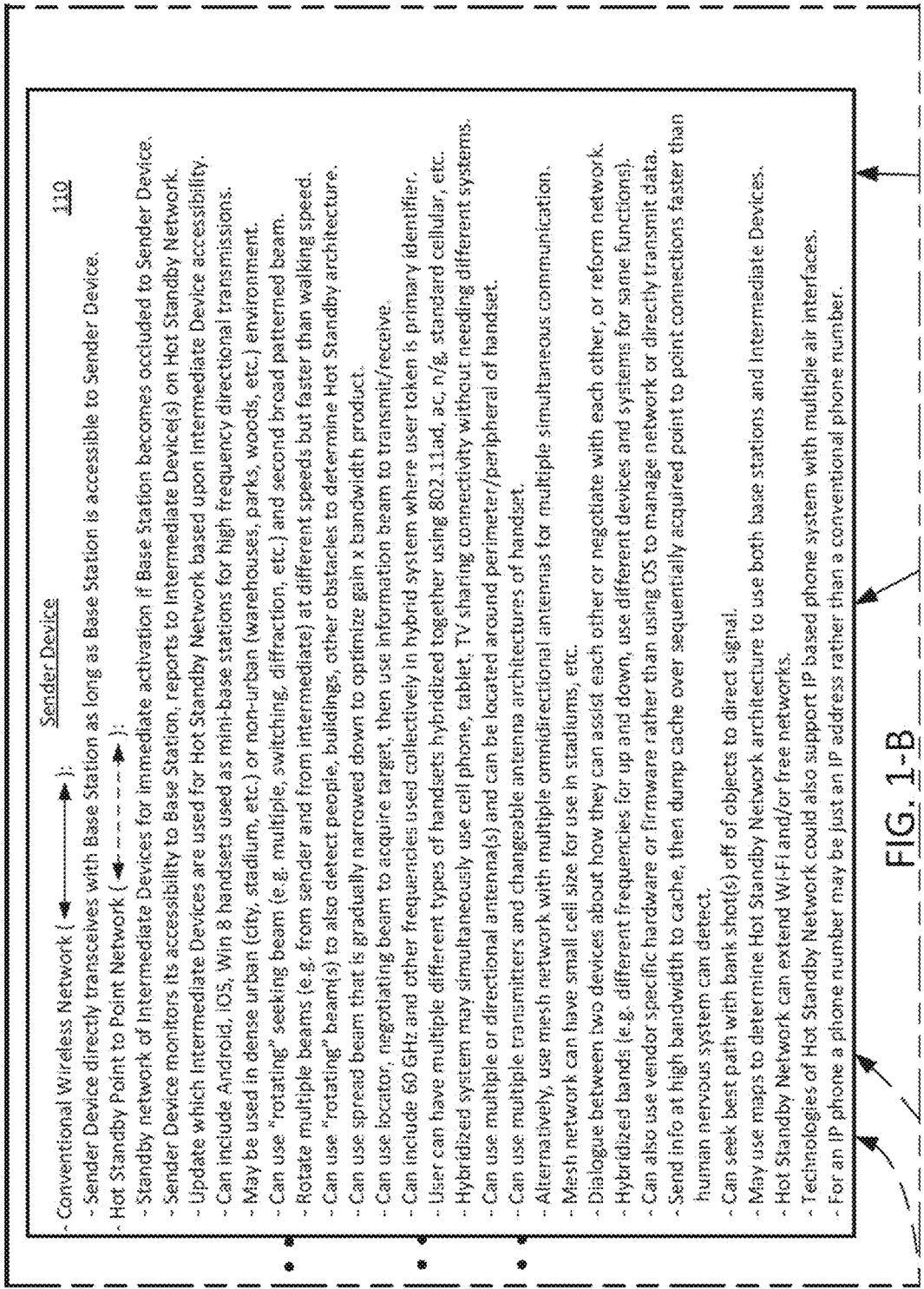
FIG. 1-B

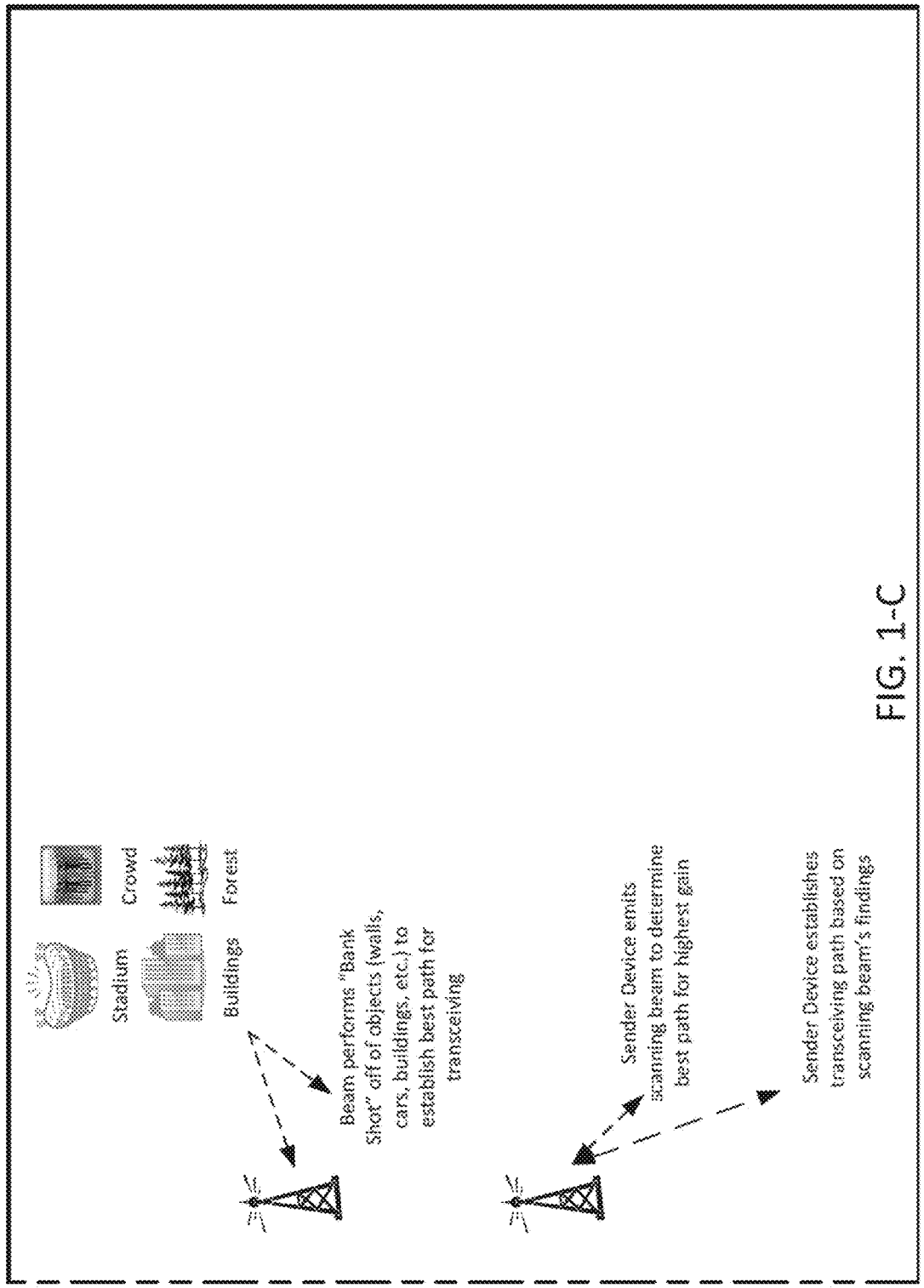
FIG. 1-C

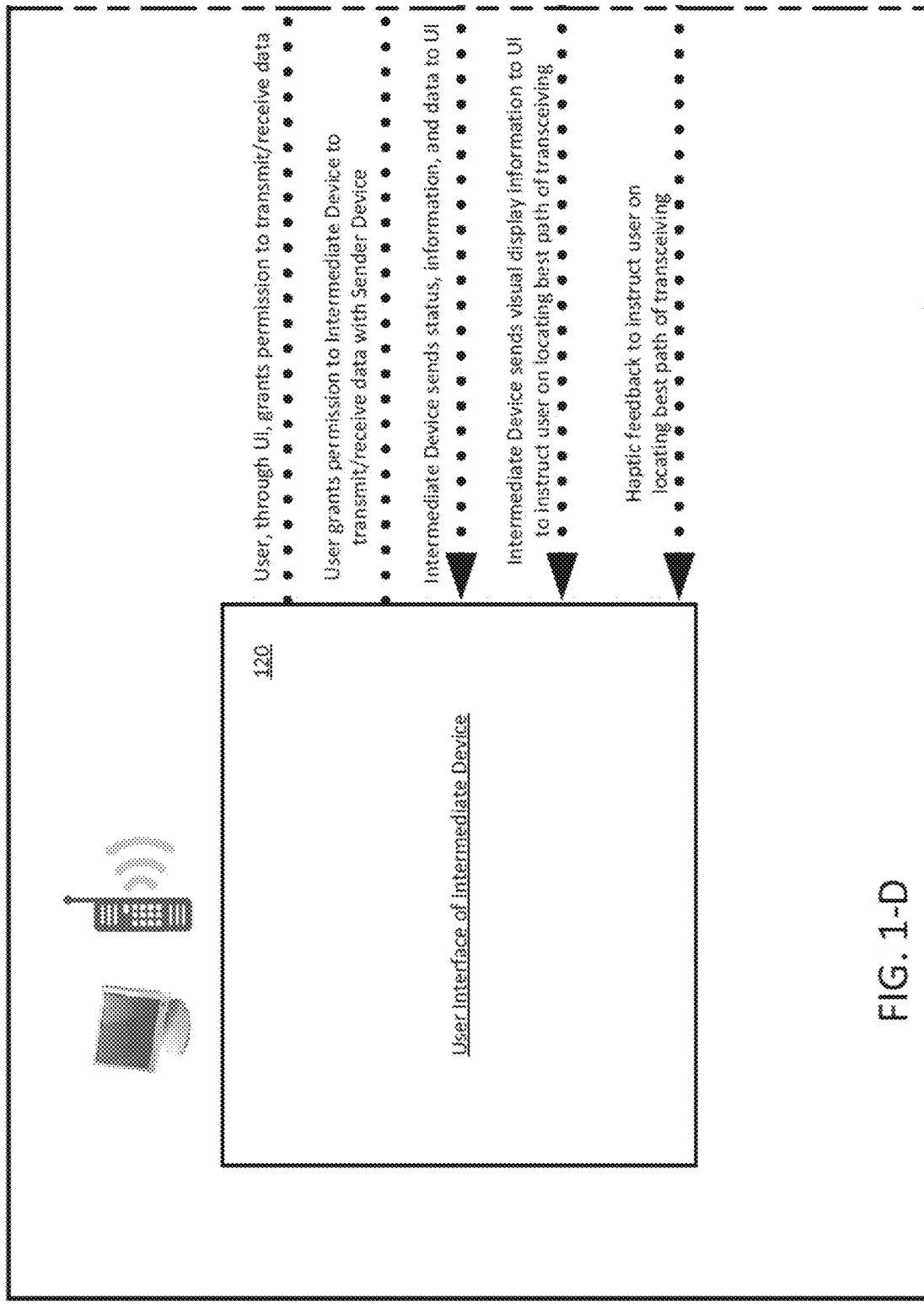
FIG. 1-D

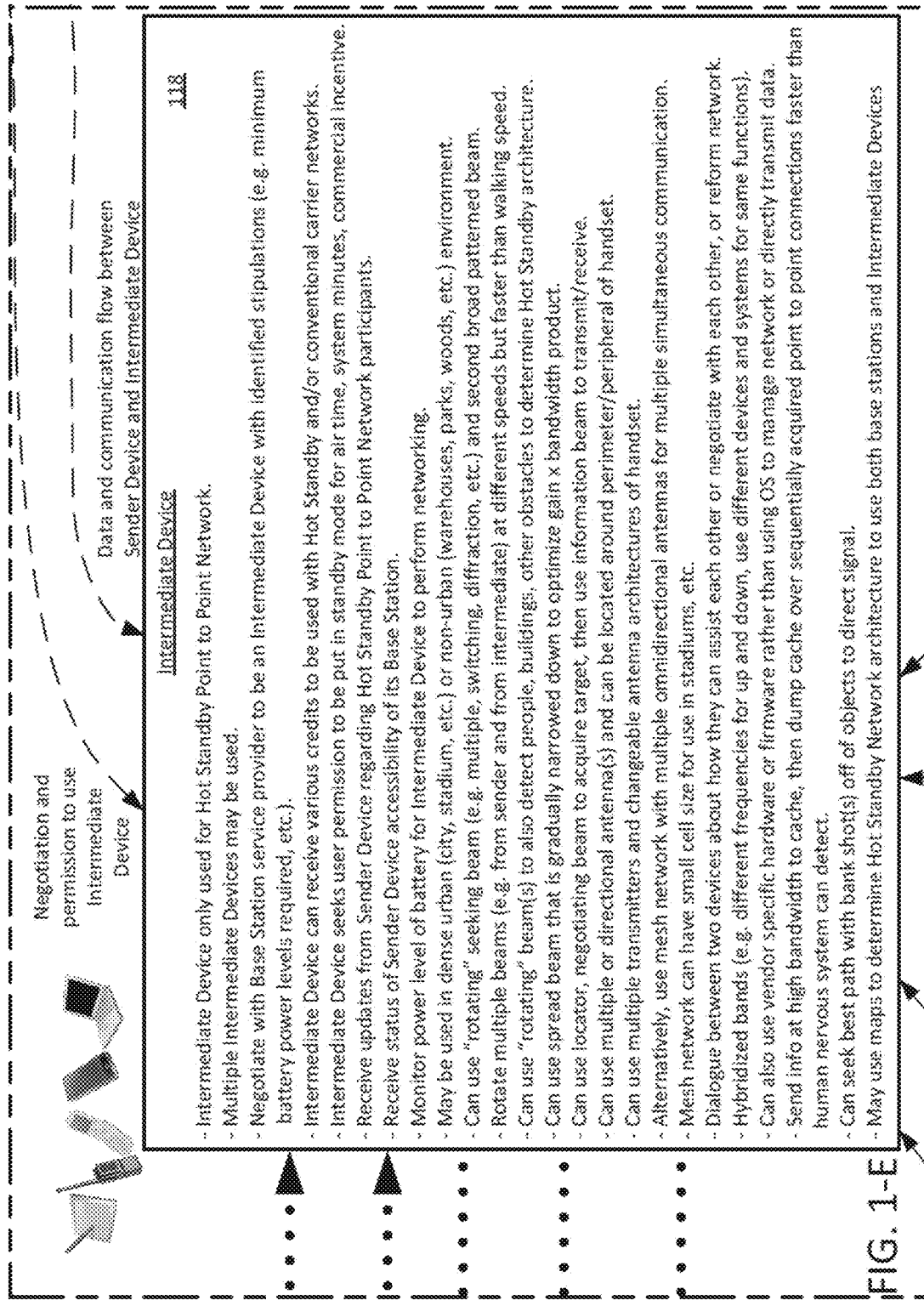
FIG. 1-E

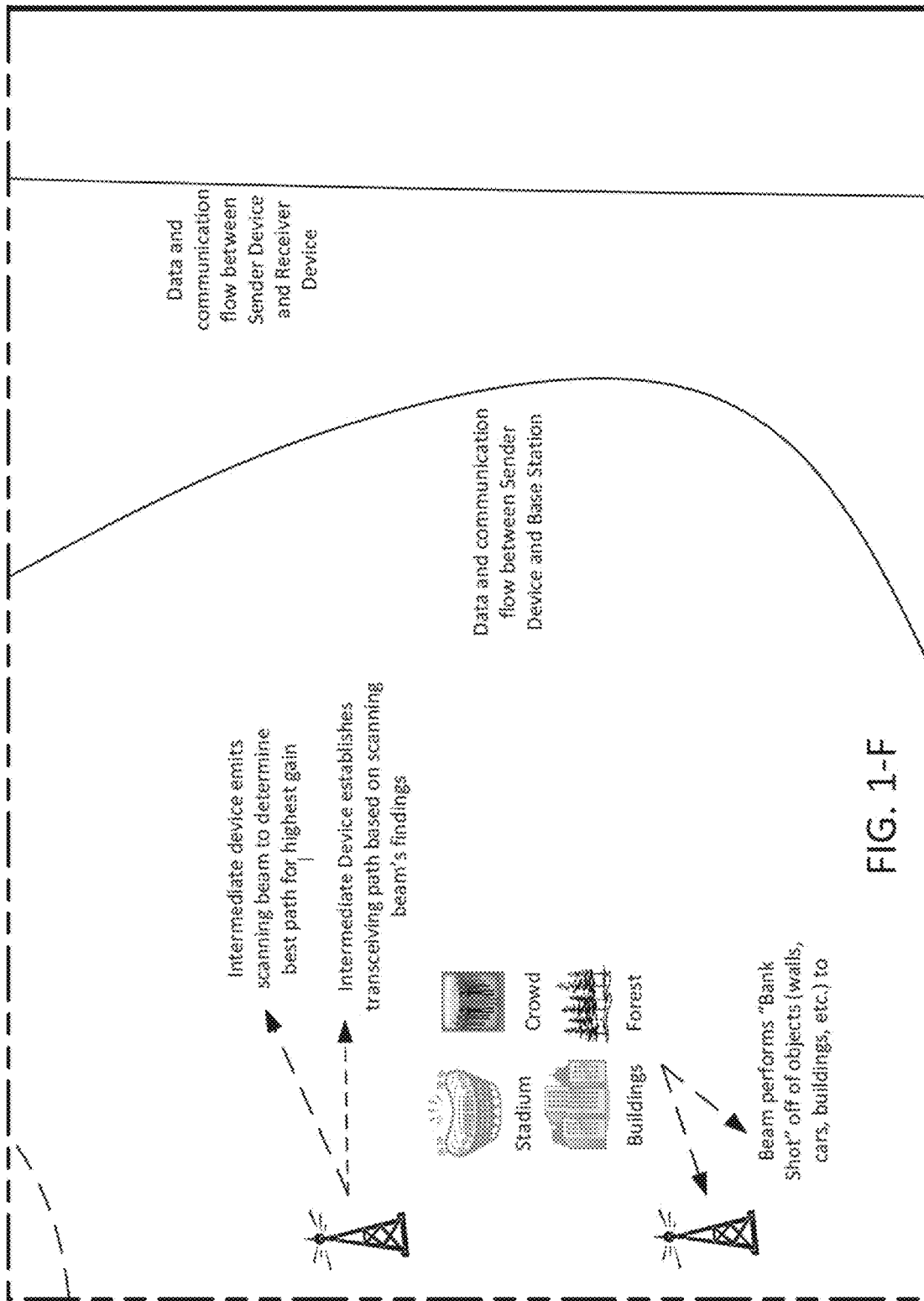
FIG. 1-F

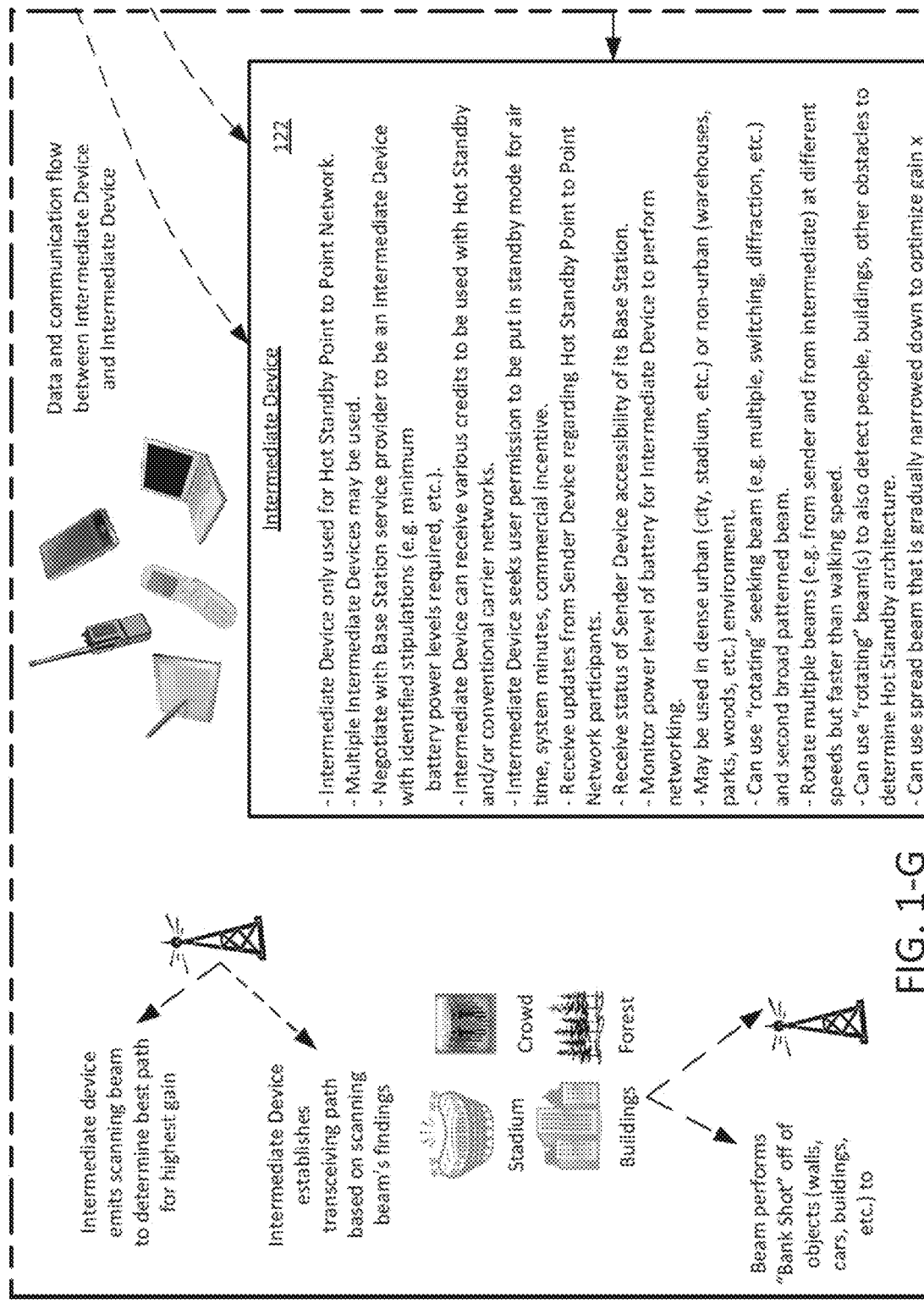
FIG. 1-G

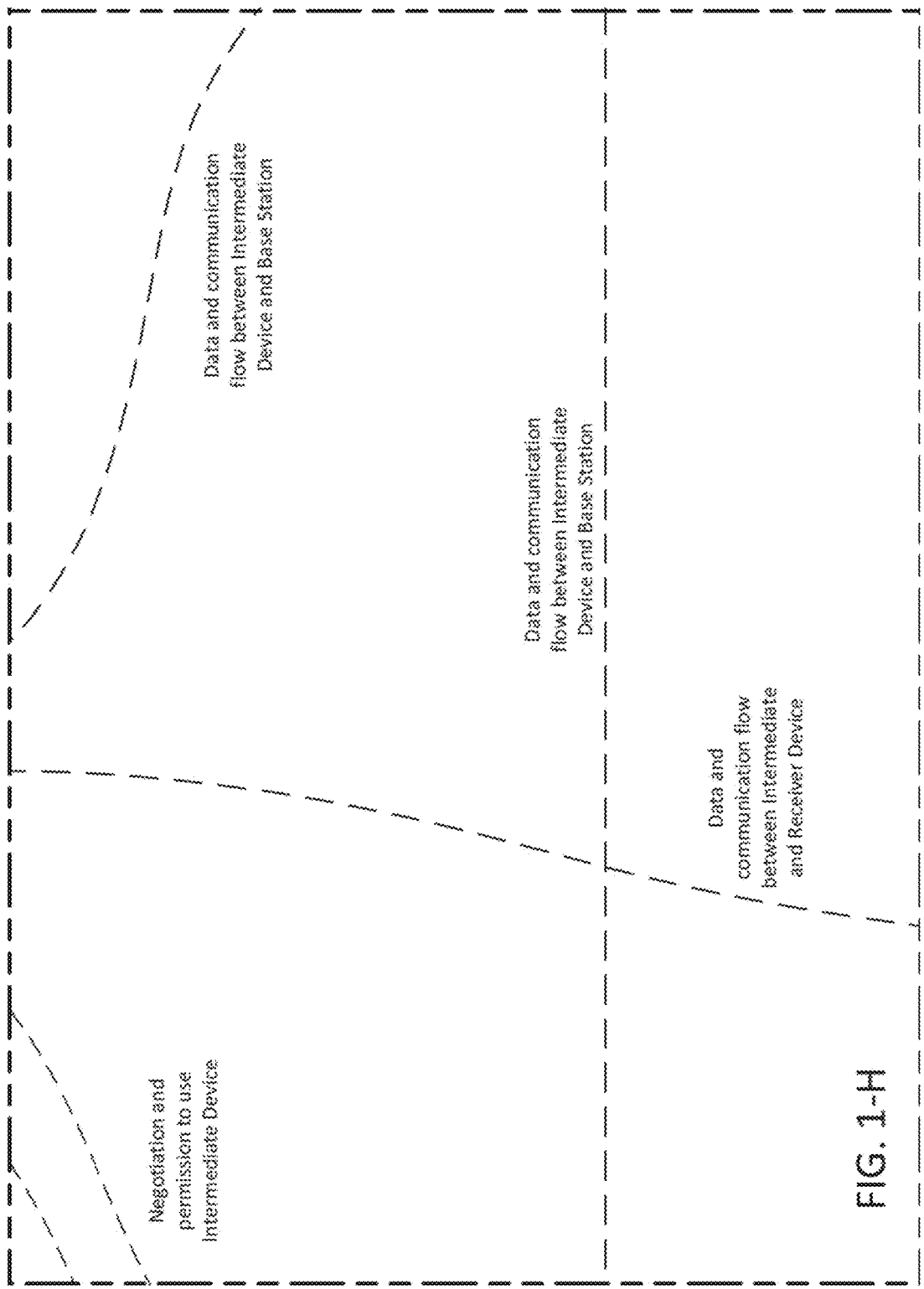
FIG. 1-H

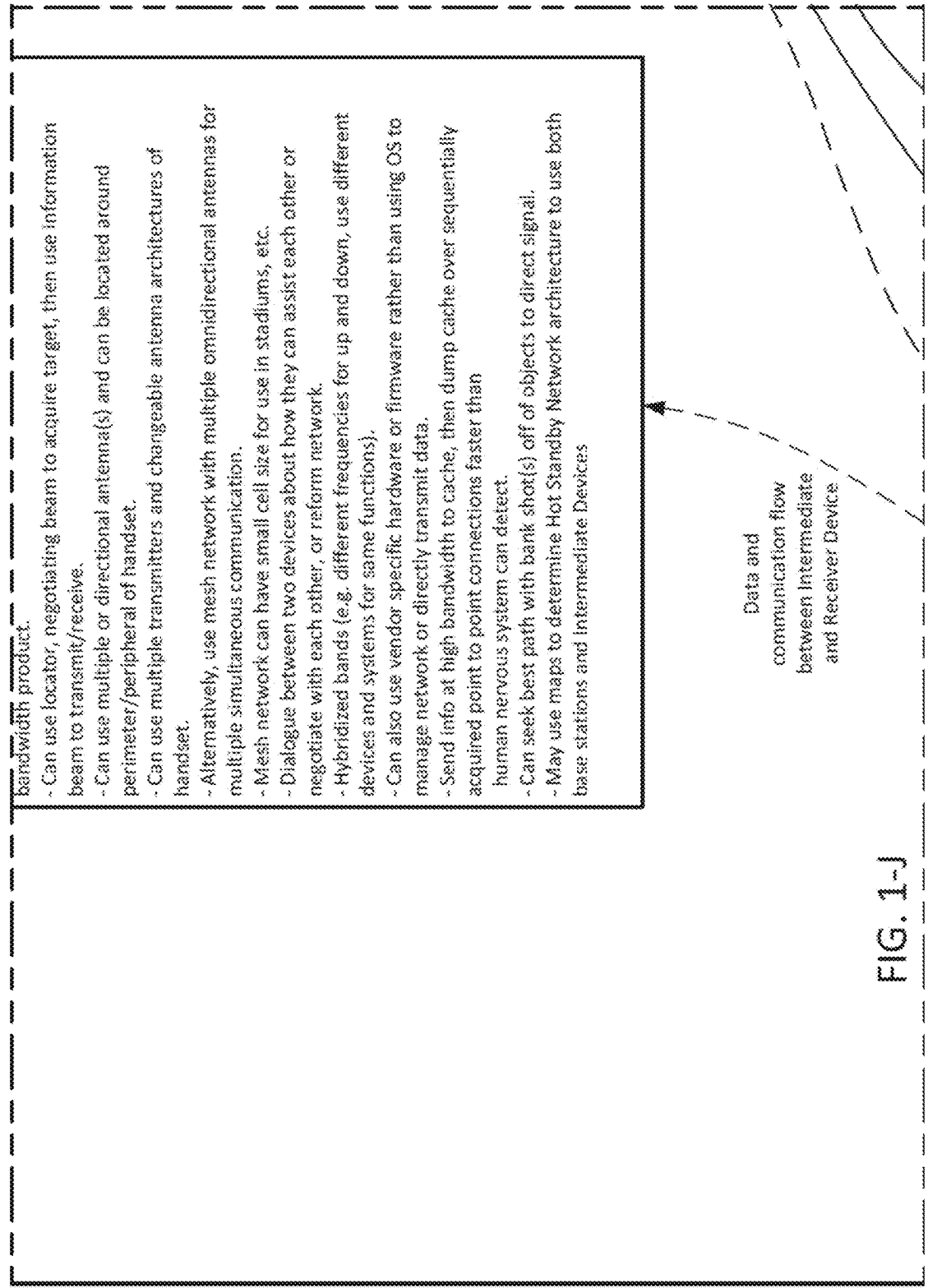
FIG. 1-J

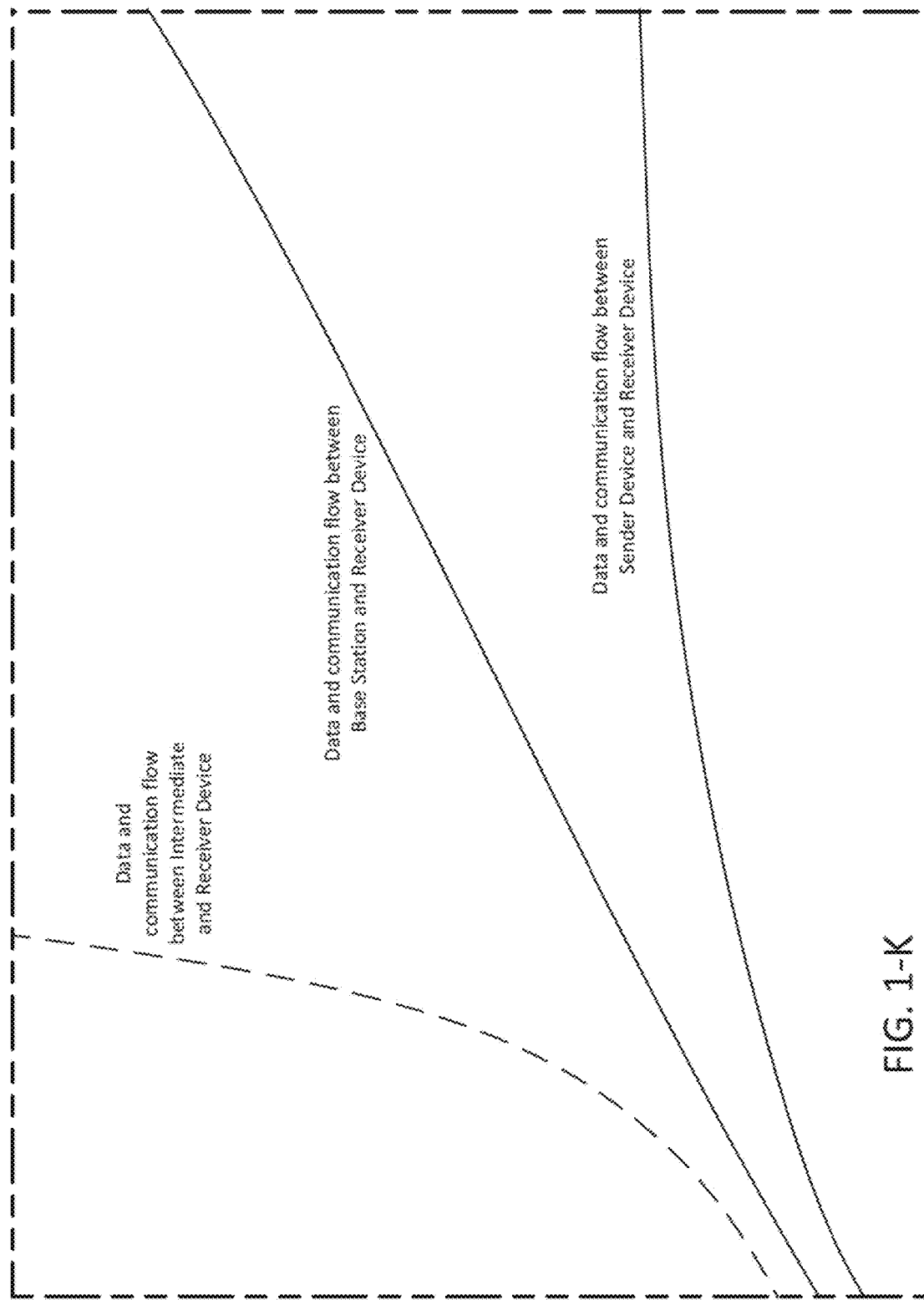
FIG. 1-K

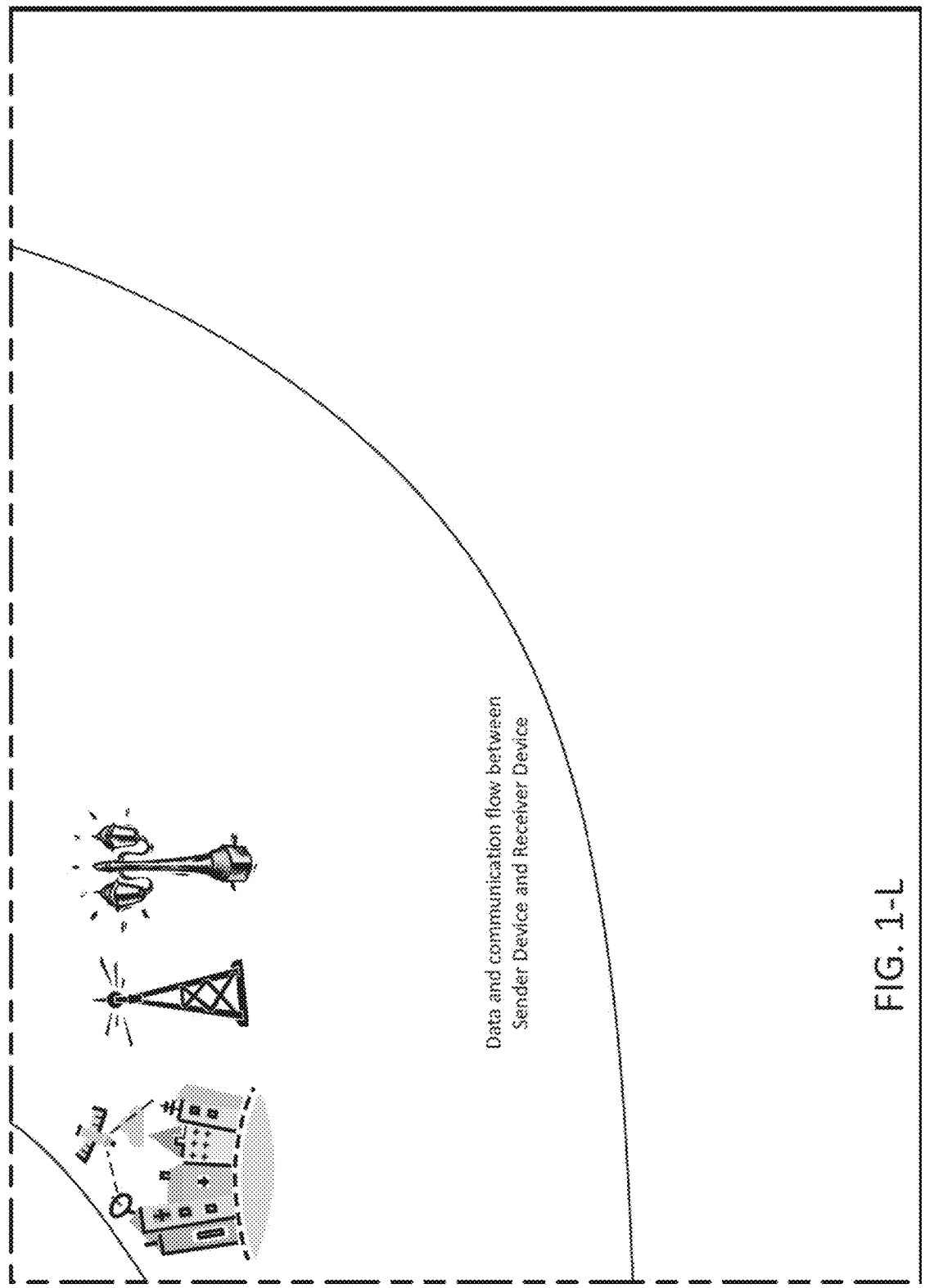
FIG. 1-L

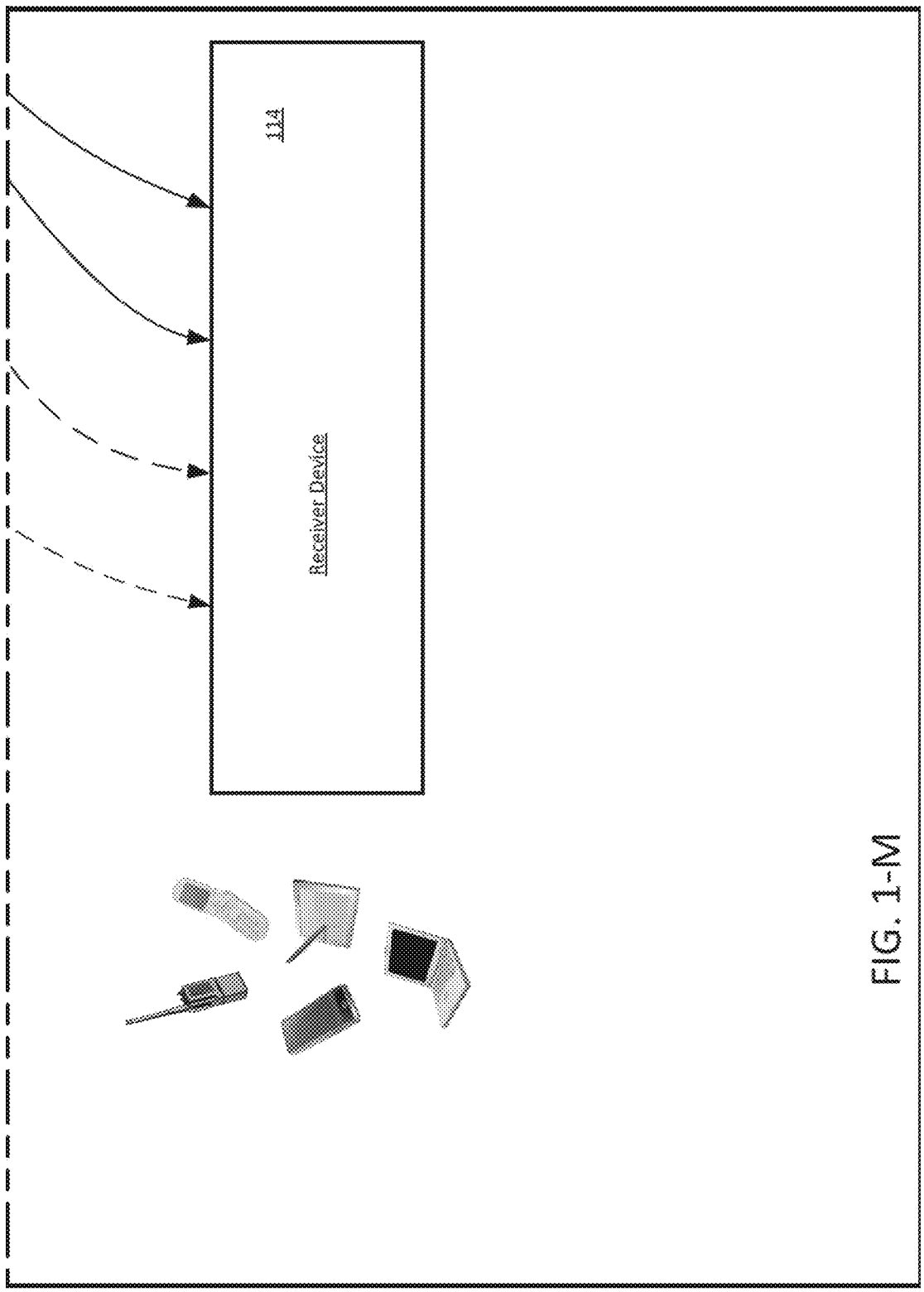

m10 processing module m11 electronically receiving communication network relay related transmissions associated with first portions of mobile operating system operated intermediate electronic communication device functionality related to communication network relay functionality of a mobile operating system operated intermediate electronic communication device as standby communication network relays upon activation thereof for use by origination electronic communication devices to communicate with destination electronic communication devices, the mobile operating system operated intermediate electronic communication device functionality including second portions related to mobile electronic communication device functionality of the mobile operating system operated intermediate electronic communication device for communication initiated by the mobile operating system operated intermediate electronic communication device module m12 electronically establishing responses to the communication network relay related transmissions associated with first portions of mobile operating system operated intermediate electronic communication device functionality related to communication network relay functionality of the mobile operating system operated intermediate electronic communication device as standby communication network relays module m13 electronically transmitting the responses to the communication network relay related transmissions associated with first portions of mobile operating system operated intermediate electronic communication device functionality related to communication network relay functionality of the mobile operating system operated intermediate electronic communication device as standby communication network relays module

FIG. 4 m11 electronically receiving communication network relay related transmissions associated with first portions of mobile operating system operated intermediate electronic communication device functionality related to communication network relay functionality of a mobile operating system operated intermediate electronic communication device as standby communication network relays upon activation thereof for use by origination electronic communication devices to communicate with destination electronic communication devices, the mobile operating system operated intermediate electronic communication device functionality including second portions related to mobile electronic communication device functionality of the mobile operating system operated intermediate electronic communication device for communication initiated by the mobile operating system operated intermediate electronic communication device module m1101 accessing data from a data source via a virtual machine representation of a computing machine including accessing data from a data source via a virtual machine representation of a real machine module m1102 accessing data from a data source via a virtual machine representation of a computing machine including accessing data from a data source via a virtual machine representation of a virtual machine module m1103 accessing data from a data source via a virtual machine representation of a virtual machine including converting a file having a file-type associated with the virtual machine to a file-type associated with the virtual machine representation module m1104 wherein the second virtual machine is configured for a limited-resource computing machine module m1105 wherein the file-type associated with the second virtual machine is configured for a mobile computing machine module m1106 activation based upon if direct access by the origination electronic communication devices to base stations of base station based communication networks otherwise used by the origination electronic communication devices becomes unavailable to the origination electronic communication devices module m1107 the mobile operating system operated intermediate electronic communication device being used by a user thereof as a mobile handset communication device for communication with users of other mobile handset communication devices module

FIG. 5A

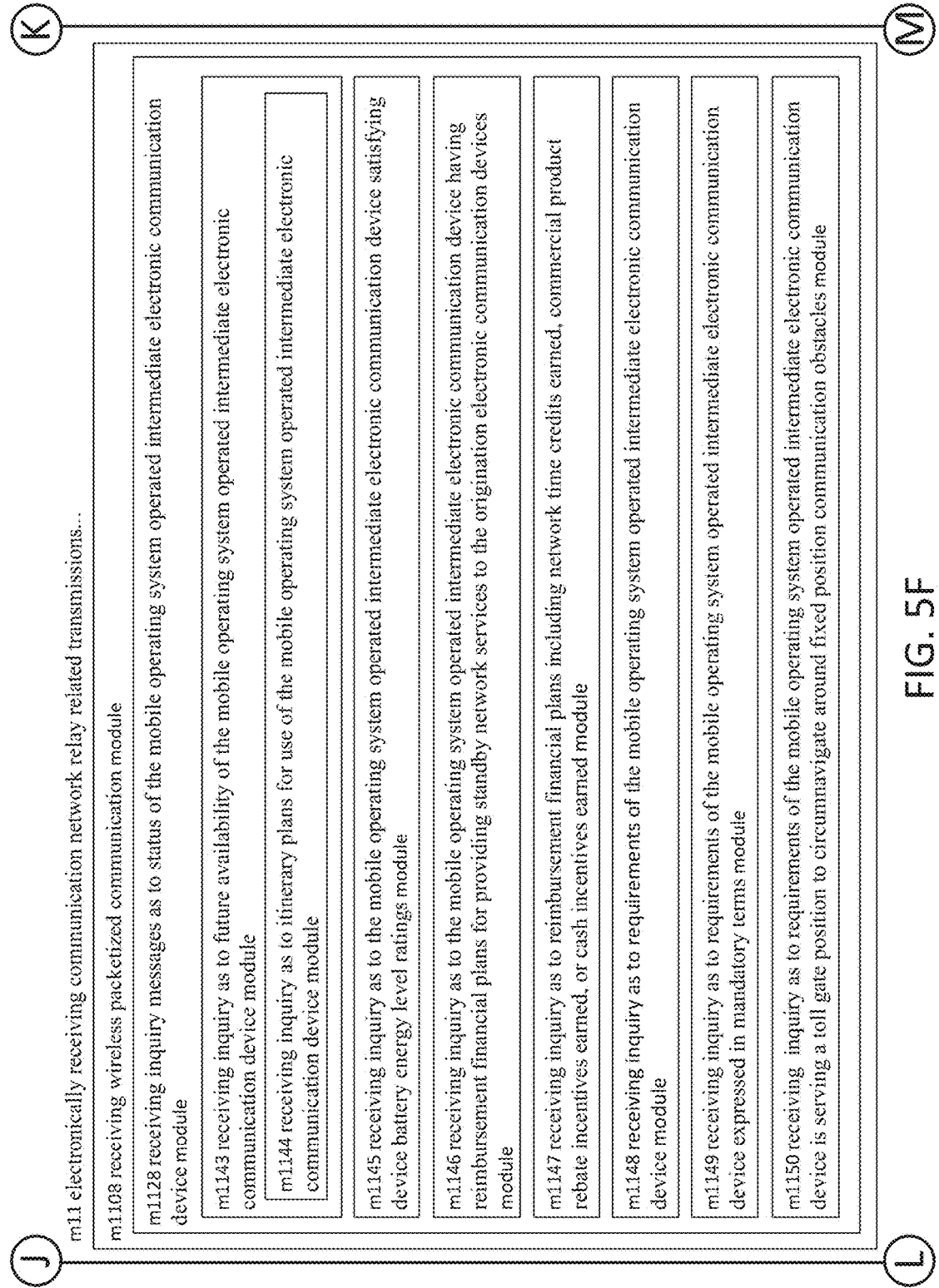

FIG. 5G

- m11 electronically receiving communication network relay related transmissions...
- m1108 receiving wireless packetized communication module
- m1128 receiving inquiry messages as to status of the mobile operating system operated intermediate electronic communication device module
  - m1151 receiving inquiry as to whether a proposed cost structure is sufficient to support use of the mobile operating system operated intermediate electronic communication device as a communication relay in standby communication networks module
    - m1152 receiving inquiry of compensation being in terms of network use credits module
  - m1153 receiving inquiry as to whether an affirmative decision has been made for the mobile operating system operated intermediate electronic communication device to serve as a standby relay in standby communication networks module
  - m1154 receiving inquiry as to whether the mobile operating system operated intermediate electronic communication device is an aerial drone module
  - m1155 receiving inquiry as to whether the mobile operating system operated intermediate electronic communication device as an aerial drone is capable of being steered by communication devices other than the mobile operating system operated intermediate electronic communication device module
  - m1156 receiving inquiry as to whether additional bandwidth capacity from the mobile operating system operated intermediate electronic communication device for use as a communication network relay can be purchased for additional compensation module
  - m1157 receiving inquiry as to whether the mobile operating system operated intermediate electronic communication device is attached to structure module
    - m1158 receiving inquiry as to whether the structure that the mobile operating system operated intermediate electronic communication device is moveable and whether the structure is capable of being steered as it is moving by communication devices other than the mobile operating system operated intermediate electronic communication device module
  - m1159 receiving inquiry as to whether packets of the inquiry messages have already been received by the mobile operating system operated intermediate electronic communication device module m12 electronically establishing responses to the communication network relay related transmissions associated with first portions of mobile operating system operated intermediate electronic communication device functionality related to communication network relay functionality of the mobile operating system operated intermediate electronic communication device as standby communication network relays module m1201 establishing through receiving information module m1202 receiving information involving access of data storage module m1203 receiving information involving receiving wireless transmissions module m1204 receiving location information regarding moveable objects that have previously obstructed communication of the mobile operating system operated intermediate electronic communication device module m1205 receiving information regarding time based distributions of instances of obstruction of electronic device communication of the mobile operating system operated intermediate electronic communication device for particular geographical locations module m1206 receiving information regarding statistical probabilities of remaining in communication with the mobile operating system operated intermediate electronic communication device for a projected travel itinerary of the origination electronic communication devices module m1207 receiving GPS positioning data regarding the mobile operating system operated intermediate electronic communication devices module m1208 receiving information associated with communication histories of successful communications of other electronic communication devices communicating with the mobile operating system operated intermediate electronic communication device module m1209 receiving information as communication history data previously stored and forwarded between electronic communication devices module m1210 receiving information regarding potential obstructions to electronic network relay communication located proximate to of the mobile operating system operated intermediate electronic communication device module

FIG. 6A m12 electronically establishing responses to the communication network relay related transmissions...

m1201 establishing through receiving information module m1210 receiving information regarding potential obstructions to electronic network relay communication located proximate to of the mobile operating system operated intermediate electronic communication device module m1211 receiving information regarding moveable communication obstructions module m1212 receiving information regarding moveable communication obstructions as pedestrians module m1213 receiving information regarding potential obstructions to electronic network relay communication as architectural structures module m1214 receiving information regarding architectural communication obstructions as stadiums module m1215 receiving information regarding communication capacity available to standby communication networks for the mobile operating system operated intermediate electronic communication device module m1216 receiving information regarding potential obstructions to electronic communication with the origination electronic communication devices that are proximate to the origination communication devices module m1217 receiving information from fixed position communication network base stations module m1218 receiving information regarding potential obstructions to electronic relay network communication with destination electronic communication devices proximate to destination electronic communication devices module m1219 receiving service quality ratings regarding the mobile operating system operated intermediate electronic communication device module m1220 receiving cost ratings involved with standby network service plans associated with the mobile operating system operated intermediate electronic communication device module

FIG. 6B m13 electronically transmitting the responses to the communication network relay related transmissions associated with first portions of mobile operating system operated intermediate electronic communication device functionality related to communication network relay functionality of the mobile operating system operated intermediate electronic communication device as standby communication network relays module m1301 transmitting by relaying the communication network relay related transmissions on to an electronic communication device other than that electronic communication device that transmitted the communication network relay related transmissions module m1302 relaying the communication network relay related transmissions on to another mobile operating system operated intermediate electronic communication device other than the mobile operating system operated intermediate electronic communication device module m1303 relaying the communication network relay related transmissions on to a base station of a base station based communication network module m1304 relaying the communication network relay related transmissions on to one of the destination electronic communication devices module m1305 relaying the communication network relay related transmissions on to one of the destination electronic communication devices module m1306 relaying the communication network relay related transmissions as audio files, video files, high capacity data files, or message traffic module m1307 relaying the communication network relay related transmissions as gigabit sized communication traffic files module m1308 relaying the communication network relay related transmissions as having a communication protocol other than that used for their prior reception module m1309 relaying the communication network relay related transmissions as having a communication protocol identical to that used for their prior reception module

A

B

FIG. 7A m13 electronically transmitting the responses to the communication network relay related transmissions...

m1310 transmitting status information to an electronic communication device that transmitted the communication network relay related transmissions module m1311 transmitting an acknowledgement that the mobile operating system operated intermediate electronic communication device is to join standby communication networks module m1312 transmitting response messages regarding status inquires module m1313 transmitting service quality ratings regarding the mobile operating system operated intermediate electronic communication device module m1314 transmitting cost ratings involved with standby network service plans associated with the mobile operating system operated intermediate electronic communication device module m1315 transmitting availability forecast ratings involved with standby networks associated with the mobile operating system operated intermediate electronic communication device module m1316 transmitting reliability ratings involved with potential standby networks associated with the mobile operating system operated intermediate electronic communication device module m1317 transmitting duration of connection ratings involved with the mobile operating system operated intermediate electronic communication device module m1318 transmitting communication bandwidth ratings involved with potential standby communication networks associated with the mobile operating system operated intermediate electronic communication device module m1319 transmitting map data related to the mobile operating system operated intermediate electronic communication device regarding communication therewith module m1320 transmitting map data regarding obstructions to communication with the mobile operating system operated intermediate electronic communication device module m1321 transmitting location information regarding electronic communication devices other than the mobile operating system operated intermediate electronic communication device module

FIG. 7B

FIG. 9B o11 electronically receiving one or more communication network relay related transmissions at least in part associated with one or more first portions of mobile operating system operated intermediate electronic communication device...

o1103 electronically receiving one or more communication network relay related transmissions at least in part associated with one or more first portions of mobile operating system operated intermediate electronic communication device functionality related at least in part to communication network relay functionality and the mobile operating system operated intermediate electronic communication device functionality including one or more second portions related at least in part to mobile electronic communication device functionality including accessing data from a data source via a virtual machine representation of at least a part of a virtual machine including converting a file having a file-type associated with the virtual machine to a file-type associated with the virtual machine representation o1104 accessing data from a data source via a virtual machine representation of at least a part of a virtual machine including converting a file having a file-type associated with the virtual machine to a file-type associated with the virtual machine representation including wherein the file-type associated with the second virtual machine is configured for a limited-resource computing machine o1105 wherein the file-type associated with the second virtual machine is configured for a limited-resource computing machine including wherein the file-type associated with the second virtual machine is configured for a mobile computing machine o1106 electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof including activation based at least in part upon if direct access by the one or more origination electronic communication devices to one or more base stations of one or more base station based communication networks otherwise used by the one or more origination electronic communication devices becomes unavailable to one or more the origination electronic communication devices

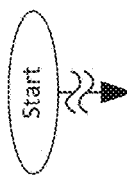 Start

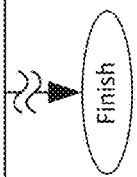 Finish

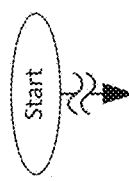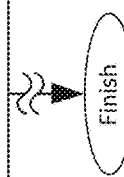

FIG. 9C o11 electronically receiving one or more communication network relay related transmissions at least in part associated with one or more first portions of mobile operating system operated intermediate electronic communication device...

o1107 the one or more second portions related at least in part to mobile electronic communication device functionality of the mobile operating system operated intermediate electronic communication device for communication initiated at least in part by the mobile operating system operated intermediate electronic communication device including the mobile operating system operated intermediate electronic communication device being used by a user thereof as a mobile handset communication device for communication with one or more users of other one or more mobile handset communication devices o1108 electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof including receiving wireless packetized communication o1109 receiving wireless packetized communication including receiving incoming message traffic o1110 receiving incoming message traffic including receiving one or more high bandwidth data transfers o1111 receiving incoming message traffic including receiving one or more high resolution audio formatted messages o1112 receiving incoming message traffic including receiving one or more high resolution video formatted messages o1113 receiving incoming message traffic including receiving one or more high capacity data files o1114 receiving wireless packetized communication including receiving the one or more communication network relay related transmissions from one or more origination electronic communication devices

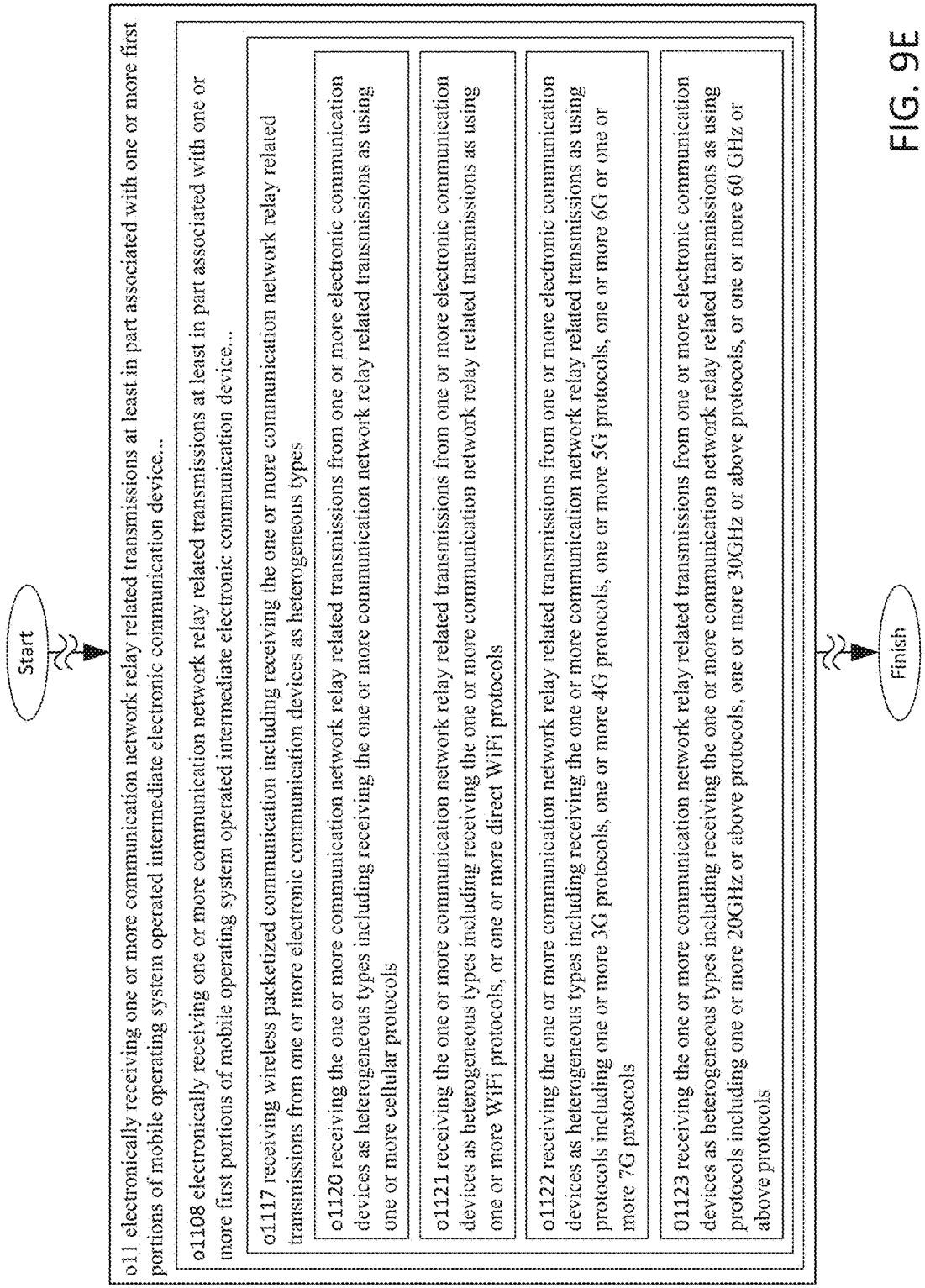

o11 electronically receiving one or more communication network relay related transmissions at least in part associated with one or more first portions of mobile operating system operated intermediate electronic communication device...

o1108 electronically receiving one or more communication network relay related transmissions at least in part associated with one or more first portions of mobile operating system operated intermediate electronic communication device...

o1128 receiving wireless packetized communication including receiving one or more inquiry messages...

o1133 receiving one or more inquiry messages as to status of the mobile operating system operated intermediate electronic communication device including receiving at least in part duration of connection ratings involved with the mobile operating system operated intermediate electronic communication device o1134 receiving one or more inquiry messages as to status of the mobile operating system operated intermediate electronic communication device including receiving at least in part communication bandwidth ratings involved with potential one or more standby communication networks associated with the mobile operating system operated intermediate electronic communication device o1135 receiving one or more inquiry messages as to status of the mobile operating system operated intermediate electronic communication device including receiving at least in part map data related to the mobile operating system operated intermediate electronic communication device o1136 receiving at least in part map data related to the mobile operating system operated intermediate electronic communication device including receiving at least in part map data regarding one or more obstructions to communication with the mobile operating system operated intermediate electronic communication device

FIG. 9H

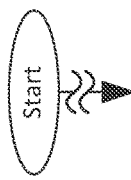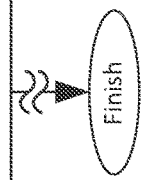

FIG. 9I o11 electronically receiving one or more communication network relay related transmissions at least in part associated with one or more first portions of mobile operating system operated intermediate electronic communication device...

o1108 electronically receiving one or more communication network relay related transmissions at least in part associated with one or more first portions of mobile operating system operated intermediate electronic communication device...

o1128 receiving wireless packetized communication including receiving one or more inquiry messages...

o1135 receiving one or more inquiry messages as to status of the mobile operating system operated intermediate electronic communication device including receiving at least in part map data related to the mobile operating system operated intermediate electronic communication device o1136 receiving at least in part map data related to the mobile operating system operated intermediate electronic communication device including receiving at least in part map data regarding one or more obstructions to communication with the mobile operating system operated intermediate electronic communication device o1137 receiving at least in part map data regarding one or more obstructions to communication with the mobile operating system operated intermediate electronic communication device including receiving at least in part map data regarding location data of moveable obstructions to communication with the mobile operating system operated intermediate electronic communication device o1138 receiving at least in part map data regarding one or more obstructions to communication with the mobile operating system operated intermediate electronic communication device including receiving at least in part map data regarding location data of stationary obstructions to communication with the mobile operating system operated intermediate electronic communication device

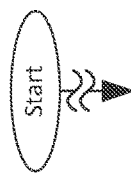
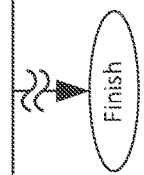

o11 electronically receiving one or more communication network relay related transmissions at least in part associated with one or more first portions of mobile operating system operated intermediate electronic communication device...

o1108 electronically receiving one or more communication network relay related transmissions at least in part associated with one or more first portions of mobile operating system operated intermediate electronic communication device...

o1128 receiving wireless packetized communication including receiving one or more inquiry messages...

o1143 receiving one or more inquiry messages as to status of the mobile operating system operated intermediate electronic communication device including receiving inquiry as to future availability of the mobile operating system operated intermediate electronic communication device o1143 receiving one or more inquiry messages as to status of the mobile operating system operated intermediate electronic communication device including receiving inquiry as to future availability of the mobile operating system operated intermediate electronic communication device o1144 receiving inquiry as to future availability of the mobile operating system operated intermediate electronic communication device including receiving inquiry as to itinerary plans for use of the mobile operating system operated intermediate electronic communication device o1145 receiving one or more inquiry messages as to status of the mobile operating system operated intermediate electronic communication device including receiving inquiry as to the mobile operating system operated intermediate electronic communication device satisfying one or more device battery energy level ratings

FIG. 9K

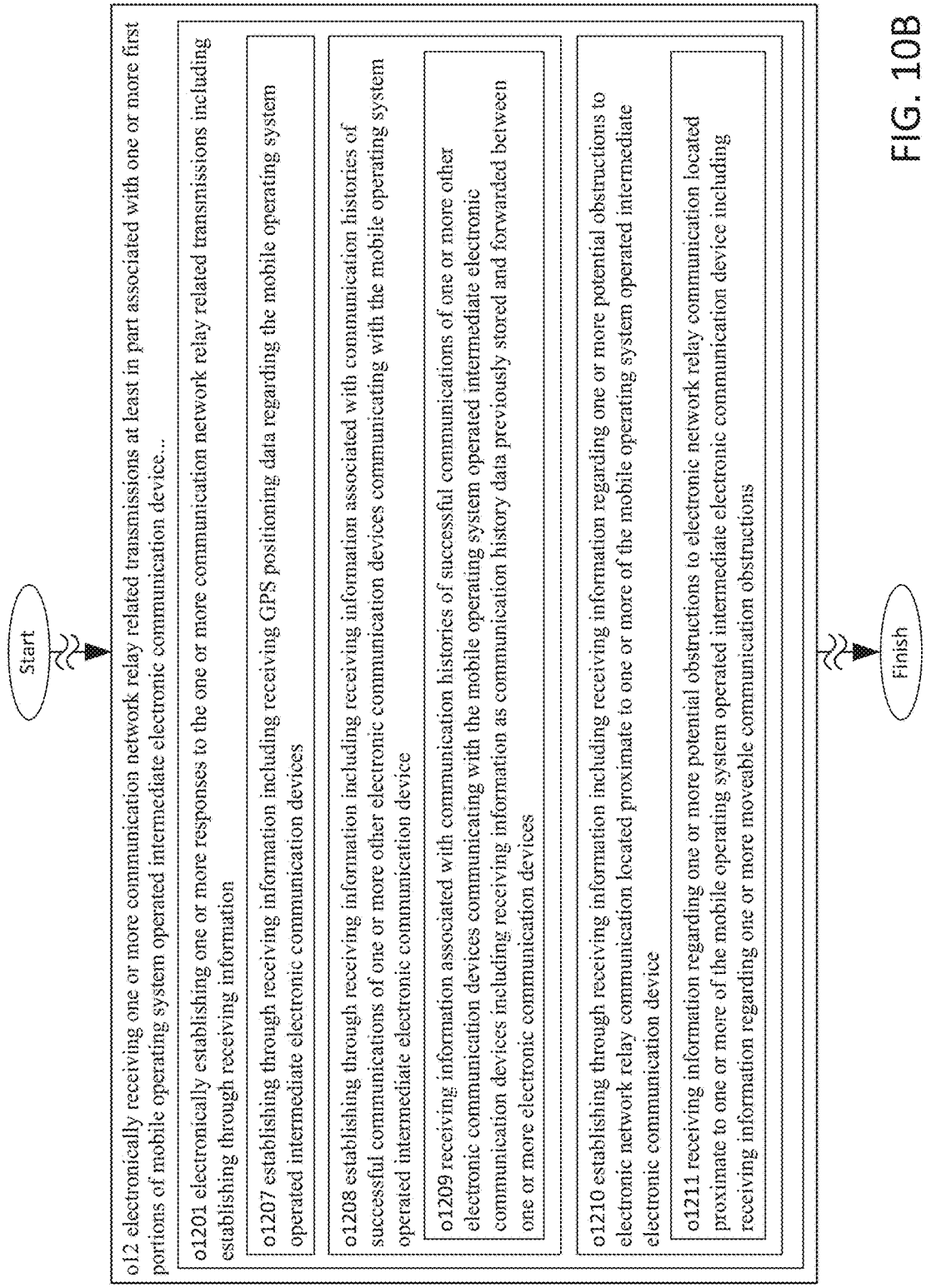

o12 electronically receiving one or more communication network relay related transmissions at least in part associated with one or more first portions of mobile operating system operated intermediate electronic communication device...

o1201 electronically establishing one or more responses to the one or more communication network relay related transmissions including establishing through receiving information o1210 establishing through receiving information including receiving information regarding one or more potential obstructions...

o1216 receiving information regarding one or more potential obstructions to electronic network relay communication located proximate to one or more of the mobile operating system operated intermediate electronic communication device including receiving information regarding one or more potential obstructions to electronic communication with the one or more origination electronic communication devices that are proximate to the one or more origination communication devices o1217 receiving information regarding one or more potential obstructions to electronic network relay communication located proximate to one or more of the mobile operating system operated intermediate electronic communication device including receiving information from one or more fixed position communication network base stations o1218 receiving information regarding one or more potential obstructions to electronic network relay communication located proximate to one or more of the mobile operating system operated intermediate electronic communication device including receiving information regarding one or more potential obstructions to electronic relay network communication with one or more destination electronic communication devices proximate to one or more destination electronic communication devices o1219 establishing through receiving information including receiving at least in part service quality ratings regarding the mobile operating system operated intermediate electronic communication device

FIG. 10D

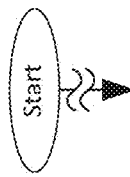
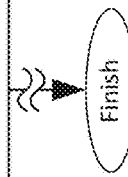

FIG. 11C o13 electronically transmitting the one or more responses to the one or more communication network relay related transmissions at least in part associated with one or more first portions of mobile operating system operated intermediate electronic communication device...

o1310 electronically transmitting the one or more responses to the one or more communication network relay related transmissions including transmitting status information to an electronic communication device that transmitted the one or more communication network relay related transmissions o1311 transmitting status information to an electronic communication device that transmitted the one or more communication network relay related transmissions including transmitting an acknowledgement that the mobile operating system operated intermediate electronic communication device is to join one or more standby communication networks o1312 transmitting status information to an electronic communication device that transmitted the one or more communication network relay related transmissions including transmitting one or more response messages regarding one or more status inquires o1313 transmitting one or more response messages regarding one or more status inquires including transmitting at least in part service quality ratings regarding the mobile operating system operated intermediate electronic communication device o1314 transmitting one or more response messages regarding one or more status inquires including transmitting at least in part cost ratings involved with standby network service plans associated with the mobile operating system operated intermediate electronic communication device o1315 transmitting one or more response messages regarding one or more status inquires including transmitting at least in part availability forecast ratings involved with one or more standby networks associated with the mobile operating system operated intermediate electronic communication device

DYNAMIC POINT TO POINT MOBILE NETWORK INCLUDING INTERMEDIATE DEVICE ASPECTS SYSTEM AND METHOD

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/891,369, entitled DYNAMIC POINT TO POINT MOBILE NETWORK SYSTEM AND METHOD, naming Roderick A. Hyde, Edward K.Y. Jung, Royce A. Levien, Richard T. Lord, Robert W. Lord, Mark A. Malamud, Doug O. Reudink and Clarence T. Tegreene as inventors, filed 10 May, 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/927,870, entitled DYNAMIC POINT TO POINT MOBILE NETWORK INCLUDING ORIGINATION DEVICE ASPECTS SYSTEM AND METHOD, naming Roderick A. Hyde, Edward K.Y. Jung, Royce A. Levien, Richard T. Lord, Robert W. Lord, Mark A. Malamud, Doug O. Reudink and Clarence T. Tegreene as inventors, filed 26 Jun. 2013, which is currently co-pending or is an application of which a currently co-pending application is entitled to the benefit of the filing date.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

SUMMARY

In one aspect, a computationally-implemented method includes, but is not limited to electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including one or more second portions related at least in part to mobile electronic communication device functionality of the mobile operating system operated intermediate electronic communication device for communication initiated at least in part by the mobile operating system operated intermediate electronic communication device; electronically establishing one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays; and electronically transmitting the one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including one or more second portions related at least in part to mobile electronic communication device functionality of the mobile operating system operated intermediate electronic communication device for communication initiated at least in part by the mobile operating system operated intermediate electronic communication device; means for electronically establishing one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays; and means for electronically transmitting the one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays. In addition to the foregoing, other system aspects are described in the claims, drawings, and text forming a part of the disclosure set forth herein.

A computationally-implemented system includes, but is not limited to electrical circuitry arrangement for electronically receiving communication network relay related transmissions associated with first portions of mobile operating system operated intermediate electronic communication device functionality related to communication network relay functionality of a mobile operating system operated intermediate electronic communication device as standby communication network relays upon activation thereof for use by origination electronic communication devices to communicate with destination electronic communication devices, the mobile operating system operated intermediate electronic communication device functionality including second portions related to mobile electronic communication device functionality of the mobile operating system operated intermediate electronic communication device for communication initiated by the mobile operating system operated intermediate electronic communication device; electrical circuitry arrangement for electronically establishing responses to the communication network relay related transmissions associated with first portions of mobile operating system operated intermediate electronic communication device functionality related to communication network relay functionality of the mobile operating system operated intermediate electronic communication device as standby communication network relays; and electrical circuitry arrangement for electronically transmitting the responses to the communication network relay related transmissions associated with first portions of mobile operating system operated intermediate electronic communication device functionality related to communication network relay functionality of the mobile operating system operated intermediate electronic communication device as standby communication network relays. In addition to the foregoing, other system aspects are described in the claims, drawings, and text forming a part of the disclosure set forth herein.

A system includes, but is not limited to electronically receiving communication network relay related transmissions associated with first portions of mobile operating system operated intermediate electronic communication device functionality related to communication network relay functionality of a mobile operating system operated intermediate electronic communication device as standby communication network relays upon activation thereof for use by origination electronic communication devices to communicate with destination electronic communication devices, the mobile operating system operated intermediate electronic communication device functionality including second portions related to mobile electronic communication device functionality of the mobile operating system operated intermediate electronic communication device for communication initiated by the mobile operating system operated intermediate electronic communication device module configured to operate in accordance with electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including one or more second portions related at least in part to mobile electronic communication device functionality of the mobile operating system operated intermediate electronic communication device for communication initiated at least in part by the mobile operating system operated intermediate electronic communication device; electronically establishing responses to the communication network relay related transmissions associated with first portions of mobile operating system operated intermediate electronic communication device functionality related to communication network relay functionality of the mobile operating system operated intermediate electronic communication device as standby communication network relays module configured to operate in accordance with electronically establishing one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays; and electronically transmitting the responses to the communication network relay related transmissions associated with first portions of mobile operating system operated intermediate electronic communication device functionality related to communication network relay functionality of the mobile operating system operated intermediate electronic communication device as standby communication network relays module configured to operate in accordance with electronically transmitting the one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays. In addition to the foregoing, other system aspects are described in the claims, drawings, and text forming a part of the disclosure set forth herein.

An article of manufacture including one or more non-transitory signal-bearing storage medium bearing one or more instructions for electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including one or more second portions related at least in part to mobile electronic communication device functionality of the mobile operating system operated intermediate electronic communication device for communication initiated at least in part by the mobile operating system operated intermediate electronic communication device; one or more instructions for electronically establishing one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays; and one or more instructions for electronically transmitting the one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including one or more second portions related at least in part to mobile electronic communication device functionality of the mobile operating system operated intermediate electronic communication device for communication initiated at least in part by the mobile operating system operated intermediate electronic communication device; electronically establishing one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays; and electronically transmitting the one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of is an example of Dynamic Point to Point Mobile Network Including Origination Device Aspects System and Method that may provide context, for instance, in introducing one or more processes and/or devices described herein.

In accordance with 37 CFR 1.84(h)(2)

Figure 1:
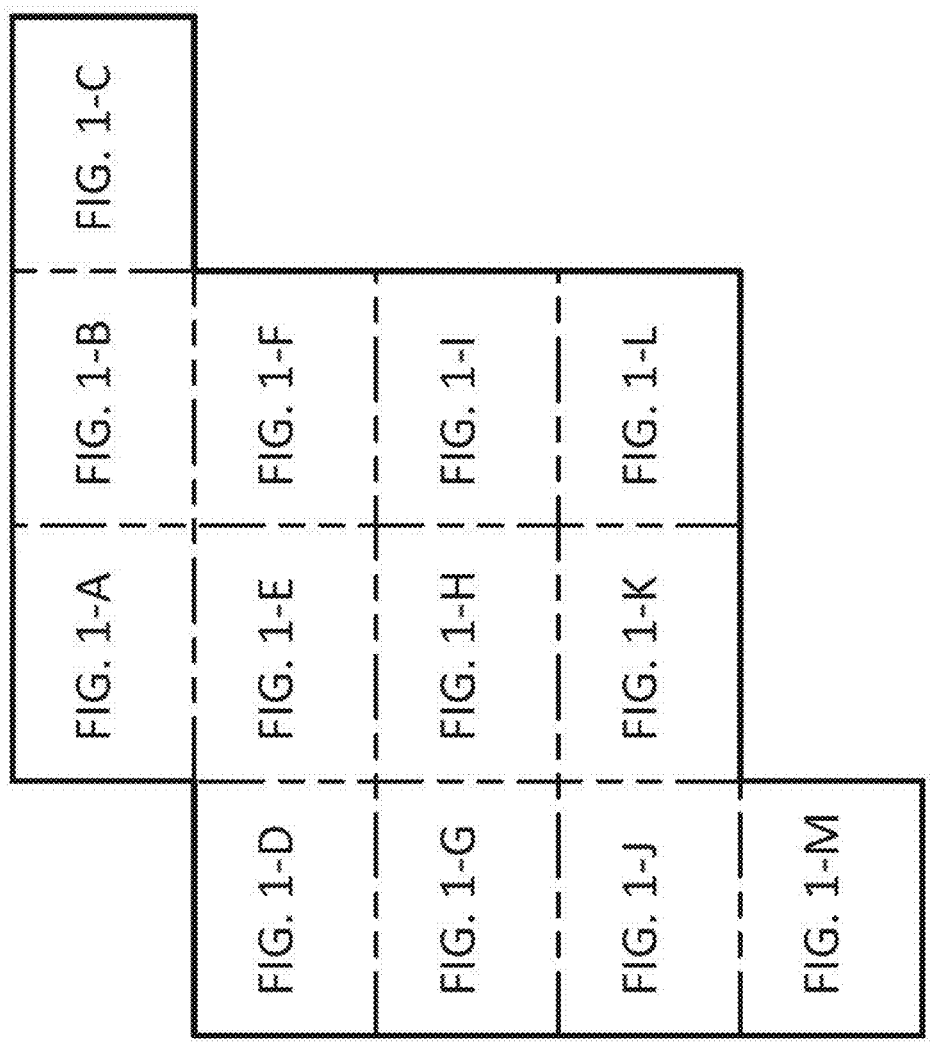
FIG. 1 shows how FIG. 1-A through FIG. 1-M are to be arranged to be assembled to form "a view of a large machine or device in its entirety . . . broken into partial views . . . extended over several sheets". The "views on two or more sheets form, in effect, a single complete view, [and] the views on the several sheets . . . [are] so arranged that the complete figure can be assembled" from "partial views drawn on separate sheets . . . linked edge to edge," in that the partial-view FIGS. 1-A through 1-M are ordered alphabetically, by increasing column from left to right, as shown in the following table (with further orientation as indicated by phantom-lines on the partial-view figures)
Figure 1:
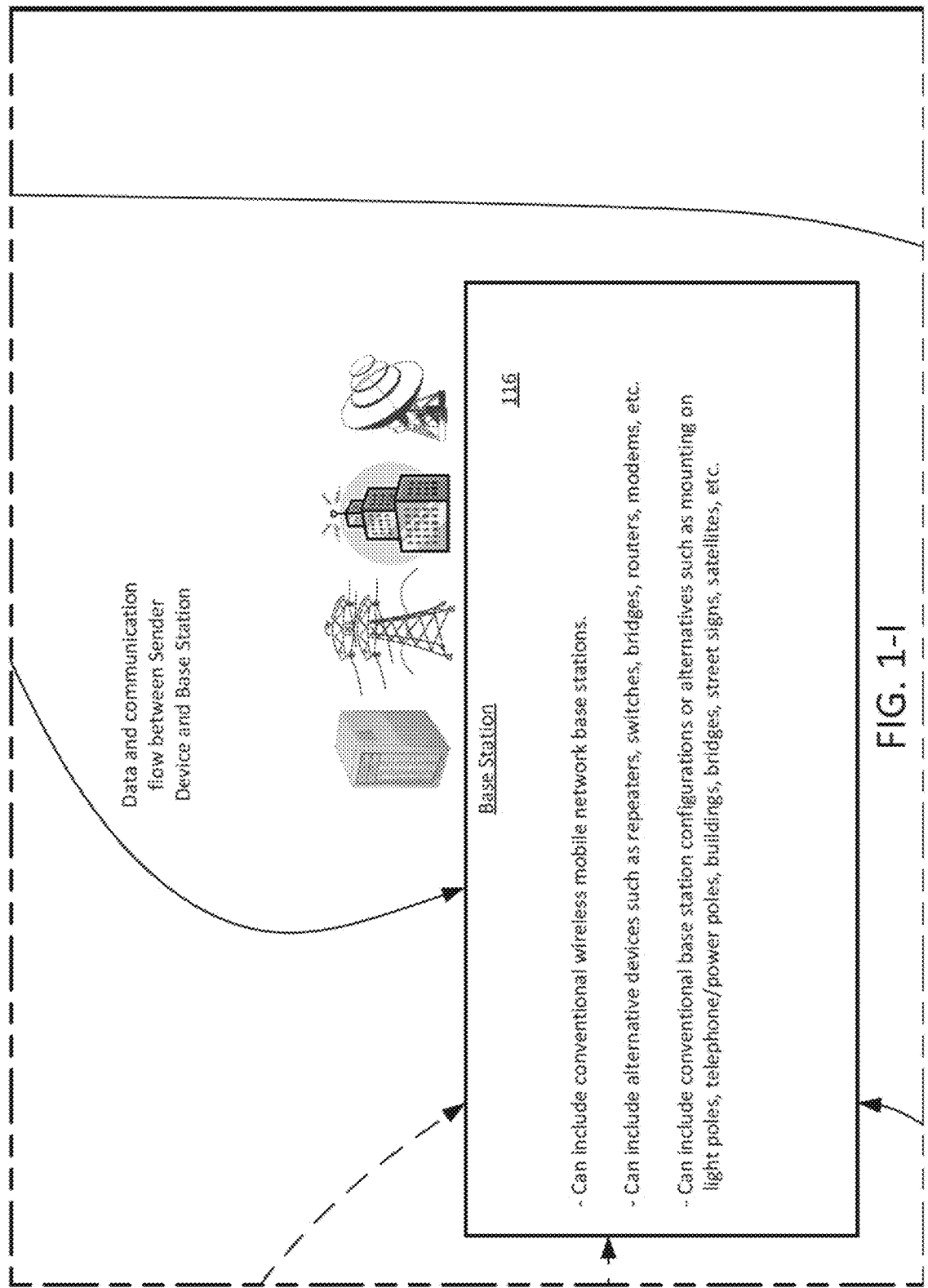

|         | FIG. 1-A | FIG. 1-B | FIG. 1-C |
|---------|----------|----------|----------|
| FIG. 1-D | FIG. 1-E | FIG. 1-F |          |
| FIG. 1-G | FIG. 1-H | FIG. 1-I |          |
| FIG. 1-J | FIG. 1-K | FIG. 1-L |          |
| FIG. 1-M |          |          |          |

FIG. 1-A through FIG. 1-M show a partially schematic diagram of an implementation(s) of a mobile network system.

Figure 2:
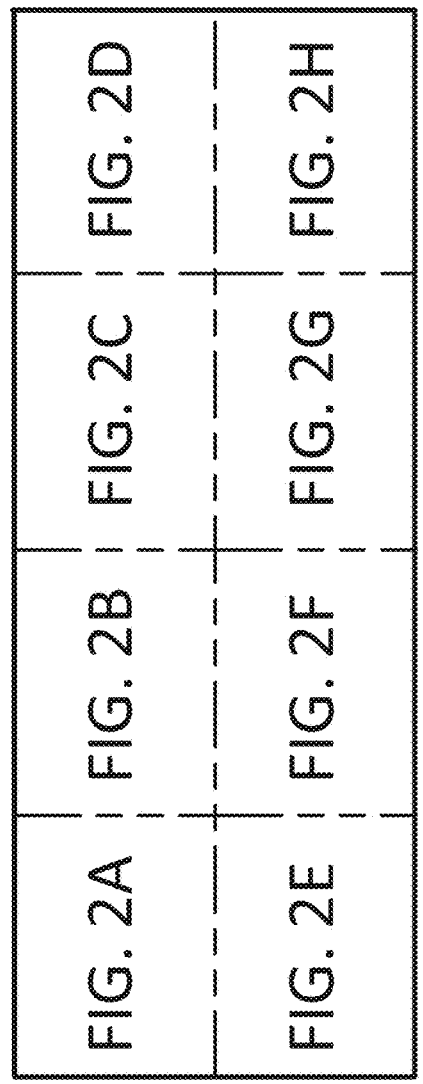
Figure 2A:
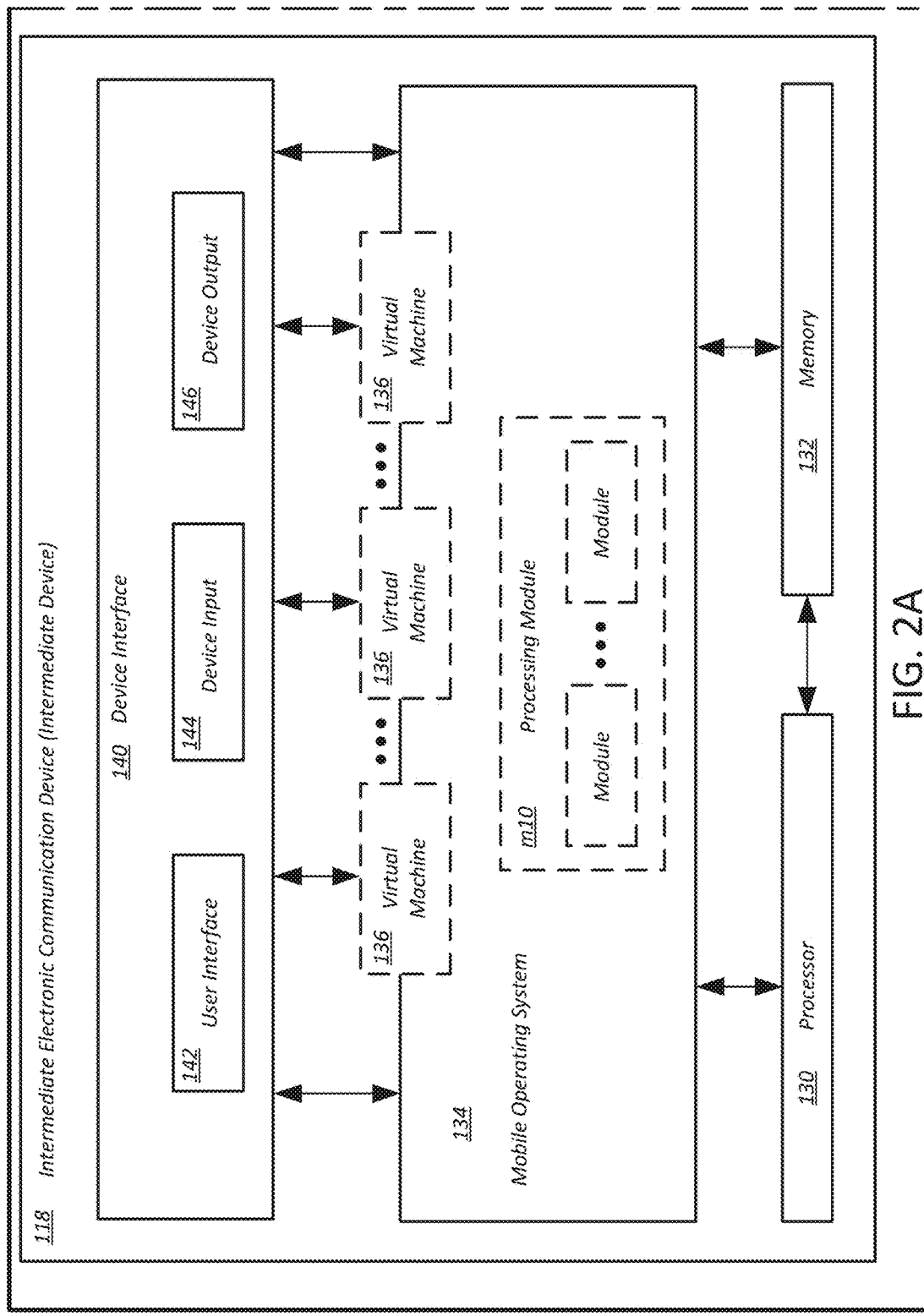
Figure 2B:
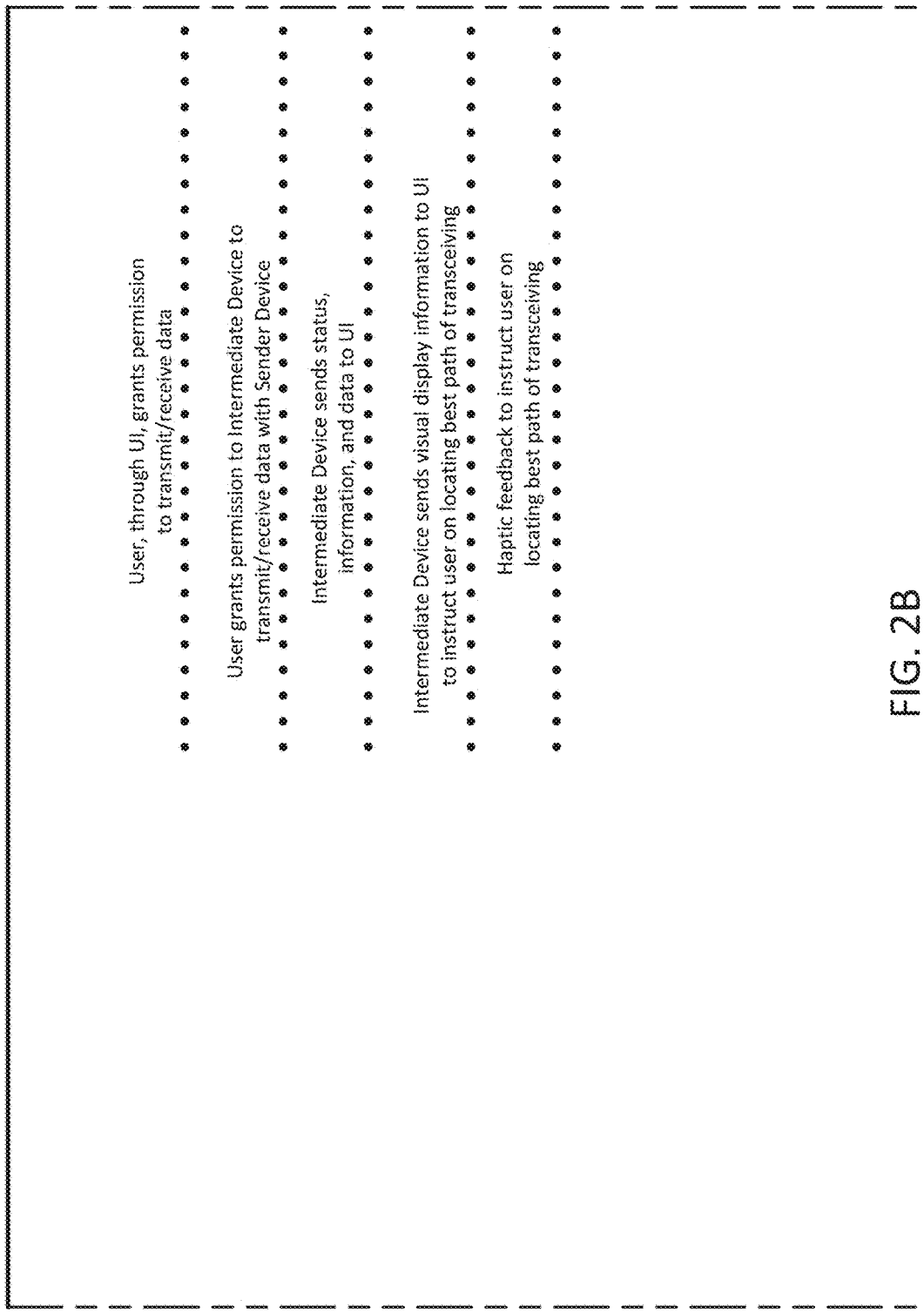
Figure 2C:
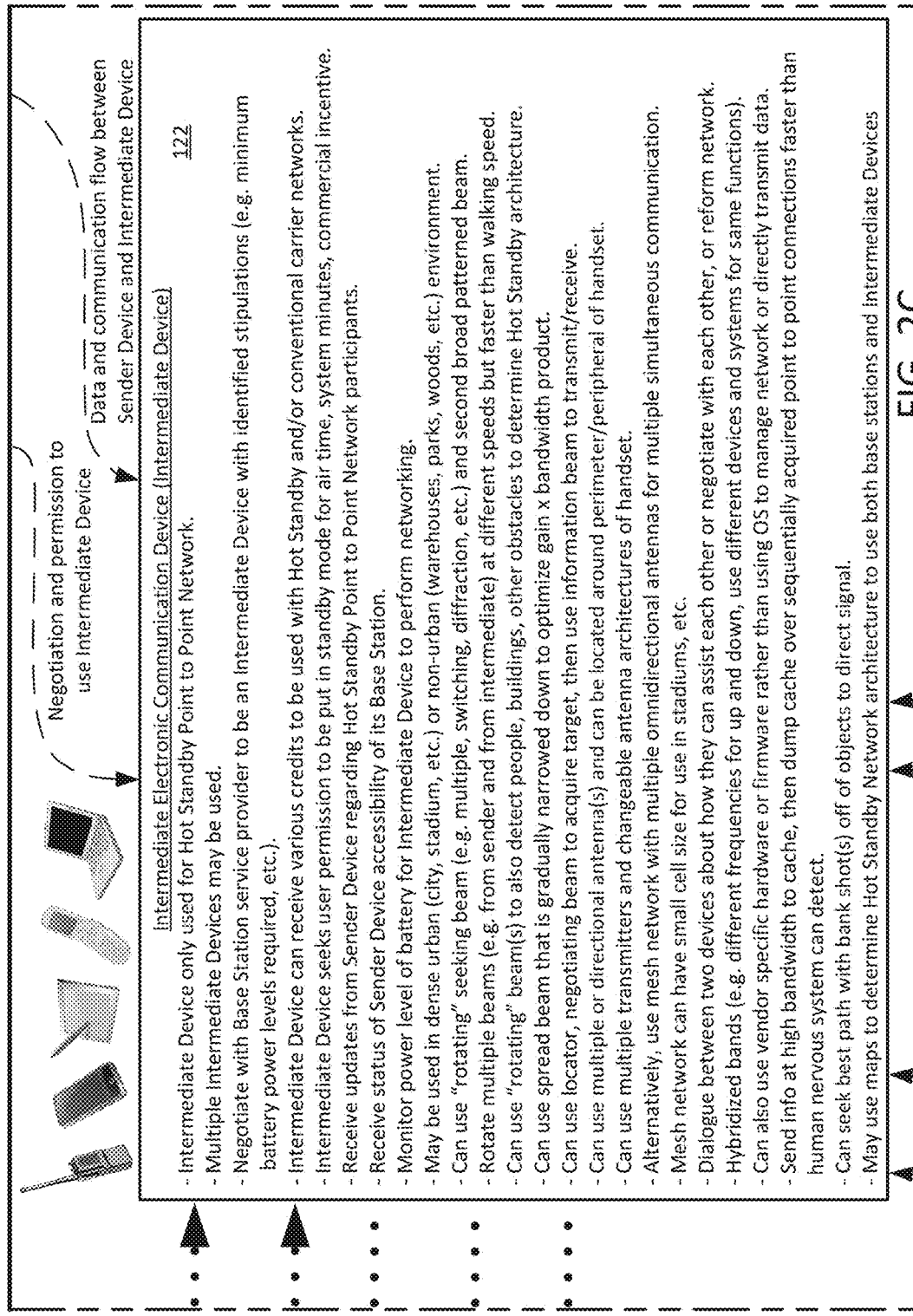
Figure 2D:
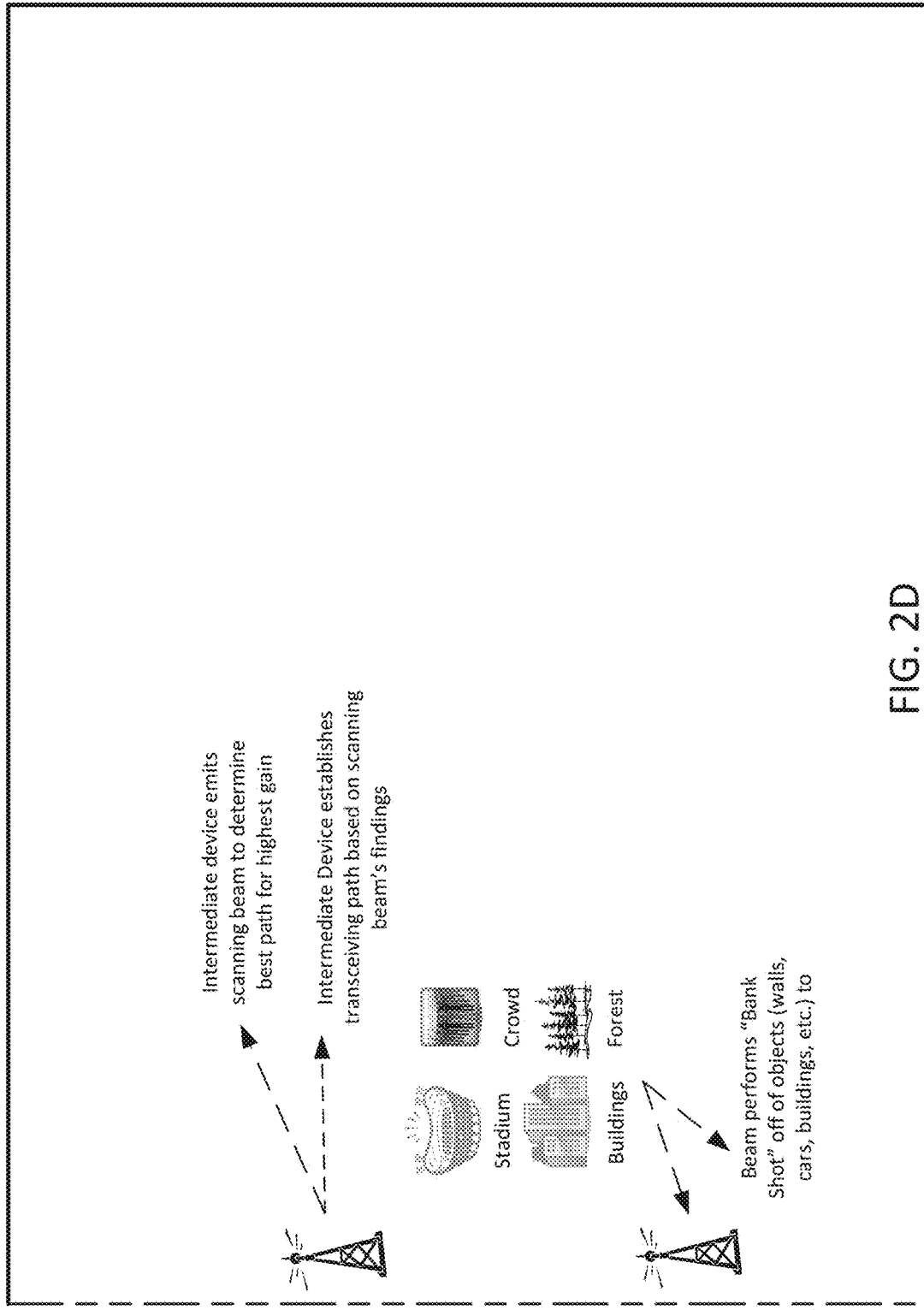
Figure 2E:
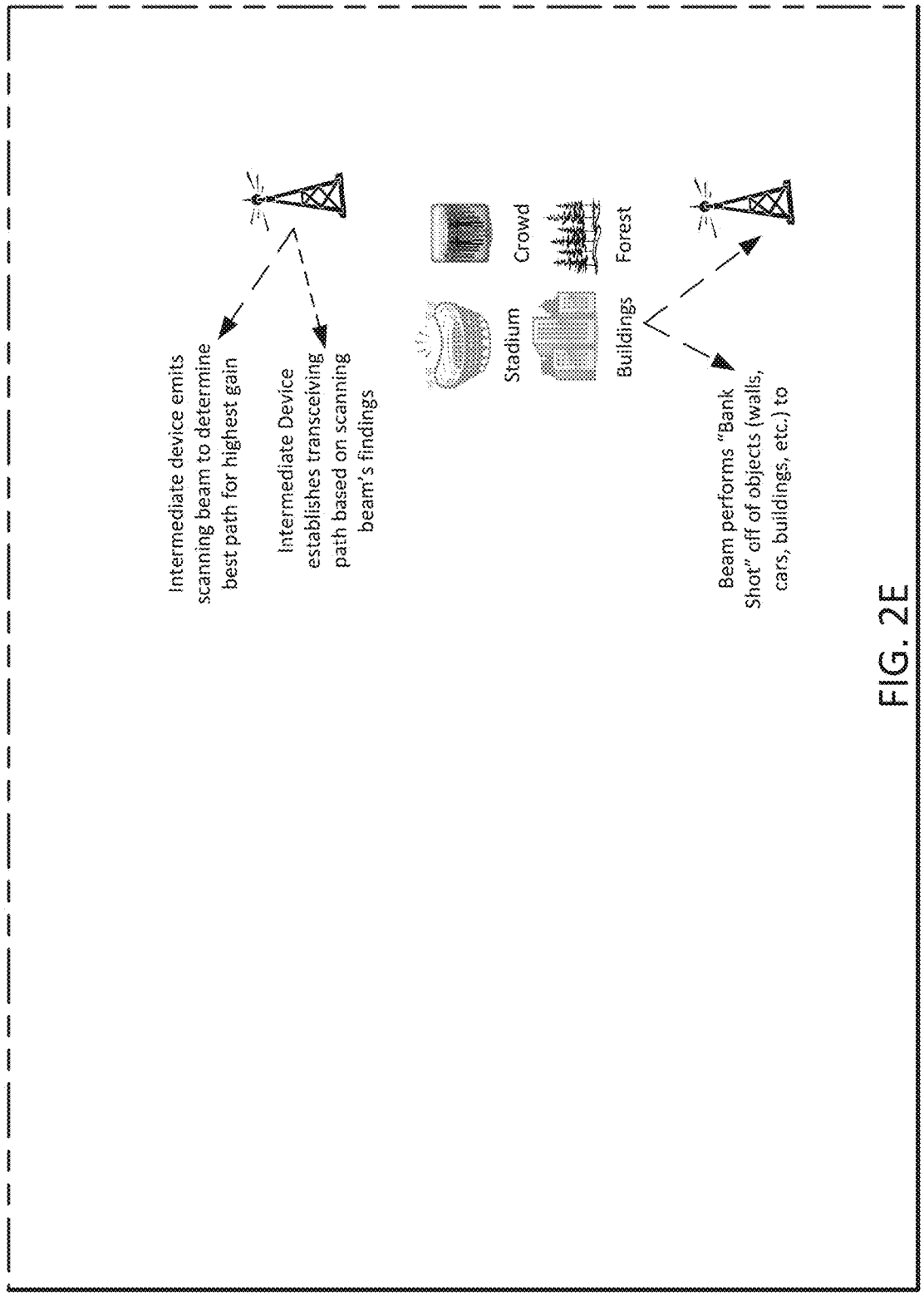
Figure 2F:
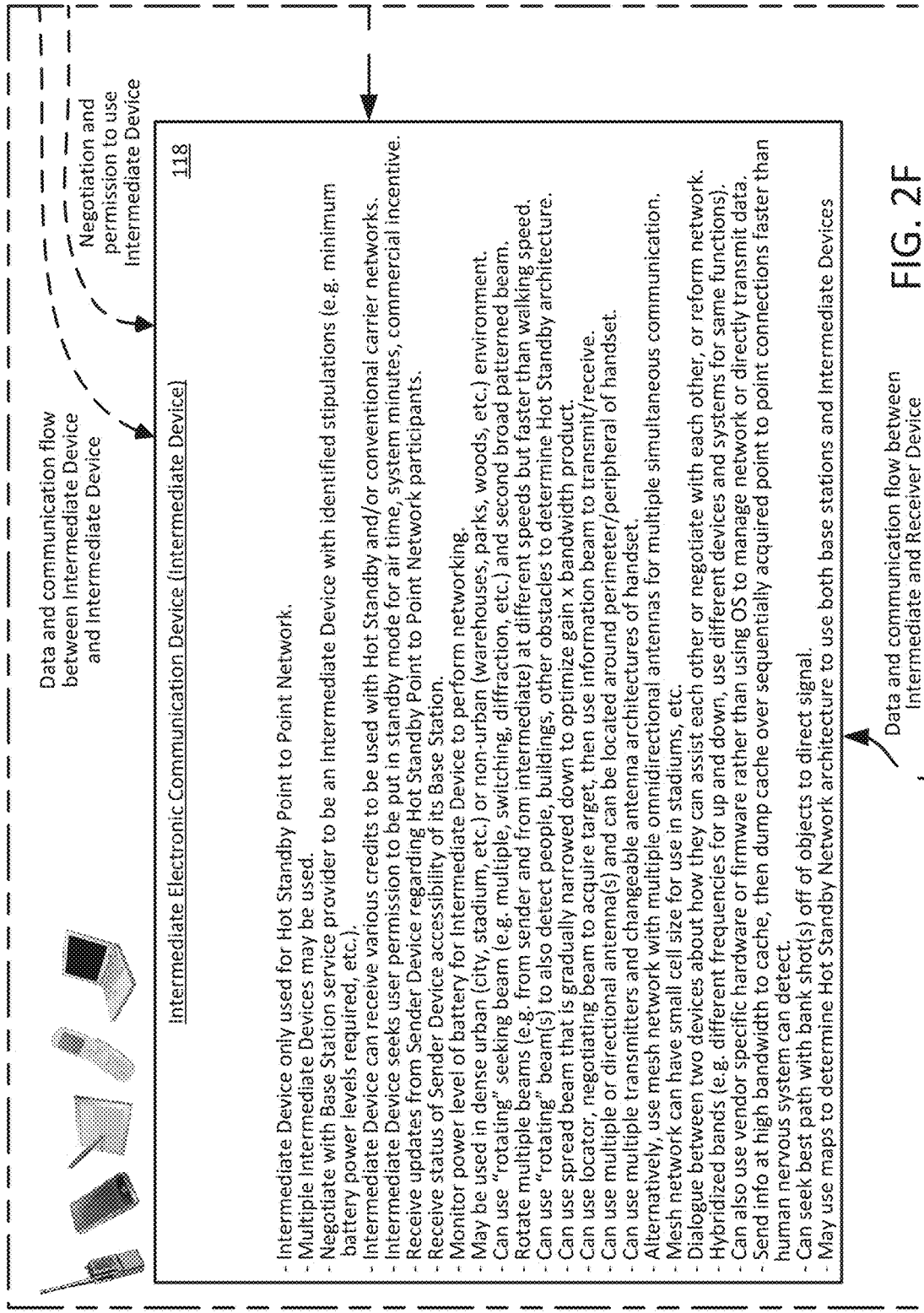
Figure 2G:
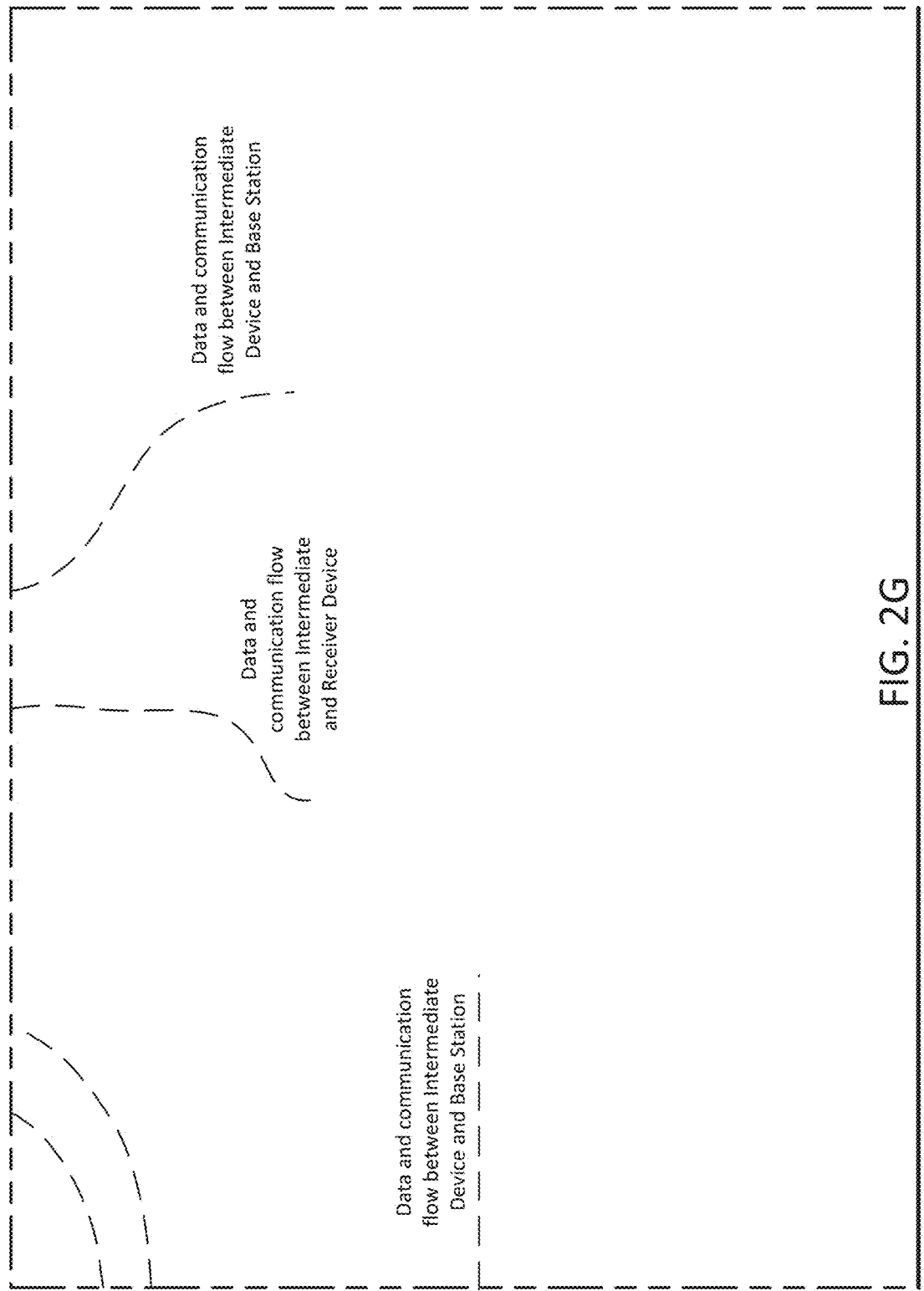
Figure 2H:
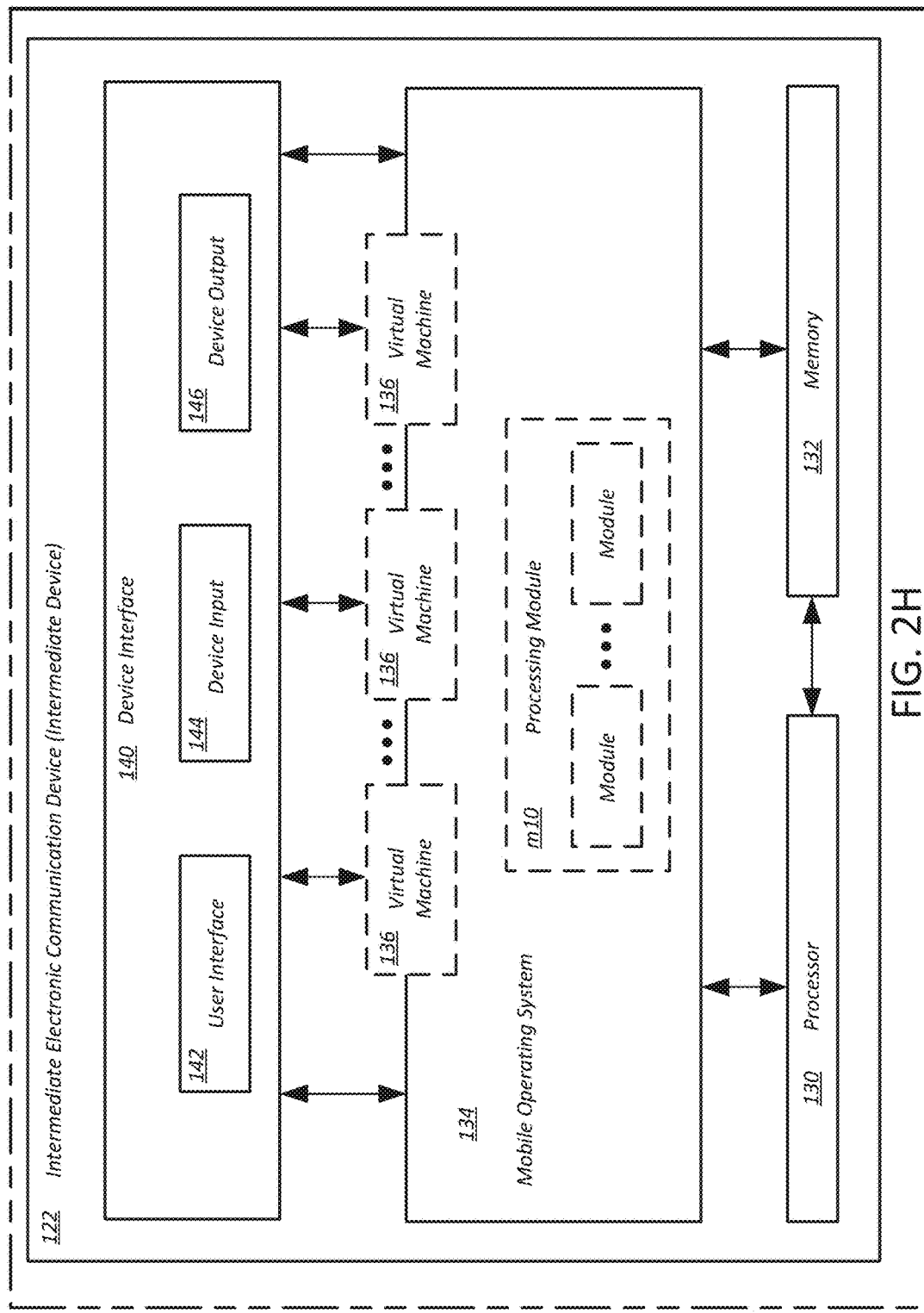

In accordance with 37 CFR 1.84(h)(2), FIG. 2 shows how FIG. 2A through FIG. 2H are to be arranged and assembled to form "a view of a large machine or device in its entirety . . . broken into partial views . . . extended over several sheets." The "views on two or more sheets form, in effect, a single complete view, [and] the views on the several sheets . . . [are] so arranged that the complete figure can be assembled" from "partial views drawn on separate sheets . . . linked edge to edge," in that the partial-view FIGS. 2A through 2H are ordered alphabetically, by increasing column from left to right, as shown in the following table (with further orientation as indicated by phantom-lines on the partial-view figures):

| FIG. 2A | FIG. 2B | FIG. 2C | FIG. 2D |
|---------|---------|---------|---------|
| FIG. 2E | FIG. 2F | FIG. 2G | FIG. 2H |

FIG. 2A through FIG. 2H show a partially schematic diagram of an implementation(s) of an intermediate electronic device.

Figure 3A:
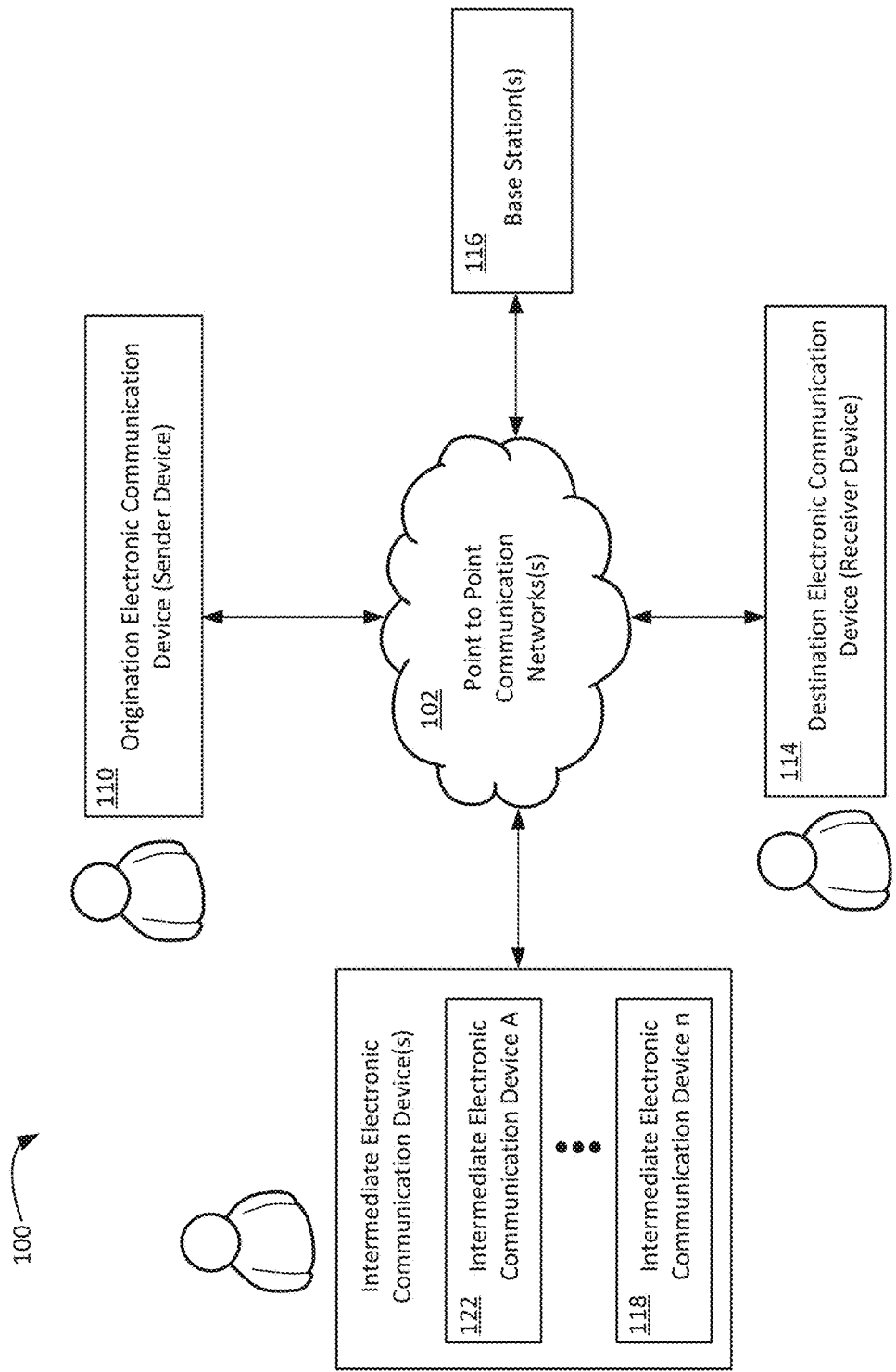

FIG. 3A shows a schematic diagram of an implementation(s) of an environment(s) and/or an implementations(s) of technologies described herein including an implementation(s) of a base-station communication network system(s) and an implementation(s) of a standby point-to-point communication network system(s).

FIG. 4 shows a schematic diagram of an implementation(s) of a processing module.

FIG. 5A through FIG. 5G show a partially schematic diagram of an implementation(s) of obtaining information of first aspects of intermediate electronic communication devices for serving as nodes of standby point-to-point communication networks upon activation module(s).

Figure 6C:
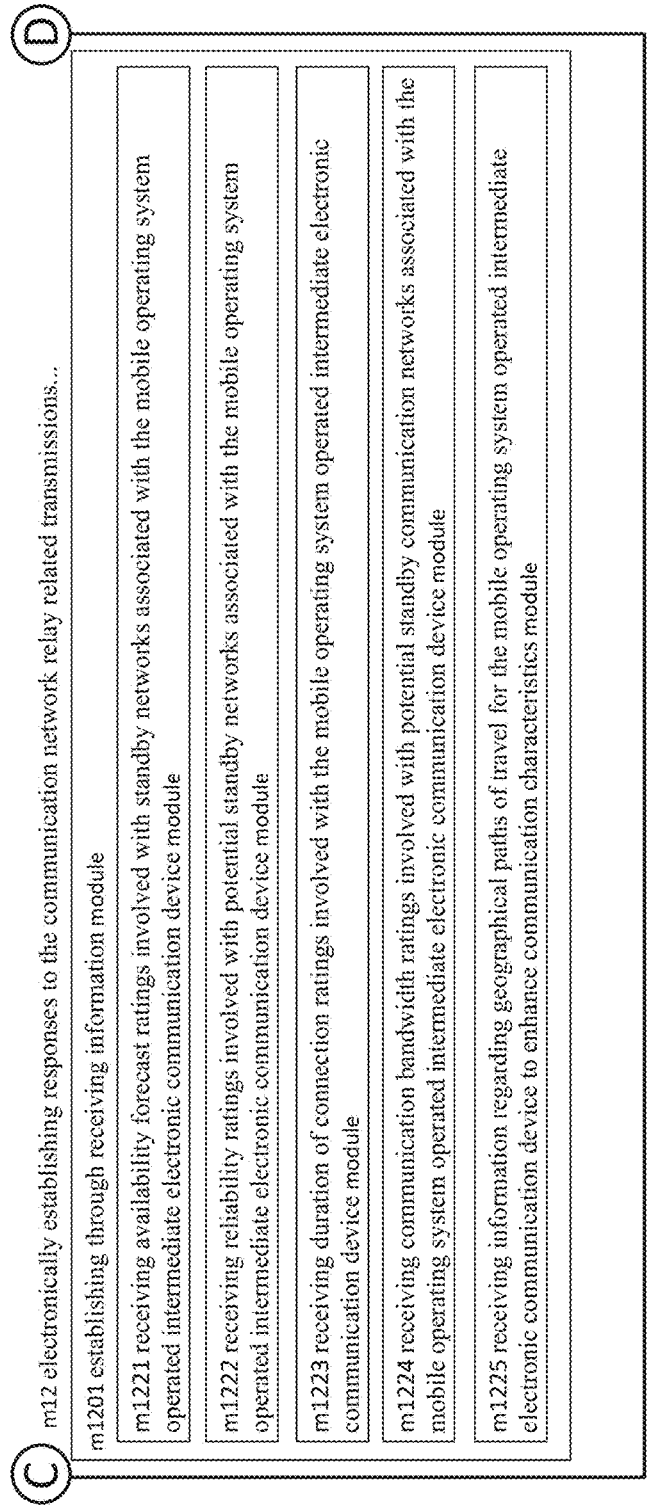

FIG. 6A through FIG. 6C show a partially schematic diagram of an implementation(s) of determining selection instructions for identifying intermediate electronic communication devices as selected based upon obtaining information regarding first aspects of intermediate electronic communication devices module(s).

FIG. 7A through FIG. 7B show a partially schematic diagram of an implementation(s) of electronically transmitting the responses to the communication network relay related transmissions associated with first portions of mobile operating system operated intermediate electronic communication device functionality related to communication network relay functionality of the mobile operating system operated intermediate electronic communication device as standby communication network relays module(s).

Figure 8:
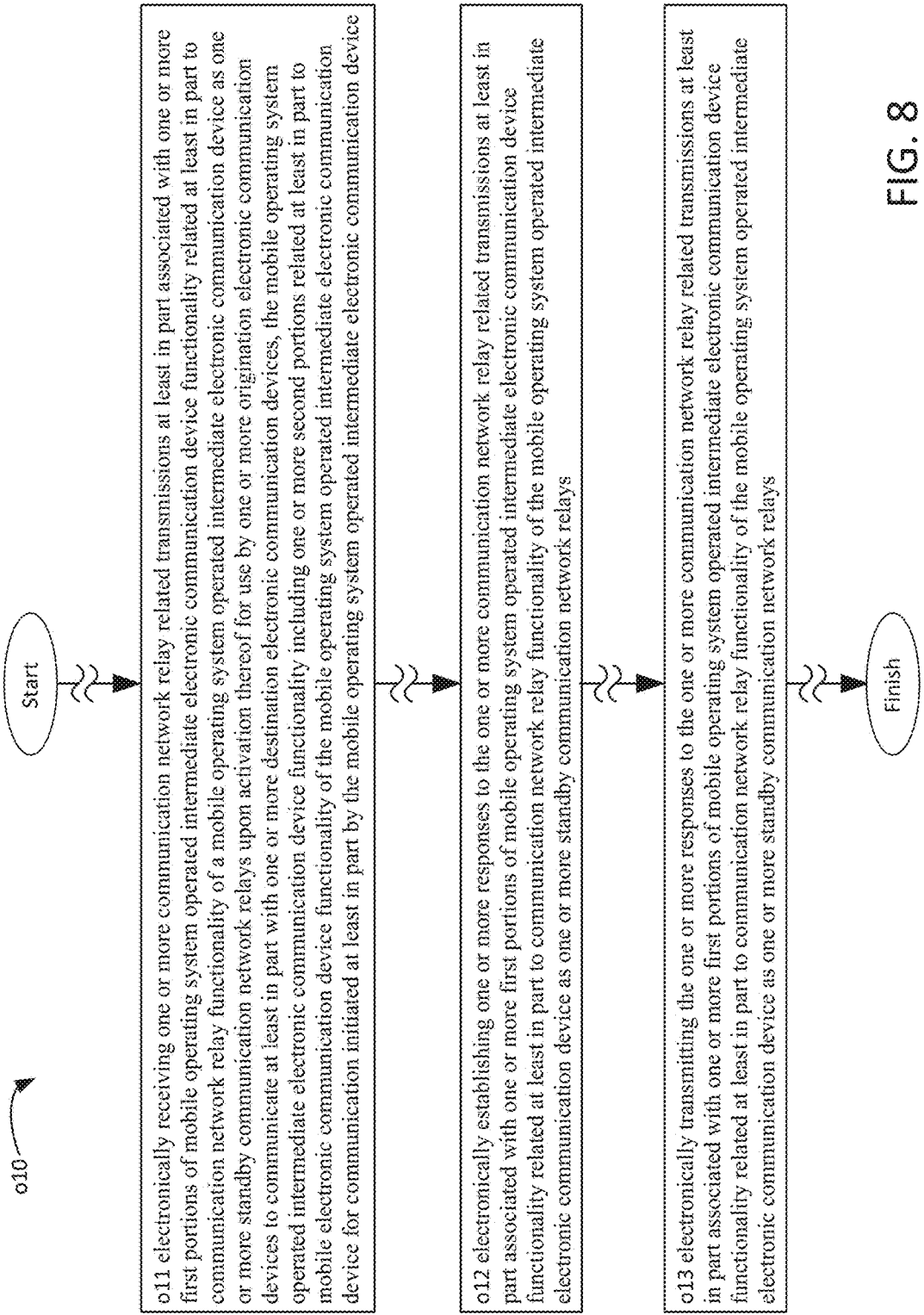

FIG. 8 shows a high-level flowchart illustrating an operational flow o1O representing exemplary operations related to operation o11, operation o12, and operation o13.

Figure 9A:
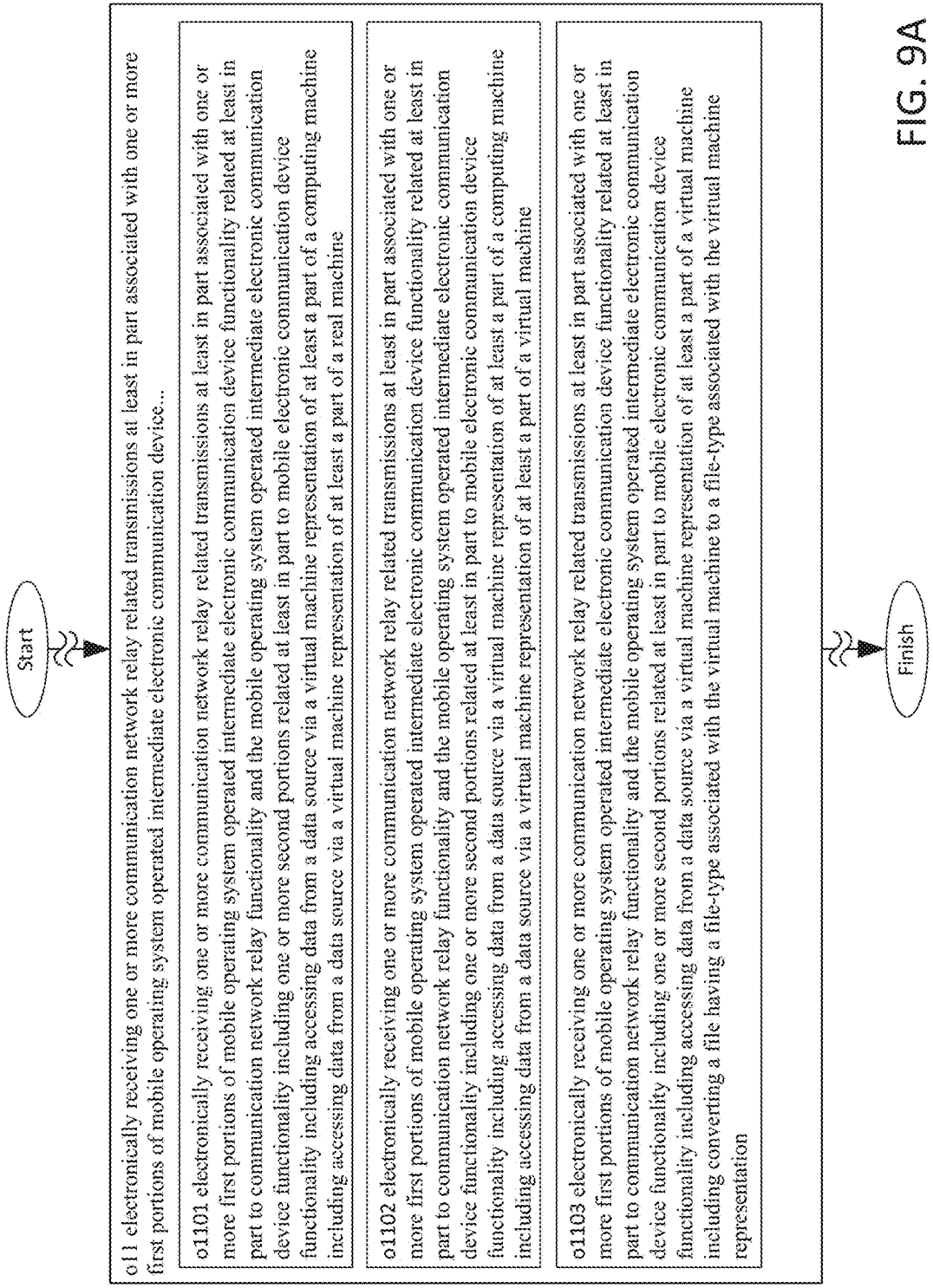

FIG. 9A through FIG. 9O show a high-level flowchart including exemplary implementations of operation o11 of FIG. 8.

FIG. 10A through FIG. 10E show a high-level flowchart including exemplary implementations of operation o12 of FIG. 8.

FIG. 11A through FIG. 11E show a high-level flowchart including exemplary implementations of operation o13 of FIG. 8.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

As depicted in FIG. 1, a mobile network system 100 is shown to include a sender device 110 having a user interface 112, a receiver device 114, a base station 116, an intermediate device 118 having a user interface 120, and an intermediate device 122. The sender device 110, the receiver device 114, the intermediate device 118 and/or the intermediate device 122 can include but are not limited to one or more of the following: a mobile device, a tablet, a cell phone, a smart phone, a gaming unit, a laptop, a walkie-talkie, a notebook computer, a phablet, using operating systems including Android, iOS, Win 8 or other operating systems and/or including one or more other types of wireless mobile device. The mobile network system 100 provides for a conventional wireless network mode and also a hot standby point-to-point network mode. In some implementations there can be more intermediate devices than the intermediate device 118 and the intermediate device 122 and in other implementations there can be just the intermediate device 118 in the hot standby network. In some implementations, the sender device 110 can initiate a call or send a message to the receiver device 114 and in other implementations the reverse can occur where the receiver device 114 initiates a call or sends a message to the sender device 110. In implementations, the sender device 110 and the receiver device 114 can be involved with two-way communication where each device both sends messages to and receives messages from each other.

FIG. 1 depicts the conventional wireless network mode with solid arrows and the hot standby point-to-point network mode with dashed arrows. The conventional wireless network is shown supporting communication between the sender device 110 and the receiver device 114 either via the base station 116 or directly between the sender device and the receiver device. The hot standby point-to-point network mode uses one or more of the intermediate devices as in effect a replacement for the base station 116 when the base station becomes occluded to the sender device 110, the receiver device 114, and/or both the sender device and the receiver device. When activated the one or more intermediate devices can be used as in effect mini-base stations for high frequency directional transmissions. Since the communication is generally done through at least fairly directional acting beams, more than one intermediate device may be required to relay communication amongst the intermediate devices and consequently between the sender device 110 and the receiver device 114.

The hot standby point-to-point network in other words can thus be used to relay communication between the sender device 110 and the receiver device 114 when the base station 116 somehow becomes unavailable. The hot standby network is maintained to be continuously available as a backup network in case the conventional wireless network mode becomes unavailable for the sender device 110 and the receiver device 114 to communicate with each other. Part of this maintenance is performed by updating which devices can be used as intermediate devices at a present given moment if called upon at that moment. The devices are enrolled initially and their status is updated regarding their location and accessibility to each other and to the sender device 110 and the receiver device 114.

For instance, one or more at least relatively directional signals can be used to communicate between the sender device 110 and the receiver device 114, such as in the GHz range of frequencies including the 50-70 GHz range, including 60 GHz frequency. It is possible that these at least relatively directional signals can be blocked by physical objects or otherwise occluded so that the conventional mode of communication via the base station 116 may become unavailable to the sender device 110 and/or the receiver device 114. Such occlusive situations can occur more often at times in environments such as in dense urban (city, stadium, etc.) or dense non-urban (warehouses, parks, woods, etc.) environments. One or more intermediate devices can be included in the hot standby network based upon direct line of sight access to them through one or more best path determinations by one or more other devices (such as the sender device 110, the receiver device 114, and/or one or more of the intermediate devices) or alternatively based upon a form of non-direct access that is not line of sight but rather makes use of another means of access such as through one or more paths using one or more bank shots off of objects for the seeking beam and/or the communication beam to take to travel from its respective transmitting device to its respective receiving device.

In some implementations the sender device 110 monitors its accessibility to the base station 116 and reports on its accessibility to the intermediate device(s) in the hot standby network. The sender device 110 can also be used to update which of the intermediate device(s) are used for the hot standby network based upon intermediate device accessibility.

To maintain the hot standby network and accessibility thereof, the sender device 110 and the receiver device 114 (that are part of the hot standby network by virtue of being the continuing end points of the communication) and the one or more intermediate devices (that are at least momentarily also part of the hot standby network by virtue of their at least momentary accessibility to the sender device 110, the receiver device 114, and/or one or more of the other intermediate devices) can use various methods to search for, locate, maintain awareness of, etc., the accessibility of each other in the hot standby network.

In some implementations, the sender device 110 can take more of a management or status reporting role to the other devices of the hot standby network. In other implementations other devices, such as the receiver device 114, can take management or status reporting roles. Depending upon how each of the devices of the hot standby network are so configured one or more them can actively search, locate, maintain awareness, and so forth of accessibility of each other by various methods and components. For instance, one or more of the devices such as the sender device 110 and/or the receiver device 114 can use a seeking beam (e.g. multiple beams, switching between single beams, beam diffraction, etc.) to determine which intermediate device(s) are accessible by the sender device 110 and which intermediate device(s) are accessible by the receiver device 114. Upon locating and/or determining one or more accessibilities of various devices such as the sender device 110, the receiver device 114, and/or one or more of the intermediate devices 118, a communication beam can be used for communication between the various devices.

Through these and/or various other measures the seeking beam can be swept or otherwise moved across a region in a rotating, zigzagged, patterned, and/or other fashion. In some implementations multiple seeking beams (e.g. from sender, intermediate, and/or receiver devices) can be moved at different speeds from each other to aid in thoroughly sweeping an area. The speeds used for sweeping the one or more seeking beams generally can be faster than walking speed for instance, but in other implementations speeds can be slowly as well. The one or more seeking beams can be used to also detect people, buildings, and other obstacles to better determine and/or update architecture and/or layout of the hot standby network. In some implementations one or more of the devices of the hot standby network can use one or more spread beams that are gradually narrowed down to optimize gain×bandwidth product for enhanced communication characteristics.

The sender device 110, the receiver device 114, and/or the one or more intermediate devices can use the one or more seeking beams to continually update which intermediate devices are being used for the hot standby network and when the hot standby network is activated for immediate use one or more communication beams can be used for negotiation and/or communication between two or more of the devices of the activated hot standby network. In other words, the one or more seeking beams can be used to acquire a target device as potentially available for immediate use by another device of the hot standby network and then the one or more communication beams can be used to transmit and/or receive one or more communication signals between the associated devices of the hot standby network.

In one or more implementations, the one or more seeking beams and/or the one or more communication beams can include 60 GHz and other frequencies used collectively. The devices of the hot standby network can include disparate devices such that, for example, the sender device 110 can be a smart phone, the intermediate device 118 can be a tablet whereas the intermediate device 122 can be a laptop and the receiver device 114 can be a cell phone. These one or more hybrid systems can all use one or more tokens or other identifiers to recognize the communicating users using the sender device 110 and the receiver device 114. In this manner the one or more hybrid systems of the disparate devices of the hot standby network can rely on other than solely one or more device identifiers but in addition or instead of can rely on one or more identifiers (such as tokens) that are directly associated with the one or more users of the devices (such as the sender device 110 and/or the receiver device 114).

In implementations one or more hybridized systems for the hot standby network can also use multiple different types of handsets hybridized together using different communication protocols such as 802.11ad, 802.11ac, 802.11n/g, standard cellular, etc. So in implementations, one or more hybridized systems can simultaneously use cell phone, tablet, TV, smart phone, laptop, etc. sharing connectivity relatively seamlessly as an integrated system. One or more hybridized systems can also use one or more hybridized bands (e.g. different frequencies for transmit and receive or for different devices and systems for same or similar functions, etc.). Through one or more hybridized systems the hot standby network can also extend paid or free Wi-Fi, other wireless networks and/or other paid or free networks. Technologies of the hot standby network can also support one or more IP based phone systems with multiple air interfaces. For an IP phone a phone number may be just an IP address rather than a conventional phone number.

To support implementations of one or more seeking beams and/or one or more communication beams by one or more hot standby network devices (such as the sender device 110, the receiver device 114, and/or one or more of the intermediate devices), one or more steerable antennas, one or more directional antennas, one or more omnidirectional antennas, and/or one or more other antennas can be located around one or more perimeters and/or peripherals of one or more of the hot standby devices. In implementations one or more transmitters can be used with changeable antenna architectures that can include various antenna types referenced above.

One or more mesh networks with one or more of the hot standby network devices (such as the sender device 110, the receiver device 114, and/or one or more of the intermediate devices) can each use multiple omnidirectional antennas for multiple simultaneous communication between associated hot standby network devices. Use of one or more mesh networks can allow for small cell size for use in stadiums, etc.

Before or during activation of the hot standby network, one or more of the devices (such as the sender device 110, the receiver device 114, and/or one or more of the intermediate devices) can use either one or more of the seeking beams and/or one or more of the communication beams to dialogue with one or more of the other devices of the hot standby network about how they can assist each other or negotiate with each other, or reform the hot standby network as accessibility between various of the devices or potential devices of the hot standby network may change.

In implementations, the devices of the hot standby network (such as the sender device 110, the receiver device 114, and/or one or more of the intermediate devices) can use vendor specific hardware or firmware rather than using an operating system to perform network administration tasks such as updating which intermediate devices are being used, etc. and/or to transmit and/or to receive communication data.

Other aspects of one or more implementations can include use of high speed data transmission between two or more of the devices of the hot standby network (such as the sender device 110, the receiver device 114, and/or one or more of the intermediate devices) to send information at high bandwidth greater than human bandwidth to cache, and sequentially dump to compensate for connection problems. For instance, the sender device 110 can send ahead communication data to one or more other devices of the hot standby network before a time that communication paths between the sender device 110 and the one or more other devices becomes blocked. This present communication data can then be sent on to the receiver device 114 also at high bandwidth if further blockages near the receiver device are anticipated or at a lesser rate dependent upon the human user operating the receiver device.

In this manner, the communication data is positioned closer to the receiver device 114 ahead of time before the user of the receiver device needs to receive the communication data so that there is still a high likelihood that if at least part of communication pathway to the receiver device is momentarily completely blocked that the communication data will still reach the receiver device in time for the user of the receiver device to not notice any communication problems. The hot standby network can also have more intermediate devices on standby than is necessary for a single path from the sender device 110 to the receiver device 114. Furthermore, the communication data can be positioned forward at multiple of the intermediate devices in case one or more of the multiple intermediate devices becomes blocked from sending the communication data on to the receiver device 114 at the appropriate time. The receiver device 114 could also include a data buffer to receive the forwarded communication data ahead of the time that the user of the receiver device 114 needs to receive the communication data for an additional or alternative way to insure reception of the communication data in time for the user of the receiver device to receive the communication data.

Implementations can also use digital maps either electronically stored internally with one or more of the devices of the hot standby network, or provided by a main device of the hot standby network such as the sender device 110 or the receiver device 114, or accessed online by the devices of the hot standby network, or elsewise acquired to determine hot standby network architecture of which intermediate devices to include in the hot standby network. Additionally or alternatively digital maps can be used to determine when the conventional base station network is available for use at least partially or fully.

Although two intermediate devices, namely the intermediate device 118 and the intermediate device 122, have been depicted in the FIG. 1 as being part of the hot standby network, the number of intermediate devices can change from as few as zero in some implementations if the sender device 110 and the receiver device 114 can communicate directly with each other over the hot standby network to multiple numbers of intermediate devices more than the two depicted. The number of intermediate devices considered part of the hot standby network can change during the time that the hot standby network is considered to be in standby mode wherein the hot standby network is not being used for communication between the sender device 110 and the receiver device 114.

The number of intermediate devices considered part of the hot standby network can change during the time that the hot standby network is considered to be in active mode as well wherein the hot standby network is being used for communication between the sender device 110 and the receiver device 114. Reasons for changes in the numbers of intermediate devices considered to be part of the hot standby network during standby and active modes of the hot standby network can include changes in positioning of the sender device 110, the receiver device 114, and/or one or more of the intermediate devices that are either currently considered or not consider part of the hot standby network. Changes in positioning of other physical objects such as people, vehicles, structures, etc. can also influence how many and which in particular of the intermediate devices that may at any given moment be consider part of the hot standby network.

Other considerations for when a device can be considered as an intermediate that is part of the hot standby network in the standby or active mode of the hot standby network may include situations where users of one or more of the intermediate devices may change their status of how they are using their respective intermediate devices. For instance, the users may start using their intermediate devices to an extent that makes their intermediate devices no longer available for the hot standby network. Or the users may stop using their intermediate devices to an extent that they become available for use by the hot standby network if needed. There may be other considerations involved such as certain payment structures being implemented to pay the users of the intermediate devices thereby stipulating that the intermediate devices only have to be available for a certain length of time, or period of time, or certain days of the week, or only if the devices are located in certain specified locations, etc. Other considerations regarding when the intermediate devices are considered part of the hot standby network can also exist as well such as whether the device's battery power level is above a certain threshold.

At one or more points in time users and/or owners of devices that are potentially capable of being used as intermediate devices can negotiate through their respective intermediate devices, through online internet access, through phone, or other access with one or more base station providers or other entities to become eligible to be an intermediate device. After this negotiation is successful, the device associated with the negotiation can be placed on a list of eligible devices, and/or assigned an access function, and so forth so that when the device is in an area to serve as an intermediate device, it can be recognized by devices of the hot network standby network as it becomes accessible to these devices.

With these one or more negotiations various stipulations can be put forth by one or more of the parties involved with the negotiations. Such negotiations can include minimum battery power levels required by the device to be accessible as an intermediate device of the hot standby network. Other stipulations can include various credits to be used by the user of the device being enrolled as a potential intermediate device with the hot standby network and/or one or more conventional carrier networks. Credits can include the device seeking its user's permission to be put in standby mode for air time, system minutes, or other commercial incentive.

As an intermediate device in the hot standby network, the intermediate device can receive status of the sender device's accessibility of its base station. The intermediate device can monitor power levels its battery for performing networking and other communication functions.

Turning now to FIG. 2, the intermediate device 118 and the intermediate device 122 (also known herein as intermediate electronic communication devices) are shown in FIG. 2A and FIG. 2H, respectively, as implementations of the intermediate devices shown in FIGS. 1. Referring again to FIGS. 2A and 2H, the intermediate electronic communication devices 118 and 122 may each include a processor 130, a memory 132, and a mobile operating system 134 communicatively linked thereto. The mobile operating system 134 may include processing module m10, which may further include modules (some of which are described below), and virtual machines 136 (such as process virtual machines, virtual machines of hardware, virtual machines of virtual machines, Java virtual machines, Dalvik virtual machines, virtual machines for use with Android operating systems such as Samsung or Google mobile devices or for use with other mobile operating systems such as Apple iOS on Microsoft Windows based mobile operating systems, etc.). The origination electronic communication device 110 may also include device 140, which may include user interface 142, device input 144, and device output 146.

Implementations of processor 130 may include one or more microprocessors, central processing units, graphics processing units, digital signal processors, network processors, floating point processors, physics processing units, or other processors. Other implementations may include processor 130 as a distributed-core processor, server based processor, as part of multiple processors distributed over one or many other user devices in addition to origination electronic communication device 110. Furthermore processor 130 may execute computer readable instructions to execute one or more operations described herein. In implementations, processor 130 may operate as processing module m10, which may include one or more modules described below.

Implementations of memory 132 may cache memory such as random access memory (RAM), flash memory, synchronous random access memory (SRAM), dynamic random access memory (DRAM), other memory, read only memory ("ROM"), flash memory, hard drives, disk-based media, disc-based media, magnetic storage, optical storage, volatile memory, nonvolatile memory, separated from device 130 (such as on a network, server), mass storage, programmable read-only memory (PROM), erasable programmable read-only memory (EPROM), and/or other types of memory.

Referring again to FIGS. 2A and 2H, implementations of device interface 140 may include one or more components to provide ways that origination electronic communication device 110 can input and output information with its environment and/or user. These components of device interface 140 may include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc., and other components as well to serve input and output functions such as for device input 144 and device output 146.

User interface 142 may include any hardware, software, firmware, and combination thereof to provide capability for a user thereof to interact with origination device 110. Implementations of user interface 142 can include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, etc.

Referring now to FIG. 3A, FIG. 3A depicts one or more systems involving base station based networks and standby point-to-point mobile network systems as described above for FIG. 1. As described, sender device 110 (also known herein as "origination electronic communication device") can communicate with receiver device 114 (also known herein as "destination electronic communication device") through one or more point-to-point communication networks 102, otherwise known in general as relay communication networks, provided by one or more networked base stations 116 and/or intermediate electronic communication devices (such as the intermediate electronic communication devices 118 or 122) dependent upon whether communication with the one or more base stations is occluded.

Implementations of modules can involve different combinations (limited to patentable subject matter under 35 U.S.C. 101) of one or more aspects from one or more electrical circuitry arrangements and/or one or more aspects from one or more instructions.

In one or more implementations, as shown in FIG. 4, the processing module m10 may include electronically receiving communication network relay related transmissions associated with first portions of mobile operating system operated intermediate electronic communication device functionality related to communication network relay functionality of a mobile operating system operated intermediate electronic communication device as standby communication network relays upon activation thereof for use by origination electronic communication devices to communicate with destination electronic communication devices, the mobile operating system operated intermediate electronic communication device functionality including second portions related to mobile electronic communication device functionality of the mobile operating system operated intermediate electronic communication device for communication initiated by the mobile operating system operated intermediate electronic communication device module m11.

In one or more implementations, as shown in FIG. 4, the processing module m10 may include electronically establishing responses to the communication network relay related transmissions associated with first portions of mobile operating system operated intermediate electronic communication device functionality related to communication network relay functionality of the mobile operating system operated intermediate electronic communication device as standby communication network relays module m12.

In one or more implementations, as shown in FIG. 4, the processing module m10 may include electronically transmitting the responses to the communication network relay related transmissions associated with first portions of mobile operating system operated intermediate electronic communication device functionality related to communication network relay functionality of the mobile operating system operated intermediate electronic communication device as standby communication network relays module m13.

In one or more implementations, as shown in FIG. 5A, module m11 may include accessing data from a data source via a virtual machine representation of a computing machine including accessing data from a data source via a virtual machine representation of a real machine module m1101.

In one or more implementations, as shown in FIG. 5A, module m11 may include accessing data from a data source via a virtual machine representation of a computing machine including accessing data from a data source via a virtual machine representation of a virtual machine module m1102.

In one or more implementations, as shown in FIG. 5A, module m11 may include accessing data from a data source via a virtual machine representation of a virtual machine including converting a file having a file-type associated with the virtual machine to a file-type associated with the virtual machine representation module m1103.

In one or more implementations, as shown in FIG. 5A, module m1103 may include wherein the file-type associated with the second virtual machine is configured for a limited-resource computing machine module m1104.

In one or more implementations, as shown in FIG. 5A, module m1104 may include wherein the file-type associated with the second virtual machine is configured for a mobile computing machine module m1105.

In one or more implementations, as shown in FIG. 5A, module m11 may include activation based upon if direct access by the origination electronic communication devices to base stations of base station based communication networks otherwise used by the origination electronic communication devices becomes unavailable to the origination electronic communication devices module m1106.

In one or more implementations, as shown in FIG. 5A, module m11 may include the mobile operating system operated intermediate electronic communication device being used by a user thereof as a mobile handset communication device for communication with users of other mobile handset communication devices module m1107.

Figure 5B:
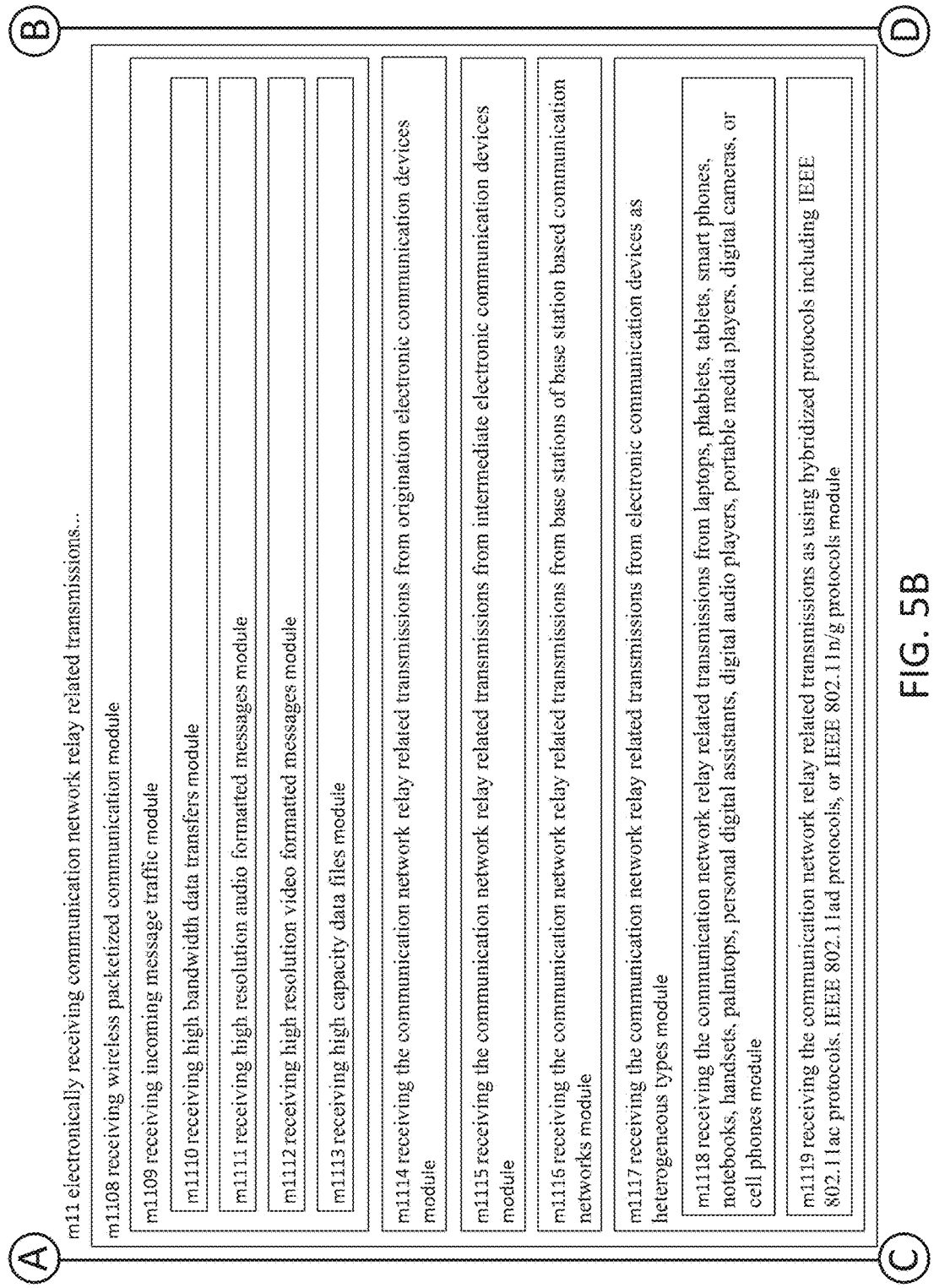

In one or more implementations, as shown in FIG. 5B, module m11 may include receiving wireless packetized communication module m1108.

In one or more implementations, as shown in FIG. 5B, module m1108 may include receiving incoming message traffic module m1109.

In one or more implementations, as shown in FIG. 5B, module m1109 may include receiving high bandwidth data transfers module m1110.

In one or more implementations, as shown in FIG. 5B, module m1109 may include receiving high resolution audio formatted messages module m1111.

In one or more implementations, as shown in FIG. 5B, module m1109 may include receiving high resolution video formatted messages module m1112.

In one or more implementations, as shown in FIG. 5B, module m1109 may include receiving high capacity data files module m1113.

In one or more implementations, as shown in FIG. 5B, module m1108 may include receiving the communication network relay related transmissions from origination electronic communication devices module m1114.

In one or more implementations, as shown in FIG. 5B, module m1108 may include receiving the communication network relay related transmissions from intermediate electronic communication devices module m1115.

In one or more implementations, as shown in FIG. 5B, module m1108 may include receiving the communication network relay related transmissions from base stations of base station based communication networks module m1116.

In one or more implementations, as shown in FIG. 5B, module m1108 may include receiving the communication network relay related transmissions from electronic communication devices as heterogeneous types module m1117.

In one or more implementations, as shown in FIG. 5B, module m1117 may include receiving the communication network relay related transmissions from laptops, phablets, tablets, smart phones, notebooks, handsets, palmtops, personal digital assistants, digital audio players, portable media players, digital cameras, or cell phones module m1118.

In one or more implementations, as shown in FIG. 5B, module m1117 may include receiving the communication network relay related transmissions as using hybridized protocols including IEEE 802.11ac protocols, IEEE 802.11ad protocols, or IEEE 802.11n/g protocols module m1119.

Figure 5C:
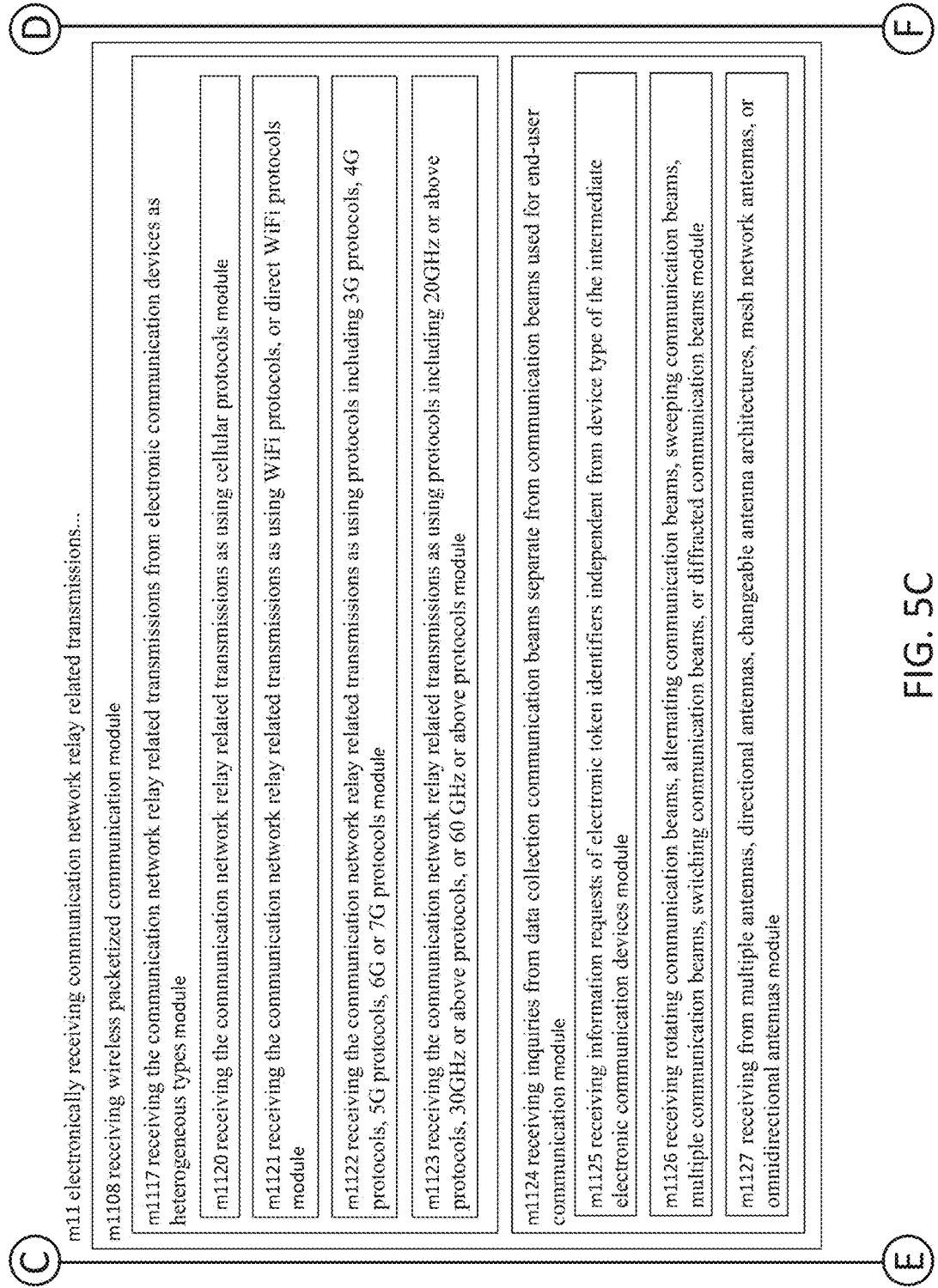

In one or more implementations, as shown in FIG. 5C, module m1117 may include receiving the communication network relay related transmissions as using cellular protocols module m1120.

In one or more implementations, as shown in FIG. 5C, module m1117 may include receiving the communication network relay related transmissions as using WiFi protocols, or direct WiFi protocols module m1121.

In one or more implementations, as shown in FIG. 5C, module m1117 may include receiving the communication network relay related transmissions as using protocols including 3G protocols, 4G protocols, 5G protocols, 6G or 7G protocols module m1122.

In one or more implementations, as shown in FIG. 5C, module m1117 may include receiving the communication network relay related transmissions as using protocols including 20 GHz or above protocols, 30 GHz or above protocols, or 60 GHz or above protocols module m1123.

In one or more implementations, as shown in FIG. 5C, module m1108 may include receiving inquiries from data collection communication beams separate from communication beams used for end-user communication module m1124.

In one or more implementations, as shown in FIG. 5C, module m1124 may include receiving information requests of electronic token identifiers independent from device type of the intermediate electronic communication devices module m1125.

In one or more implementations, as shown in FIG. 5C, module m1124 may include receiving rotating communication beams, alternating communication beams, sweeping communication beams, multiple communication beams, switching communication beams, or diffracted communication beams module m1126.

In one or more implementations, as shown in FIG. 5C, module m1124 may include receiving from multiple antennas, directional antennas, changeable antenna architectures, mesh network antennas, or omnidirectional antennas module m1127.

Figure 5D:
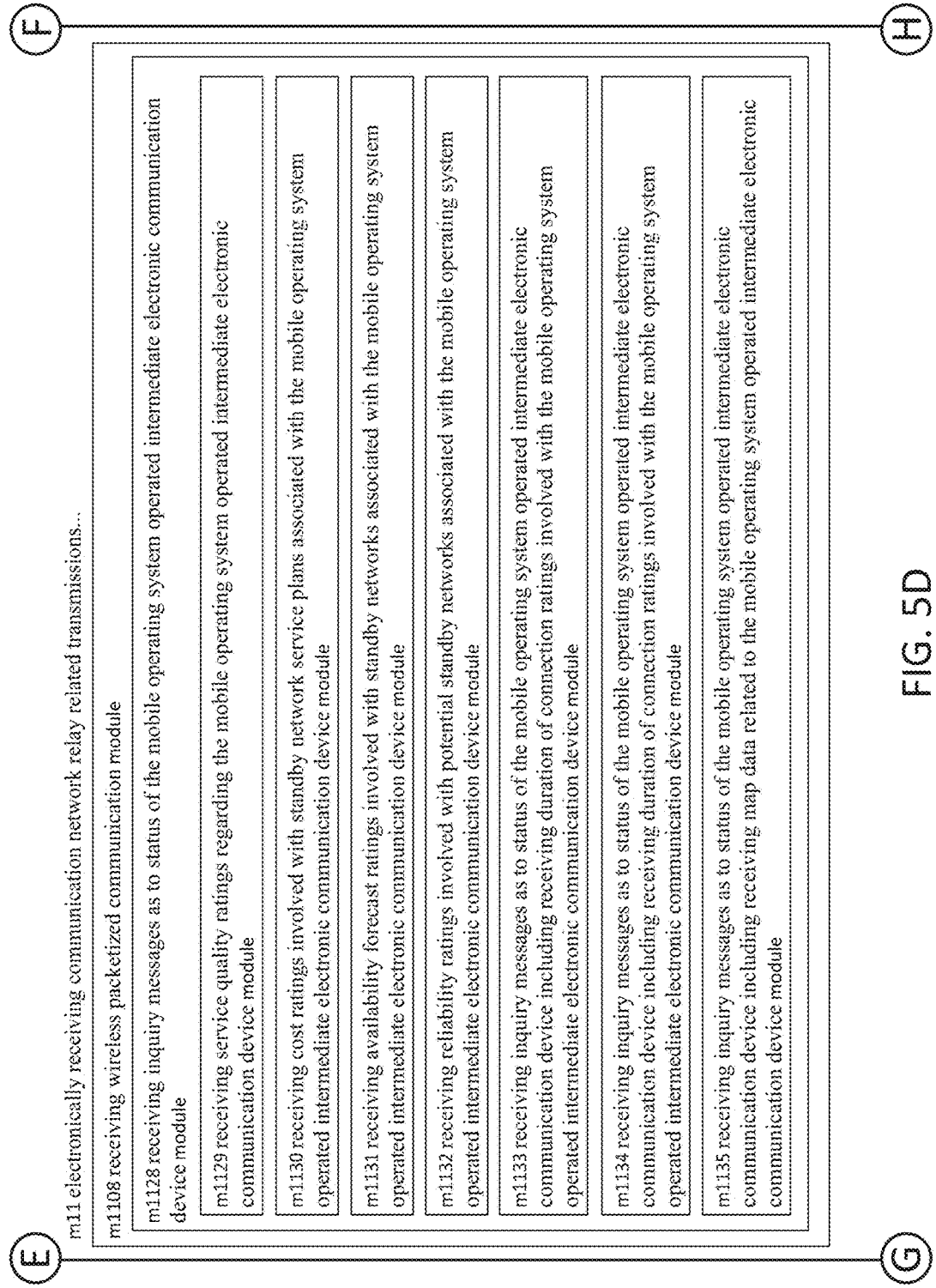

In one or more implementations, as shown in FIG. 5D, module m1108 may include receiving inquiry messages as to status of the mobile operating system operated intermediate electronic communication device module m1128.

In one or more implementations, as shown in FIG. 5D, module m1128 may include receiving service quality ratings regarding the mobile operating system operated intermediate electronic communication device module m1129.

In one or more implementations, as shown in FIG. 5D, module m1128 may include receiving cost ratings involved with standby network service plans associated with the mobile operating system operated intermediate electronic communication device module m1130.

In one or more implementations, as shown in FIG. 5D, module m1128 may include receiving availability forecast ratings involved with standby networks associated with the mobile operating system operated intermediate electronic communication device module m1131.

In one or more implementations, as shown in FIG. 5D, module m1128 may include receiving reliability ratings involved with potential standby networks associated with the mobile operating system operated intermediate electronic communication device module m1132.

In one or more implementations, as shown in FIG. 5D, module m1128 may include receiving inquiry messages as to status of the mobile operating system operated intermediate electronic communication device including receiving duration of connection ratings involved with the mobile operating system operated intermediate electronic communication device module m1133.

In one or more implementations, as shown in FIG. 5D, module m1128 may include receiving inquiry messages as to status of the mobile operating system operated intermediate electronic communication device including receiving communication bandwidth ratings involved with potential standby communication networks associated with the mobile operating system operated intermediate electronic communication device module m1134.

Figure 5E:
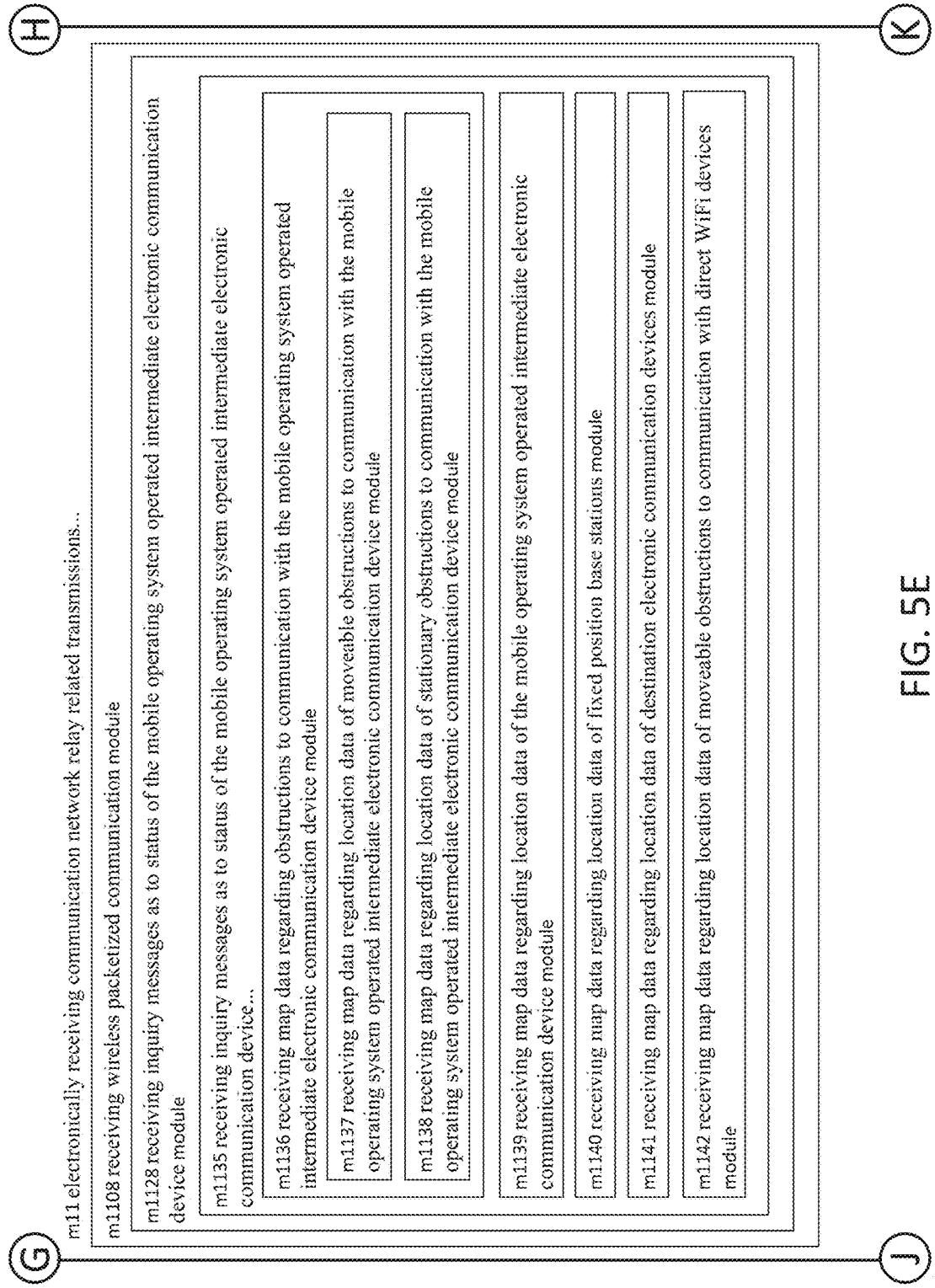

In one or more implementations, as shown in FIG. 5E, module m1128 may include receiving inquiry messages as to status of the mobile operating system operated intermediate electronic communication device including receiving map data related to the mobile operating system operated intermediate electronic communication device module m1135.

In one or more implementations, as shown in FIG. 5E, module m1135 may include receiving map data regarding obstructions to communication with the mobile operating system operated intermediate electronic communication device module m1136.

In one or more implementations, as shown in FIG. 5E, module m1136 may include receiving map data regarding location data of moveable obstructions to communication with the mobile operating system operated intermediate electronic communication device module m1137.

In one or more implementations, as shown in FIG. 5E, module m1136 may include receiving map data regarding location data of stationary obstructions to communication with the mobile operating system operated intermediate electronic communication device module m1138.

In one or more implementations, as shown in FIG. 5E, module m1135 may include receiving map data regarding location data of the mobile operating system operated intermediate electronic communication device module m1139.

In one or more implementations, as shown in FIG. 5E, module m1135 may include receiving map data regarding location data of fixed position base stations module m1140.

In one or more implementations, as shown in FIG. 5E, module m1135 may include receiving map data regarding location data of destination electronic communication devices module m1141.

In one or more implementations, as shown in FIG. 5E, module m1135 may include receiving map data regarding location data of moveable obstructions to communication with direct WiFi devices module m1142.

In one or more implementations, as shown in FIG. 5F, module m1128 may include receiving inquiry as to future availability of the mobile operating system operated intermediate electronic communication device module m1143.

In one or more implementations, as shown in FIG. 5F, module m1143 may include receiving inquiry as to itinerary plans for use of the mobile operating system operated intermediate electronic communication device module m1144.

In one or more implementations, as shown in FIG. 5F, module m1128 may include receiving inquiry as to the mobile operating system operated intermediate electronic communication device satisfying device battery energy level ratings module m1145.

In one or more implementations, as shown in FIG. 5F, module m1128 may include receiving inquiry as to the mobile operating system operated intermediate electronic communication device having reimbursement financial plans for providing standby network services to the origination electronic communication devices module m1146.

In one or more implementations, as shown in FIG. 5F, module m1128 may include receiving inquiry as to reimbursement financial plans including network time credits earned, commercial product rebate incentives earned, or cash incentives earned module m1147.

In one or more implementations, as shown in FIG. 5F, module m1128 may include receiving inquiry as to requirements of the mobile operating system operated intermediate electronic communication device module m1148.

In one or more implementations, as shown in FIG. 5F, module m1148 may include receiving inquiry as to requirements of the mobile operating system operated intermediate electronic communication device expressed in mandatory terms module m1149.

In one or more implementations, as shown in FIG. 5F, module m1128 may include receiving inquiry as to requirements of the mobile operating system operated intermediate electronic communication device is serving a toll gate position to circumnavigate around fixed position communication obstacles module m1150.

In one or more implementations, as shown in FIG. 5G, module m1128 may include receiving inquiry as to whether a proposed cost structure is sufficient to support use of the mobile operating system operated intermediate electronic communication device as a communication relay in standby communication networks module m1151.

In one or more implementations, as shown in FIG. 5G, module m1151 may include receiving inquiry of compensation being in terms of network use credits module m1152.

In one or more implementations, as shown in FIG. 5G, module m1128 may include receiving inquiry as to whether an affirmative decision has been made for the mobile operating system operated intermediate electronic communication device to serve as a standby relay in standby communication networks module m1153.

In one or more implementations, as shown in FIG. 5G, module m1128 may include receiving inquiry as to whether the mobile operating system operated intermediate electronic communication device is an aerial drone module m1154.

In one or more implementations, as shown in FIG. 5G, module m1154 may include receiving inquiry as to whether the mobile operating system operated intermediate electronic communication device as an aerial drone is capable of being steered by communication devices other than the mobile operating system operated intermediate electronic communication device module m1155.

In one or more implementations, as shown in FIG. 5G, module m1128 may include receiving inquiry as to whether additional bandwidth capacity from the mobile operating system operated intermediate electronic communication device for use as a communication network relay can be purchased for additional compensation module m1156.

In one or more implementations, as shown in FIG. 5G, module m1128 may include receiving inquiry as to whether the mobile operating system operated intermediate electronic communication device is attached to structure module m1157.

In one or more implementations, as shown in FIG. 5G, module m1157 may include receiving inquiry as to whether the structure that the mobile operating system operated intermediate electronic communication device is moveable and whether the structure is capable of being steered as it is moving by communication devices other than the mobile operating system operated intermediate electronic communication device module m1158.

In one or more implementations, as shown in FIG. 5G, module m1128 may include receiving inquiry as to whether packets of the inquiry messages have already been received by the mobile operating system operated intermediate electronic communication device module m1159.

In one or more implementations, as shown in FIG. 6A, module m12 may include establishing through receiving information module m1201.

In one or more implementations, as shown in FIG. 6A, module m1201 may include receiving information involving access of data storage module m1202.

In one or more implementations, as shown in FIG. 6A, module m1201 may include receiving information involving receiving wireless transmissions module m1203.

In one or more implementations, as shown in FIG. 6A, module m1201 may include receiving location information regarding moveable objects that have previously obstructed communication of the mobile operating system operated intermediate electronic communication device module m1204.

In one or more implementations, as shown in FIG. 6A, module m1201 may include receiving information regarding time based distributions of instances of obstruction of electronic device communication of the mobile operating system operated intermediate electronic communication device for particular geographical locations module m1205.

In one or more implementations, as shown in FIG. 6A, module m1201 may include receiving information regarding statistical probabilities of remaining in communication with the mobile operating system operated intermediate electronic communication device for a projected travel itinerary of the origination electronic communication devices module m1206.

In one or more implementations, as shown in FIG. 6A, module m1201 may include receiving GPS positioning data regarding the mobile operating system operated intermediate electronic communication devices module m1207.

In one or more implementations, as shown in FIG. 6A, module m1201 may include receiving information associated with communication histories of successful communications of other electronic communication devices communicating with the mobile operating system operated intermediate electronic communication device module m1208.

In one or more implementations, as shown in FIG. 6A, module m1208 may include receiving information as communication history data previously stored and forwarded between electronic communication devices module m1209.

In one or more implementations, as shown in FIG. 6A, module m1201 may include receiving information regarding potential obstructions to electronic network relay communication located proximate to of the mobile operating system operated intermediate electronic communication device module m1210.

In one or more implementations, as shown in FIG. 6B, module m1210 may include receiving information regarding moveable communication obstructions module m1211.

In one or more implementations, as shown in FIG. 6B, module m1211 may include receiving information regarding moveable communication obstructions as pedestrians module m1212.

In one or more implementations, as shown in FIG. 6B, module m1210 may include receiving information regarding potential obstructions to electronic network relay communication as architectural structures module m1213.

In one or more implementations, as shown in FIG. 6B, module m1213 may include receiving information regarding architectural communication obstructions as stadiums module m1214.

In one or more implementations, as shown in FIG. 6B, module m1210 may include receiving information regarding communication capacity available to standby communication networks for the mobile operating system operated intermediate electronic communication device module m1215.

In one or more implementations, as shown in FIG. 6B, module m1210 may include receiving information regarding potential obstructions to electronic communication with the origination electronic communication devices that are proximate to the origination communication devices module m1216.

In one or more implementations, as shown in FIG. 6B, module m1210 may include receiving information from fixed position communication network base stations module m1217.

In one or more implementations, as shown in FIG. 6B, module m1210 may include receiving information regarding potential obstructions to electronic relay network communication with destination electronic communication devices proximate to destination electronic communication devices module m1218.

In one or more implementations, as shown in FIG. 6B, module m1201 may include receiving service quality ratings regarding the mobile operating system operated intermediate electronic communication device module m1219.

In one or more implementations, as shown in FIG. 6B, module m1201 may include receiving cost ratings involved with standby network service plans associated with the mobile operating system operated intermediate electronic communication device module m1220.

In one or more implementations, as shown in FIG. 6C, module m1201 may include receiving availability forecast ratings involved with standby networks associated with the mobile operating system operated intermediate electronic communication device module m1221.

In one or more implementations, as shown in FIG. 6C, module m1201 may include receiving reliability ratings involved with potential standby networks associated with the mobile operating system operated intermediate electronic communication device module m1222.

In one or more implementations, as shown in FIG. 6C, module m1201 may include receiving duration of connection ratings involved with the mobile operating system operated intermediate electronic communication device module m1223.

In one or more implementations, as shown in FIG. 6C, module m1201 may include receiving communication bandwidth ratings involved with potential standby communication networks associated with the mobile operating system operated intermediate electronic communication device module m1224.

In one or more implementations, as shown in FIG. 6C, module m1201 may include receiving information regarding geographical paths of travel for the mobile operating system operated intermediate electronic communication device to enhance communication characteristics module m1225.

In one or more implementations, as shown in FIG. 7A, module m13 may include transmitting by relaying the communication network relay related transmissions on to an electronic communication device other than that electronic communication device that transmitted the communication network relay related transmissions module m1301.

In one or more implementations, as shown in FIG. 7A, module m1301 may include relaying the communication network relay related transmissions on to another mobile operating system operated intermediate electronic communication device other than the mobile operating system operated intermediate electronic communication device module m1302.

In one or more implementations, as shown in FIG. 7A, module m1301 may include relaying the communication network relay related transmissions on to a base station of a base station based communication network module m1303.

In one or more implementations, as shown in FIG. 7A, module m1301 may include relaying the communication network relay related transmissions on to one of the destination electronic communication devices module m1304.

In one or more implementations, as shown in FIG. 7A, module m1301 may include relaying the communication network relay related transmissions by storing and forwarding module m1305.

In one or more implementations, as shown in FIG. 7A, module m1301 may include relaying the communication network relay related transmissions as audio files, video files, high capacity data files, or message traffic module m1306.

In one or more implementations, as shown in FIG. 7A, module m1306 may include relaying the communication network relay related transmissions as gigabit sized communication traffic files module m1307.

In one or more implementations, as shown in FIG. 7A, module m1306 may include relaying the communication network relay related transmissions as having a communication protocol other than that used for their prior reception module m1308.

In one or more implementations, as shown in FIG. 7A, module m1306 may include relaying the communication network relay related transmissions as having a communication protocol identical to that used for their prior reception module m1309.

In one or more implementations, as shown in FIG. 7B, module m13 may include transmitting status information to an electronic communication device that transmitted the communication network relay related transmissions module m1310.

In one or more implementations, as shown in FIG. 7B, module m1310 may include transmitting an acknowledgement that the mobile operating system operated intermediate electronic communication device is to join standby communication networks module m1311.

In one or more implementations, as shown in FIG. 7B, module m1310 may include transmitting response messages regarding status inquires module m1312.

In one or more implementations, as shown in FIG. 7B, module m1312 may include transmitting service quality ratings regarding the mobile operating system operated intermediate electronic communication device module m1313.

In one or more implementations, as shown in FIG. 7B, module m1312 may include transmitting cost ratings involved with standby network service plans associated with the mobile operating system operated intermediate electronic communication device module m1314.

In one or more implementations, as shown in FIG. 7B, module m1312 may include transmitting availability forecast ratings involved with standby networks associated with the mobile operating system operated intermediate electronic communication device module m1315.

In one or more implementations, as shown in FIG. 7B, module m1312 may include transmitting reliability ratings involved with potential standby networks associated with the mobile operating system operated intermediate electronic communication device module m1316.

In one or more implementations, as shown in FIG. 7B, module m1312 may include transmitting duration of connection ratings involved with the mobile operating system operated intermediate electronic communication device module m1317.

In one or more implementations, as shown in FIG. 7B, module m1312 may include transmitting communication bandwidth ratings involved with potential standby communication networks associated with the mobile operating system operated intermediate electronic communication device module m1318.

In one or more implementations, as shown in FIG. 7B, module m1312 may include transmitting map data related to the mobile operating system operated intermediate electronic communication device regarding communication therewith module m1319.

In one or more implementations, as shown in FIG. 7B, module m1312 may include transmitting map data regarding obstructions to communication with the mobile operating system operated intermediate electronic communication device module m1320.

In one or more implementations, as shown in FIG. 7B, module m1312 may include transmitting location information regarding electronic communication devices other than the mobile operating system operated intermediate electronic communication device module m1321.

An operational flow o10 as shown in FIG. 8 represents example operations related to electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including one or more second portions related at least in part to mobile electronic communication device functionality of the mobile operating system operated intermediate electronic communication device for communication initiated at least in part by the mobile operating system operated intermediate electronic communication device; electronically establishing one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays; and electronically transmitting the one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays.

FIG. 8 and those figures that follow may have various examples of operational flows, and explanation may be provided with respect to the above-described examples and/or with respect to other examples and contexts. Nonetheless, it should be understood that the operational flows may be executed in a number of other environments and contexts, and/or in modified versions. Furthermore, although the various operational flows are presented in the sequence(s) illustrated, it should be understood that the various operations may be performed in other orders than those which are illustrated, or may be performed concurrently.

In FIG. 8 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In one or more implementations, as shown in FIG. 8, the operational flow o10 proceeds to operation o11 for electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof for use by one or more origination electronic communication devices to communicate at least in part with one or more destination electronic communication devices, the mobile operating system operated intermediate electronic communication device functionality including one or more second portions related at least in part to mobile electronic communication device functionality of the mobile operating system operated intermediate electronic communication device for communication initiated at least in part by the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i11 of the operation o11, for performance of the operation o11 by an electrical circuitry arrangement e11 as activated thereto, and/or otherwise fulfillment of the operation o11. One or more non-transitory signal bearing physical media can bear the one or more instructions i11 that when executed can direct performance of the operation o11. Furthermore, electronically receiving communication network relay related transmissions associated with first portions of mobile operating system operated intermediate electronic communication device functionality related to communication network relay functionality of a mobile operating system operated intermediate electronic communication device as standby communication network relays upon activation thereof for use by origination electronic communication devices to communicate with destination electronic communication devices, the mobile operating system operated intermediate electronic communication device functionality including second portions related to mobile electronic communication device functionality of the mobile operating system operated intermediate electronic communication device for communication initiated by the mobile operating system operated intermediate electronic communication device module m11 depicted in FIG. 4 as being included in the processing module m10, when executed and/or activated, can direct performance of and/or perform the operation o11. Illustratively, in one or more implementations, the operation o11 can be carried out, for example, by electronically receiving (e.g. receiving a high bandwidth communication to be relayed to another electronic communication device, receiving a lower bandwidth communication sweeping beam that is probing for available mobile devices to serve as relay nodes in a standby communication network, etc.) one or more communication network relay related transmissions (e.g. related in an actual sense in that an intermediate communication device was been enrolled to serve in one or more standby communication networks and at least one of such standby communication networks has been activated thereby making the intermediate communication device eligible to receive transmissions to be relayed as part of its functions serving as relay node in the standby communication network, related in a potential sense in that the one or more network relay related transmissions involve inquiry in the status of possible involvement as a relay node in one or more standby communication networks, etc.) at least in part associated (e.g. directly associated by relying one or more first portion functions such as relaying functions to process the received transmission, indirectly associated in that transmission can involve inquiry into potential for relay functions, etc.) with one or more first portions (e.g. first portions being some functions but not others, such as first portions including relaying functions that are other than found on conventional mobile communication devices, but first portions not being personal texting functions typically found on a mobile communication device, etc.) of mobile operating system (e.g. mobile Android OS, mobile Apple iOS, mobile Windows OS, etc.) operated intermediate electronic communication device (e.g. mobile phones, mobile computers, mobile tablets, etc.) functionality (e.g. electronically implemented functions such as communication reception, transmitting, processing, storage, display, calculation, etc.) related at least in part to communication network relay functionality (e.g. functions of a network relay node that receives and relays communication transmissions in assisting in flow of network traffic, etc.) of a mobile operating system operated intermediate electronic communication device (e.g. smartphone, phablet, etc.) as one or more standby communication network relays (e.g. standby relay can be activated for immediate service such as when primary networking pathways are blocked or otherwise hindered, etc.) upon activation (e.g. activation based upon a communication device originating a message is somehow blocked from sending the message to a base station in a network typically used by the originating communication device, etc.) thereof for use by one or more origination electronic communication devices (e.g. a mobile device such as a laptop, etc.) to communicate (e.g. sending high resolution graphics, use of high resolution video conferencing, etc.) at least in part with one or more destination electronic communication devices (e.g. other mobile devices such as high bandwidth cell phones, etc.), the mobile operating system operated intermediate electronic communication device functionality including one or more second portions (e.g. functions other than and/or in addition to the first portion functions, etc.) related at least in part to mobile electronic communication device functionality (e.g. communication functions typically found with mobile devices such as smart phones, laptops, etc.) of the mobile operating system operated intermediate electronic communication device (e.g. mobile Samsung tablet, etc.) for communication initiated at least in part by the mobile operating system operated intermediate electronic communication device (e.g. placing of a call on a smartphone by an end-user could be a second portion functionality whereas routing a network transmissions received by a smartphone to another mobile device as part of providing standby network capability could be a first portion functionality, etc.).

In one or more implementations, as shown in FIG. 8, the operational flow o10 proceeds to operation o12 for electronically establishing one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays. Origination of a physically tangible component group can be accomplished through skilled in the art design choice selection including use of one or more components and/or subsystems explicitly and/or implicitly referred to herein for at least in part implementing execution of one or more instructions i12 of the operation o12, for performance of the operation o12 by an electrical circuitry arrangement e12 as activated thereto, and/or otherwise fulfillment of the operation o12. One or more non-transitory signal bearing physical media can bear the one or more instructions i12 that when executed can direct performance of the operation o12. Furthermore, electronically establishing responses to the communication network relay related transmissions associated with first portions of mobile operating system operated intermediate electronic communication device functionality related to communication network relay functionality of the mobile operating system operated intermediate electronic communication device as standby communication network relays module m12 depicted in FIG. 4 as being included in the processing module m10, when executed and/or activated, can direct performance of and/or perform the operation o12. Illustratively, in one or more implementations, the operation o12 can be carried out, for example, by electronically establishing (e.g. determining, calculating, concluding based upon analysis, etc.) one or more responses (e.g. one or more reply transmissions sent back to the communication device that transmitted the received one or more transmissions, relaying the one or more received transmissions on to a third communication device as part of serving as a standby communication network relay node, etc.) to the one or more communication network relay related transmissions (e.g. sweeping beam serving as probe for potential relays, high bandwidth communication beam, etc.) at least in part associated with one or more first portions of mobile operating system operated intermediate electronic communication device functionality (e.g. first portion functions other than second portion functions (second portion functions can be typically used with mobile communication devices such as placing calls, etc.), such first portion functions can be used in serving as a standby network relay to assist with network traffic flow when one or more standard base stations become blocked to communication traffic, first portion functions can be provided by mobile OS and/or by firmware or other hardware associated with the communication device, etc.) related at least in part to communication network relay functionality of the mobile operating system operated intermediate electronic communication device as one or more standby communication network relays (e.g. relaying transmissions to another mobile or other communication device such as a base station, etc.).

In one or more implementations, as shown in FIG. 8, the operational flow o10 proceeds to operation o13 for electronically transmitting the one or more responses to the one or more communication network relay related transmissions at least in part associated with one or more first portions of mobile operating system operated intermediate electronic communication device functionality related at least in part to communication network relay functionality of the mobile operating system operated intermediate electronic communication device as one or more standby communication network relays. Origination of a physically tangible component group can be accomplished through skilled in the art design choice selection including use of one or more components and/or subsystems explicitly and/or implicitly referred to herein for at least in part implementing execution of one or more instructions i13 of the operation o13, for performance of the operation o13 by an electrical circuitry arrangement e13 as activated thereto, and/or otherwise fulfillment of the operation o13. One or more non-transitory signal bearing physical media can bear the one or more instructions i13 that when executed can direct performance of the operation o13. Furthermore, electronically transmitting the responses to the communication network relay related transmissions associated with first portions of mobile operating system operated intermediate electronic communication device functionality related to communication network relay functionality of the mobile operating system operated intermediate electronic communication device as standby communication network relays module m13 depicted in FIG. 4 as being included in the processing module m10, when executed and/or activated, can direct performance of and/or perform the operation o13. Illustratively, in one or more implementations, the operation o13 can be carried out, for example, by electronically transmitting (e.g. mesh network transmissions, 60 GHz, 5 GHz, 2.4 GHz, and all cellular bands, etc.) the one or more responses (e.g. information in response to a query, acknowledgement of an agreement to participate in a standby communication network as a backup relay node, etc.) to the one or more communication network relay related transmissions (e.g. information queries, packets with other destinations, etc.) at least in part associated with one or more first portions of mobile operating system operated intermediate electronic communication device functionality (e.g. first portion regarding some aspect of standby network such as potential for joining as a relay node, etc.) related at least in part to communication network relay functionality (e.g. re-transmit received transmission to service traffic flow of a network hindered by communication that has been blocked to prior available base stations, etc.) of the mobile operating system operated intermediate electronic communication device (e.g. smartphone, mobile handset, etc.) as one or more standby communication network relays (e.g. switches, routers, gateways, bridges, repeaters, etc.).

In one or more implementations, as shown in FIG. 9A, the operation o11 can include operation o1101 for electronically receiving one or more communication network relay related transmissions at least in part associated with one or more first portions of mobile operating system operated intermediate electronic communication device functionality related at least in part to communication network relay functionality and the mobile operating system operated intermediate electronic communication device functionality including one or more second portions related at least in part to mobile electronic communication device functionality including accessing data from a data source via a virtual machine representation of at least a part of a computing machine including accessing data from a data source via a virtual machine representation of at least a part of a real machine. Origination of a physically tangible component group can be accomplished through skilled in the art design choice selection including use of one or more components and/or subsystems explicitly and/or implicitly referred to herein for at least in part implementing execution of one or more instructions i1101 of the operation o1101, for performance of the operation o1101 by an electrical circuitry arrangement e1101 as activated thereto, and/or otherwise fulfillment of the operation o1101. One or more non-transitory signal bearing physical media can bear the one or more instructions i1101 that when executed can direct performance of the operation o1101. Furthermore, accessing data from a data source via a virtual machine representation of a computing machine including accessing data from a data source via a virtual machine representation of a real machine module m1101 depicted in FIG. 5A as being included in the module m11, when executed and/or activated, can direct performance of and/or perform the operation o1101. Illustratively, in one or more implementations, the operation o1101 can be carried out, for example, by electronically receiving (e.g. receiving a high bandwidth communication to be relayed to another electronic communication device, receiving a lower bandwidth communication sweeping beam that is probing for available mobile devices to serve as relay nodes in a standby communication network, etc.) one or more communication network relay related transmissions (e.g. related in an actual sense in that an intermediate communication device was been enrolled to serve in one or more standby communication networks and at least one of such standby communication networks has been activated thereby making the intermediate communication device eligible to receive transmissions to be relayed as part of its functions serving as relay node in the standby communication network, related in a potential sense in that the one or more network relay related transmissions involve inquiry in the status of possible involvement as a relay node in one or more standby communication networks, etc.) at least in part associated (e.g. directly associated by relying one or more first portion functions such as relaying functions to process the received transmission, indirectly associated in that transmission can involve inquiry into potential for relay functions, etc.) with one or more first portions (e.g. first portions being some functions but not others, such as first portions including relaying functions that are other than found on conventional mobile communication devices, but first portions not being personal texting functions typically found on a mobile communication device, etc.) of mobile operating system (e.g. mobile Android OS, mobile Apple iOS, mobile Windows OS, etc.) operated intermediate electronic communication device (e.g. mobile phones, mobile computers, mobile tablets, etc.) functionality (e.g. electronically implemented functions such as communication reception, transmitting, processing, storage, display, calculation, etc.) related at least in part to communication network relay functionality (e.g. functions of a network relay node that receives and relays communication transmissions in assisting in flow of network traffic, etc.) of a mobile operating system operated intermediate electronic communication device (e.g. smartphone, phablet, etc.) as one or more standby communication network relays (e.g. standby relay can be activated for immediate service such as when primary networking pathways are blocked or otherwise hindered, etc.) upon activation (e.g. activation based upon a communication device originating a message is somehow blocked from sending the message to a base station in a network typically used by the originating communication device, etc.) thereof for use by one or more origination electronic communication devices (e.g. a mobile device such as a laptop, etc.) to communicate (e.g. sending high resolution graphics, use of high resolution video conferencing, etc.) at least in part with one or more destination electronic communication devices (e.g. other mobile devices such as high bandwidth cell phones, etc.), the mobile operating system operated intermediate electronic communication device functionality including one or more second portions (e.g. functions other than and/or in addition to the first portion functions, etc.) related at least in part to mobile electronic communication device functionality (e.g. communication functions typically found with mobile devices such as smart phones, laptops, etc.) of the mobile operating system operated intermediate electronic communication device (e.g. mobile Samsung tablet, etc.) for communication initiated at least in part by the mobile operating system operated intermediate electronic communication device (e.g. placing of a call on a smartphone by an end-user could be a second portion functionality whereas routing a network transmissions received by a smartphone to another mobile device as part of providing standby network capability could be a first portion functionality, etc.) including accessing data (e.g. data calls, etc.) from a data source (e.g. electronic memory, etc.) via a virtual machine representation (e.g. process virtual machine, etc.) of at least a part of a computing machine (e.g. mobile OS portion, etc.) including accessing data (e.g. through bus, etc.) from a data source (e.g. hard drive, etc.) via a virtual machine representation (e.g. process virtual machine, etc.) of at least a part of a real machine (e.g. processor hardware, etc.).

In one or more implementations, as shown in FIG. 9A, the operation o11 can include operation o1102 for electronically receiving one or more communication network relay related transmissions at least in part associated with one or more first portions of mobile operating system operated intermediate electronic communication device functionality related at least in part to communication network relay functionality and the mobile operating system operated intermediate electronic communication device functionality including one or more second portions related at least in part to mobile electronic communication device functionality including accessing data from a data source via a virtual machine representation of at least a part of a computing machine including accessing data from a data source via a virtual machine representation of at least a part of a virtual machine. Origination of a physically tangible component group can be accomplished through skilled in the art design choice selection including use of one or more components and/or subsystems explicitly and/or implicitly referred to herein for at least in part implementing execution of one or more instructions i1102 of the operation o1102, for performance of the operation o1102 by an electrical circuitry arrangement e1102 as activated thereto, and/or otherwise fulfillment of the operation o1102. One or more non-transitory signal bearing physical media can bear the one or more instructions i1102 that when executed can direct performance of the operation o1102. Furthermore, accessing data from a data source via a virtual machine representation of a computing machine including accessing data from a data source via a virtual machine representation of a virtual machine module m1102 depicted in FIG. 5A as being included in the module m11, when executed and/or activated, can direct performance of and/or perform the operation o1102. Illustratively, in one or more implementations, the operation o1102 can be carried out, for example, by electronically receiving (e.g. receiving a high bandwidth communication to be relayed to another electronic communication device, receiving a lower bandwidth communication sweeping beam that is probing for available mobile devices to serve as relay nodes in a standby communication network, etc.) one or more communication network relay related transmissions (e.g. related in an actual sense in that an intermediate communication device was been enrolled to serve in one or more standby communication networks and at least one of such standby communication networks has been activated thereby making the intermediate communication device eligible to receive transmissions to be relayed as part of its functions serving as relay node in the standby communication network, related in a potential sense in that the one or more network relay related transmissions involve inquiry in the status of possible involvement as a relay node in one or more standby communication networks, etc.) at least in part associated (e.g. directly associated by relying one or more first portion functions such as relaying functions to process the received transmission, indirectly associated in that transmission can involve inquiry into potential for relay functions, etc.) with one or more first portions (e.g. first portions being some functions but not others, such as first portions including relaying functions that are other than found on conventional mobile communication devices, but first portions not being personal texting functions typically found on a mobile communication device, etc.) of mobile operating system (e.g. mobile Android OS, mobile Apple iOS, mobile Windows OS, etc.) operated intermediate electronic communication device (e.g. mobile phones, mobile computers, mobile tablets, etc.) functionality (e.g. electronically implemented functions such as communication reception, transmitting, processing, storage, display, calculation, etc.) related at least in part to communication network relay functionality (e.g. functions of a network relay node that receives and relays communication transmissions in assisting in flow of network traffic, etc.) of a mobile operating system operated intermediate electronic communication device (e.g. smartphone, phablet, etc.) as one or more standby communication network relays (e.g. standby relay can be activated for immediate service such as when primary networking pathways are blocked or otherwise hindered, etc.) upon activation (e.g. activation based upon a communication device originating a message is somehow blocked from sending the message to a base station in a network typically used by the originating communication device, etc.) thereof for use by one or more origination electronic communication devices (e.g. a mobile device such as a laptop, etc.) to communicate (e.g. sending high resolution graphics, use of high resolution video conferencing, etc.) at least in part with one or more destination electronic communication devices (e.g. other mobile devices such as high bandwidth cell phones, etc.), the mobile operating system operated intermediate electronic communication device functionality including one or more second portions (e.g. functions other than and/or in addition to the first portion functions, etc.) related at least in part to mobile electronic communication device functionality (e.g. communication functions typically found with mobile devices such as smart phones, laptops, etc.) of the mobile operating system operated intermediate electronic communication device (e.g. mobile Samsung tablet, etc.) for communication initiated at least in part by the mobile operating system operated intermediate electronic communication device (e.g. placing of a call on a smartphone by an end-user could be a second portion functionality whereas routing a network transmissions received by a smartphone to another mobile device as part of providing standby network capability could be a first portion functionality, etc.) including accessing data (e.g. data calls, etc.) from a data source (e.g. electronic memory, etc.) via a virtual machine representation (e.g. process virtual machine, etc.) of at least a part of a computing machine (e.g. mobile OS portion, etc.) including accessing data (e.g. through bus, etc.) from a data source (e.g. hard drive, etc.) via a virtual machine representation (e.g. process virtual machine, Android, etc.) of at least a part of a virtual machine (e.g. Java, etc.).

In one or more implementations, as shown in FIG. 9A, the operation o11 can include operation o1103 for electronically receiving one or more communication network relay related transmissions at least in part associated with one or more first portions of mobile operating system operated intermediate electronic communication device functionality related at least in part to communication network relay functionality and the mobile operating system operated intermediate electronic communication device functionality including one or more second portions related at least in part to mobile electronic communication device functionality including accessing data from a data source via a virtual machine representation of at least a part of a virtual machine including converting a file having a file-type associated with the virtual machine to a file-type associated with the virtual machine representation. Origination of a physically tangible component group can be accomplished through skilled in the art design choice selection including use of one or more components and/or subsystems explicitly and/or implicitly referred to herein for at least in part implementing execution of one or more instructions i1103 of the operation o1103, for performance of the operation o1103 by an electrical circuitry arrangement e1103 as activated thereto, and/or otherwise fulfillment of the operation o1103. One or more non-transitory signal bearing physical media can bear the one or more instructions i1103 that when executed can direct performance of the operation o1103. Furthermore, accessing data from a data source via a virtual machine representation of a virtual machine including converting a file having a file-type associated with the virtual machine to a file-type associated with the virtual machine representation module m1103 depicted in FIG. 5A as being included in the module m11, when executed and/or activated, can direct performance of and/or perform the operation o1103. Illustratively, in one or more implementations, the operation o1103 can be carried out, for example, by electronically receiving (e.g. receiving a high bandwidth communication to be relayed to another electronic communication device, receiving a lower bandwidth communication sweeping beam that is probing for available mobile devices to serve as relay nodes in a standby communication network, etc.) one or more communication network relay related transmissions (e.g. related in an actual sense in that an intermediate communication device was been enrolled to serve in one or more standby communication networks and at least one of such standby communication networks has been activated thereby making the intermediate communication device eligible to receive transmissions to be relayed as part of its functions serving as relay node in the standby communication network, related in a potential sense in that the one or more network relay related transmissions involve inquiry in the status of possible involvement as a relay node in one or more standby communication networks, etc.) at least in part associated (e.g. directly associated by relying one or more first portion functions such as relaying functions to process the received transmission, indirectly associated in that transmission can involve inquiry into potential for relay functions, etc.) with one or more first portions (e.g. first portions being some functions but not others, such as first portions including relaying functions that are other than found on conventional mobile communication devices, but first portions not being personal texting functions typically found on a mobile communication device, etc.) of mobile operating system (e.g. mobile Android OS, mobile Apple iOS, mobile Windows OS, etc.) operated intermediate electronic communication device (e.g. mobile phones, mobile computers, mobile tablets, etc.) functionality (e.g. electronically implemented functions such as communication reception, transmitting, processing, storage, display, calculation, etc.) related at least in part to communication network relay functionality (e.g. functions of a network relay node that receives and relays communication transmissions in assisting in flow of network traffic, etc.) of a mobile operating system operated intermediate electronic communication device (e.g. smartphone, phablet, etc.) as one or more standby communication network relays (e.g. standby relay can be activated for immediate service such as when primary networking pathways are blocked or otherwise hindered, etc.) upon activation (e.g. activation based upon a communication device originating a message is somehow blocked from sending the message to a base station in a network typically used by the originating communication device, etc.) thereof for use by one or more origination electronic communication devices (e.g. a mobile device such as a laptop, etc.) to communicate (e.g. sending high resolution graphics, use of high resolution video conferencing, etc.) at least in part with one or more destination electronic communication devices (e.g. other mobile devices such as high bandwidth cell phones, etc.), the mobile operating system operated intermediate electronic communication device functionality including one or more second portions (e.g. functions other than and/or in addition to the first portion functions, etc.) related at least in part to mobile electronic communication device functionality (e.g. communication functions typically found with mobile devices such as smart phones, laptops, etc.) of the mobile operating system operated intermediate electronic communication device (e.g. mobile Samsung tablet, etc.) for communication initiated at least in part by the mobile operating system operated intermediate electronic communication device (e.g. placing of a call on a smartphone by an end-user could be a second portion functionality whereas routing a network transmissions received by a smartphone to another mobile device as part of providing standby network capability could be a first portion functionality, etc.) including accessing data (e.g. through data call, etc.) from a data source (e.g. memory, etc.) via a virtual machine representation (e.g. process virtual machine, Android, etc.) of at least a part of a virtual machine including converting a file having a file-type associated with the virtual machine (e.g. .class JVM files, etc.) to a file-type associated with the virtual machine representation (e.g. .dex Dalvix files, etc.).

In one or more implementations, as shown in FIG. 9B, the operation o1103 can include operation o1104 for accessing data from a data source via a virtual machine representation of at least a part of a virtual machine including converting a file having a file-type associated with the virtual machine to a file-type associated with the virtual machine representation including wherein the file-type associated with the second virtual machine is configured for a limited-resource computing machine. Origination of a physically tangible component group can be accomplished through skilled in the art design choice selection including use of one or more components and/or subsystems explicitly and/or implicitly referred to herein for at least in part implementing execution of one or more instructions i1104 of the operation o1104, for performance of the operation o1104 by an electrical circuitry arrangement e1104 as activated thereto, and/or otherwise fulfillment of the operation o1104. One or more non-transitory signal bearing physical media can bear the one or more instructions i1104 that when executed can direct performance of the operation o1104. Furthermore, wherein the file-type associated with the second virtual machine is configured for a limited-resource computing machine module m1104 depicted in FIG. 5A as being included in the module m1103, when executed and/or activated, can direct performance of and/or perform the operation o1104. Illustratively, in one or more implementations, the operation o1104 can be carried out, for example, by accessing data (e.g. through data call, etc.) from a data source (e.g. memory, etc.) via a virtual machine representation (e.g. process virtual machine, Android, etc.) of at least a part of a virtual machine including converting a file having a file-type associated with the virtual machine (e.g. .class JVM files, etc.) to a file-type associated with the virtual machine representation (e.g. .dex Dalvix files, etc.) wherein the file-type associated with the second virtual machine (e.g. .dex Dalvix files, etc.) is configured for a limited-resource computing machine (e.g. Android operating system device, etc.).

In one or more implementations, as shown in FIG. 9B, the operation o1104 can include operation o1105 for wherein the file-type associated with the second virtual machine is configured for a limited-resource computing machine including wherein the file-type associated with the second virtual machine is configured for a mobile computing machine. Origination of a physically tangible component group can be accomplished through skilled in the art design choice selection including use of one or more components and/or subsystems explicitly and/or implicitly referred to herein for at least in part implementing execution of one or more instructions i1105 of the operation o1105, for performance of the operation o1105 by an electrical circuitry arrangement e1105 as activated thereto, and/or otherwise fulfillment of the operation o1105. One or more non-transitory signal bearing physical media can bear the one or more instructions i1105 that when executed can direct performance of the operation o1105. Furthermore, wherein the file-type associated with the second virtual machine is configured for a mobile computing machine module m1105 depicted in FIG. 5A as being included in the module m1104, when executed and/or activated, can direct performance of and/or perform the operation o1105. Illustratively, in one or more implementations, the operation o1105 can be carried out, for example, by wherein the file-type associated with the second virtual machine (e.g. .dex Dalvix files, etc.) is configured for a limited-resource computing machine (e.g. Android operating system device, etc.) wherein the file-type associated with the second virtual machine is configured for a mobile computing machine (e.g. mobile devices such as Samsung mobile devices, Google mobile devices, etc.).

In one or more implementations, as shown in FIG. 9B, the operation o11 can include operation o1106 for electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof including activation based at least in part upon if direct access by the one or more origination electronic communication devices to one or more base stations of one or more base station based communication networks otherwise used by the one or more origination electronic communication devices becomes unavailable to one or more the origination electronic communication devices. Origination of a physically tangible component group can be accomplished through skilled in the art design choice selection including use of one or more components and/or subsystems explicitly and/or implicitly referred to herein for at least in part implementing execution of one or more instructions i1106 of the operation o1106, for performance of the operation o1106 by an electrical circuitry arrangement e1106 as activated thereto, and/or otherwise fulfillment of the operation o1106. One or more non-transitory signal bearing physical media can bear the one or more instructions i1106 that when executed can direct performance of the operation o1106. Furthermore, activation based upon if direct access by the origination electronic communication devices to base stations of base station based communication networks otherwise used by the origination electronic communication devices becomes unavailable to the origination electronic communication devices module m1106 depicted in FIG. 5A as being included in the module m11, when executed and/or activated, can direct performance of and/or perform the operation o1106. Illustratively, in one or more implementations, the operation o1106 can be carried out, for example, by electronically receiving (e.g. receiving a high bandwidth communication to be relayed to another electronic communication device, receiving a lower bandwidth communication sweeping beam that is probing for available mobile devices to serve as relay nodes in a standby communication network, etc.) one or more communication network relay related transmissions (e.g. related in an actual sense in that an intermediate communication device was been enrolled to serve in one or more standby communication networks and at least one of such standby communication networks has been activated thereby making the intermediate communication device eligible to receive transmissions to be relayed as part of its functions serving as relay node in the standby communication network, related in a potential sense in that the one or more network relay related transmissions involve inquiry in the status of possible involvement as a relay node in one or more standby communication networks, etc.) at least in part associated (e.g. directly associated by relying one or more first portion functions such as relaying functions to process the received transmission, indirectly associated in that transmission can involve inquiry into potential for relay functions, etc.) with one or more first portions (e.g. first portions being some functions but not others, such as first portions including relaying functions that are other than found on conventional mobile communication devices, but first portions not being personal texting functions typically found on a mobile communication device, etc.) of mobile operating system (e.g. mobile Android OS, mobile Apple iOS, mobile Windows OS, etc.) operated intermediate electronic communication device (e.g. mobile phones, mobile computers, mobile tablets, etc.) functionality (e.g. electronically implemented functions such as communication reception, transmitting, processing, storage, display, calculation, etc.) related at least in part to communication network relay functionality (e.g. functions of a network relay node that receives and relays communication transmissions in assisting in flow of network traffic, etc.) of a mobile operating system operated intermediate electronic communication device (e.g. smartphone, phablet, etc.) as one or more standby communication network relays (e.g. standby relay can be activated for immediate service such as when primary networking pathways are blocked or otherwise hindered, etc.) upon activation (e.g. activation based upon a communication device originating a message is somehow blocked from sending the message to a base station in a network typically used by the originating communication device, etc.) thereof for use by one or more origination electronic communication devices (e.g. a mobile device such as a laptop, etc.) to communicate (e.g. sending high resolution graphics, use of high resolution video conferencing, etc.) at least in part with one or more destination electronic communication devices (e.g. other mobile devices such as high bandwidth cell phones, etc.), the mobile operating system operated intermediate electronic communication device functionality including one or more second portions (e.g. functions other than and/or in addition to the first portion functions, etc.) related at least in part to mobile electronic communication device functionality (e.g. communication functions typically found with mobile devices such as smart phones, laptops, etc.) of the mobile operating system operated intermediate electronic communication device (e.g. mobile Samsung tablet, etc.) for communication initiated at least in part by the mobile operating system operated intermediate electronic communication device (e.g. placing of a call on a smartphone by an end-user could be a second portion functionality whereas routing a network transmissions received by a smartphone to another mobile device as part of providing standby network capability could be a first portion functionality, etc.) activation based at least in part upon if direct access by the one or more origination electronic communication devices (e.g. tablet computer, etc.) to one or more base stations (e.g. one or more fixed position cell towers, network routers, network switches, network routers, base transceiver stations, mobile switching centers, macrocells, microcells, picocells, femtocells, access point base stations, cell sites, repeaters, etc.) of one or more base station based communication networks e.g. monthly or annual based subscription to use of cellular, point-to-point, or otherwise network of fixed position or other base station network, etc.) otherwise used by the one or more origination electronic communication devices (e.g. smart phone, etc.) becomes unavailable to one or more the origination electronic communication devices (e.g. laptop, etc.).

In one or more implementations, as shown in FIG. 9C, the operation o11 can include operation o1107 for the one or more second portions related at least in part to mobile electronic communication device functionality of the mobile operating system operated intermediate electronic communication device for communication initiated at least in part by the mobile operating system operated intermediate electronic communication device including the mobile operating system operated intermediate electronic communication device being used by a user thereof as a mobile handset communication device for communication with one or more users of other one or more mobile handset communication devices. Origination of a physically tangible component group can be accomplished through skilled in the art design choice selection including use of one or more components and/or subsystems explicitly and/or implicitly referred to herein for at least in part implementing execution of one or more instructions i1107 of the operation o1107, for performance of the operation o1107 by an electrical circuitry arrangement e1107 as activated thereto, and/or otherwise fulfillment of the operation o1107. One or more non-transitory signal bearing physical media can bear the one or more instructions i1107 that when executed can direct performance of the operation o1107. Furthermore, the mobile operating system operated intermediate electronic communication device being used by a user thereof as a mobile handset communication device for communication with users of other mobile handset communication devices module m1107 depicted in FIG. 5A as being included in the module m11, when executed and/or activated, can direct performance of and/or perform the operation o1107. Illustratively, in one or more implementations, the operation o1107 can be carried out, for example, by electronically receiving (e.g. receiving a high bandwidth communication to be relayed to another electronic communication device, receiving a lower bandwidth communication sweeping beam that is probing for available mobile devices to serve as relay nodes in a standby communication network, etc.) one or more communication network relay related transmissions (e.g. related in an actual sense in that an intermediate communication device was been enrolled to serve in one or more standby communication networks and at least one of such standby communication networks has been activated thereby making the intermediate communication device eligible to receive transmissions to be relayed as part of its functions serving as relay node in the standby communication network, related in a potential sense in that the one or more network relay related transmissions involve inquiry in the status of possible involvement as a relay node in one or more standby communication networks, etc.) at least in part associated (e.g. directly associated by relying one or more first portion functions such as relaying functions to process the received transmission, indirectly associated in that transmission can involve inquiry into potential for relay functions, etc.) with one or more first portions (e.g. first portions being some functions but not others, such as first portions including relaying functions that are other than found on conventional mobile communication devices, but first portions not being personal texting functions typically found on a mobile communication device, etc.) of mobile operating system (e.g. mobile Android OS, mobile Apple iOS, mobile Windows OS, etc.) operated intermediate electronic communication device (e.g. mobile phones, mobile computers, mobile tablets, etc.) functionality (e.g. electronically implemented functions such as communication reception, transmitting, processing, storage, display, calculation, etc.) related at least in part to communication network relay functionality (e.g. functions of a network relay node that receives and relays communication transmissions in assisting in flow of network traffic, etc.) of a mobile operating system operated intermediate electronic communication device (e.g. smartphone, phablet, etc.) as one or more standby communication network relays (e.g. standby relay can be activated for immediate service such as when primary networking pathways are blocked or otherwise hindered, etc.) upon activation (e.g. activation based upon a communication device originating a message is somehow blocked from sending the message to a base station in a network typically used by the originating communication device, etc.) thereof for use by one or more origination electronic communication devices (e.g. a mobile device such as a laptop, etc.) to communicate (e.g. sending high resolution graphics, use of high resolution video conferencing, etc.) at least in part with one or more destination electronic communication devices (e.g. other mobile devices such as high bandwidth cell phones, etc.), the mobile operating system operated intermediate electronic communication device functionality including one or more second portions (e.g. functions other than and/or in addition to the first portion functions, etc.) related at least in part to mobile electronic communication device functionality (e.g. communication functions typically found with mobile devices such as smart phones, laptops, etc.) of the mobile operating system operated intermediate electronic communication device (e.g. mobile Samsung tablet, etc.) for communication initiated at least in part by the mobile operating system operated intermediate electronic communication device (e.g. placing of a call on a smartphone by an end-user could be a second portion functionality whereas routing a network transmissions received by a smartphone to another mobile device as part of providing standby network capability could be a first portion functionality, etc.) the mobile operating system operated intermediate electronic communication device (e.g. Android tablet, Samsung smartphone, etc.) being used by a user (e.g. businessperson, etc.) thereof as a mobile handset communication device (e.g. phablet, etc.) for communication with one or more users (e.g. other businesspersons, etc.) of other one or more mobile handset communication devices (e.g. Apple iPhones, etc.).

In one or more implementations, as shown in FIG. 9C, the operation o11 can include operation o1108 for electronically receiving one or more communication network relay related transmissions at least in part associated with one or more first portions of mobile operating system operated intermediate electronic communication device functionality related at least in part to communication network relay functionality of a mobile operating system operated intermediate electronic communication device as one or more standby communication network relays upon activation thereof including receiving wireless packetized communication. Origination of a physically tangible component group can be accomplished through skilled in the art design choice selection including use of one or more components and/or subsystems explicitly and/or implicitly referred to herein for at least in part implementing execution of one or more instructions i1108 of the operation o1108, for performance of the operation o1108 by an electrical circuitry arrangement e1108 as activated thereto, and/or otherwise fulfillment of the operation o1108. One or more non-transitory signal bearing physical media can bear the one or more instructions i1108 that when executed can direct performance of the operation o1108. Furthermore, receiving wireless packetized communication module m1108 depicted in FIG. 5B as being included in the module m11, when executed and/or activated, can direct performance of and/or perform the operation o1108. Illustratively, in one or more implementations, the operation o1108 can be carried out, for example, by electronically receiving (e.g. receiving a high bandwidth communication to be relayed to another electronic communication device, receiving a lower bandwidth communication sweeping beam that is probing for available mobile devices to serve as relay nodes in a standby communication network, etc.) one or more communication network relay related transmissions (e.g. related in an actual sense in that an intermediate communication device was been enrolled to serve in one or more standby communication networks and at least one of such standby communication networks has been activated thereby making the intermediate communication device eligible to receive transmissions to be relayed as part of its functions serving as relay node in the standby communication network, related in a potential sense in that the one or more network relay related transmissions involve inquiry in the status of possible involvement as a relay node in one or more standby communication networks, etc.) at least in part associated (e.g. directly associated by relying one or more first portion functions such as relaying functions to process the received transmission, indirectly associated in that transmission can involve inquiry into potential for relay functions, etc.) with one or more first portions (e.g. first portions being some functions but not others, such as first portions including relaying functions that are other than found on conventional mobile communication devices, but first portions not being personal texting functions typically found on a mobile communication device, etc.) of mobile operating system (e.g. mobile Android OS, mobile Apple iOS, mobile Windows OS, etc.) operated intermediate electronic communication device (e.g. mobile phones, mobile computers, mobile tablets, etc.) functionality (e.g. electronically implemented functions such as communication reception, transmitting, processing, storage, display, calculation, etc.) related at least in part to communication network relay functionality (e.g. functions of a network relay node that receives and relays communication transmissions in assisting in flow of network traffic, etc.) of a mobile operating system operated intermediate electronic communication device (e.g. smartphone, phablet, etc.) as one or more standby communication network relays (e.g. standby relay can be activated for immediate service such as when primary networking pathways are blocked or otherwise hindered, etc.) upon activation (e.g. activation based upon a communication device originating a message is somehow blocked from sending the message to a base station in a network typically used by the originating communication device, etc.) thereof for use by one or more origination electronic communication devices (e.g. a mobile device such as a laptop, etc.) to communicate (e.g. sending high resolution graphics, use of high resolution video conferencing, etc.) at least in part with one or more destination electronic communication devices (e.g. other mobile devices such as high bandwidth cell phones, etc.), the mobile operating system operated intermediate electronic communication device functionality including one or more second portions (e.g. functions other than and/or in addition to the first portion functions, etc.) related at least in part to mobile electronic communication device functionality (e.g. communication functions typically found with mobile devices such as smart phones, laptops, etc.) of the mobile operating system operated intermediate electronic communication device (e.g. mobile Samsung tablet, etc.) for communication initiated at least in part by the mobile operating system operated intermediate electronic communication device (e.g. placing of a call on a smartphone by an end-user could be a second portion functionality whereas routing a network transmissions received by a smartphone to another mobile device as part of providing standby network capability could be a first portion functionality, etc.) receiving wireless packetized communication (e.g. IEEE 802.11 packets, cellular packets, etc.).

In one or more implementations, as shown in FIG. 9C, the operation o1108 can include operation o1109 for receiving wireless packetized communication including receiving incoming message traffic. Origination of a physically tangible component group can be accomplished through skilled in the art design choice selection including use of one or more components and/or subsystems explicitly and/or implicitly referred to herein for at least in part implementing execution of one or more instructions i1109 of the operation o1109, for performance of the operation o1109 by an electrical circuitry arrangement e1109 as activated thereto, and/or otherwise fulfillment of the operation o1109. One or more non-transitory signal bearing physical media can bear the one or more instructions i1109 that when executed can direct performance of the operation o1109. Furthermore, receiving incoming message traffic module m1109 depicted in FIG. 5B as being included in the module m1108, when executed and/or activated, can direct performance of and/or perform the operation o1109. Illustratively, in one or more implementations, the operation o1109 can be carried out, for example, by receiving wireless packetized communication (e.g. IEEE 802.11 packets, cellular packets, etc.) receiving incoming message traffic (e.g. text messages, voice calls, etc.).

In one or more implementations, as shown in FIG. 9C, the operation o1109 can include operation o1110 for receiving incoming message traffic including receiving one or more high bandwidth data transfers. Origination of a physically tangible component group can be accomplished through skilled in the art design choice selection including use of one or more components and/or subsystems explicitly and/or implicitly referred to herein for at least in part implementing execution of one or more instructions i1110 of the operation o1110, for performance of the operation o1110 by an electrical circuitry arrangement e1110 as activated thereto, and/or otherwise fulfillment of the operation o1110. One or more non-transitory signal bearing physical media can bear the one or more instructions i1110 that when executed can direct performance of the operation o1110. Furthermore, receiving high bandwidth data transfers module m1110 depicted in FIG. 5B as being included in the module m1109, when executed and/or activated, can direct performance of and/or perform the operation o1110. Illustratively, in one or more implementations, the operation o1110 can be carried out, for example, by receiving incoming message traffic (e.g. text messages, voice calls, etc.) receiving one or more high bandwidth data transfers (e.g. high resolution video calls, large capacity data files, etc.).

In one or more implementations, as shown in FIG. 9C, the operation o1109 can include operation o1111 for receiving incoming message traffic including receiving one or more high resolution audio formatted messages. Origination of a physically tangible component group can be accomplished through skilled in the art design choice selection including use of one or more components and/or subsystems explicitly and/or implicitly referred to herein for at least in part implementing execution of one or more instructions i1111 of the operation o1111, for performance of the operation o1111 by an electrical circuitry arrangement e1111 as activated thereto, and/or otherwise fulfillment of the operation o1111. One or more non-transitory signal bearing physical media can bear the one or more instructions i1111 that when executed can direct performance of the operation o1111. Furthermore, receiving high resolution audio formatted messages module m1111 depicted in FIG. 5B as being included in the module m1109, when executed and/or activated, can direct performance of and/or perform the operation o1111. Illustratively, in one or more implementations, the operation o1111 can be carried out, for example, by receiving incoming message traffic (e.g. text messages, voice calls, etc.) receiving one or more high resolution audio formatted messages (e.g. FLAC formatted, Pono formatted, etc.).

In one or more implementations, as shown in FIG. 9C, the operation o1109 can include operation o1112 for receiving incoming message traffic including receiving one or more high resolution video formatted messages. Origination of a physically tangible component group can be accomplished through skilled in the art design choice selection including use of one or more components and/or subsystems explicitly and/or implicitly referred to herein for at least in part implementing execution of one or more instructions i1112 of the operation o1112, for performance of the operation o1112 by an electrical circuitry arrangement e1112 as activated thereto, and/or otherwise fulfillment of the operation o1112. One or more non-transitory signal bearing physical media can bear the one or more instructions i1112 that when executed can direct performance of the operation o1112. Furthermore, receiving high resolution video formatted messages module m1112 depicted in FIG. 5B as being included in the module m1109, when executed and/or activated, can direct performance of and/or perform the operation o1112. Illustratively, in one or more implementations, the operation o1112 can be carried out, for example, by receiving incoming message traffic (e.g. text messages, voice calls, etc.) receiving one or more high resolution video formatted messages (e.g. ultra high definition format, 4K UHD (2160p), 8K UHD (4320p), etc.).

In one or more implementations, as shown in FIG. 9C, the operation o1109 can include operation o1113 for receiving incoming message traffic including receiving one or more high capacity data files. Origination of a physically tangible component group can be accomplished through skilled in the art design choice selection including use of one or more components and/or subsystems explicitly and/or implicitly referred to herein for at least in part implementing execution of one or more instructions i1113 of the operation o1113, for performance of the operation o1113 by an electrical circuitry arrangement e1113 as activated thereto, and/or otherwise fulfillment of the operation o1113. One or more non-transitory signal bearing physical media can bear the one or more instructions i1113 that when executed can direct performance of the operation o1113. Furthermore, receiving high capacity data files module m1113 depicted in FIG. 5B as being included in the module m1109, when executed and/or activated, can direct performance of and/or perform the operation o1113. Illustratively, in one or more implementations, the operation o1113 can be carried out, for example, by receiving incoming message traffic (e.g. text messages, voice calls, etc.) receiving one or more high capacity data files (e.g. over one Terabyte sized file, etc.).

In one or more implementations, as shown in FIG. 9C, the operation o1108 can include operation o1114 for receiving wireless packetized communication including receiving the one or more communication network relay related transmissions from one or more origination electronic communication devices. Origination of a physically tangible component group can be accomplished through skilled in the art design choice selection including use of one or more components and/or subsystems explicitly and/or implicitly referred to herein for at least in part implementing execution of one or more instructions i1114 of the operation o1114, for performance of the operation o1114 by an electrical circuitry arrangement e1114 as activated thereto, and/or otherwise fulfillment of the operation o1114. One or more non-transitory signal bearing physical media can bear the one or more instructions i1114 that when executed can direct performance of the operation o1114. Furthermore, receiving the communication network relay related transmissions from origination electronic communication devices module m1114 depicted in FIG. 5B as being included in the module m1108, when executed and/or activated, can direct performance of and/or perform the operation o1114. Illustratively, in one or more implementations, the operation o1114 can be carried out, for example, by receiving wireless packetized communication (e.g. IEEE 802.11 packets, cellular packets, etc.) receiving the one or more communication network relay related transmissions (e.g. one or more status inquiries from sweeping beam low bandwidth probing communication, etc.) from one or more origination electronic communication device (e.g. Research In Motion PDA device, etc.).

Figure 9D:
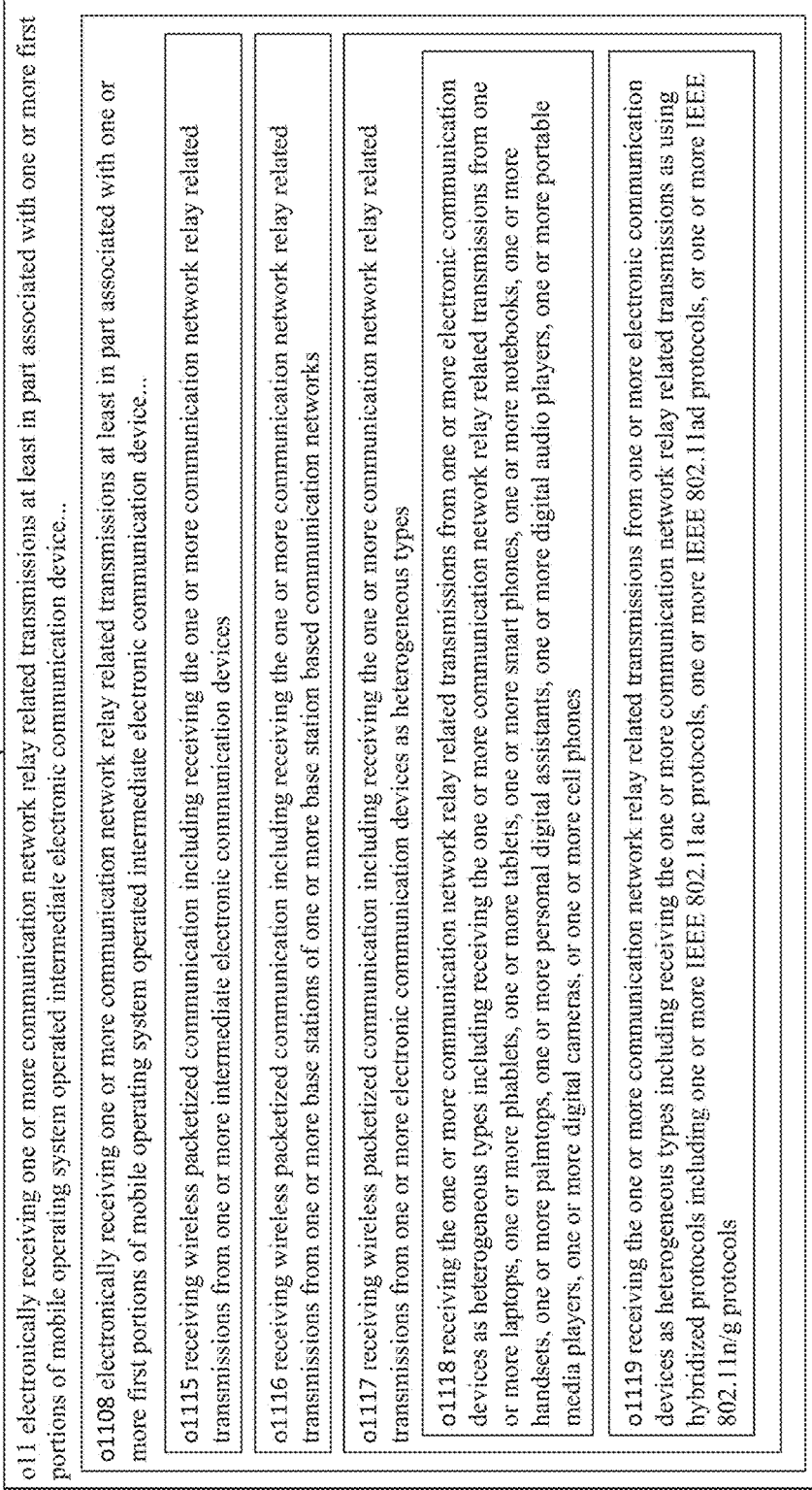

In one or more implementations, as shown in FIG. 9D, the operation o1108 can include operation o1115 for receiving wireless packetized communication including receiving the one or more communication network relay related transmissions from one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1115 of the operation o1115, for performance of the operation o1115 by an electrical circuitry arrangement e1115 as activated thereto, and/or otherwise fulfillment of the operation o1115. One or more non-transitory signal bearing physical media can bear the one or more instructions i1115 that when executed can direct performance of the operation o1115. Furthermore, receiving the communication network relay related transmissions from intermediate electronic communication devices module m1115 depicted in FIG. 5B as being included in the module m1108, when executed and/or activated, can direct performance of and/or perform the operation o1115. Illustratively, in one or more implementations, the operation o1115 can be carried out, for example, by receiving wireless packetized communication (e.g. IEEE 802.11 packets, cellular packets, etc.) receiving the one or more communication network relay related transmissions (e.g. streaming high definition video files, etc.) from one or more intermediate electronic communication devices (e.g. acting as one or more standby network relay nodes, etc.).

In one or more implementations, as shown in FIG. 9D, the operation o1108 can include operation o1116 for receiving wireless packetized communication including receiving the one or more communication network relay related transmissions from one or more base stations of one or more base station based communication networks. Origination of a physically tangible component group can be accomplished through skilled in the art design choice selection including use of one or more components and/or subsystems explicitly and/or implicitly referred to herein for at least in part implementing execution of one or more instructions i1116 of the operation o1116, for performance of the operation o1116 by an electrical circuitry arrangement e1116 as activated thereto, and/or otherwise fulfillment of the operation o1116. One or more non-transitory signal bearing physical media can bear the one or more instructions i1116 that when executed can direct performance of the operation o1116. Furthermore, receiving the communication network relay related transmissions from base stations of base station based communication networks module m1116 depicted in FIG. 5B as being included in the module m1108, when executed and/or activated, can direct performance of and/or perform the operation o1116. Illustratively, in one or more implementations, the operation o1116 can be carried out, for example, by receiving wireless packetized communication (e.g. IEEE 802.11 packets, cellular packets, etc.) receiving the one or more communication network relay related transmissions (e.g. alert message that one or more base stations are blocked and a standby network is required to be activated, etc.) from one or more base stations of one or more base station based communication networks (e.g. one or more base stations that are part of a combined Verizon and Sprint cellular communication network, etc.).

In one or more implementations, as shown in FIG. 9D, the operation o1108 can include operation o1117 for receiving wireless packetized communication including receiving the one or more communication network relay related transmissions from one or more electronic communication devices as heterogeneous types. Origination of a physically tangible component group can be accomplished through skilled in the art design choice selection including use of one or more components and/or subsystems explicitly and/or implicitly referred to herein for at least in part implementing execution of one or more instructions i1117 of the operation o1117, for performance of the operation o1117 by an electrical circuitry arrangement e1117 as activated thereto, and/or otherwise fulfillment of the operation o1117. One or more non-transitory signal bearing physical media can bear the one or more instructions i1117 that when executed can direct performance of the operation o1117. Furthermore, receiving the communication network relay related transmissions from electronic communication devices as heterogeneous types module m1117 depicted in FIG. 5B as being included in the module m1108, when executed and/or activated, can direct performance of and/or perform the operation o1117. Illustratively, in one or more implementations, the operation o1117 can be carried out, for example, by receiving wireless packetized communication (e.g. IEEE 802.11 packets, cellular packets, etc.) receiving the one or more communication network relay related transmissions from one or more electronic communication devices as heterogeneous types (e.g. mixtures of laptops, phablets, smartphones, etc.).

In one or more implementations, as shown in FIG. 9D, the operation o1117 can include operation o1118 for receiving the one or more communication network relay related transmissions from one or more electronic communication devices as heterogeneous types including receiving the one or more communication network relay related transmissions from one or more laptops, one or more phablets, one or more tablets, one or more smart phones, one or more notebooks, one or more handsets, one or more palmtops, one or more personal digital assistants, one or more digital audio players, one or more portable media players, one or more digital cameras, or one or more cell phones. Origination of a physically tangible component group can be accomplished through skilled in the art design choice selection including use of one or more components and/or subsystems explicitly and/or implicitly referred to herein for at least in part implementing execution of one or more instructions i1118 of the operation o1118, for performance of the operation o1118 by an electrical circuitry arrangement e1118 as activated thereto, and/or otherwise fulfillment of the operation o1118. One or more non-transitory signal bearing physical media can bear the one or more instructions i1118 that when executed can direct performance of the operation o1118. Furthermore, receiving the communication network relay related transmissions from laptops, phablets, tablets, smart phones, notebooks, handsets, palmtops, personal digital assistants, digital audio players, portable media players, digital cameras, or cell phones module m1118 depicted in FIG. 5B as being included in the module m1117, when executed and/or activated, can direct performance of and/or perform the operation o1118. Illustratively, in one or more implementations, the operation o1118 can be carried out, for example, by receiving the one or more communication network relay related transmissions from one or more electronic communication devices as heterogeneous types (e.g. mixtures of laptops, phablets, smartphones, etc.) receiving the one or more communication network relay related transmissions from one or more laptops (e.g. Sony Vaio, etc.), one or more phablets (e.g. Samsung Galaxy, etc.), one or more tablets (e.g. Toshiba tablets, etc.), one or more smartphones (e.g. Verizon smartphones, etc.), one or more notebooks (e.g. Thinkpad notebooks, etc.), one or more handsets (e.g. Google Android handset, etc.), one or more palmtops (e.g. HP next generation palmtop, etc.), one or more personal digital assistants (e.g. Blackberry PDA, etc.), one or more digital audio players (e.g. satellite radio mp3 receivers, etc.), one or more portable media players (e.g. downloading involving direct WiFi, etc.), one or more digital cameras (e.g. communicating cellular network, etc.), or one or more cell phones (e.g. Sprint network, etc.).

In one or more implementations, as shown in FIG. 9D, the operation o1117 can include operation o1119 for receiving the one or more communication network relay related transmissions from one or more electronic communication devices as heterogeneous types including receiving the one or more communication network relay related transmissions as using hybridized protocols including one or more IEEE 802.11ac protocols, one or more IEEE 802.11ad protocols, or one or more IEEE 802.11n/g protocols. Origination of a physically tangible component group can be accomplished through skilled in the art design choice selection including use of one or more components and/or subsystems explicitly and/or implicitly referred to herein for at least in part implementing execution of one or more instructions i1119 of the operation o1119, for performance of the operation o1119 by an electrical circuitry arrangement e1119 as activated thereto, and/or otherwise fulfillment of the operation o1119. One or more non-transitory signal bearing physical media can bear the one or more instructions i1119 that when executed can direct performance of the operation o1119. Furthermore, receiving the communication network relay related transmissions as using hybridized protocols including IEEE 802.11ac protocols, IEEE 802.11ad protocols, or IEEE 802.11n/g protocols module m1119 depicted in FIG. 5B as being included in the module m1117, when executed and/or activated, can direct performance of and/or perform the operation o1119. Illustratively, in one or more implementations, the operation o1119 can be carried out, for example, by receiving the one or more communication network relay related transmissions from one or more electronic communication devices as heterogeneous types (e.g. mixtures of laptops, phablets, smartphones, etc.) receiving the one or more communication network relay related transmissions as using hybridized protocols including one or more IEEE 802.11ac protocols, one or more IEEE 802.11ad protocols, or one or more IEEE 802.11n/g protocols (e.g. IEEE 802 protocols used together by intermediate electronic communication devices, etc.).

In one or more implementations, as shown in FIG. 9E, the operation o1117 can include operation o1120 for receiving the one or more communication network relay related transmissions from one or more electronic communication devices as heterogeneous types including receiving the one or more communication network relay related transmissions as using one or more cellular protocols. Origination of a physically tangible component group can be accomplished through skilled in the art design choice selection including use of one or more components and/or subsystems explicitly and/or implicitly referred to herein for at least in part implementing execution of one or more instructions i1120 of the operation o1120, for performance of the operation o1120 by an electrical circuitry arrangement e1120 as activated thereto, and/or otherwise fulfillment of the operation o1120. One or more non-transitory signal bearing physical media can bear the one or more instructions i1120 that when executed can direct performance of the operation o1120. Furthermore, receiving the communication network relay related transmissions as using cellular protocols module m1120 depicted in FIG. 5C as being included in the module m1117, when executed and/or activated, can direct performance of and/or perform the operation o1120. Illustratively, in one or more implementations, the operation o1120 can be carried out, for example, by receiving the one or more communication network relay related transmissions from one or more electronic communication devices as heterogeneous types (e.g. mixtures of laptops, phablets, smartphones, etc.) receiving the one or more communication network relay related transmissions as using one or more cellular protocols (e.g. IEEE 802 protocols used together by intermediate electronic communication devices, etc.).

In one or more implementations, as shown in FIG. 9E, the operation o1117 can include operation o1121 for receiving the one or more communication network relay related transmissions from one or more electronic communication devices as heterogeneous types including receiving the one or more communication network relay related transmissions as using one or more WiFi protocols, or one or more direct WiFi protocols. Origination of a physically tangible component group can be accomplished through skilled in the art design choice selection including use of one or more components and/or subsystems explicitly and/or implicitly referred to herein for at least in part implementing execution of one or more instructions i1121 of the operation o1121, for performance of the operation o1121 by an electrical circuitry arrangement e1121 as activated thereto, and/or otherwise fulfillment of the operation o1121. One or more non-transitory signal bearing physical media can bear the one or more instructions i1121 that when executed can direct performance of the operation o1121. Furthermore, receiving the communication network relay related transmissions as using WiFi protocols, or direct WiFi protocols module m1121 depicted in FIG. 5C as being included in the module m1117, when executed and/or activated, can direct performance of and/or perform the operation o1121. Illustratively, in one or more implementations, the operation o1121 can be carried out, for example, by receiving the one or more communication network relay related transmissions from one or more electronic communication devices as heterogeneous types (e.g. mixtures of laptops, phablets, smartphones, etc.) receiving the one or more communication network relay related transmissions as using one or more WiFi protocols, or one or more direct WiFi protocols (e.g. IEEE 802 protocols used together by intermediate electronic communication devices, etc.).

In one or more implementations, as shown in FIG. 9E, the operation o1117 can include operation o1122 for receiving the one or more communication network relay related transmissions from one or more electronic communication devices as heterogeneous types including receiving the one or more communication network relay related transmissions as using protocols including one or more 3G protocols, one or more 4G protocols, one or more 5G protocols, one or more 6G or one or more 7G protocols. Origination of a physically tangible component group can be accomplished through skilled in the art design choice selection including use of one or more components and/or subsystems explicitly and/or implicitly referred to herein for at least in part implementing execution of one or more instructions i1122 of the operation o1122, for performance of the operation o1122 by an electrical circuitry arrangement e1122 as activated thereto, and/or otherwise fulfillment of the operation o1122. One or more non-transitory signal bearing physical media can bear the one or more instructions i1122 that when executed can direct performance of the operation o1122. Furthermore, receiving the communication network relay related transmissions as using protocols including 3G protocols, 4G protocols, 5G protocols, 6G or 7G protocols module m1122 depicted in FIG. 5C as being included in the module m1117, when executed and/or activated, can direct performance of and/or perform the operation o1122. Illustratively, in one or more implementations, the operation o1122 can be carried out, for example, by receiving the one or more communication network relay related transmissions from one or more electronic communication devices as heterogeneous types (e.g. mixtures of laptops, phablets, smartphones, etc.) receiving the one or more communication network relay related transmissions as using protocols (e.g. IEEE 802 protocols used together by intermediate electronic communication devices, etc.) including one or more 3G protocols, one or more 4G protocols, one or more 5G protocols, one or more 6G or one or more 7G protocols.

In one or more implementations, as shown in FIG. 9E, the operation o1117 can include operation o1123 for receiving the one or more communication network relay related transmissions from one or more electronic communication devices as heterogeneous types including receiving the one or more communication network relay related transmissions as using protocols including one or more 20 GHz or above protocols, one or more 30 GHz or above protocols, or one or more 60 GHz or above protocols. Origination of a physically tangible component group can be accomplished through skilled in the art design choice selection including use of one or more components and/or subsystems explicitly and/or implicitly referred to herein for at least in part implementing execution of one or more instructions i1123 of the operation o1123, for performance of the operation o1123 by an electrical circuitry arrangement e1123 as activated thereto, and/or otherwise fulfillment of the operation o1123. One or more non-transitory signal bearing physical media can bear the one or more instructions i1123 that when executed can direct performance of the operation o1123. Furthermore, receiving the communication network relay related transmissions as using protocols including 20 GHz or above protocols, 30 GHz or above protocols, or 60 GHz or above protocols module m1123 depicted in FIG. 5C as being included in the module m1117, when executed and/or activated, can direct performance of and/or perform the operation o1123. Illustratively, in one or more implementations, the operation o1123 can be carried out, for example, by receiving the one or more communication network relay related transmissions from one or more electronic communication devices as heterogeneous types (e.g. mixtures of laptops, phablets, smartphones, etc.) receiving the one or more communication network relay related transmissions (e.g. high definition gaming data being shared between multiple high-end performance mobile computers, etc.) as using protocols including one or more 20 GHz or above protocols, one or more 30 GHz or above protocols, or one or more 60 GHz or above protocols (e.g. Samsung advanced protocol sets, etc.).

Figure 9F:
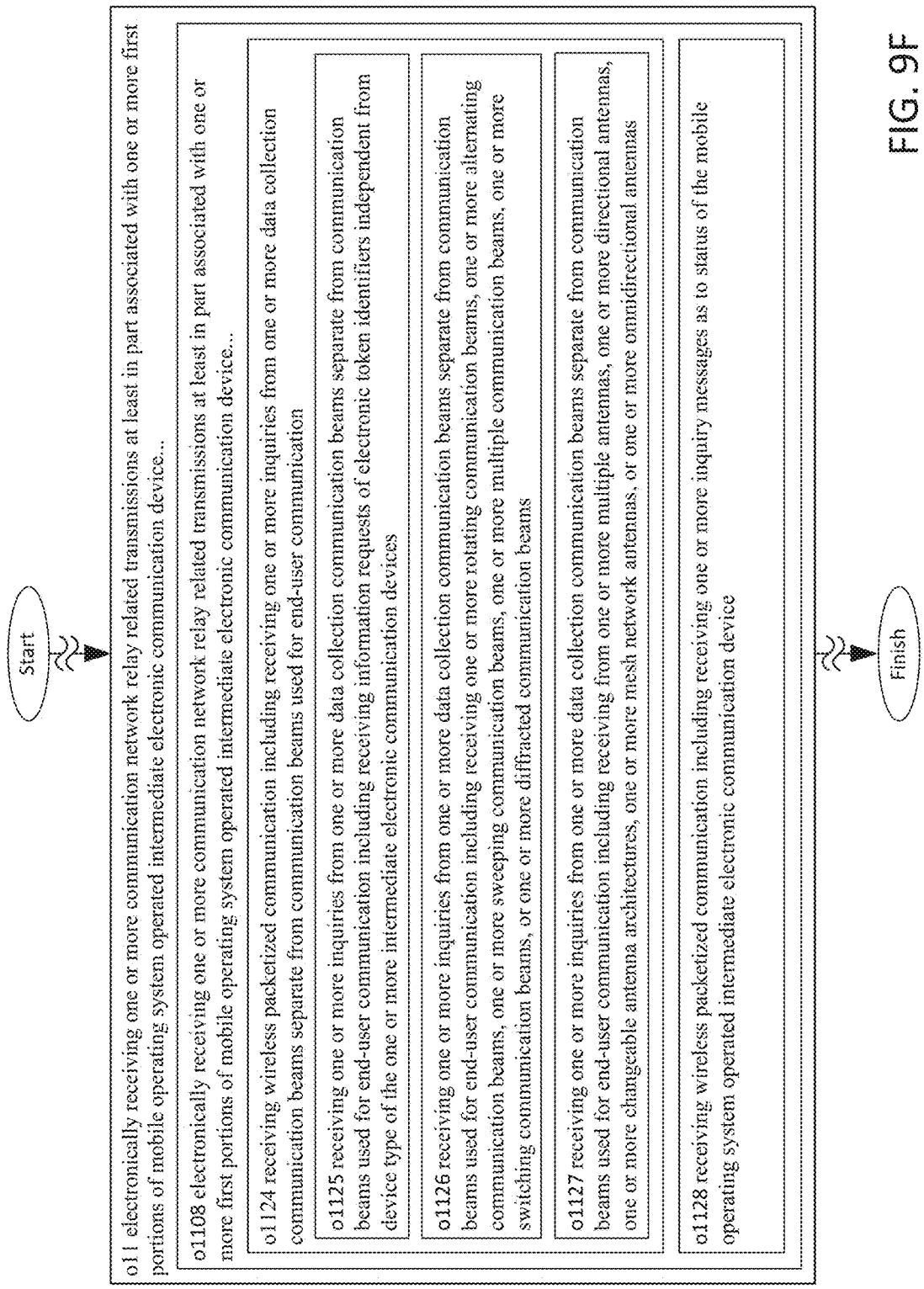

In one or more implementations, as shown in FIG. 9F, the operation o1108 can include operation o1124 for receiving wireless packetized communication including receiving one or more inquiries from one or more data collection communication beams separate from communication beams used for end-user communication. Origination of a physically tangible component group can be accomplished through skilled in the art design choice selection including use of one or more components and/or subsystems explicitly and/or implicitly referred to herein for at least in part implementing execution of one or more instructions i1124 of the operation o1124, for performance of the operation o1124 by an electrical circuitry arrangement e1124 as activated thereto, and/or otherwise fulfillment of the operation o1124. One or more non-transitory signal bearing physical media can bear the one or more instructions i1124 that when executed can direct performance of the operation o1124. Furthermore, receiving inquiries from data collection communication beams separate from communication beams used for end-user communication module m1124 depicted in FIG. 5C as being included in the module m1108, when executed and/or activated, can direct performance of and/or perform the operation o1124. Illustratively, in one or more implementations, the operation o1124 can be carried out, for example, by receiving wireless packetized communication (e.g. IEEE 802.11 packets, cellular packets, etc.) receiving one or more inquiries from one or more data collection communication beams (e.g. multiple beams, sweeping beams, rotating beams, etc.) separate from communication beams used for end-user communication (e.g. on other channel than the data collection communication beam, etc.).

In one or more implementations, as shown in FIG. 9F, the operation o1124 can include operation o1125 for receiving one or more inquiries from one or more data collection communication beams separate from communication beams used for end-user communication including receiving information requests of electronic token identifiers independent from device type of the one or more intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1125 of the operation o1125, for performance of the operation o1125 by an electrical circuitry arrangement e1125 as activated thereto, and/or otherwise fulfillment of the operation o1125. One or more non-transitory signal bearing physical media can bear the one or more instructions i1125 that when executed can direct performance of the operation o1125. Furthermore, receiving information requests of electronic token identifiers independent from device type of the intermediate electronic communication devices module m1125 depicted in FIG. 5C as being included in the module m1124, when executed and/or activated, can direct performance of and/or perform the operation o1125. Illustratively, in one or more implementations, the operation o1125 can be carried out, for example, by receiving one or more inquiries from one or more data collection communication beams (e.g. multiple beams, sweeping beams, rotating beams, etc.) separate from communication beams used for end-user communication (e.g. on other channel than the data collection communication beam, etc.) receiving information requests (e.g. packet communication requests, etc.) of electronic token identifiers (e.g. token identifiers as part of packet header information, etc.) independent from device type (e.g. cell phone versus tablet, etc.) of the one or more intermediate electronic communication devices (e.g. mobile communication devices, etc.).

In one or more implementations, as shown in FIG. 9F, the operation o1124 can include operation o1126 for receiving one or more inquiries from one or more data collection communication beams separate from communication beams used for end-user communication including receiving one or more rotating communication beams, one or more alternating communication beams, one or more sweeping communication beams, one or more multiple communication beams, one or more switching communication beams, or one or more diffracted communication beams. Origination of a physically tangible component group can be accomplished through skilled in the art design choice selection including use of one or more components and/or subsystems explicitly and/or implicitly referred to herein for at least in part implementing execution of one or more instructions i1126 of the operation o1126, for performance of the operation o1126 by an electrical circuitry arrangement e1126 as activated thereto, and/or otherwise fulfillment of the operation o1126. One or more non-transitory signal bearing physical media can bear the one or more instructions i1126 that when executed can direct performance of the operation o1126. Furthermore, receiving rotating communication beams, alternating communication beams, sweeping communication beams, multiple communication beams, switching communication beams, or diffracted communication beams module m1126 depicted in FIG. 5C as being included in the module m1124, when executed and/or activated, can direct performance of and/or perform the operation o1126. Illustratively, in one or more implementations, the operation o1126 can be carried out, for example, by receiving one or more inquiries from one or more data collection communication beams (e.g. multiple beams, sweeping beams, rotating beams, etc.) separate from communication beams used for end-user communication (e.g. on other channel than the data collection communication beam, etc.) receiving one or more rotating communication beams (e.g. involving array antenna, etc.), one or more alternating communication beams (e.g. involving switched antennas, etc.), one or more sweeping communication beams (e.g. involving change of phase, etc.), one or more multiple communication beams (e.g. involving mesh antennas, etc.), one or more switching communication beams (e.g. involving switching antennas, etc.), or one or more diffracted communication beams (e.g. involving diffracted transmission, etc.).

In one or more implementations, as shown in FIG. 9F, the operation o1124 can include operation o1127 for receiving one or more inquiries from one or more data collection communication beams separate from communication beams used for end-user communication including receiving from one or more multiple antennas, one or more directional antennas, one or more changeable antenna architectures, one or more mesh network antennas, or one or more omnidirectional antennas. Origination of a physically tangible component group can be accomplished through skilled in the art design choice selection including use of one or more components and/or subsystems explicitly and/or implicitly referred to herein for at least in part implementing execution of one or more instructions i1127 of the operation o1127, for performance of the operation o1127 by an electrical circuitry arrangement e1127 as activated thereto, and/or otherwise fulfillment of the operation o1127. One or more non-transitory signal bearing physical media can bear the one or more instructions i1127 that when executed can direct performance of the operation o1127. Furthermore, receiving from multiple antennas, directional antennas, changeable antenna architectures, mesh network antennas, or omnidirectional antennas module m1127 depicted in FIG. 5C as being included in the module m1124, when executed and/or activated, can direct performance of and/or perform the operation o1127. Illustratively, in one or more implementations, the operation o1127 can be carried out, for example, by receiving one or more inquiries from one or more data collection communication beams (e.g. multiple beams, sweeping beams, rotating beams, etc.) separate from communication beams used for end-user communication (e.g. on other channel than the data collection communication beam, etc.) receiving from one or more multiple antennas (e.g. located along perimeter of mobile handset, etc.), one or more directional antennas (e.g. incorporated into laptop, etc.), one or more changeable antenna architectures (e.g. as controlled by mobile OS, etc.), one or more mesh network antennas (e.g. to integrate as a mesh network node, etc.), or one or more omnidirectional antennas (e.g. incorporated into smartphone handset, etc.).

In one or more implementations, as shown in FIG. 9F, the operation o1108 can include operation o1128 for receiving wireless packetized communication including receiving one or more inquiry messages as to status of the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1128 of the operation o1128, for performance of the operation o1128 by an electrical circuitry arrangement e1128 as activated thereto, and/or otherwise fulfillment of the operation o1128. One or more non-transitory signal bearing physical media can bear the one or more instructions i1128 that when executed can direct performance of the operation o1128. Furthermore, receiving inquiry messages as to status of the mobile operating system operated intermediate electronic communication device module m1128 depicted in FIG. 5D as being included in the module m1108, when executed and/or activated, can direct performance of and/or perform the operation o1128. Illustratively, in one or more implementations, the operation o1128 can be carried out, for example, by receiving wireless packetized communication (e.g. IEEE 802.11 packets, cellular packets, etc.) receiving one or more inquiry messages as to status (e.g. inquiries regarding performance characteristics and availability, etc.) of the mobile operating system operated intermediate electronic communication device (e.g. wireless digital video camera equipment, etc.).

Figure 9G:
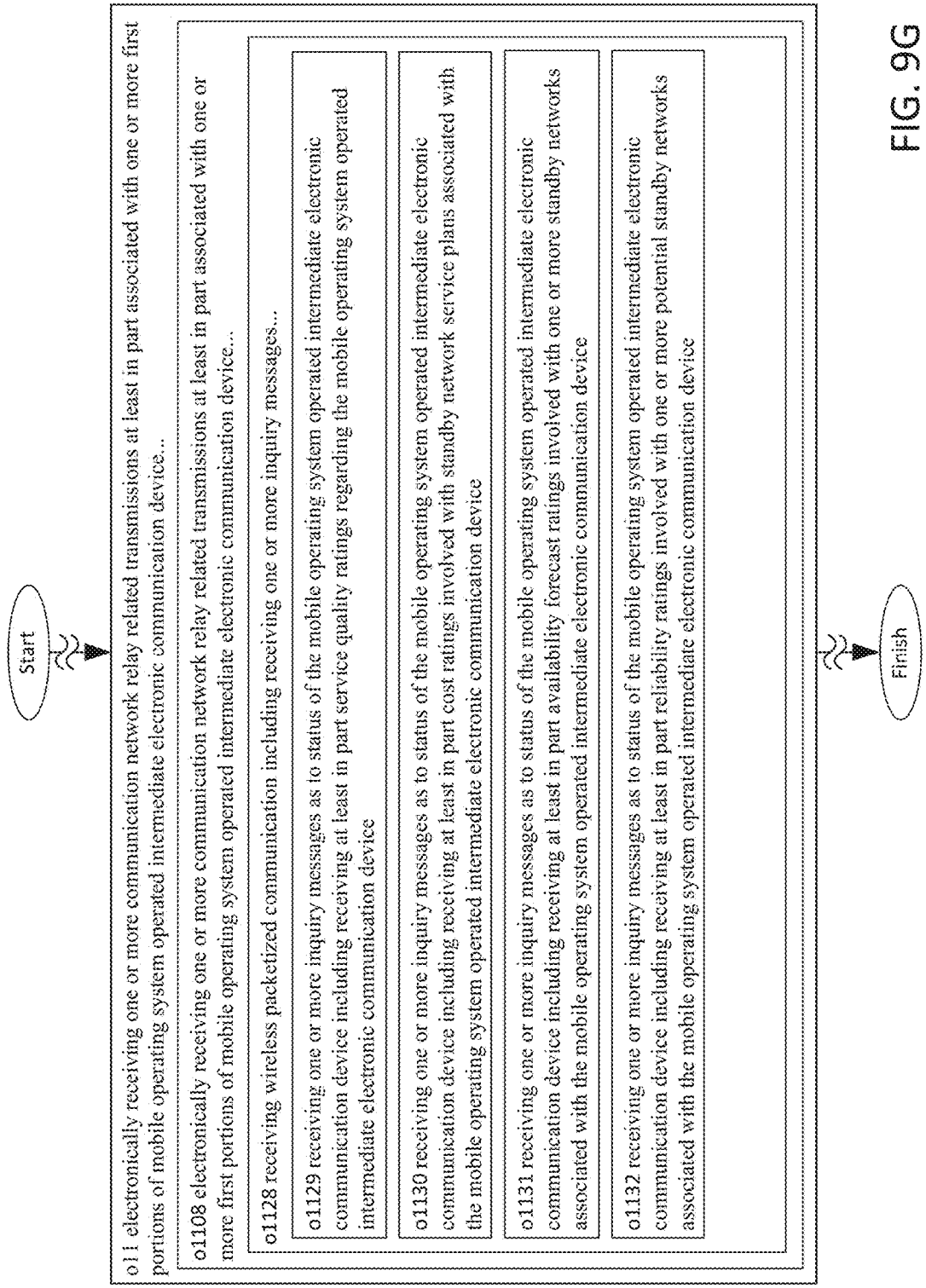

In one or more implementations, as shown in FIG. 9G, the operation o1128 can include operation o1129 for receiving one or more inquiry messages as to status of the mobile operating system operated intermediate electronic communication device including receiving at least in part service quality ratings regarding the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1129 of the operation o1129, for performance of the operation o1129 by an electrical circuitry arrangement e1129 as activated thereto, and/or otherwise fulfillment of the operation o1129. One or more non-transitory signal bearing physical media can bear the one or more instructions i1129 that when executed can direct performance of the operation o1129. Furthermore, receiving service quality ratings regarding the mobile operating system operated intermediate electronic communication device module m1129 depicted in FIG. 5D as being included in the module m1128, when executed and/or activated, can direct performance of and/or perform the operation o1129. Illustratively, in one or more implementations, the operation o1129 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving at least in part service quality ratings (e.g. service quality ratings to take into consideration weighted evaluations of a plurality of aspects that can include communication speed, uptime availability, transmission reliability, etc.) regarding the mobile operating system operated intermediate electronic communication device.

In one or more implementations, as shown in FIG. 9G, the operation o1128 can include operation o1130 for receiving one or more inquiry messages as to status of the mobile operating system operated intermediate electronic communication device including receiving at least in part cost ratings involved with standby network service plans associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1130 of the operation o1130, for performance of the operation o1130 by an electrical circuitry arrangement e1130 as activated thereto, and/or otherwise fulfillment of the operation o1130. One or more non-transitory signal bearing physical media can bear the one or more instructions i1130 that when executed can direct performance of the operation o1130. Furthermore, receiving cost ratings involved with standby network service plans associated with the mobile operating system operated intermediate electronic communication device module m1130 depicted in FIG. 5D as being included in the module m1128, when executed and/or activated, can direct performance of and/or perform the operation o1130. Illustratively, in one or more implementations, the operation o1130 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving at least in part cost ratings involved with standby network service plans (e.g. network credits, cash requirements, rebate coupons needed to pay end-users of the intermediate electronic communication devices for providing such for the standby network service, etc.) associated with the mobile operating system operated intermediate electronic communication device.

In one or more implementations, as shown in FIG. 9G, the operation o1128 can include operation o1131 for receiving one or more inquiry messages as to status of the mobile operating system operated intermediate electronic communication device including receiving at least in part availability forecast ratings involved with one or more standby networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1131 of the operation o1131, for performance of the operation o1131 by an electrical circuitry arrangement e1131 as activated thereto, and/or otherwise fulfillment of the operation o1131. One or more non-transitory signal bearing physical media can bear the one or more instructions i1131 that when executed can direct performance of the operation o1131. Furthermore, receiving availability forecast ratings involved with standby networks associated with the mobile operating system operated intermediate electronic communication device module m1131 depicted in FIG. 5D as being included in the module m1128, when executed and/or activated, can direct performance of and/or perform the operation o1131. Illustratively, in one or more implementations, the operation o1131 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving at least in part availability forecast ratings (e.g. based upon forecasted use by the end-users, planned travel locations in relation to known potential obstructions, etc.) involved with one or more standby networks associated with the mobile operating system operated intermediate electronic communication device.

In one or more implementations, as shown in FIG. 9G, the operation o1128 can include operation o1132 for receiving one or more inquiry messages as to status of the mobile operating system operated intermediate electronic communication device including receiving at least in part reliability ratings involved with one or more potential standby networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1132 of the operation o1132, for performance of the operation o1132 by an electrical circuitry arrangement e1132 as activated thereto, and/or otherwise fulfillment of the operation o1132. One or more non-transitory signal bearing physical media can bear the one or more instructions i1132 that when executed can direct performance of the operation o1132. Furthermore, receiving reliability ratings involved with potential standby networks associated with the mobile operating system operated intermediate electronic communication device module m1132 depicted in FIG. 5D as being included in the module m1128, when executed and/or activated, can direct performance of and/or perform the operation o1132. Illustratively, in one or more implementations, the operation o1132 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving at least in part reliability ratings (e.g. accounts of down time, lack of capacity, etc. of past networks involved with the intermediate electronic communication devices, etc.) involved with one or more potential standby networks associated with the mobile operating system operated intermediate electronic communication device.

In one or more implementations, as shown in FIG. 9H, the operation o1128 can include operation o1133 for receiving one or more inquiry messages as to status of the mobile operating system operated intermediate electronic communication device including receiving at least in part duration of connection ratings involved with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1133 of the operation o1133, for performance of the operation o1133 by an electrical circuitry arrangement e1133 as activated thereto, and/or otherwise fulfillment of the operation o1133. One or more non-transitory signal bearing physical media can bear the one or more instructions i1133 that when executed can direct performance of the operation o1133. Furthermore, receiving inquiry messages as to status of the mobile operating system operated intermediate electronic communication device including receiving duration of connection ratings involved with the mobile operating system operated intermediate electronic communication device module m1133 depicted in FIG. 5D as being included in the module m1128, when executed and/or activated, can direct performance of and/or perform the operation o1133. Illustratively, in one or more implementations, the operation o1133 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving at least in part duration of connection ratings (e.g. percentage of online network time compared with total time attempted to be online associated with general communication activities or particular communication activities as standby network nodes regarding the intermediate electronic communication devices, etc.) involved with the mobile operating system operated intermediate electronic communication device.

In one or more implementations, as shown in FIG. 9H, the operation o1128 can include operation o1134 for receiving one or more inquiry messages as to status of the mobile operating system operated intermediate electronic communication device including receiving at least in part communication bandwidth ratings involved with potential one or more standby communication networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1134 of the operation o1134, for performance of the operation o1134 by an electrical circuitry arrangement e1134 as activated thereto, and/or otherwise fulfillment of the operation o1134. One or more non-transitory signal bearing physical media can bear the one or more instructions i1134 that when executed can direct performance of the operation o1134. Furthermore, receiving inquiry messages as to status of the mobile operating system operated intermediate electronic communication device including receiving communication bandwidth ratings involved with potential standby communication networks associated with the mobile operating system operated intermediate electronic communication device module m1134 depicted in FIG. 5D as being included in the module m1128, when executed and/or activated, can direct performance of and/or perform the operation o1134. Illustratively, in one or more implementations, the operation o1134 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving at least in part communication bandwidth ratings (e.g. communication speed such as in gigabits per second associated with general communication activities or particular communication activities as standby network nodes regarding the intermediate electronic communication devices, etc.) involved with potential one or more standby communication networks associated with the mobile operating system operated intermediate electronic communication device.

In one or more implementations, as shown in FIG. 9H, the operation o1128 can include operation o1135 for receiving one or more inquiry messages as to status of the mobile operating system operated intermediate electronic communication device including receiving at least in part map data related to the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1135 of the operation o1135, for performance of the operation o1135 by an electrical circuitry arrangement e1135 as activated thereto, and/or otherwise fulfillment of the operation o1135. One or more non-transitory signal bearing physical media can bear the one or more instructions i1135 that when executed can direct performance of the operation o1135. Furthermore, receiving inquiry messages as to status of the mobile operating system operated intermediate electronic communication device including receiving map data related to the mobile operating system operated intermediate electronic communication device module m1135 depicted in FIG. 5E as being included in the module m1128, when executed and/or activated, can direct performance of and/or perform the operation o1135. Illustratively, in one or more implementations, the operation o1135 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving at least in part map data related to the mobile operating system operated intermediate electronic communication device (e.g. taking into consideration locations of potential obstructions to point-to-point communication, locations of standby communication and fixed base station networks and historical performance data, etc. map data associated with communication with destination electronic communication devices can be determined, etc.).

In one or more implementations, as shown in FIG. 9H, the operation o1135 can include operation o1136 for receiving at least in part map data related to the mobile operating system operated intermediate electronic communication device including receiving at least in part map data regarding one or more obstructions to communication with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1136 of the operation o1136, for performance of the operation o1136 by an electrical circuitry arrangement e1136 as activated thereto, and/or otherwise fulfillment of the operation o1136. One or more non-transitory signal bearing physical media can bear the one or more instructions i1136 that when executed can direct performance of the operation o1136. Furthermore, receiving map data regarding obstructions to communication with the mobile operating system operated intermediate electronic communication device module m1136 depicted in FIG. 5E as being included in the module m1135, when executed and/or activated, can direct performance of and/or perform the operation o1136. Illustratively, in one or more implementations, the operation o1136 can be carried out, for example, by receiving at least in part map data related to the mobile operating system operated intermediate electronic communication device (e.g. taking into consideration locations of potential obstructions to point-to-point communication, locations of standby communication and fixed base station networks and historical performance data, etc. map data associated with communication with destination electronic communication devices can be determined, etc.) receiving at least in part map data regarding one or more obstructions to communication with the mobile operating system operated intermediate electronic communication device (e.g. taking into consideration locations of historical obstructions to point-to-point communication, locations of standby communication and historical performance data, etc. map data associated with communication obstructions with intermediate electronic communication devices can be determined, etc.).

Figure 9J:
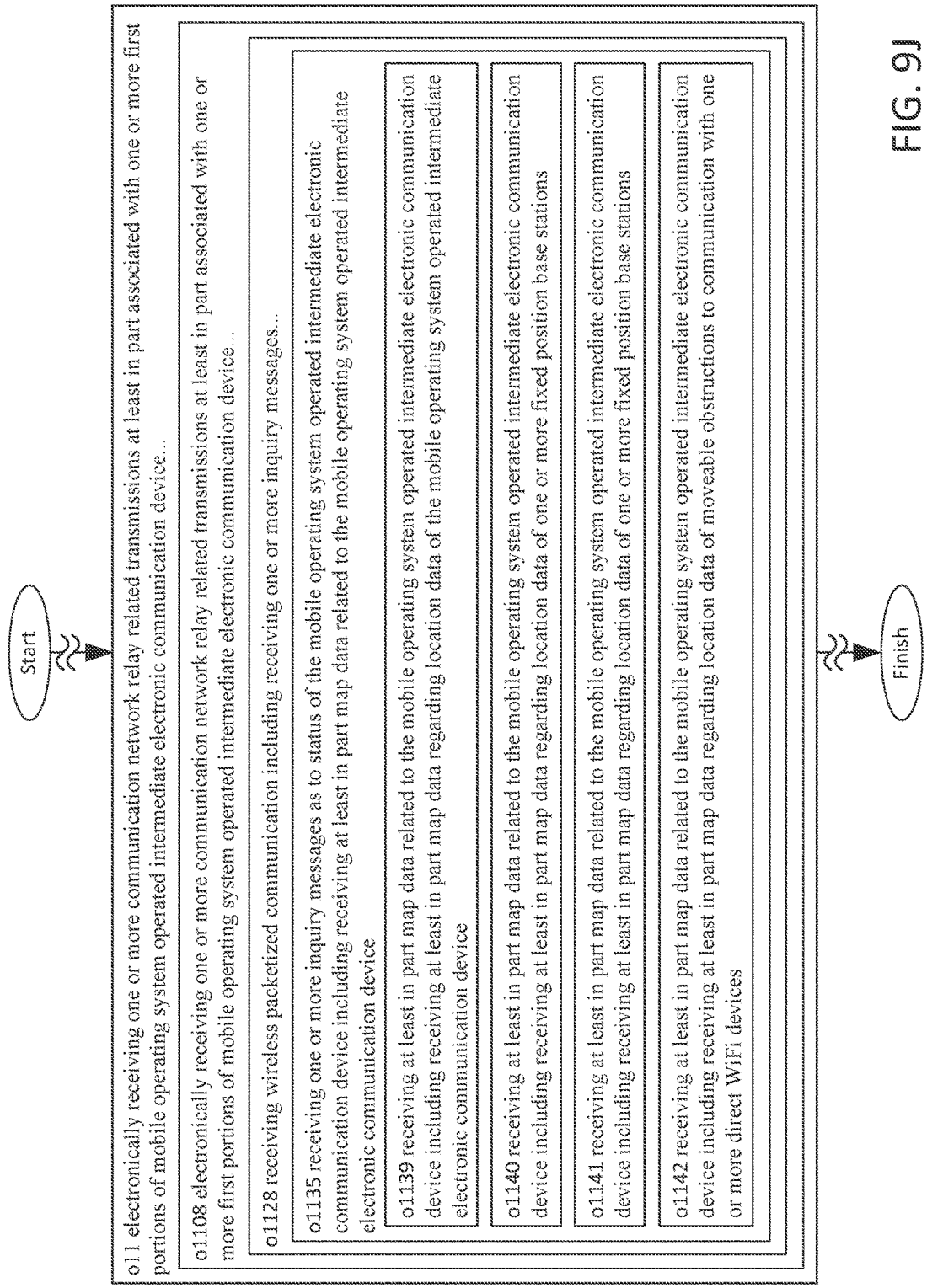

In one or more implementations, as shown in FIG. 9J, the operation o1136 can include operation o1137 for receiving at least in part map data regarding one or more obstructions to communication with the mobile operating system operated intermediate electronic communication device including receiving at least in part map data regarding location data of moveable obstructions to communication with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1137 of the operation o1137, for performance of the operation o1137 by an electrical circuitry arrangement e1137 as activated thereto, and/or otherwise fulfillment of the operation o1137. One or more non-transitory signal bearing physical media can bear the one or more instructions i1137 that when executed can direct performance of the operation o1137. Furthermore, receiving map data regarding location data of moveable obstructions to communication with the mobile operating system operated intermediate electronic communication device module m1137 depicted in FIG. 5E as being included in the module m1136, when executed and/or activated, can direct performance of and/or perform the operation o1137. Illustratively, in one or more implementations, the operation o1137 can be carried out, for example, by receiving at least in part map data regarding one or more obstructions to communication with the mobile operating system operated intermediate electronic communication device (e.g. taking into consideration locations of historical obstructions to point-to-point communication, locations of standby communication and historical performance data, etc. map data associated with communication obstructions with intermediate electronic communication devices can be determined, etc.) receiving at least in part map data regarding location data of moveable obstructions to communication with the mobile operating system operated intermediate electronic communication device (e.g. taking into consideration locations of moveable obstructions to point-to-point communication, locations of standby communication and historical performance data, etc. map data associated with moveable obstructions to communication with intermediate electronic communication devices can be determined, etc.).

In one or more implementations, as shown in FIG. 9J, the operation o1136 can include operation o1138 for receiving at least in part map data regarding one or more obstructions to communication with the mobile operating system operated intermediate electronic communication device including receiving at least in part map data regarding location data of stationary obstructions to communication with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1138 of the operation o1138, for performance of the operation o1138 by an electrical circuitry arrangement e1138 as activated thereto, and/or otherwise fulfillment of the operation o1138. One or more non-transitory signal bearing physical media can bear the one or more instructions i1138 that when executed can direct performance of the operation o1138. Furthermore, receiving map data regarding location data of stationary obstructions to communication with the mobile operating system operated intermediate electronic communication device module m1138 depicted in FIG. 5E as being included in the module m1136, when executed and/or activated, can direct performance of and/or perform the operation o1138. Illustratively, in one or more implementations, the operation o1138 can be carried out, for example, by receiving at least in part map data regarding one or more obstructions to communication with the mobile operating system operated intermediate electronic communication device (e.g. taking into consideration locations of historical obstructions to point-to-point communication, locations of standby communication and historical performance data, etc. map data associated with communication obstructions with intermediate electronic communication devices can be determined, etc.) receiving at least in part map data regarding location data of stationary obstructions to communication with the mobile operating system operated intermediate electronic communication device (e.g. taking into consideration locations of stationary obstructions to point-to-point communication, locations of standby communication and historical performance data, etc. map data associated with stationary obstructions to communication with intermediate electronic communication devices can be determined, etc.).

In one or more implementations, as shown in FIG. 9K, the operation o1135 can include operation o1139 for receiving at least in part map data related to the mobile operating system operated intermediate electronic communication device including receiving at least in part map data regarding location data of the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1139 of the operation o1139, for performance of the operation o1139 by an electrical circuitry arrangement e1139 as activated thereto, and/or otherwise fulfillment of the operation o1139. One or more non-transitory signal bearing physical media can bear the one or more instructions i1139 that when executed can direct performance of the operation o1139. Furthermore, receiving map data regarding location data of the mobile operating system operated intermediate electronic communication device module m1139 depicted in FIG. 5E as being included in the module m1135, when executed and/or activated, can direct performance of and/or perform the operation o1139. Illustratively, in one or more implementations, the operation o1139 can be carried out, for example, by receiving at least in part map data related to the mobile operating system operated intermediate electronic communication device (e.g. taking into consideration locations of potential obstructions to point-to-point communication, locations of standby communication and fixed base station networks and historical performance data, etc. map data associated with communication with destination electronic communication devices can be determined, etc.) receiving at least in part map data regarding location data of the mobile operating system operated intermediate electronic communication device (e.g. taking into consideration locations of obstructions to point-to-point communication, locations of standby communication and historical performance data, etc. map data associated with intermediate electronic communication devices can be determined, etc.).

In one or more implementations, as shown in FIG. 9K, the operation o1135 can include operation o1140 for receiving at least in part map data related to the mobile operating system operated intermediate electronic communication device including receiving at least in part map data regarding location data of one or more fixed position base stations. Origination of a physically tangible component group can be accomplished through skilled in the art design choice selection including use of one or more components and/or subsystems explicitly and/or implicitly referred to herein for at least in part implementing execution of one or more instructions i1140 of the operation o1140, for performance of the operation o1140 by an electrical circuitry arrangement e1140 as activated thereto, and/or otherwise fulfillment of the operation o1140. One or more non-transitory signal bearing physical media can bear the one or more instructions i1140 that when executed can direct performance of the operation o1140. Furthermore, receiving map data regarding location data of fixed position base stations module m1140 depicted in FIG. 5E as being included in the module m1135, when executed and/or activated, can direct performance of and/or perform the operation o1140. Illustratively, in one or more implementations, the operation o1140 can be carried out, for example, by receiving at least in part map data related to the mobile operating system operated intermediate electronic communication device (e.g. taking into consideration locations of potential obstructions to point-to-point communication, locations of standby communication and fixed base station networks and historical performance data, etc. map data associated with communication with destination electronic communication devices can be determined, etc.) receiving at least in part map data regarding location data of one or more fixed position base stations (e.g. taking into consideration locations of obstructions to point-to-point communication, and historical performance data, etc. map data associated with fixed position based stations can be determined, etc.).

In one or more implementations, as shown in FIG. 9K, the operation o1135 can include operation o1141 for receiving at least in part map data related to the mobile operating system operated intermediate electronic communication device including receiving at least in part map data regarding location data of one or more destination electronic communication devices. Origination of a physically tangible component group can be accomplished through skilled in the art design choice selection including use of one or more components and/or subsystems explicitly and/or implicitly referred to herein for at least in part implementing execution of one or more instructions i1141 of the operation o1141, for performance of the operation o1141 by an electrical circuitry arrangement e1141 as activated thereto, and/or otherwise fulfillment of the operation o1141. One or more non-transitory signal bearing physical media can bear the one or more instructions i1141 that when executed can direct performance of the operation o1141. Furthermore, receiving map data regarding location data of destination electronic communication devices module m1141 depicted in FIG. 5E as being included in the module m1135, when executed and/or activated, can direct performance of and/or perform the operation o1141. Illustratively, in one or more implementations, the operation o1141 can be carried out, for example, by receiving at least in part map data related to the mobile operating system operated intermediate electronic communication device (e.g. taking into consideration locations of potential obstructions to point-to-point communication, locations of standby communication and fixed base station networks and historical performance data, etc. map data associated with communication with destination electronic communication devices can be determined, etc.) receiving at least in part map data regarding location data of one or more destination electronic communication devices (e.g. taking into consideration locations of obstructions to point-to-point communication, and historical performance data, etc. map data associated with the destination electronic communication device can be determined, etc.).

In one or more implementations, as shown in FIG. 9K, the operation o1135 can include operation o1142 for receiving at least in part map data related to the mobile operating system operated intermediate electronic communication device including receiving at least in part map data regarding location data of moveable obstructions to communication with one or more direct WiFi devices. Origination of a physically tangible component group can be accomplished through skilled in the art design choice selection including use of one or more components and/or subsystems explicitly and/or implicitly referred to herein for at least in part implementing execution of one or more instructions i1142 of the operation o1142, for performance of the operation o1142 by an electrical circuitry arrangement e1142 as activated thereto, and/or otherwise fulfillment of the operation o1142. One or more non-transitory signal bearing physical media can bear the one or more instructions i1142 that when executed can direct performance of the operation o1142. Furthermore, receiving map data regarding location data of moveable obstructions to communication with direct WiFi devices module m1142 depicted in FIG. 5E as being included in the module m1135, when executed and/or activated, can direct performance of and/or perform the operation o1142. Illustratively, in one or more implementations, the operation o1142 can be carried out, for example, by receiving at least in part map data related to the mobile operating system operated intermediate electronic communication device (e.g. taking into consideration locations of potential obstructions to point-to-point communication, locations of standby communication and fixed base station networks and historical performance data, etc. map data associated with communication with destination electronic communication devices can be determined, etc.) receiving at least in part map data regarding location data of moveable obstructions to communication with one or more direct WiFi devices (e.g. taking into consideration locations of moveable obstructions to point-to-point communication, map data regarding moveable obstructions to communication with WiFi devices can be determined, etc.).

Figure 9L:
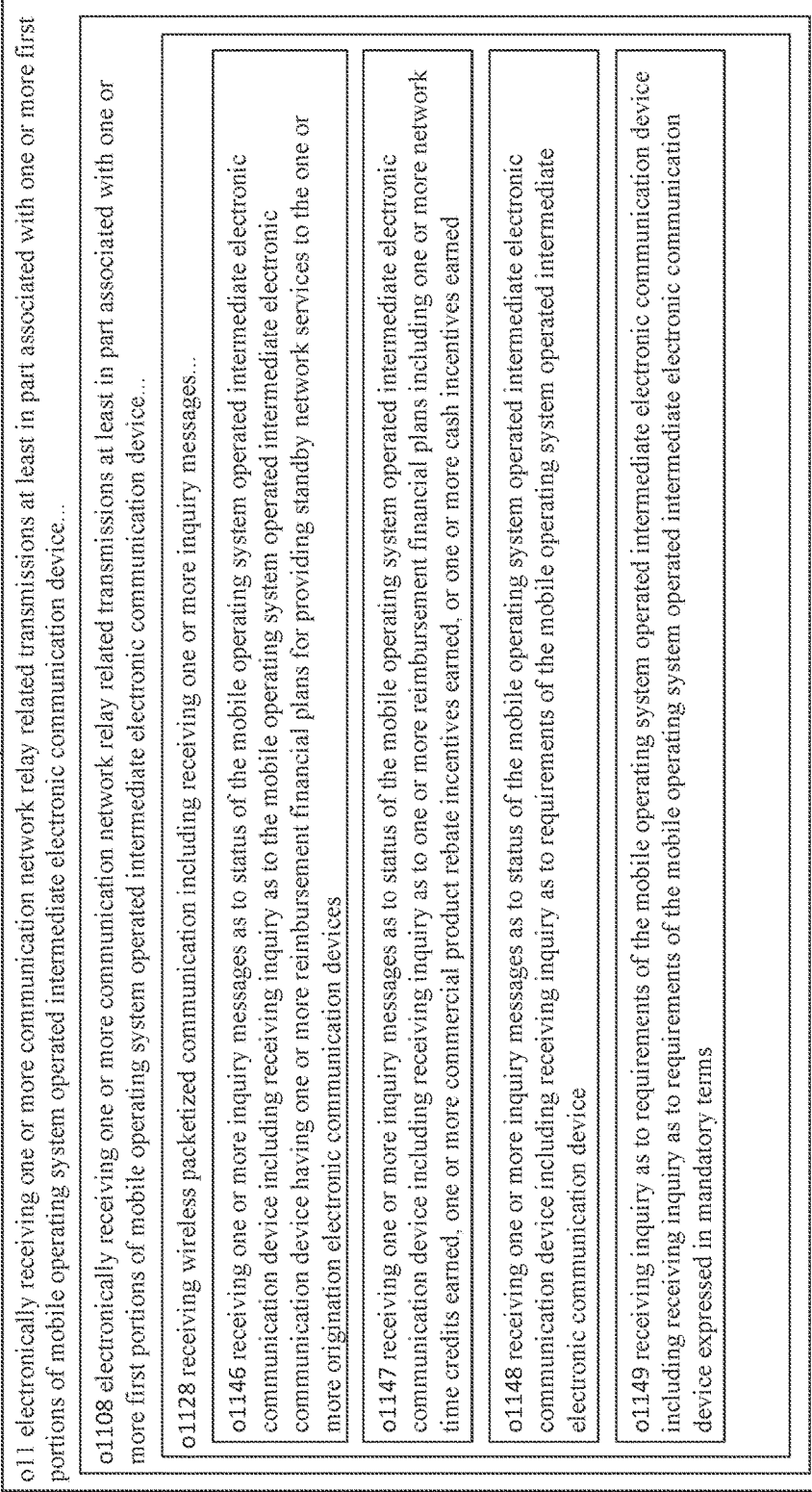

In one or more implementations, as shown in FIG. 9L, the operation o1128 can include operation o1143 for receiving one or more inquiry messages as to status of the mobile operating system operated intermediate electronic communication device including receiving inquiry as to future availability of the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1143 of the operation o1143, for performance of the operation o1143 by an electrical circuitry arrangement e1143 as activated thereto, and/or otherwise fulfillment of the operation o1143. One or more non-transitory signal bearing physical media can bear the one or more instructions i1143 that when executed can direct performance of the operation o1143. Furthermore, receiving inquiry as to future availability of the mobile operating system operated intermediate electronic communication device module m1143 depicted in FIG. 5F as being included in the module m1128, when executed and/or activated, can direct performance of and/or perform the operation o1143. Illustratively, in one or more implementations, the operation o1143 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry (e.g. as electronic data packets, etc.) as to future availability (e.g. times during day that device is able to serve as a network relay node, etc.) of the mobile operating system operated intermediate electronic communication device (e.g. mobile Android communication device, etc.).

In one or more implementations, as shown in FIG. 9L, the operation o1143 can include operation o1144 for receiving inquiry as to future availability of the mobile operating system operated intermediate electronic communication device including receiving inquiry as to itinerary plans for use of the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1144 of the operation o1144, for performance of the operation o1144 by an electrical circuitry arrangement e1144 as activated thereto, and/or otherwise fulfillment of the operation o1144. One or more non-transitory signal bearing physical media can bear the one or more instructions i1144 that when executed can direct performance of the operation o1144. Furthermore, receiving inquiry as to itinerary plans for use of the mobile operating system operated intermediate electronic communication device module m1144 depicted in FIG. 5F as being included in the module m1143, when executed and/or activated, can direct performance of and/or perform the operation o1144. Illustratively, in one or more implementations, the operation o1144 can be carried out, for example, by receiving inquiry (e.g. as electronic data packets, etc.) as to future availability (e.g. times during day that device is able to serve as a network relay node, etc.) of the mobile operating system operated intermediate electronic communication device (e.g. mobile Android communication device, etc.) receiving inquiry as to itinerary plans for use of the mobile operating system operated intermediate electronic communication device.

In one or more implementations, as shown in FIG. 9L, the operation o1128 can include operation o1145 for receiving one or more inquiry messages as to status of the mobile operating system operated intermediate electronic communication device including receiving inquiry as to the mobile operating system operated intermediate electronic communication device satisfying one or more device battery energy level ratings. Origination of a physically tangible component group can be accomplished through skilled in the art design choice selection including use of one or more components and/or subsystems explicitly and/or implicitly referred to herein for at least in part implementing execution of one or more instructions i1145 of the operation o1145, for performance of the operation o1145 by an electrical circuitry arrangement e1145 as activated thereto, and/or otherwise fulfillment of the operation o1145. One or more non-transitory signal bearing physical media can bear the one or more instructions i1145 that when executed can direct performance of the operation o1145. Furthermore, receiving inquiry as to the mobile operating system operated intermediate electronic communication device satisfying device battery energy level ratings module m1145 depicted in FIG. 5F as being included in the module m1128, when executed and/or activated, can direct performance of and/or perform the operation o1145. Illustratively, in one or more implementations, the operation o1145 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry as to the mobile operating system operated intermediate electronic communication device satisfying one or more device battery energy level ratings (e.g. battery energy level to sustain a 20 minute high speed data transfer, etc.).

Figure 9M:
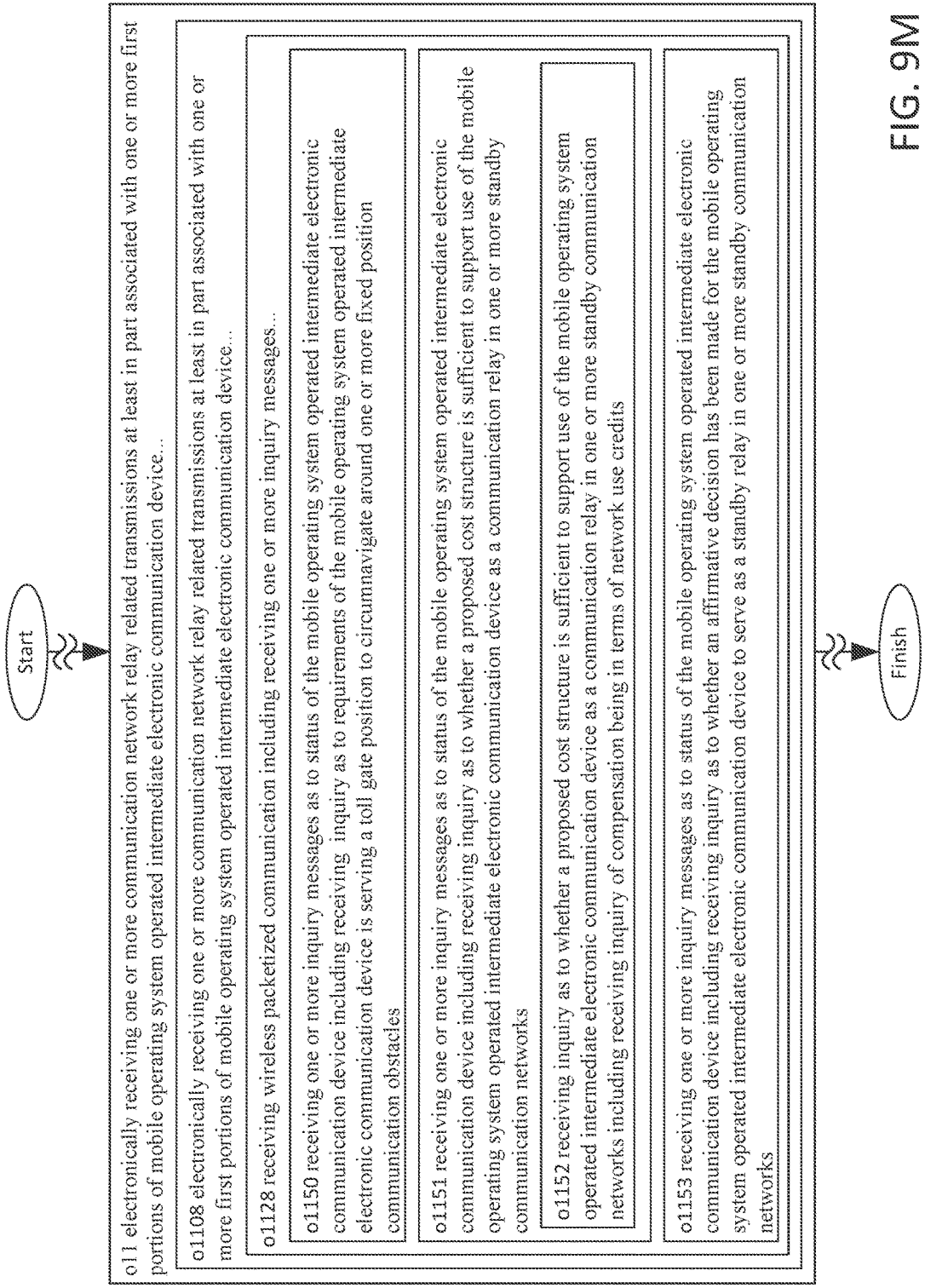

In one or more implementations, as shown in FIG. 9M, the operation o1128 can include operation o1146 for receiving one or more inquiry messages as to status of the mobile operating system operated intermediate electronic communication device including receiving inquiry as to the mobile operating system operated intermediate electronic communication device having one or more reimbursement financial plans for providing standby network services to the one or more origination electronic communication devices. Origination of a physically tangible component group can be accomplished through skilled in the art design choice selection including use of one or more components and/or subsystems explicitly and/or implicitly referred to herein for at least in part implementing execution of one or more instructions i1146 of the operation o1146, for performance of the operation o1146 by an electrical circuitry arrangement e1146 as activated thereto, and/or otherwise fulfillment of the operation o1146. One or more non-transitory signal bearing physical media can bear the one or more instructions i1146 that when executed can direct performance of the operation o1146. Furthermore, receiving inquiry as to the mobile operating system operated intermediate electronic communication device having reimbursement financial plans for providing standby network services to the origination electronic communication devices module m1146 depicted in FIG. 5F as being included in the module m1128, when executed and/or activated, can direct performance of and/or perform the operation o1146. Illustratively, in one or more implementations, the operation o1146 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry as to the mobile operating system operated intermediate electronic communication device having one or more reimbursement financial plans (e.g. plans would compensate owners or users of the intermediate electronic communication devices based upon connection speeds and duration of connections that the intermediate electronic communication devices provide to one or more standby communication networks, etc.) for providing standby network services to the one or more origination electronic communication devices.

In one or more implementations, as shown in FIG. 9M, the operation o1128 can include operation o1147 for receiving one or more inquiry messages as to status of the mobile operating system operated intermediate electronic communication device including receiving inquiry as to one or more reimbursement financial plans including one or more network time credits earned, one or more commercial product rebate incentives earned, or one or more cash incentives earned. Origination of a physically tangible component group can be accomplished through skilled in the art design choice selection including use of one or more components and/or subsystems explicitly and/or implicitly referred to herein for at least in part implementing execution of one or more instructions i1147 of the operation o1147, for performance of the operation o1147 by an electrical circuitry arrangement e1147 as activated thereto, and/or otherwise fulfillment of the operation o1147. One or more non-transitory signal bearing physical media can bear the one or more instructions i1147 that when executed can direct performance of the operation o1147. Furthermore, receiving inquiry as to reimbursement financial plans including network time credits earned, commercial product rebate incentives earned, or cash incentives earned module m1147 depicted in FIG. 5F as being included in the module m1128, when executed and/or activated, can direct performance of and/or perform the operation o1147. Illustratively, in one or more implementations, the operation o1147 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry as to one or more reimbursement financial plans including one or more network time credits earned, one or more commercial product rebate incentives earned, or one or more cash incentives earned (e.g. earnings are tracked and provided by base station network provider to furnish extra capacity or increase reliability of base station network through augmentation services provided by the standby communication network, etc.).

In one or more implementations, as shown in FIG. 9M, the operation o1128 can include operation o1148 for receiving one or more inquiry messages as to status of the mobile operating system operated intermediate electronic communication device including receiving inquiry as to requirements of the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1148 of the operation o1148, for performance of the operation o1148 by an electrical circuitry arrangement e1148 as activated thereto, and/or otherwise fulfillment of the operation o1148. One or more non-transitory signal bearing physical media can bear the one or more instructions i1148 that when executed can direct performance of the operation o1148. Furthermore, receiving inquiry as to requirements of the mobile operating system operated intermediate electronic communication device module m1148 depicted in FIG. 5F as being included in the module m1128, when executed and/or activated, can direct performance of and/or perform the operation o1148. Illustratively, in one or more implementations, the operation o1148 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry (e.g. message packet, etc.) as to requirements (e.g. financial cost structures of using the communication device for standby network relay node, etc.) of the mobile operating system operated intermediate electronic communication device (e.g. LG smartphone, etc.).

In one or more implementations, as shown in FIG. 9M, the operation o1148 can include operation o1149 for receiving inquiry as to requirements of the mobile operating system operated intermediate electronic communication device including receiving inquiry as to requirements of the mobile operating system operated intermediate electronic communication device expressed in mandatory terms. Origination of a physically tangible component group can be accomplished through skilled in the art design choice selection including use of one or more components and/or subsystems explicitly and/or implicitly referred to herein for at least in part implementing execution of one or more instructions i1149 of the operation o1149, for performance of the operation o1149 by an electrical circuitry arrangement e1149 as activated thereto, and/or otherwise fulfillment of the operation o1149. One or more non-transitory signal bearing physical media can bear the one or more instructions i1149 that when executed can direct performance of the operation o1149. Furthermore, receiving inquiry as to requirements of the mobile operating system operated intermediate electronic communication device expressed in mandatory terms module m1149 depicted in FIG. 5F as being included in the module m1148, when executed and/or activated, can direct performance of and/or perform the operation o1149. Illustratively, in one or more implementations, the operation o1149 can be carried out, for example, by receiving inquiry (e.g. message packet, etc.) as to requirements (e.g. financial cost structures of using the communication device for standby network relay node, etc.) of the mobile operating system operated intermediate electronic communication device (e.g. LG smartphone, etc.) receiving inquiry (e.g. wireless multiple beams, etc.) as to requirements (e.g. maximum sustainable bandwidth allowed, etc.) of the mobile operating system operated intermediate electronic communication device (e.g. cell phone, etc.) expressed in mandatory terms (e.g. not to exceed a predetermined data rate threshold, etc.).

Figure 9N:
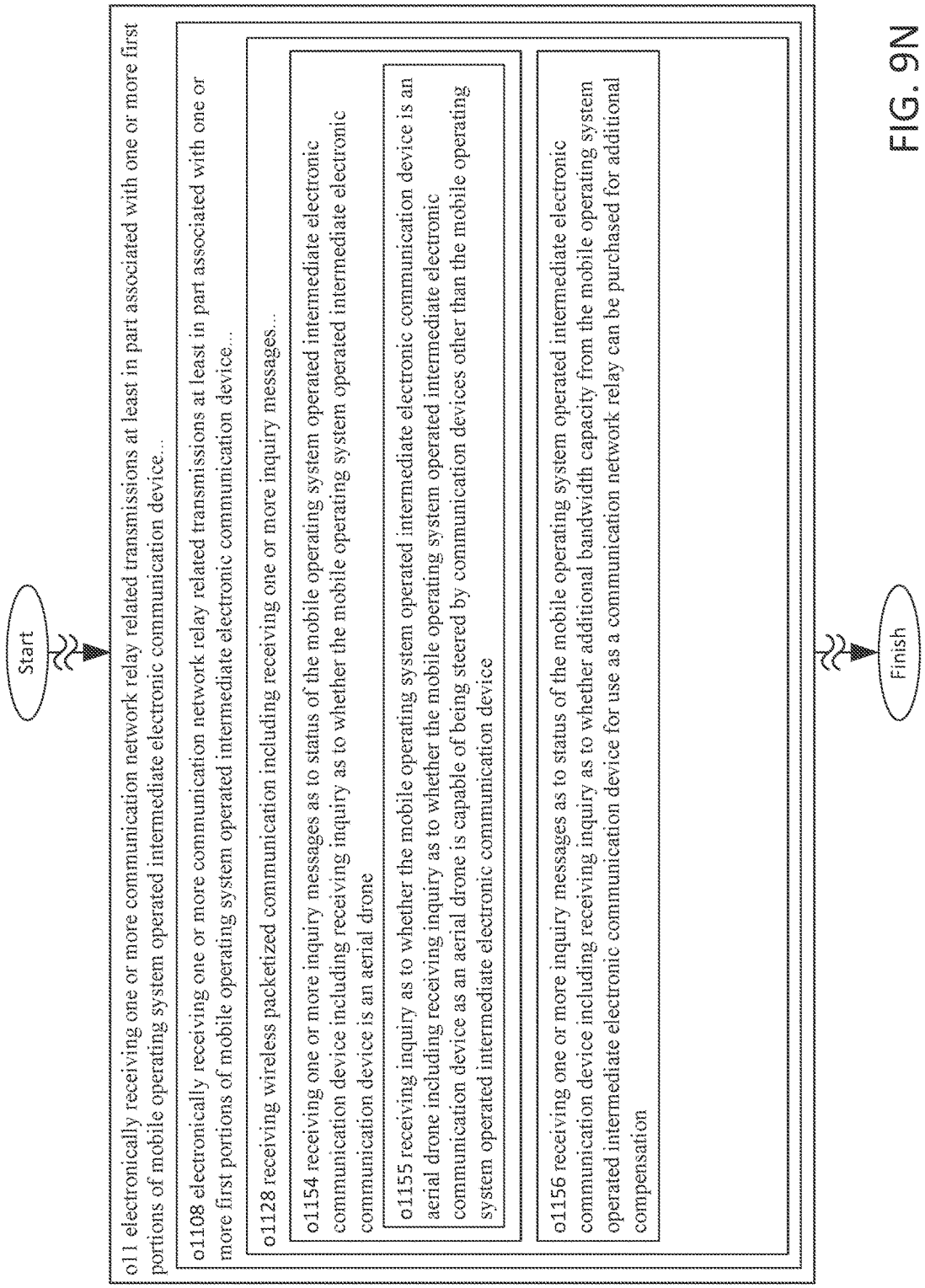
Figure 90:
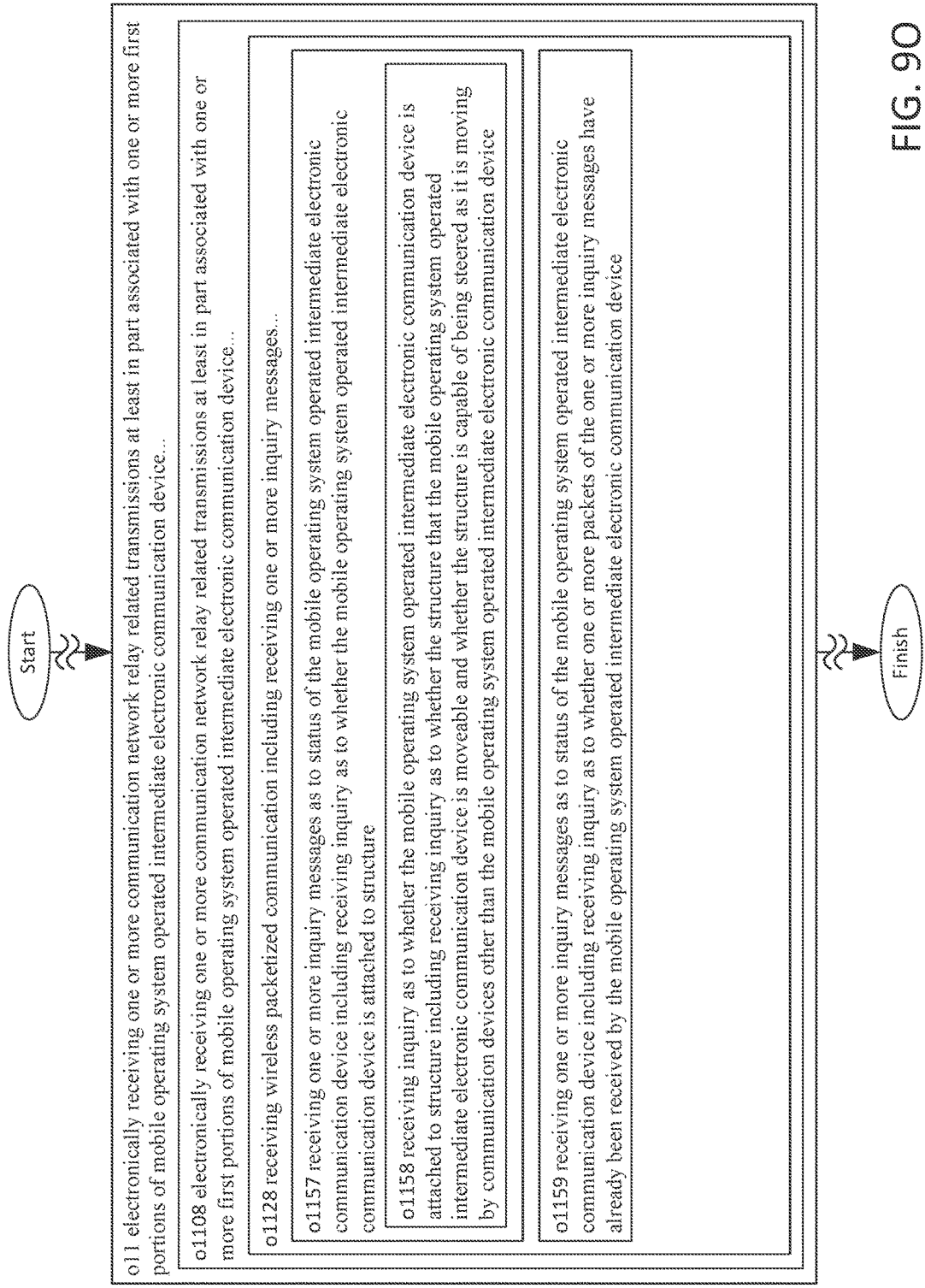

In one or more implementations, as shown in FIG. 9N, the operation o1128 can include operation o1150 for receiving one or more inquiry messages as to status of the mobile operating system operated intermediate electronic communication device including receiving inquiry as to requirements of the mobile operating system operated intermediate electronic communication device is serving a toll gate position to circumnavigate around one or more fixed position communication obstacles. Origination of a physically tangible component group can be accomplished through skilled in the art design choice selection including use of one or more components and/or subsystems explicitly and/or implicitly referred to herein for at least in part implementing execution of one or more instructions i1150 of the operation o1150, for performance of the operation o1150 by an electrical circuitry arrangement e1150 as activated thereto, and/or otherwise fulfillment of the operation o1150. One or more non-transitory signal bearing physical media can bear the one or more instructions i1150 that when executed can direct performance of the operation o1150. Furthermore, receiving inquiry as to requirements of the mobile operating system operated intermediate electronic communication device is serving a toll gate position to circumnavigate around fixed position communication obstacles module m1150 depicted in FIG. 5F as being included in the module m1128, when executed and/or activated, can direct performance of and/or perform the operation o1150. Illustratively, in one or more implementations, the operation o1150 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry (e.g. electronic messaging, etc.) as to requirements (e.g. communication protocol suite available, etc.) of the mobile operating system operated intermediate electronic communication device (e.g. HT smartphone, etc.) is serving a toll gate position (e.g. attached to one side of a building blocking one or more communication pathways and linked with another communication device attached to the other side of the building to allow signals to be effectively by-passed around the building, etc.) to circumnavigate around one or more fixed position communication obstacles (e.g. a skyscraper, etc.).

In one or more implementations, as shown in FIG. 9N, the operation o1128 can include operation o1151 for receiving one or more inquiry messages as to status of the mobile operating system operated intermediate electronic communication device including receiving inquiry as to whether a proposed cost structure is sufficient to support use of the mobile operating system operated intermediate electronic communication device as a communication relay in one or more standby communication networks. Origination of a physically tangible component group can be accomplished through skilled in the art design choice selection including use of one or more components and/or subsystems explicitly and/or implicitly referred to herein for at least in part implementing execution of one or more instructions i1151 of the operation o1151, for performance of the operation o1151 by an electrical circuitry arrangement e1151 as activated thereto, and/or otherwise fulfillment of the operation o1151. One or more non-transitory signal bearing physical media can bear the one or more instructions i1151 that when executed can direct performance of the operation o1151. Furthermore, receiving inquiry as to whether a proposed cost structure is sufficient to support use of the mobile operating system operated intermediate electronic communication device as a communication relay in standby communication networks module m1151 depicted in FIG. 5G as being included in the module m1128, when executed and/or activated, can direct performance of and/or perform the operation o1151. Illustratively, in one or more implementations, the operation o1151 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry (e.g. electronic text messaging, etc.) as to whether a proposed cost structure (e.g. compensation offer from one or more origination electronic communication devices for use of the intermediate electronic communication device as a standby network relay, etc.) is sufficient to support use (e.g. compensation offer meets one or more minimum thresholds set forth by the intermediate electronic communication device for use as a standby network relay node, etc.) the mobile operating system operated intermediate electronic communication device (e.g. Sony Vaio, etc.) as a communication relay (e.g. network repeater, etc.) in one or more standby communication networks (e.g. backup network for supporting base station system when communication to one or more base station has become blocked, etc.).

In one or more implementations, as shown in FIG. 9N, the operation o1151 can include operation o1152 for receiving inquiry as to whether a proposed cost structure is sufficient to support use of the mobile operating system operated intermediate electronic communication device as a communication relay in one or more standby communication networks including receiving inquiry of compensation being in terms of network use credits. Origination of a physically tangible component group can be accomplished through skilled in the art design choice selection including use of one or more components and/or subsystems explicitly and/or implicitly referred to herein for at least in part implementing execution of one or more instructions i1152 of the operation o1152, for performance of the operation o1152 by an electrical circuitry arrangement e1152 as activated thereto, and/or otherwise fulfillment of the operation o1152. One or more non-transitory signal bearing physical media can bear the one or more instructions i1152 that when executed can direct performance of the operation o1152. Furthermore, receiving inquiry of compensation being in terms of network use credits module m1152 depicted in FIG. 5G as being included in the module m1151, when executed and/or activated, can direct performance of and/or perform the operation o1152. Illustratively, in one or more implementations, the operation o1152 can be carried out, for example, by receiving inquiry (e.g. electronic text messaging, etc.) as to whether a proposed cost structure (e.g. compensation offer from one or more origination electronic communication devices for use of the intermediate electronic communication device as a standby network relay, etc.) is sufficient to support use (e.g.

compensation offer meets one or more minimum thresholds set forth by the intermediate electronic communication device for use as a standby network relay node, etc.) the mobile operating system operated intermediate electronic communication device (e.g. Sony Vaio, etc.) as a communication relay (e.g. network repeater, etc.) in one or more standby communication networks (e.g. backup network for supporting base station system when communication to one or more base station has become blocked, etc.) receiving inquiry of compensation being in terms of network use credits (e.g. network minutes for use by intermediate electronic communication device are given in exchange for minutes of use of the intermediate electronic communication device as a standby network relay node, etc.).

In one or more implementations, as shown in FIG. 9N, the operation o1128 can include operation o1153 for receiving one or more inquiry messages as to status of the mobile operating system operated intermediate electronic communication device including receiving inquiry as to whether an affirmative decision has been made for the mobile operating system operated intermediate electronic communication device to serve as a standby relay in one or more standby communication networks. Origination of a physically tangible component group can be accomplished through skilled in the art design choice selection including use of one or more components and/or subsystems explicitly and/or implicitly referred to herein for at least in part implementing execution of one or more instructions i1153 of the operation o1153, for performance of the operation o1153 by an electrical circuitry arrangement e1153 as activated thereto, and/or otherwise fulfillment of the operation o1153. One or more non-transitory signal bearing physical media can bear the one or more instructions i1153 that when executed can direct performance of the operation o1153. Furthermore, receiving inquiry as to whether an affirmative decision has been made for the mobile operating system operated intermediate electronic communication device to serve as a standby relay in standby communication networks module m1153 depicted in FIG. 5G as being included in the module m1128, when executed and/or activated, can direct performance of and/or perform the operation o1153. Illustratively, in one or more implementations, the operation o1153 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry as to whether an affirmative decision has been made for the mobile operating system operated intermediate electronic communication device to serve as a standby relay in one or more standby communication networks (e.g. offer made by the intermediate electronic communication device to serve as a standby network relay node for a specified amount of compensation is acknowledged through a status message received intermediate electronic communication device that the offer has been accepted either by an origination electronic communication device or by a base station based communication network administration office, etc.).

In one or more implementations, as shown in FIG. 9P, the operation o1128 can include operation o1154 for receiving one or more inquiry messages as to status of the mobile operating system operated intermediate electronic communication device including receiving inquiry as to whether the mobile operating system operated intermediate electronic communication device is an aerial drone. Origination of a physically tangible component group can be accomplished through skilled in the art design choice selection including use of one or more components and/or subsystems explicitly and/or implicitly referred to herein for at least in part implementing execution of one or more instructions i1154 of the operation o1154, for performance of the operation o1154 by an electrical circuitry arrangement e1154 as activated thereto, and/or otherwise fulfillment of the operation o1154. One or more non-transitory signal bearing physical media can bear the one or more instructions i1154 that when executed can direct performance of the operation o1154. Furthermore, receiving inquiry as to whether the mobile operating system operated intermediate electronic communication device is an aerial drone module m1154 depicted in FIG. 5G as being included in the module m1128, when executed and/or activated, can direct performance of and/or perform the operation o1154. Illustratively, in one or more implementations, the operation o1154 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry as to whether the mobile operating system operated intermediate electronic communication device is an aerial drone (e.g. receiving inquiry seeking to confirm that the intermediate communication device is attached to an aerial drone capable of being flown through the air, etc.).

In one or more implementations, as shown in FIG. 9P, the operation o1154 can include operation o1155 for receiving inquiry as to whether the mobile operating system operated intermediate electronic communication device is an aerial drone including receiving inquiry as to whether the mobile operating system operated intermediate electronic communication device as an aerial drone is capable of being steered by communication devices other than the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1155 of the operation o1155, for performance of the operation o1155 by an electrical circuitry arrangement e1155 as activated thereto, and/or otherwise fulfillment of the operation o1155. One or more non-transitory signal bearing physical media can bear the one or more instructions i1155 that when executed can direct performance of the operation o1155. Furthermore, receiving inquiry as to whether the mobile operating system operated intermediate electronic communication device as an aerial drone is capable of being steered by communication devices other than the mobile operating system operated intermediate electronic communication device module m1155 depicted in FIG. 5G as being included in the module m1154, when executed and/or activated, can direct performance of and/or perform the operation o1155. Illustratively, in one or more implementations, the operation o1155 can be carried out, for example, by receiving inquiry as to whether the mobile operating system operated intermediate electronic communication device is an aerial drone (e.g. receiving inquiry seeking to confirm that the intermediate communication device is attached to an aerial drone capable of being flown through the air, etc.) receiving inquiry as to whether the mobile operating system operated intermediate electronic communication device as an aerial drone is capable of being steered by communication devices other than the mobile operating system operated intermediate electronic communication device (e.g. receiving inquiry seeking to confirm that an origination electronic communication device can control positioning of the intermediate communication device by remotely piloting an aerial drone in which the intermediate communication device is attached thereto, etc.).

In one or more implementations, as shown in FIG. 9P, the operation o1128 can include operation o1156 for receiving one or more inquiry messages as to status of the mobile operating system operated intermediate electronic communication device including receiving inquiry as to whether additional bandwidth capacity from the mobile operating system operated intermediate electronic communication device for use as a communication network relay can be purchased for additional compensation. Origination of a physically tangible component group can be accomplished through skilled in the art design choice selection including use of one or more components and/or subsystems explicitly and/or implicitly referred to herein for at least in part implementing execution of one or more instructions i1156 of the operation o1156, for performance of the operation o1156 by an electrical circuitry arrangement e1156 as activated thereto, and/or otherwise fulfillment of the operation o1156. One or more non-transitory signal bearing physical media can bear the one or more instructions i1156 that when executed can direct performance of the operation o1156. Furthermore, receiving inquiry as to whether additional bandwidth capacity from the mobile operating system operated intermediate electronic communication device for use as a communication network relay can be purchased for additional compensation module m1156 depicted in FIG. 5G as being included in the module m1128, when executed and/or activated, can direct performance of and/or perform the operation o1156. Illustratively, in one or more implementations, the operation o1156 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry as to whether additional bandwidth capacity (e.g. such as in gigabit per second data transfer, etc.) from the mobile operating system operated intermediate electronic communication device (Samsung Android smartphone, etc.) for use as a communication network relay (e.g. network repeater, etc.) can be purchased for additional compensation (e.g. additional free minutes of network use, cash rebates, or product or service upgrades, etc.).

In one or more implementations, as shown in FIG. 9Q, the operation o1128 can include operation o1157 for receiving one or more inquiry messages as to status of the mobile operating system operated intermediate electronic communication device including receiving inquiry as to whether the mobile operating system operated intermediate electronic communication device is attached to structure. Origination of a physically tangible component group can be accomplished through skilled in the art design choice selection including use of one or more components and/or subsystems explicitly and/or implicitly referred to herein for at least in part implementing execution of one or more instructions i1157 of the operation o1157, for performance of the operation o1157 by an electrical circuitry arrangement e1157 as activated thereto, and/or otherwise fulfillment of the operation o1157. One or more non-transitory signal bearing physical media can bear the one or more instructions i1157 that when executed can direct performance of the operation o1157. Furthermore, receiving inquiry as to whether the mobile operating system operated intermediate electronic communication device is attached to structure module m1157 depicted in FIG. 5G as being included in the module m1128, when executed and/or activated, can direct performance of and/or perform the operation o1157. Illustratively, in one or more implementations, the operation o1157 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry as to whether the mobile operating system operated intermediate electronic communication device is attached to structure (e.g. inquiry as to whether attachment is to a known communication obstacle such as a large wall or geographic monument known to cause problems in communication with base stations, etc.).

In one or more implementations, as shown in FIG. 9Q, the operation o1157 can include operation o1158 for receiving inquiry as to whether the mobile operating system operated intermediate electronic communication device is attached to structure including receiving inquiry as to whether the structure that the mobile operating system operated intermediate electronic communication device is moveable and whether the structure is capable of being steered as it is moving by communication devices other than the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1158 of the operation o1158, for performance of the operation o1158 by an electrical circuitry arrangement e1158 as activated thereto, and/or otherwise fulfillment of the operation o1158. One or more non-transitory signal bearing physical media can bear the one or more instructions i1158 that when executed can direct performance of the operation o1158. Furthermore, receiving inquiry as to whether the structure that the mobile operating system operated intermediate electronic communication device is moveable and whether the structure is capable of being steered as it is moving by communication devices other than the mobile operating system operated intermediate electronic communication device module m1158 depicted in FIG. 5G as being included in the module m1157, when executed and/or activated, can direct performance of and/or perform the operation o1158. Illustratively, in one or more implementations, the operation o1158 can be carried out, for example, by receiving inquiry as to whether the mobile operating system operated intermediate electronic communication device is attached to structure (e.g. inquiry as to whether attachment is to a known communication obstacle such as a large wall or geographic monument known to cause problems in communication with base stations, etc.) receiving inquiry (e.g. packetized network traffic, etc.) as to whether the structure that the mobile operating system operated intermediate electronic communication device is moveable (e.g. such as a bus or an aerial drone, etc.) and whether the structure is capable of being steered (e.g. such as remotely steered, etc.) as it is moving (e.g. moving by the bus or aerial drone moving, etc.) by communication devices (e.g. remote control or bus driver, etc.) other than the mobile operating system operated intermediate electronic communication device (e.g. such as a cell phone, etc.).

In one or more implementations, as shown in FIG. 9Q, the operation o1128 can include operation o1159 for receiving one or more inquiry messages as to status of the mobile operating system operated intermediate electronic communication device including receiving inquiry as to whether one or more packets of the one or more inquiry messages have already been received by the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1159 of the operation o1159, for performance of the operation o1159 by an electrical circuitry arrangement e1159 as activated thereto, and/or otherwise fulfillment of the operation o1159. One or more non-transitory signal bearing physical media can bear the one or more instructions i1159 that when executed can direct performance of the operation o1159. Furthermore, receiving inquiry as to whether packets of the inquiry messages have already been received by the mobile operating system operated intermediate electronic communication device module m1159 depicted in FIG. 5G as being included in the module m1128, when executed and/or activated, can direct performance of and/or perform the operation o1159. Illustratively, in one or more implementations, the operation o1159 can be carried out, for example, by receiving one or more inquiry messages as to status (e.g. inquiries regarding performance characteristics and availability, etc.) of the mobile operating system operated intermediate electronic communication device (e.g. wireless digital video camera equipment, etc.) receiving inquiry (e.g. through flags or time stamps set in packet headers, etc.) as to whether one or more packets of the one or more inquiry messages have already been received by the mobile operating system operated intermediate electronic communication device (e.g. in order to reduce occurrence of recurrent loops in a standby communication network, etc.).

Figure 10A:
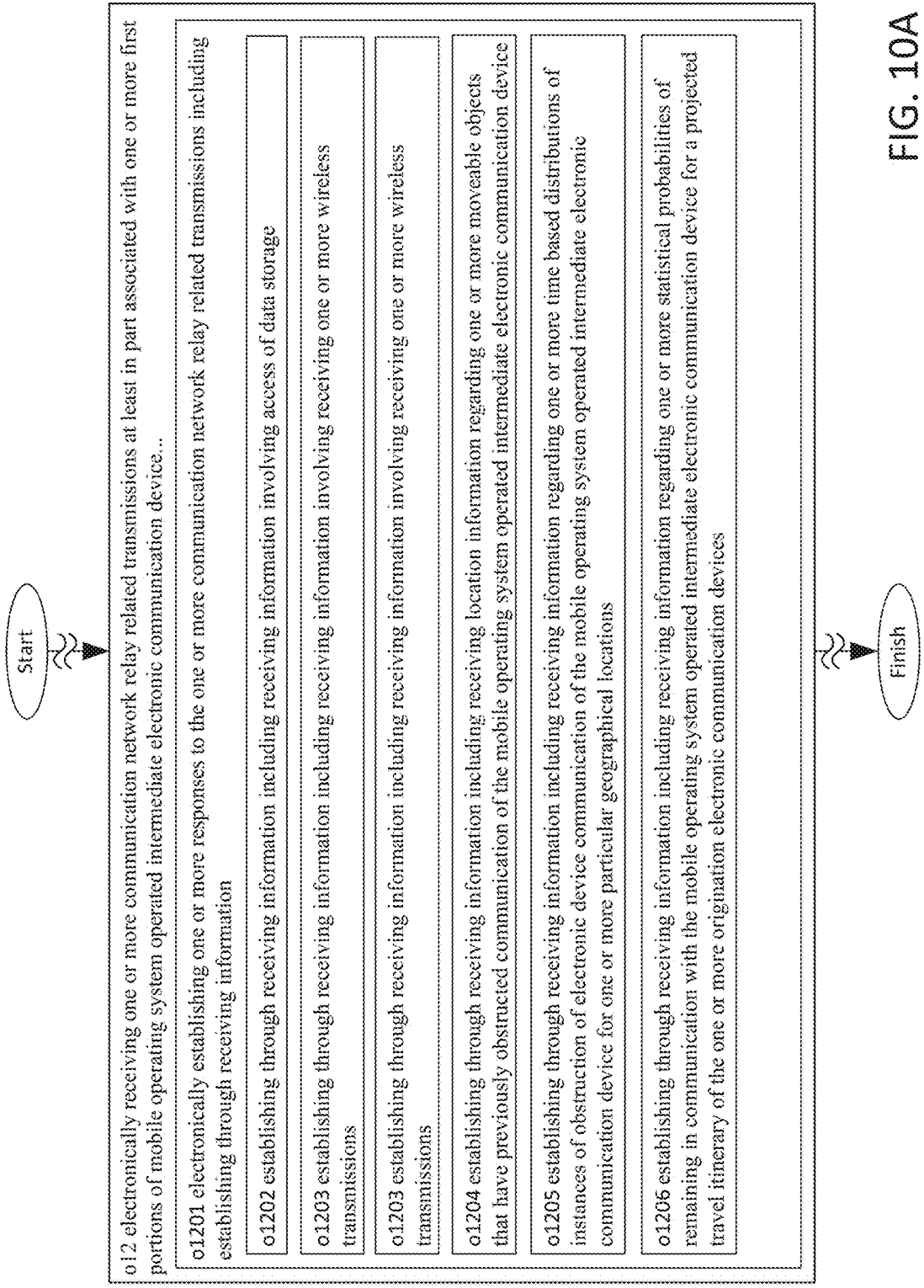

In one or more implementations, as shown in FIG. 10A, the operation o12 can include operation o1201 for electronically establishing one or more responses to the one or more communication network relay related transmissions including establishing through receiving information. Origination of a physically tangible component group can be accomplished through skilled in the art design choice selection including use of one or more components and/or subsystems explicitly and/or implicitly referred to herein for at least in part implementing execution of one or more instructions i1201 of the operation o1201, for performance of the operation o1201 by an electrical circuitry arrangement e1201 as activated thereto, and/or otherwise fulfillment of the operation o1201. One or more non-transitory signal bearing physical media can bear the one or more instructions i1201 that when executed can direct performance of the operation o1201. Furthermore, establishing through receiving information module m1201 depicted in FIG. 6A as being included in the module m12, when executed and/or activated, can direct performance of and/or perform the operation o1201. Illustratively, in one or more implementations, the operation o1201 can be carried out, for example, by electronically establishing (e.g. determining, calculating, concluding based upon analysis, etc.) one or more responses (e.g. one or more reply transmissions sent back to the communication device that transmitted the received one or more transmissions, relaying the one or more received transmissions on to a third communication device as part of serving as a standby communication network relay node, etc.) to the one or more communication network relay related transmissions (e.g. sweeping beam serving as probe for potential relays, high bandwidth communication beam, etc.) at least in part associated with one or more first portions of mobile operating system operated intermediate electronic communication device functionality (e.g. first portion functions other than second portion functions (second portion functions can be typically used with mobile communication devices such as placing calls, etc.), such first portion functions can be used in serving as a standby network relay to assist with network traffic flow when one or more standard base stations become blocked to communication traffic, first portion functions can be provided by mobile OS and/or by firmware or other hardware associated with the communication device, etc.) related at least in part to communication network relay functionality of the mobile operating system operated intermediate electronic communication device as one or more standby communication network relays (e.g. relaying transmissions to another mobile or other communication device such as a base station, etc.) establishing (e.g. determining, concluding, calculating, comparing, etc.) through receiving information (e.g. receiving through network packet traffic, etc.).

In one or more implementations, as shown in FIG. 10A, the operation o1201 can include operation o1202 for establishing through receiving information including receiving information involving access of data storage. Origination of a physically tangible component group can be accomplished through skilled in the art design choice selection including use of one or more components and/or subsystems explicitly and/or implicitly referred to herein for at least in part implementing execution of one or more instructions i1202 of the operation o1202, for performance of the operation o1202 by an electrical circuitry arrangement e1202 as activated thereto, and/or otherwise fulfillment of the operation o1202. One or more non-transitory signal bearing physical media can bear the one or more instructions i1202 that when executed can direct performance of the operation o1202. Furthermore, receiving information involving access of data storage module m1202 depicted in FIG. 6A as being included in the module m1201, when executed and/or activated, can direct performance of and/or perform the operation o1202. Illustratively, in one or more implementations, the operation o1202 can be carried out, for example, by establishing (e.g. determining, concluding, calculating, comparing, etc.) through receiving information (e.g. receiving through network packet traffic, etc.) receiving information (e.g. such as status information, etc.) involving access of data storage (e.g. such as memory or hard drive access calls, etc.).

In one or more implementations, as shown in FIG. 10A, the operation o1201 can include operation o1203 for establishing through receiving information including receiving information involving receiving one or more wireless transmissions. Origination of a physically tangible component group can be accomplished through skilled in the art design choice selection including use of one or more components and/or subsystems explicitly and/or implicitly referred to herein for at least in part implementing execution of one or more instructions i1203 of the operation o1203, for performance of the operation o1203 by an electrical circuitry arrangement e1203 as activated thereto, and/or otherwise fulfillment of the operation o1203. One or more non-transitory signal bearing physical media can bear the one or more instructions i1203 that when executed can direct performance of the operation o1203. Furthermore, receiving information involving receiving wireless transmissions module m1203 depicted in FIG. 6A as being included in the module m1201, when executed and/or activated, can direct performance of and/or perform the operation o1203. Illustratively, in one or more implementations, the operation o1203 can be carried out, for example, by establishing (e.g. determining, concluding, calculating, comparing, etc.) through receiving information (e.g. receiving through network packet traffic, etc.) receiving information involving receiving one or more wireless transmissions (e.g. cellular transmissions, etc.).

In one or more implementations, as shown in FIG. 10A, the operation o1201 can include operation o1204 for establishing through receiving information including receiving location information regarding one or more moveable objects that have previously obstructed communication of the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1204 of the operation o1204, for performance of the operation o1204 by an electrical circuitry arrangement e1204 as activated thereto, and/or otherwise fulfillment of the operation o1204. One or more non-transitory signal bearing physical media can bear the one or more instructions i1204 that when executed can direct performance of the operation o1204. Furthermore, receiving location information regarding moveable objects that have previously obstructed communication of the mobile operating system operated intermediate electronic communication device module m1204 depicted in FIG. 6A as being included in the module m1201, when executed and/or activated, can direct performance of and/or perform the operation o1204. Illustratively, in one or more implementations, the operation o1204 can be carried out, for example, by establishing (e.g. determining, concluding, calculating, comparing, etc.) through receiving information (e.g. receiving through network packet traffic, etc.) receiving location information (e.g. relative geographical coordinates, etc.) regarding one or more moveable objects (e.g. industrial construction equipment, etc.) that have previously obstructed communication (e.g. less than a day of obstruction, etc.) of the mobile operating system operated intermediate electronic communication device (e.g. iPad, etc.).

In one or more implementations, as shown in FIG. 10A, the operation o1201 can include operation o1205 for establishing through receiving information including receiving information regarding one or more time based distributions of instances of obstruction of electronic device communication of the mobile operating system operated intermediate electronic communication device for one or more particular geographical locations. Origination of a physically tangible component group can be accomplished through skilled in the art design choice selection including use of one or more components and/or subsystems explicitly and/or implicitly referred to herein for at least in part implementing execution of one or more instructions i1205 of the operation o1205, for performance of the operation o1205 by an electrical circuitry arrangement e1205 as activated thereto, and/or otherwise fulfillment of the operation o1205. One or more non-transitory signal bearing physical media can bear the one or more instructions i1205 that when executed can direct performance of the operation o1205. Furthermore, receiving information regarding time based distributions of instances of obstruction of electronic device communication of the mobile operating system operated intermediate electronic communication device for particular geographical locations module m1205 depicted in FIG. 6A as being included in the module m1201, when executed and/or activated, can direct performance of and/or perform the operation o1205. Illustratively, in one or more implementations, the operation o1205 can be carried out, for example, by establishing (e.g. determining, concluding, calculating, comparing, etc.) through receiving information (e.g. receiving through network packet traffic, etc.) receiving information (e.g. data calculation, electronic signal reception, etc.) regarding one or more time based distributions of instances of obstruction (e.g. frequency occurrences regarding days of week, holidays, seasonal events, months of year, institutional calendars, etc.) of electronic device communication (e.g. cellular, mesh network, etc.) of the mobile operating system operated intermediate electronic communication device (e.g. portable computers, etc.) for one or more particular geographical locations (e.g. cities, parks, downtowns, buildings, etc.).

In one or more implementations, as shown in FIG. 10A, the operation o1201 can include operation o1206 for establishing through receiving information including receiving information regarding one or more statistical probabilities of remaining in communication with the mobile operating system operated intermediate electronic communication device for a projected travel itinerary of the one or more origination electronic communication devices. Origination of a physically tangible component group can be accomplished through skilled in the art design choice selection including use of one or more components and/or subsystems explicitly and/or implicitly referred to herein for at least in part implementing execution of one or more instructions i1206 of the operation o1206, for performance of the operation o1206 by an electrical circuitry arrangement e1206 as activated thereto, and/or otherwise fulfillment of the operation o1206. One or more non-transitory signal bearing physical media can bear the one or more instructions i1206 that when executed can direct performance of the operation o1206. Furthermore, receiving information regarding statistical probabilities of remaining in communication with the mobile operating system operated intermediate electronic communication device for a projected travel itinerary of the origination electronic communication devices module m1206 depicted in FIG. 6A as being included in the module m1201, when executed and/or activated, can direct performance of and/or perform the operation o1206. Illustratively, in one or more implementations, the operation o1206 can be carried out, for example, by establishing (e.g. determining, concluding, calculating, comparing, etc.) through receiving information (e.g. receiving through network packet traffic, etc.) receiving information regarding one or more statistical probabilities (e.g. Gaussian distribution, manual surveys, user surveys, automated surveys, etc.) of remaining in communication (e.g. call not dropped, data transmission complete, no delays in transmission, etc.) with the mobile operating system operated intermediate electronic communication device (e.g. handset, etc.) for a projected travel itinerary (e.g. several stops through city, bus routes, commuter lanes, downtown pedestrian route, etc.) of the one or more origination electronic communication devices (e.g. iPhone, etc.).

In one or more implementations, as shown in FIG. 10B, the operation o1201 can include operation o1207 for establishing through receiving information including receiving GPS positioning data regarding the mobile operating system operated intermediate electronic communication devices. Origination of a physically tangible component group can be accomplished through skilled in the art design choice selection including use of one or more components and/or subsystems explicitly and/or implicitly referred to herein for at least in part implementing execution of one or more instructions i1207 of the operation o1207, for performance of the operation o1207 by an electrical circuitry arrangement e1207 as activated thereto, and/or otherwise fulfillment of the operation o1207. One or more non-transitory signal bearing physical media can bear the one or more instructions i1207 that when executed can direct performance of the operation o1207. Furthermore, receiving GPS positioning data regarding the mobile operating system operated intermediate electronic communication devices module m1207 depicted in FIG. 6A as being included in the module m1201, when executed and/or activated, can direct performance of and/or perform the operation o1207. Illustratively, in one or more implementations, the operation o1207 can be carried out, for example, by establishing (e.g. determining, concluding, calculating, comparing, etc.) through receiving information (e.g. receiving through network packet traffic, etc.) receiving GPS positioning data (e.g. global positioning system satellite data, chipset information, data base inquiry, etc.) regarding the mobile operating system operated intermediate electronic communication devices (e.g. phablet, etc.).

In one or more implementations, as shown in FIG. 10B, the operation o1201 can include operation o1208 for establishing through receiving information including receiving information associated with communication histories of successful communications of one or more other electronic communication devices communicating with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1208 of the operation o1208, for performance of the operation o1208 by an electrical circuitry arrangement e1208 as activated thereto, and/or otherwise fulfillment of the operation o1208. One or more non-transitory signal bearing physical media can bear the one or more instructions i1208 that when executed can direct performance of the operation o1208. Furthermore, receiving information associated with communication histories of successful communications of other electronic communication devices communicating with the mobile operating system operated intermediate electronic communication device module m1208 depicted in FIG. 6A as being included in the module m1201, when executed and/or activated, can direct performance of and/or perform the operation o1208. Illustratively, in one or more implementations, the operation o1208 can be carried out, for example, by establishing (e.g. determining, concluding, calculating, comparing, etc.) through receiving information (e.g. receiving through network packet traffic, etc.) receiving information associated with communication histories of successful communications (e.g. call not dropped, communication bandwidth above designated threshold, meet or exceed service quality thresholds for data transmission or media presentation quality, etc.) of one or more other electronic communication devices (e.g. portable media devices, etc.) communicating with the mobile operating system operated intermediate electronic communication device (e.g. portable computers, etc.).

In one or more implementations, as shown in FIG. 10B, the operation o1208 can include operation o1209 for receiving information associated with communication histories of successful communications of one or more other electronic communication devices communicating with the mobile operating system operated intermediate electronic communication devices including receiving information as communication history data previously stored and forwarded between one or more electronic communication devices. Origination of a physically tangible component group can be accomplished through skilled in the art design choice selection including use of one or more components and/or subsystems explicitly and/or implicitly referred to herein for at least in part implementing execution of one or more instructions i1209 of the operation o1209, for performance of the operation o1209 by an electrical circuitry arrangement e1209 as activated thereto, and/or otherwise fulfillment of the operation o1209. One or more non-transitory signal bearing physical media can bear the one or more instructions i1209 that when executed can direct performance of the operation o1209. Furthermore, receiving information as communication history data previously stored and forwarded between electronic communication devices module m1209 depicted in FIG. 6A as being included in the module m1208, when executed and/or activated, can direct performance of and/or perform the operation o1209. Illustratively, in one or more implementations, the operation o1209 can be carried out, for example, by receiving information associated with communication histories of successful communications (e.g. call not dropped, communication bandwidth above designated threshold, meet or exceed service quality thresholds for data transmission or media presentation quality, etc.) of one or more other electronic communication devices (e.g. portable media devices, etc.) communicating with the mobile operating system operated intermediate electronic communication device (e.g. portable computers, etc.) receiving information as communication history data (e.g. successful communication versus communication problems with maintaining communication links, transmission dropout, degradation of transmission speed, etc.) previously stored and forwarded (e.g. temporarily held in device memory and then retransmitted, etc.) between one or more electronic communication devices (e.g. handheld computers, etc.).

In one or more implementations, as shown in FIG. 10B, the operation o1201 can include operation o1210 for establishing through receiving information including receiving information regarding one or more potential obstructions to electronic network relay communication located proximate to one or more of the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1210 of the operation o1210, for performance of the operation o1210 by an electrical circuitry arrangement e1210 as activated thereto, and/or otherwise fulfillment of the operation o1210. One or more non-transitory signal bearing physical media can bear the one or more instructions i1210 that when executed can direct performance of the operation o1210. Furthermore, receiving information regarding potential obstructions to electronic network relay communication located proximate to of the mobile operating system operated intermediate electronic communication device module m1210 depicted in FIG. 6A as being included in the module m1201, when executed and/or activated, can direct performance of and/or perform the operation o1210. Illustratively, in one or more implementations, the operation o1210 can be carried out, for example, by establishing (e.g. determining, concluding, calculating, comparing, etc.) through receiving information (e.g. receiving through network packet traffic, etc.) receiving information regarding one or more potential obstructions to electronic network relay communication (e.g. thunderstorm cells, etc.) located proximate (e.g. within one mile, etc.) to one or more of the mobile operating system operated intermediate electronic communication device (e.g. tablet computers, etc.).

In one or more implementations, as shown in FIG. 10B, the operation o1210 can include operation o1211 for receiving information regarding one or more potential obstructions to electronic network relay communication located proximate to one or more of the mobile operating system operated intermediate electronic communication device including receiving information regarding one or more moveable communication obstructions. Origination of a physically tangible component group can be accomplished through skilled in the art design choice selection including use of one or more components and/or subsystems explicitly and/or implicitly referred to herein for at least in part implementing execution of one or more instructions i1211 of the operation o1211, for performance of the operation o1211 by an electrical circuitry arrangement e1211 as activated thereto, and/or otherwise fulfillment of the operation o1211. One or more non-transitory signal bearing physical media can bear the one or more instructions i1211 that when executed can direct performance of the operation o1211. Furthermore, receiving information regarding moveable communication obstructions module m1211 depicted in FIG. 6B as being included in the module m1210, when executed and/or activated, can direct performance of and/or perform the operation o1211. Illustratively, in one or more implementations, the operation o1211 can be carried out, for example, by receiving information regarding one or more potential obstructions to electronic network relay communication (e.g. thunderstorm cells, etc.) located proximate (e.g. within one mile, etc.) to one or more of the mobile operating system operated intermediate electronic communication device (e.g. tablet computers, etc.) receiving information regarding one or more moveable communication obstructions (e.g. ship container traffic in relation to ferry traffic, etc.).

Figure 10C:
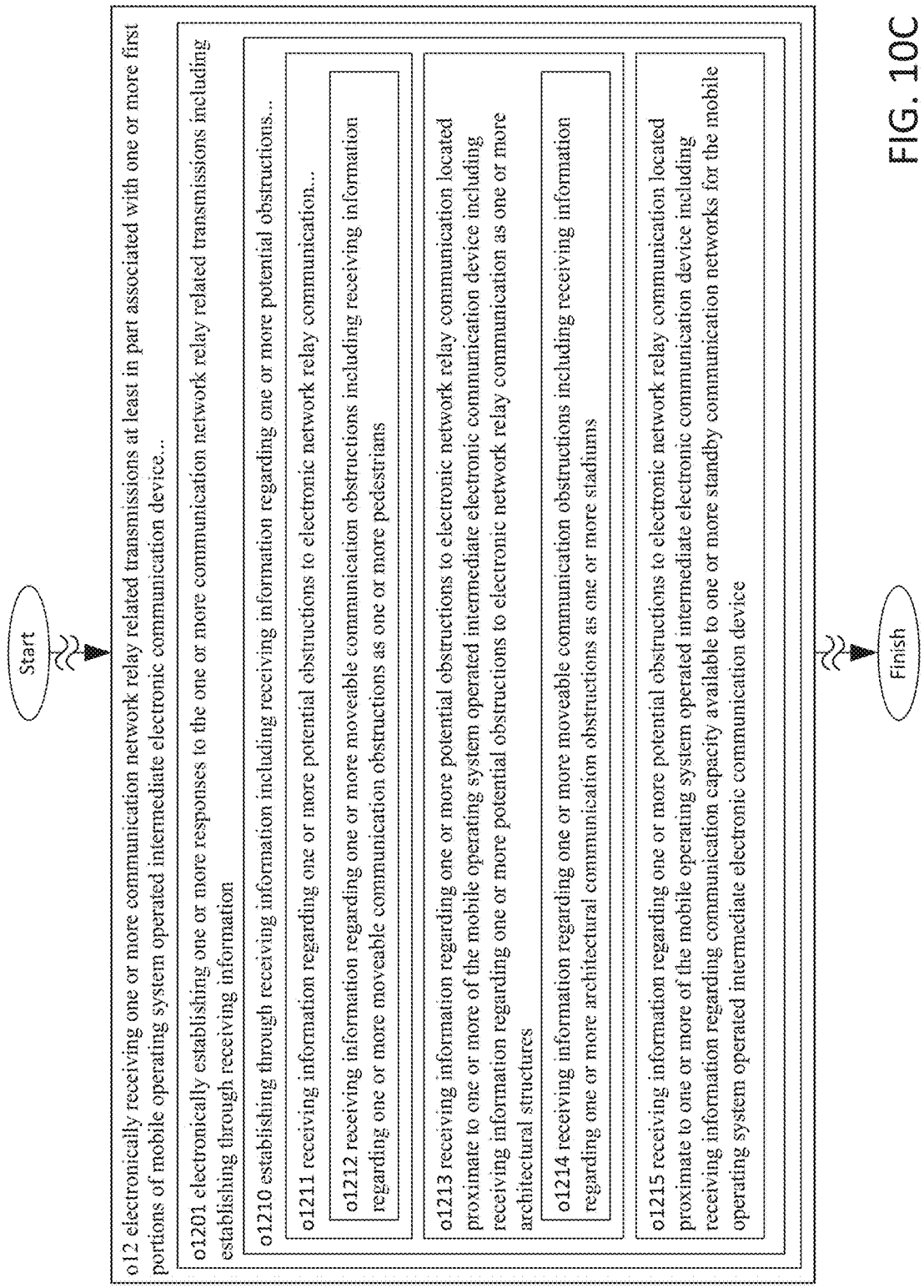

In one or more implementations, as shown in FIG. 10C, the operation o1211 can include operation o1212 for receiving information regarding one or more moveable communication obstructions including receiving information regarding one or more moveable communication obstructions as one or more pedestrians. Origination of a physically tangible component group can be accomplished through skilled in the art design choice selection including use of one or more components and/or subsystems explicitly and/or implicitly referred to herein for at least in part implementing execution of one or more instructions i1212 of the operation o1212, for performance of the operation o1212 by an electrical circuitry arrangement e1212 as activated thereto, and/or otherwise fulfillment of the operation o1212. One or more non-transitory signal bearing physical media can bear the one or more instructions i1212 that when executed can direct performance of the operation o1212. Furthermore, receiving information regarding moveable communication obstructions as pedestrians module m1212 depicted in FIG. 6B as being included in the module m1211, when executed and/or activated, can direct performance of and/or perform the operation o1212. Illustratively, in one or more implementations, the operation o1212 can be carried out, for example, by receiving information regarding one or more moveable communication obstructions (e.g. ship container traffic in relation to ferry traffic, etc.) receiving information regarding one or more moveable communication obstructions as one or more pedestrians (e.g. pedestrians on the ship containers or ferry traffic, pedestrians having health issues regarding high frequency electronic communications, etc.).

In one or more implementations, as shown in FIG. 10C, the operation o1210 can include operation o1213 for receiving information regarding one or more potential obstructions to electronic network relay communication located proximate to one or more of the mobile operating system operated intermediate electronic communication device including receiving information regarding one or more potential obstructions to electronic network relay communication as one or more architectural structures. Origination of a physically tangible component group can be accomplished through skilled in the art design choice selection including use of one or more components and/or subsystems explicitly and/or implicitly referred to herein for at least in part implementing execution of one or more instructions i1213 of the operation o1213, for performance of the operation o1213 by an electrical circuitry arrangement e1213 as activated thereto, and/or otherwise fulfillment of the operation o1213. One or more non-transitory signal bearing physical media can bear the one or more instructions i1213 that when executed can direct performance of the operation o1213. Furthermore, receiving information regarding potential obstructions to electronic network relay communication as architectural structures module m1213 depicted in FIG. 6B as being included in the module m1210, when executed and/or activated, can direct performance of and/or perform the operation o1213. Illustratively, in one or more implementations, the operation o1213 can be carried out, for example, by receiving information regarding one or more potential obstructions to electronic network relay communication (e.g. thunderstorm cells, etc.) located proximate (e.g. within one mile, etc.) to one or more of the mobile operating system operated intermediate electronic communication device (e.g. tablet computers, etc.) receiving information regarding one or more potential obstructions (e.g. 50% percent probability of greater than 5% of a period of time that communication is blocked, etc.) to electronic network relay communication as one or more architectural structures (e.g. warehouses, airport centers, etc.).

In one or more implementations, as shown in FIG. 10C, the operation o1213 can include operation o1214 for receiving information regarding one or more moveable communication obstructions including receiving information regarding one or more architectural communication obstructions as one or more stadiums. Origination of a physically tangible component group can be accomplished through skilled in the art design choice selection including use of one or more components and/or subsystems explicitly and/or implicitly referred to herein for at least in part implementing execution of one or more instructions i1214 of the operation o1214, for performance of the operation o1214 by an electrical circuitry arrangement e1214 as activated thereto, and/or otherwise fulfillment of the operation o1214. One or more non-transitory signal bearing physical media can bear the one or more instructions i1214 that when executed can direct performance of the operation o1214. Furthermore, receiving information regarding architectural communication obstructions as stadiums module m1214 depicted in FIG. 6B as being included in the module m1213, when executed and/or activated, can direct performance of and/or perform the operation o1214. Illustratively, in one or more implementations, the operation o1214 can be carried out, for example, by receiving information regarding one or more potential obstructions (e.g. 50% percent probability of greater than 5% of a period of time that communication is blocked, etc.) to electronic network relay communication as one or more architectural structures (e.g. warehouses, airport centers, etc.) receiving information regarding one or more architectural communication obstructions (e.g. communication is degraded in speed, quality, duration of availability, etc.) as one or more stadiums (e.g. sports arenas, concert halls, etc.).

In one or more implementations, as shown in FIG. 10C, the operation o1210 can include operation o1215 for receiving information regarding one or more potential obstructions to electronic network relay communication located proximate to one or more of the mobile operating system operated intermediate electronic communication device including receiving information regarding communication capacity available to one or more standby communication networks for the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1215 of the operation o1215, for performance of the operation o1215 by an electrical circuitry arrangement e1215 as activated thereto, and/or otherwise fulfillment of the operation o1215. One or more non-transitory signal bearing physical media can bear the one or more instructions i1215 that when executed can direct performance of the operation o1215. Furthermore, receiving information regarding communication capacity available to standby communication networks for the mobile operating system operated intermediate electronic communication device module m1215 depicted in FIG. 6B as being included in the module m1210, when executed and/or activated, can direct performance of and/or perform the operation o1215. Illustratively, in one or more implementations, the operation o1215 can be carried out, for example, by receiving information regarding one or more potential obstructions to electronic network relay communication (e.g. thunderstorm cells, etc.) located proximate (e.g. within one mile, etc.) to one or more of the mobile operating system operated intermediate electronic communication device (e.g. tablet computers, etc.) receiving information regarding communication capacity (e.g. gigabit per second rates, etc.) available (e.g. end-users of intermediate electronic communication devices have signed up to have their devices provide standby service, etc.) available to one or more standby communication networks (e.g. networks can have one or more intermediate devices and can share one or more intermediate devices, etc.) for the mobile operating system operated intermediate electronic communication device (e.g. mobile communication devices, etc.).

In one or more implementations, as shown in FIG. 10D, the operation o1210 can include operation o1216 for receiving information regarding one or more potential obstructions to electronic network relay communication located proximate to one or more of the mobile operating system operated intermediate electronic communication device including receiving information regarding one or more potential obstructions to electronic communication with the one or more origination electronic communication devices that are proximate to the one or more origination communication devices. Origination of a physically tangible component group can be accomplished through skilled in the art design choice selection including use of one or more components and/or subsystems explicitly and/or implicitly referred to herein for at least in part implementing execution of one or more instructions i1216 of the operation o1216, for performance of the operation o1216 by an electrical circuitry arrangement e1216 as activated thereto, and/or otherwise fulfillment of the operation o1216. One or more non-transitory signal bearing physical media can bear the one or more instructions i1216 that when executed can direct performance of the operation o1216. Furthermore, receiving information regarding potential obstructions to electronic communication with the origination electronic communication devices that are proximate to the origination communication devices module m1216 depicted in FIG. 6B as being included in the module m1210, when executed and/or activated, can direct performance of and/or perform the operation o1216. Illustratively, in one or more implementations, the operation o1216 can be carried out, for example, by receiving information regarding one or more potential obstructions to electronic network relay communication (e.g. thunderstorm cells, etc.) located proximate (e.g. within one mile, etc.) to one or more of the mobile operating system operated intermediate electronic communication device (e.g. tablet computers, etc.) receiving information regarding one or more potential obstructions (e.g. totally block communication in one or more directions of communication, etc.) to electronic communication (e.g. line of sight, etc.) with the one or more origination electronic communication devices (e.g. mobile handset, etc.) that are proximate (e.g. 500 meters, etc.) to the one or more origination communication devices (e.g. laptop computer, etc.).

In one or more implementations, as shown in FIG. 10D, the operation o1210 can include operation o1217 for receiving information regarding one or more potential obstructions to electronic network relay communication located proximate to one or more of the mobile operating system operated intermediate electronic communication device including receiving information from one or more fixed position communication network base stations. Origination of a physically tangible component group can be accomplished through skilled in the art design choice selection including use of one or more components and/or subsystems explicitly and/or implicitly referred to herein for at least in part implementing execution of one or more instructions i1217 of the operation o1217, for performance of the operation o1217 by an electrical circuitry arrangement e1217 as activated thereto, and/or otherwise fulfillment of the operation o1217. One or more non-transitory signal bearing physical media can bear the one or more instructions i1217 that when executed can direct performance of the operation o1217. Furthermore, receiving information from fixed position communication network base stations module m1217 depicted in FIG. 6B as being included in the module m1210, when executed and/or activated, can direct performance of and/or perform the operation o1217. Illustratively, in one or more implementations, the operation o1217 can be carried out, for example, by receiving information regarding one or more potential obstructions to electronic network relay communication (e.g. thunderstorm cells, etc.) located proximate (e.g. within one mile, etc.) to one or more of the mobile operating system operated intermediate electronic communication device (e.g. tablet computers, etc.) receiving information from one or more fixed position communication network base stations (e.g. routers, switches, relays, etc.).

In one or more implementations, as shown in FIG. 10D, the operation o1210 can include operation o1218 for receiving information regarding one or more potential obstructions to electronic network relay communication located proximate to one or more of the mobile operating system operated intermediate electronic communication device including receiving information regarding one or more potential obstructions to electronic relay network communication with one or more destination electronic communication devices proximate to one or more destination electronic communication devices. Origination of a physically tangible component group can be accomplished through skilled in the art design choice selection including use of one or more components and/or subsystems explicitly and/or implicitly referred to herein for at least in part implementing execution of one or more instructions i1218 of the operation o1218, for performance of the operation o1218 by an electrical circuitry arrangement e1218 as activated thereto, and/or otherwise fulfillment of the operation o1218. One or more non-transitory signal bearing physical media can bear the one or more instructions i1218 that when executed can direct performance of the operation o1218. Furthermore, receiving information regarding potential obstructions to electronic relay network communication with destination electronic communication devices proximate to destination electronic communication devices module m1218 depicted in FIG. 6B as being included in the module m1210, when executed and/or activated, can direct performance of and/or perform the operation o1218. Illustratively, in one or more implementations, the operation o1218 can be carried out, for example, by receiving information regarding one or more potential obstructions to electronic network relay communication (e.g. thunderstorm cells, etc.) located proximate (e.g. within one mile, etc.) to one or more of the mobile operating system operated intermediate electronic communication device (e.g. tablet computers, etc.) receiving information regarding one or more potential obstructions having cross-sectional dimensions above predetermined thresholds, etc.) to electronic relay network communication (e.g. substantially line of sight communication, etc.) with one or more destination electronic communication devices (e.g. mobile handheld device, etc.) proximate (e.g. within 500 feet, etc.) to one or more destination electronic communication devices (e.g. laptop, etc.).

In one or more implementations, as shown in FIG. 10D, the operation o1201 can include operation o1219 for establishing through receiving information including receiving at least in part service quality ratings regarding the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1219 of the operation o1219, for performance of the operation o1219 by an electrical circuitry arrangement e1219 as activated thereto, and/or otherwise fulfillment of the operation o1219. One or more non-transitory signal bearing physical media can bear the one or more instructions i1219 that when executed can direct performance of the operation o1219. Furthermore, receiving service quality ratings regarding the mobile operating system operated intermediate electronic communication device module m1219 depicted in FIG. 6B as being included in the module m1201, when executed and/or activated, can direct performance of and/or perform the operation o1219. Illustratively, in one or more implementations, the operation o1219 can be carried out, for example, by establishing (e.g. determining, concluding, calculating, comparing, etc.) through receiving information (e.g. receiving through network packet traffic, etc.) receiving at least in part service quality ratings (e.g. service quality ratings to take into consideration weighted evaluations of a plurality of aspects that can include communication speed, uptime availability, transmission reliability, etc.) regarding the mobile operating system operated intermediate electronic communication device.

Figure 10E:
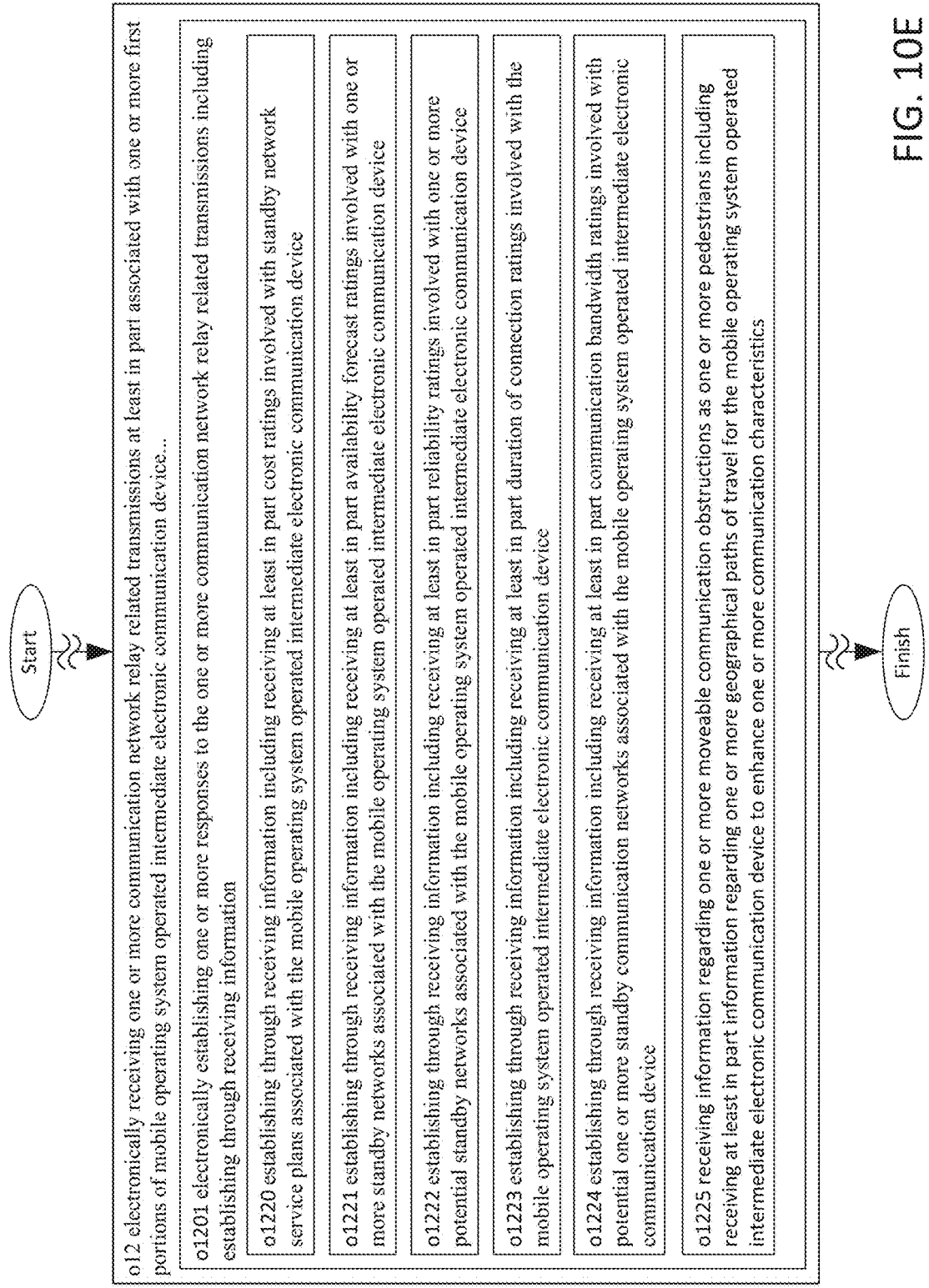

In one or more implementations, as shown in FIG. 10E, the operation o1201 can include operation o1220 for establishing through receiving information including receiving at least in part cost ratings involved with standby network service plans associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1220 of the operation o1220, for performance of the operation o1220 by an electrical circuitry arrangement e1220 as activated thereto, and/or otherwise fulfillment of the operation o1220. One or more non-transitory signal bearing physical media can bear the one or more instructions i1220 that when executed can direct performance of the operation o1220. Furthermore, receiving cost ratings involved with standby network service plans associated with the mobile operating system operated intermediate electronic communication device module m1220 depicted in FIG. 6B as being included in the module m1201, when executed and/or activated, can direct performance of and/or perform the operation o1220. Illustratively, in one or more implementations, the operation o1220 can be carried out, for example, by establishing (e.g. determining, concluding, calculating, comparing, etc.) through receiving information (e.g. receiving through network packet traffic, etc.) receiving at least in part cost ratings involved with standby network service plans (e.g. network credits, cash requirements, rebate coupons needed to pay end-users of the intermediate electronic communication devices for providing such for the standby network service, etc.) associated with the mobile operating system operated intermediate electronic communication device.

In one or more implementations, as shown in FIG. 10E, the operation o1201 can include operation o1221 for establishing through receiving information including receiving at least in part availability forecast ratings involved with one or more standby networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1221 of the operation o1221, for performance of the operation o1221 by an electrical circuitry arrangement e1221 as activated thereto, and/or otherwise fulfillment of the operation o1221. One or more non-transitory signal bearing physical media can bear the one or more instructions i1221 that when executed can direct performance of the operation o1221. Furthermore, receiving availability forecast ratings involved with standby networks associated with the mobile operating system operated intermediate electronic communication device module m1221 depicted in FIG. 6C as being included in the module m1201, when executed and/or activated, can direct performance of and/or perform the operation o1221. Illustratively, in one or more implementations, the operation o1221 can be carried out, for example, by establishing (e.g. determining, concluding, calculating, comparing, etc.) through receiving information (e.g. receiving through network packet traffic, etc.) receiving at least in part availability forecast ratings (e.g.

based upon forecasted use by the end-users, planned travel locations in relation to known potential obstructions, etc.) involved with one or more standby networks associated with the mobile operating system operated intermediate electronic communication device.

In one or more implementations, as shown in FIG. 10E, the operation o1201 can include operation o1222 for establishing through receiving information including receiving at least in part reliability ratings involved with one or more potential standby networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1222 of the operation o1222, for performance of the operation o1222 by an electrical circuitry arrangement e1222 as activated thereto, and/or otherwise fulfillment of the operation o1222. One or more non-transitory signal bearing physical media can bear the one or more instructions i1222 that when executed can direct performance of the operation o1222. Furthermore, receiving reliability ratings involved with potential standby networks associated with the mobile operating system operated intermediate electronic communication device module m1222 depicted in FIG. 6C as being included in the module m1201, when executed and/or activated, can direct performance of and/or perform the operation o1222. Illustratively, in one or more implementations, the operation o1222 can be carried out, for example, by establishing (e.g. determining, concluding, calculating, comparing, etc.) through receiving information (e.g. receiving through network packet traffic, etc.) receiving at least in part reliability ratings (e.g. accounts of down time, lack of capacity, etc. of past networks involved with the intermediate electronic communication devices, etc.) involved with one or more potential standby networks associated with the mobile operating system operated intermediate electronic communication device.

In one or more implementations, as shown in FIG. 10E, the operation o1201 can include operation o1223 for establishing through receiving information including receiving at least in part duration of connection ratings involved with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1223 of the operation o1223, for performance of the operation o1223 by an electrical circuitry arrangement e1223 as activated thereto, and/or otherwise fulfillment of the operation o1223. One or more non-transitory signal bearing physical media can bear the one or more instructions i1223 that when executed can direct performance of the operation o1223. Furthermore, receiving duration of connection ratings involved with the mobile operating system operated intermediate electronic communication device module m1223 depicted in FIG. 6C as being included in the module m1201, when executed and/or activated, can direct performance of and/or perform the operation o1223. Illustratively, in one or more implementations, the operation o1223 can be carried out, for example, by establishing (e.g. determining, concluding, calculating, comparing, etc.) through receiving information (e.g. receiving through network packet traffic, etc.) receiving at least in part duration of connection ratings (e.g. percentage of online network time compared with total time attempted to be online associated with general communication activities or particular communication activities as standby network nodes regarding the intermediate electronic communication devices, etc.) involved with the mobile operating system operated intermediate electronic communication device.

In one or more implementations, as shown in FIG. 10E, the operation o1201 can include operation o1224 for establishing through receiving information including receiving at least in part communication bandwidth ratings involved with potential one or more standby communication networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1224 of the operation o1224, for performance of the operation o1224 by an electrical circuitry arrangement e1224 as activated thereto, and/or otherwise fulfillment of the operation o1224. One or more non-transitory signal bearing physical media can bear the one or more instructions i1224 that when executed can direct performance of the operation o1224. Furthermore, receiving communication bandwidth ratings involved with potential standby communication networks associated with the mobile operating system operated intermediate electronic communication device module m1224 depicted in FIG. 6C as being included in the module m1201, when executed and/or activated, can direct performance of and/or perform the operation o1224. Illustratively, in one or more implementations, the operation o1224 can be carried out, for example, by establishing (e.g. determining, concluding, calculating, comparing, etc.) through receiving information (e.g. receiving through network packet traffic, etc.) receiving at least in part communication bandwidth ratings (e.g. communication speed such as in gigabits per second associated with general communication activities or particular communication activities as standby network nodes regarding the intermediate electronic communication devices, etc.) involved with potential one or more standby communication networks associated with the mobile operating system operated intermediate electronic communication device.

In one or more implementations, as shown in FIG. 10E, the operation o1201 can include operation o1225 for receiving information regarding one or more moveable communication obstructions as one or more pedestrians including receiving at least in part information regarding one or more geographical paths of travel for the mobile operating system operated intermediate electronic communication device to enhance one or more communication characteristics. Origination of a physically tangible component group can be accomplished through skilled in the art design choice selection including use of one or more components and/or subsystems explicitly and/or implicitly referred to herein for at least in part implementing execution of one or more instructions i1225 of the operation o1225, for performance of the operation o1225 by an electrical circuitry arrangement e1225 as activated thereto, and/or otherwise fulfillment of the operation o1225. One or more non-transitory signal bearing physical media can bear the one or more instructions i1225 that when executed can direct performance of the operation o1225. Furthermore, receiving information regarding geographical paths of travel for the mobile operating system operated intermediate electronic communication device to enhance communication characteristics module m1225 depicted in FIG. 6C as being included in the module m1201, when executed and/or activated, can direct performance of and/or perform the operation o1225. Illustratively, in one or more implementations, the operation o1225 can be carried out, for example, by establishing (e.g. determining, concluding, calculating, comparing, etc.) through receiving information (e.g. receiving through network packet traffic, etc.) receiving at least in part information regarding one or more geographical paths of travel for the mobile operating system operated intermediate electronic communication device to enhance one or more communication characteristics (e.g. calculating one or more paths of travel to enhance performance characteristics solely or in combination such as communication availability, reliability, quality, duration, etc.).

Figure 11A:
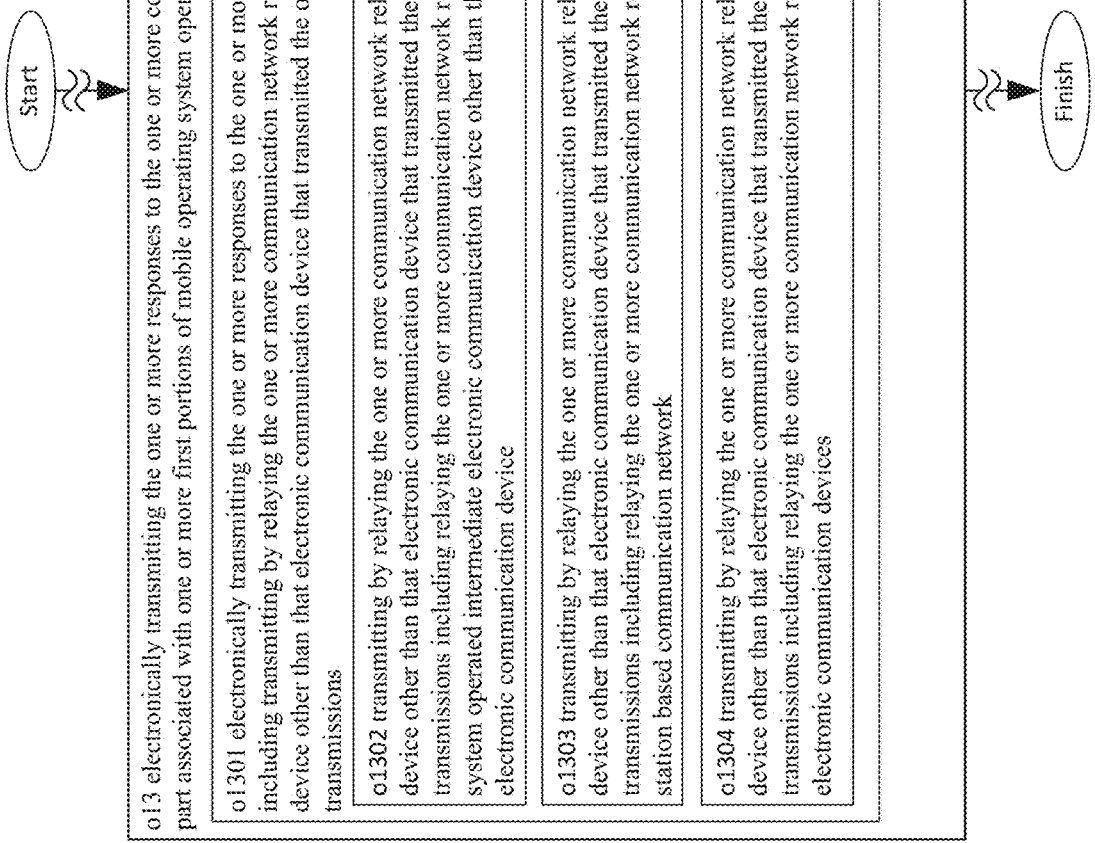

In one or more implementations, as shown in FIG. 11A, the operation o13 can include operation o1301 for electronically transmitting the one or more responses to the one or more communication network relay related transmissions including transmitting by relaying the one or more communication network relay related transmissions on to an electronic communication device other than that electronic communication device that transmitted the one or more communication network relay related transmissions. Origination of a physically tangible component group can be accomplished through skilled in the art design choice selection including use of one or more components and/or subsystems explicitly and/or implicitly referred to herein for at least in part implementing execution of one or more instructions i1301 of the operation o1301, for performance of the operation o1301 by an electrical circuitry arrangement e1301 as activated thereto, and/or otherwise fulfillment of the operation o1301. One or more non-transitory signal bearing physical media can bear the one or more instructions i1301 that when executed can direct performance of the operation o1301. Furthermore, transmitting by relaying the communication network relay related transmissions on to an electronic communication device other than that electronic communication device that transmitted the communication network relay related transmissions module m1301 depicted in FIG. 7A as being included in the module m13, when executed and/or activated, can direct performance of and/or perform the operation o1301. Illustratively, in one or more implementations, the operation o1301 can be carried out, for example, by electronically transmitting (e.g. mesh network transmissions, 60 GHz, 5 GHz, 2.4 GHz, and all cellular bands, etc.) the one or more responses (e.g. information in response to a query, acknowledgement of an agreement to participate in a standby communication network as a backup relay node, etc.) to the one or more communication network relay related transmissions (e.g. information queries, packets with other destinations, etc.) at least in part associated with one or more first portions of mobile operating system operated intermediate electronic communication device functionality (e.g. first portion regarding some aspect of standby network such as potential for joining as a relay node, etc.) related at least in part to communication network relay functionality (e.g. re-transmit received transmission to service traffic flow of a network hindered by communication that has been blocked to prior available base stations, etc.) of the mobile operating system operated intermediate electronic communication device (e.g. smartphone, mobile handset, etc.) as one or more standby communication network relays (e.g. switches, routers, gateways, bridges, repeaters, etc.) transmitting (e.g. high bandwidth communication beam, etc.) by relaying (e.g. network repeater, etc.) the one or more communication network relay related transmissions (e.g. packet traffic, etc.) on to an electronic communication device (e.g. Google smartphone, etc.) other than that electronic communication device (e.g. origination device, etc.) that transmitted the one or more communication network relay related transmissions (e.g. cellular communication, etc.).

In one or more implementations, as shown in FIG. 11A, the operation o1301 can include operation o1302 for transmitting by relaying the one or more communication network relay related transmissions on to an electronic communication device other than that electronic communication device that transmitted the one or more communication network relay related transmissions including relaying the one or more communication network relay related transmissions on to another mobile operating system operated intermediate electronic communication device other than the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1302 of the operation o1302, for performance of the operation o1302 by an electrical circuitry arrangement e1302 as activated thereto, and/or otherwise fulfillment of the operation o1302. One or more non-transitory signal bearing physical media can bear the one or more instructions i1302 that when executed can direct performance of the operation o1302. Furthermore, relaying the communication network relay related transmissions on to another mobile operating system operated intermediate electronic communication device other than the mobile operating system operated intermediate electronic communication device module m1302 depicted in FIG. 7A as being included in the module m1301, when executed and/or activated, can direct performance of and/or perform the operation o1302. Illustratively, in one or more implementations, the operation o1302 can be carried out, for example, by transmitting (e.g. high bandwidth communication beam, etc.) by relaying (e.g. network repeater, etc.) the one or more communication network relay related transmissions (e.g. packet traffic, etc.) on to an electronic communication device (e.g. Google smartphone, etc.) other than that electronic communication device (e.g. origination device, etc.) that transmitted the one or more communication network relay related transmissions (e.g. cellular communication, etc.) relaying (e.g. router, etc.) the one or more communication network relay related transmissions (e.g. wireless transmission, etc.) on to another mobile operating system operated intermediate electronic communication device (e.g. laptop, etc.) other than the mobile operating system operated intermediate electronic communication device (e.g. cell phone, etc.).

In one or more implementations, as shown in FIG. 11A, the operation o1301 can include operation o1303 for transmitting by relaying the one or more communication network relay related transmissions on to an electronic communication device other than that electronic communication device that transmitted the one or more communication network relay related transmissions including relaying the one or more communication network relay related transmissions on to a base station of a base station based communication network. Origination of a physically tangible component group can be accomplished through skilled in the art design choice selection including use of one or more components and/or subsystems explicitly and/or implicitly referred to herein for at least in part implementing execution of one or more instructions i1303 of the operation o1303, for performance of the operation o1303 by an electrical circuitry arrangement e1303 as activated thereto, and/or otherwise fulfillment of the operation o1303. One or more non-transitory signal bearing physical media can bear the one or more instructions i1303 that when executed can direct performance of the operation o1303. Furthermore, relaying the communication network relay related transmissions on to a base station of a base station based communication network module m1303 depicted in FIG. 7A as being included in the module m1301, when executed and/or activated, can direct performance of and/or perform the operation o1303. Illustratively, in one or more implementations, the operation o1303 can be carried out, for example, by transmitting (e.g. high bandwidth communication beam, etc.) by relaying (e.g. network repeater, etc.) the one or more communication network relay related transmissions (e.g. packet traffic, etc.) on to an electronic communication device (e.g. Google smartphone, etc.) other than that electronic communication device (e.g. origination device, etc.) that transmitted the one or more communication network relay related transmissions (e.g. cellular communication, etc.) relaying (e.g. network switch, etc.) the one or more communication network relay related transmissions (e.g. network packets, etc.) on to a base station (e.g. cell tower, etc.) of a base station based communication network (e.g. Sprint network, etc.).

In one or more implementations, as shown in FIG. 11A, the operation o1301 can include operation o1304 for transmitting by relaying the one or more communication network relay related transmissions on to an electronic communication device other than that electronic communication device that transmitted the one or more communication network relay related transmissions including relaying the one or more communication network relay related transmissions on to one of the destination electronic communication devices. Origination of a physically tangible component group can be accomplished through skilled in the art design choice selection including use of one or more components and/or subsystems explicitly and/or implicitly referred to herein for at least in part implementing execution of one or more instructions i1304 of the operation o1304, for performance of the operation o1304 by an electrical circuitry arrangement e1304 as activated thereto, and/or otherwise fulfillment of the operation o1304. One or more non-transitory signal bearing physical media can bear the one or more instructions i1304 that when executed can direct performance of the operation o1304. Furthermore, relaying the communication network relay related transmissions on to one of the destination electronic communication devices module m1304 depicted in FIG. 7A as being included in the module m1301, when executed and/or activated, can direct performance of and/or perform the operation o1304. Illustratively, in one or more implementations, the operation o1304 can be carried out, for example, by transmitting (e.g. high bandwidth communication beam, etc.) by relaying (e.g. network repeater, etc.) the one or more communication network relay related transmissions (e.g. packet traffic, etc.) on to an electronic communication device (e.g. Google smartphone, etc.) other than that electronic communication device (e.g. origination device, etc.) that transmitted the one or more communication network relay related transmissions (e.g. cellular communication, etc.) relaying (e.g. network relay, etc.) the one or more communication network relay related transmissions (e.g. direct WiFi, etc.) on to one of the destination electronic communication devices (e.g. tablet, etc.).

Figure 11B:
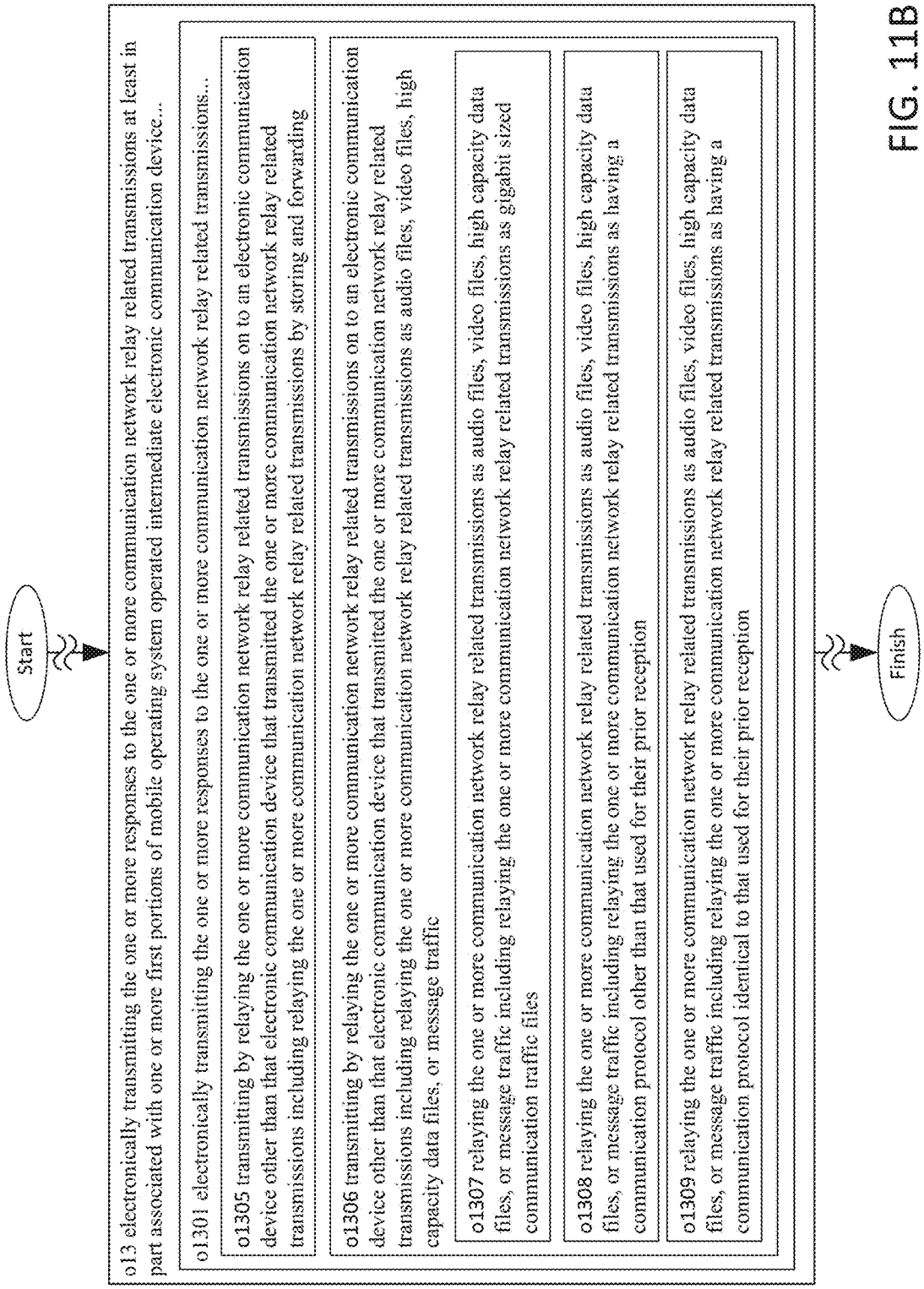

In one or more implementations, as shown in FIG. 11B, the operation o1301 can include operation o1305 for transmitting by relaying the one or more communication network relay related transmissions on to an electronic communication device other than that electronic communication device that transmitted the one or more communication network relay related transmissions including relaying the one or more communication network relay related transmissions by storing and forwarding. Origination of a physically tangible component group can be accomplished through skilled in the art design choice selection including use of one or more components and/or subsystems explicitly and/or implicitly referred to herein for at least in part implementing execution of one or more instructions i1305 of the operation o1305, for performance of the operation o1305 by an electrical circuitry arrangement e1305 as activated thereto, and/or otherwise fulfillment of the operation o1305. One or more non-transitory signal bearing physical media can bear the one or more instructions i1305 that when executed can direct performance of the operation o1305. Furthermore, relaying the communication network relay related transmissions by storing and forwarding module m1305 depicted in FIG. 7A as being included in the module m1301, when executed and/or activated, can direct performance of and/or perform the operation o1305. Illustratively, in one or more implementations, the operation o1305 can be carried out, for example, by transmitting (e.g. high bandwidth communication beam, etc.) by relaying (e.g. network repeater, etc.) the one or more communication network relay related transmissions (e.g. packet traffic, etc.) on to an electronic communication device (e.g. Google smartphone, etc.) other than that electronic communication device (e.g. origination device, etc.) that transmitted the one or more communication network relay related transmissions (e.g. cellular communication, etc.) relaying (e.g. network router, etc.) the one or more communication network relay related transmissions (e.g. cellular transmissions, etc.) by storing and forwarding (e.g. store higher capacity ahead of expected detection by human users, etc.).

In one or more implementations, as shown in FIG. 11B, the operation o1301 can include operation o1306 for transmitting by relaying the one or more communication network relay related transmissions on to an electronic communication device other than that electronic communication device that transmitted the one or more communication network relay related transmissions including relaying the one or more communication network relay related transmissions as audio files, video files, high capacity data files, or message traffic. Origination of a physically tangible component group can be accomplished through skilled in the art design choice selection including use of one or more components and/or subsystems explicitly and/or implicitly referred to herein for at least in part implementing execution of one or more instructions i1306 of the operation o1306, for performance of the operation o1306 by an electrical circuitry arrangement e1306 as activated thereto, and/or otherwise fulfillment of the operation o1306. One or more non-transitory signal bearing physical media can bear the one or more instructions i1306 that when executed can direct performance of the operation o1306. Furthermore, relaying the communication network relay related transmissions as audio files, video files, high capacity data files, or message traffic module m1306 depicted in FIG. 7A as being included in the module m1301, when executed and/or activated, can direct performance of and/or perform the operation o1306. Illustratively, in one or more implementations, the operation o1306 can be carried out, for example, by transmitting (e.g. high bandwidth communication beam, etc.) by relaying (e.g. network repeater, etc.) the one or more communication network relay related transmissions (e.g. packet traffic, etc.) on to an electronic communication device (e.g. Google smartphone, etc.) other than that electronic communication device (e.g. origination device, etc.) that transmitted the one or more communication network relay related transmissions (e.g. cellular communication, etc.) relaying (e.g. network relay, etc.) the one or more communication network relay related transmissions (e.g. 5 GHz packets, etc.) as audio files (e.g. FLAC format, etc.), video files (e.g. Ultra High Definition, etc.), high capacity data files (e.g. gigabit sized files, etc.), or message traffic (e.g. simultaneous high capacity multi-stream messaging, etc.).

In one or more implementations, as shown in FIG. 11B, the operation o1306 can include operation o1307 for relaying the one or more communication network relay related transmissions as audio files, video files, high capacity data files, or message traffic including relaying the one or more communication network relay related transmissions as gigabit sized communication traffic files. Origination of a physically tangible component group can be accomplished through skilled in the art design choice selection including use of one or more components and/or subsystems explicitly and/or implicitly referred to herein for at least in part implementing execution of one or more instructions i1307 of the operation o1307, for performance of the operation o1307 by an electrical circuitry arrangement e1307 as activated thereto, and/or otherwise fulfillment of the operation o1307. One or more non-transitory signal bearing physical media can bear the one or more instructions i1307 that when executed can direct performance of the operation o1307. Furthermore, relaying the communication network relay related transmissions as gigabit sized communication traffic files module m1307 depicted in FIG. 7A as being included in the module m1306, when executed and/or activated, can direct performance of and/or perform the operation o1307. Illustratively, in one or more implementations, the operation o1307 can be carried out, for example, by relaying (e.g. network relay, etc.) the one or more communication network relay related transmissions (e.g. 5 GHz packets, etc.) as audio files (e.g. FLAC format, etc.), video files (e.g. Ultra High Definition, etc.), high capacity data files (e.g. gigabit sized files, etc.), or message traffic (e.g. simultaneous high capacity multi-stream messaging, etc.) relaying (e.g. network bridge, etc.) the one or more communication network relay related transmissions (e.g. packet traffic, etc.) as gigabit sized communication traffic files (e.g. high definition video streaming, etc.).

In one or more implementations, as shown in FIG. 11B, the operation o1306 can include operation o1308 for relaying the one or more communication network relay related transmissions as audio files, video files, high capacity data files, or message traffic including relaying the one or more communication network relay related transmissions as having a communication protocol other than that used for their prior reception. Origination of a physically tangible component group can be accomplished through skilled in the art design choice selection including use of one or more components and/or subsystems explicitly and/or implicitly referred to herein for at least in part implementing execution of one or more instructions i1308 of the operation o1308, for performance of the operation o1308 by an electrical circuitry arrangement e1308 as activated thereto, and/or otherwise fulfillment of the operation o1308. One or more non-transitory signal bearing physical media can bear the one or more instructions i1308 that when executed can direct performance of the operation o1308. Furthermore, relaying the communication network relay related transmissions as having a communication protocol other than that used for their prior reception module m1308 depicted in FIG. 7A as being included in the module m1306, when executed and/or activated, can direct performance of and/or perform the operation o1308. Illustratively, in one or more implementations, the operation o1308 can be carried out, for example, by relaying (e.g. network relay, etc.) the one or more communication network relay related transmissions (e.g. 5 GHz packets, etc.) as audio files (e.g. FLAC format, etc.), video files (e.g. Ultra High Definition, etc.), high capacity data files (e.g. gigabit sized files, etc.), or message traffic (e.g. simultaneous high capacity multi-stream messaging, etc.) relaying (e.g. network relay, etc.) the one or more communication network relay related transmissions (e.g. point-to-point wireless transmission, etc.) as having a communication protocol (e.g. IEEE 802.11, protocol etc.) other than that used for their prior reception (e.g. 4G protocol, etc.).

In one or more implementations, as shown in FIG. 11B, the operation o1306 can include operation o1309 for relaying the one or more communication network relay related transmissions as audio files, video files, high capacity data files, or message traffic including relaying the one or more communication network relay related transmissions as having a communication protocol identical to that used for their prior reception. Origination of a physically tangible component group can be accomplished through skilled in the art design choice selection including use of one or more components and/or subsystems explicitly and/or implicitly referred to herein for at least in part implementing execution of one or more instructions i1309 of the operation o1309, for performance of the operation o1309 by an electrical circuitry arrangement e1309 as activated thereto, and/or otherwise fulfillment of the operation o1309. One or more non-transitory signal bearing physical media can bear the one or more instructions i1309 that when executed can direct performance of the operation o1309. Furthermore, relaying the communication network relay related transmissions as having a communication protocol identical to that used for their prior reception module m1309 depicted in FIG. 7A as being included in the module m1306, when executed and/or activated, can direct performance of and/or perform the operation o1309. Illustratively, in one or more implementations, the operation o1309 can be carried out, for example, by relaying (e.g. network relay, etc.) the one or more communication network relay related transmissions (e.g. 5 GHz packets, etc.) as audio files (e.g. FLAC format, etc.), video files (e.g. Ultra High Definition, etc.), high capacity data files (e.g. gigabit sized files, etc.), or message traffic (e.g. simultaneous high capacity multi-stream messaging, etc.) relaying (e.g. network router, etc.) the one or more communication network relay related transmissions (e.g. cellular transmissions, etc.) as having a communication protocol identical (e.g. cellular packet CDMA, etc.) to that used for their prior reception (e.g. CDMA, etc.).

In one or more implementations, as shown in FIG. 11C, the operation o13 can include operation o1310 for electronically transmitting the one or more responses to the one or more communication network relay related transmissions including transmitting status information to an electronic communication device that transmitted the one or more communication network relay related transmissions. Origination of a physically tangible component group can be accomplished through skilled in the art design choice selection including use of one or more components and/or subsystems explicitly and/or implicitly referred to herein for at least in part implementing execution of one or more instructions i1310 of the operation o1310, for performance of the operation o1310 by an electrical circuitry arrangement e1310 as activated thereto, and/or otherwise fulfillment of the operation o1310. One or more non-transitory signal bearing physical media can bear the one or more instructions i1310 that when executed can direct performance of the operation o1310. Furthermore, transmitting status information to an electronic communication device that transmitted the communication network relay related transmissions module m1310 depicted in FIG. 7B as being included in the module m13, when executed and/or activated, can direct performance of and/or perform the operation o1310. Illustratively, in one or more implementations, the operation o1310 can be carried out, for example, by electronically transmitting (e.g. mesh network transmissions, 60 GHz, 5 GHz, 2.4 GHz, and all cellular bands, etc.) the one or more responses (e.g. information in response to a query, acknowledgement of an agreement to participate in a standby communication network as a backup relay node, etc.) to the one or more communication network relay related transmissions (e.g. information queries, packets with other destinations, etc.) at least in part associated with one or more first portions of mobile operating system operated intermediate electronic communication device functionality (e.g. first portion regarding some aspect of standby network such as potential for joining as a relay node, etc.) related at least in part to communication network relay functionality (e.g. re-transmit received transmission to service traffic flow of a network hindered by communication that has been blocked to prior available base stations, etc.) of the mobile operating system operated intermediate electronic communication device (e.g. smartphone, mobile handset, etc.) as one or more standby communication network relays (e.g. switches, routers, gateways, bridges, repeaters, etc.) transmitting (e.g. multicast transmission, etc.) status information (e.g. acceptance of standby network compensation plan, etc.) to an electronic communication device (e.g. base station, etc.) that transmitted the one or more communication network relay related transmissions (e.g. packet based transmission, etc.).

In one or more implementations, as shown in FIG. 11C, the operation o1310 can include operation o1311 for transmitting status information to an electronic communication device that transmitted the one or more communication network relay related transmissions including transmitting an acknowledgement that the mobile operating system operated intermediate electronic communication device is to join one or more standby communication networks. Origination of a physically tangible component group can be accomplished through skilled in the art design choice selection including use of one or more components and/or subsystems explicitly and/or implicitly referred to herein for at least in part implementing execution of one or more instructions i1311 of the operation o1311, for performance of the operation o1311 by an electrical circuitry arrangement e1311 as activated thereto, and/or otherwise fulfillment of the operation o1311. One or more non-transitory signal bearing physical media can bear the one or more instructions i1311 that when executed can direct performance of the operation o1311. Furthermore, transmitting an acknowledgement that the mobile operating system operated intermediate electronic communication device is to join standby communication networks module m1311 depicted in FIG. 7B as being included in the module m1310, when executed and/or activated, can direct performance of and/or perform the operation o1311. Illustratively, in one or more implementations, the operation o1311 can be carried out, for example, by transmitting (e.g. multicast transmission, etc.) status information (e.g. acceptance of standby network compensation plan, etc.) to an electronic communication device (e.g. base station, etc.) that transmitted the one or more communication network relay related transmissions (e.g. packet based transmission, etc.) transmitting (e.g. cellular transmission, etc.) an acknowledgement (e.g. confirmation that the performance qualifications are met by the intermediate device, etc.) that the mobile operating system operated intermediate electronic communication device (e.g. Toshiba tablet computer, etc.) is to join one or more standby communication networks (e.g. cellular backup for base station network, etc.).

In one or more implementations, as shown in FIG. 11C, the operation o1310 can include operation o1312 for transmitting status information to an electronic communication device that transmitted the one or more communication network relay related transmissions including transmitting one or more response messages regarding one or more status inquires. Origination of a physically tangible component group can be accomplished through skilled in the art design choice selection including use of one or more components and/or subsystems explicitly and/or implicitly referred to herein for at least in part implementing execution of one or more instructions i1312 of the operation o1312, for performance of the operation o1312 by an electrical circuitry arrangement e1312 as activated thereto, and/or otherwise fulfillment of the operation o1312. One or more non-transitory signal bearing physical media can bear the one or more instructions i1312 that when executed can direct performance of the operation o1312. Furthermore, transmitting response messages regarding status inquires module m1312 depicted in FIG. 7B as being included in the module m1310, when executed and/or activated, can direct performance of and/or perform the operation o1312. Illustratively, in one or more implementations, the operation o1312 can be carried out, for example, by transmitting (e.g. multicast transmission, etc.) status information (e.g. acceptance of standby network compensation plan, etc.) to an electronic communication device (e.g. base station, etc.) that transmitted the one or more communication network relay related transmissions (e.g. packet based transmission, etc.) transmitting one or more response messages (e.g. information regarding performance characteristics of the intermediate device such as reliability factors, etc.) regarding one or more status inquires (e.g. inquiring into performance characteristics of intermediate device, etc.).

In one or more implementations, as shown in FIG. 11C, the operation o1312 can include operation o1313 for transmitting one or more response messages regarding one or more status inquires including transmitting at least in part service quality ratings regarding the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1313 of the operation o1313, for performance of the operation o1313 by an electrical circuitry arrangement e1313 as activated thereto, and/or otherwise fulfillment of the operation o1313. One or more non-transitory signal bearing physical media can bear the one or more instructions i1313 that when executed can direct performance of the operation o1313. Furthermore, transmitting service quality ratings regarding the mobile operating system operated intermediate electronic communication device module m1313 depicted in FIG. 7B as being included in the module m1312, when executed and/or activated, can direct performance of and/or perform the operation o1313. Illustratively, in one or more implementations, the operation o1313 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part service quality ratings (e.g. service quality ratings to take into consideration weighted evaluations of a plurality of aspects that can include communication speed, uptime availability, transmission reliability, etc.) regarding the mobile operating system operated intermediate electronic communication device.

In one or more implementations, as shown in FIG. 11C, the operation o1312 can include operation o1314 for transmitting one or more response messages regarding one or more status inquires including transmitting at least in part cost ratings involved with standby network service plans associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1314 of the operation o1314, for performance of the operation o1314 by an electrical circuitry arrangement e1314 as activated thereto, and/or otherwise fulfillment of the operation o1314. One or more non-transitory signal bearing physical media can bear the one or more instructions i1314 that when executed can direct performance of the operation o1314. Furthermore, transmitting cost ratings involved with standby network service plans associated with the mobile operating system operated intermediate electronic communication device module m1314 depicted in FIG. 7B as being included in the module m1312, when executed and/or activated, can direct performance of and/or perform the operation o1314. Illustratively, in one or more implementations, the operation o1314 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part cost ratings involved with standby network service plans (e.g. network credits, cash requirements, rebate coupons needed to pay end-users of the intermediate electronic communication devices for providing such for the standby network service, etc.) associated with the mobile operating system operated intermediate electronic communication device.

In one or more implementations, as shown in FIG. 11C, the operation o1312 can include operation o1315 for transmitting one or more response messages regarding one or more status inquires including transmitting at least in part availability forecast ratings involved with one or more standby networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1315 of the operation o1315, for performance of the operation o1315 by an electrical circuitry arrangement e1315 as activated thereto, and/or otherwise fulfillment of the operation o1315. One or more non-transitory signal bearing physical media can bear the one or more instructions i1315 that when executed can direct performance of the operation o1315. Furthermore, transmitting availability forecast ratings involved with standby networks associated with the mobile operating system operated intermediate electronic communication device module m1315 depicted in FIG. 7B as being included in the module m1312, when executed and/or activated, can direct performance of and/or perform the operation o1315. Illustratively, in one or more implementations, the operation o1315 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part availability forecast ratings (e.g. based upon forecasted use by the end-users, planned travel locations in relation to known potential obstructions, etc.) involved with one or more standby networks associated with the mobile operating system operated intermediate electronic communication device.

Figure 11D:
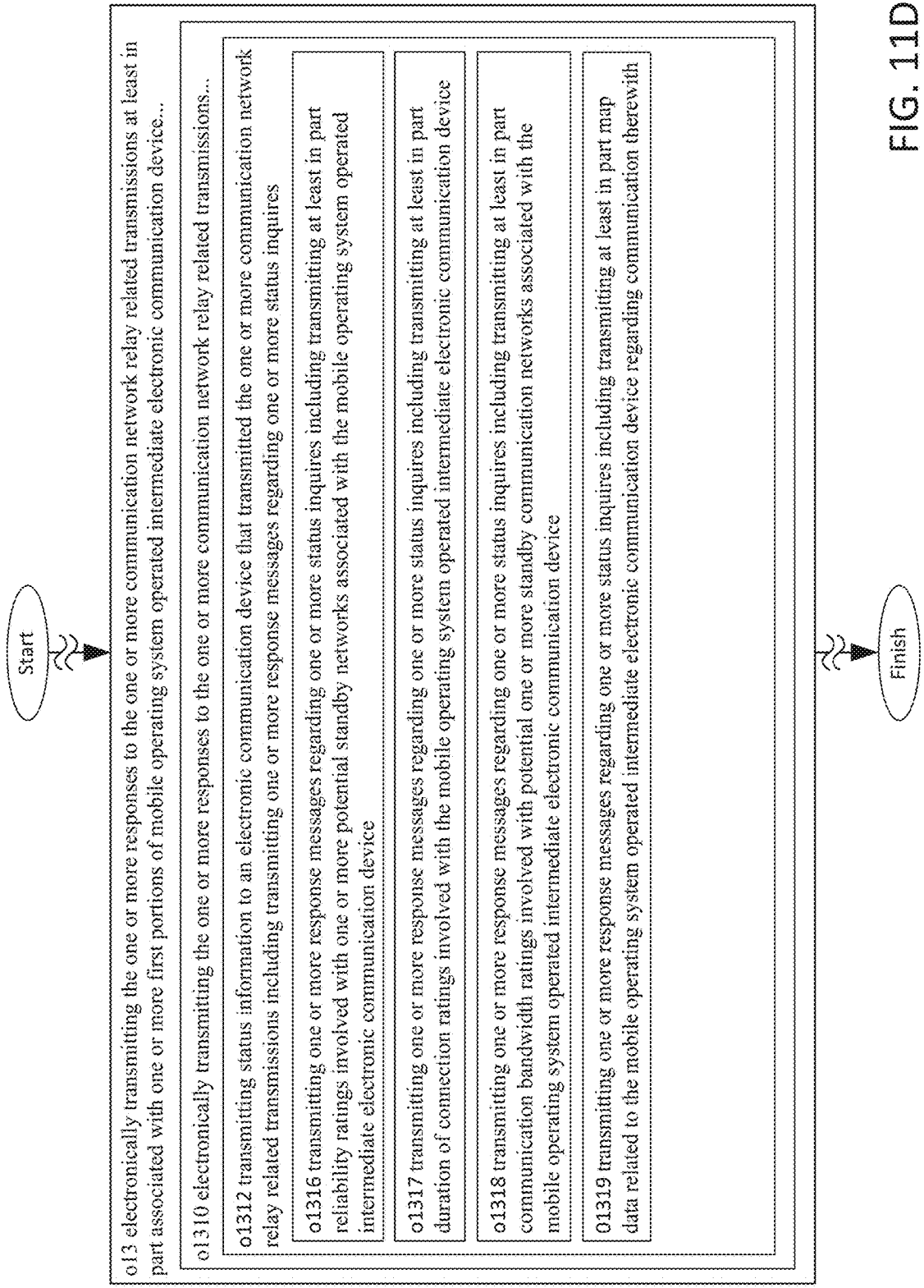

In one or more implementations, as shown in FIG. 11D, the operation o1312 can include operation o1316 for transmitting one or more response messages regarding one or more status inquires including transmitting at least in part reliability ratings involved with one or more potential standby networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1316 of the operation o1316, for performance of the operation o1316 by an electrical circuitry arrangement e1316 as activated thereto, and/or otherwise fulfillment of the operation o1316. One or more non-transitory signal bearing physical media can bear the one or more instructions i1316 that when executed can direct performance of the operation o1316. Furthermore, transmitting reliability ratings involved with potential standby networks associated with the mobile operating system operated intermediate electronic communication device module m1316 depicted in FIG. 7B as being included in the module m1312, when executed and/or activated, can direct performance of and/or perform the operation o1316. Illustratively, in one or more implementations, the operation o1316 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part reliability ratings (e.g. accounts of down time, lack of capacity, etc. of past networks involved with the intermediate electronic communication devices, etc.) involved with one or more potential standby networks associated with the mobile operating system operated intermediate electronic communication device.

In one or more implementations, as shown in FIG. 11D, the operation o1312 can include operation o1317 for transmitting one or more response messages regarding one or more status inquires including transmitting at least in part duration of connection ratings involved with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1317 of the operation o1317, for performance of the operation o1317 by an electrical circuitry arrangement e1317 as activated thereto, and/or otherwise fulfillment of the operation o1317. One or more non-transitory signal bearing physical media can bear the one or more instructions i1317 that when executed can direct performance of the operation o1317. Furthermore, transmitting duration of connection ratings involved with the mobile operating system operated intermediate electronic communication device module m1317 depicted in FIG. 7B as being included in the module m1312, when executed and/or activated, can direct performance of and/or perform the operation o1317. Illustratively, in one or more implementations, the operation o1317 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part duration of connection ratings (e.g. percentage of online network time compared with total time attempted to be online associated with general communication activities or particular communication activities as standby network nodes regarding the intermediate electronic communication devices, etc.) involved with the mobile operating system operated intermediate electronic communication device.

In one or more implementations, as shown in FIG. 11D, the operation o1312 can include operation o1318 for transmitting one or more response messages regarding one or more status inquires including transmitting at least in part communication bandwidth ratings involved with potential one or more standby communication networks associated with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1318 of the operation o1318, for performance of the operation o1318 by an electrical circuitry arrangement e1318 as activated thereto, and/or otherwise fulfillment of the operation o1318. One or more non-transitory signal bearing physical media can bear the one or more instructions i1318 that when executed can direct performance of the operation o1318. Furthermore, transmitting communication bandwidth ratings involved with potential standby communication networks associated with the mobile operating system operated intermediate electronic communication device module m1318 depicted in FIG. 7B as being included in the module m1312, when executed and/or activated, can direct performance of and/or perform the operation o1318. Illustratively, in one or more implementations, the operation o1318 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part communication bandwidth ratings (e.g. communication speed such as in gigabits per second associated with general communication activities or particular communication activities as standby network nodes regarding the intermediate electronic communication devices, etc.) involved with potential one or more standby communication networks associated with the mobile operating system operated intermediate electronic communication device.

In one or more implementations, as shown in FIG. 11D, the operation o1312 can include operation o1319 for transmitting one or more response messages regarding one or more status inquires including transmitting at least in part map data related to the mobile operating system operated intermediate electronic communication device regarding communication therewith. Origination of a physically tangible component group can be accomplished through skilled in the art design choice selection including use of one or more components and/or subsystems explicitly and/or implicitly referred to herein for at least in part implementing execution of one or more instructions i1319 of the operation o1319, for performance of the operation o1319 by an electrical circuitry arrangement e1319 as activated thereto, and/or otherwise fulfillment of the operation o1319. One or more non-transitory signal bearing physical media can bear the one or more instructions i1319 that when executed can direct performance of the operation o1319. Furthermore, transmitting map data related to the mobile operating system operated intermediate electronic communication device regarding communication therewith module m1319 depicted in FIG. 7B as being included in the module m1312, when executed and/or activated, can direct performance of and/or perform the operation o1319. Illustratively, in one or more implementations, the operation o1319 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part map data related to the mobile operating system operated intermediate electronic communication device regarding communication therewith e.g. taking into consideration locations of potential obstructions to point-to-point communication, locations of standby communication and fixed base station networks and historical performance data, etc. map data associated with communication with destination electronic communication devices can be determined, etc.).

Figure 11E:
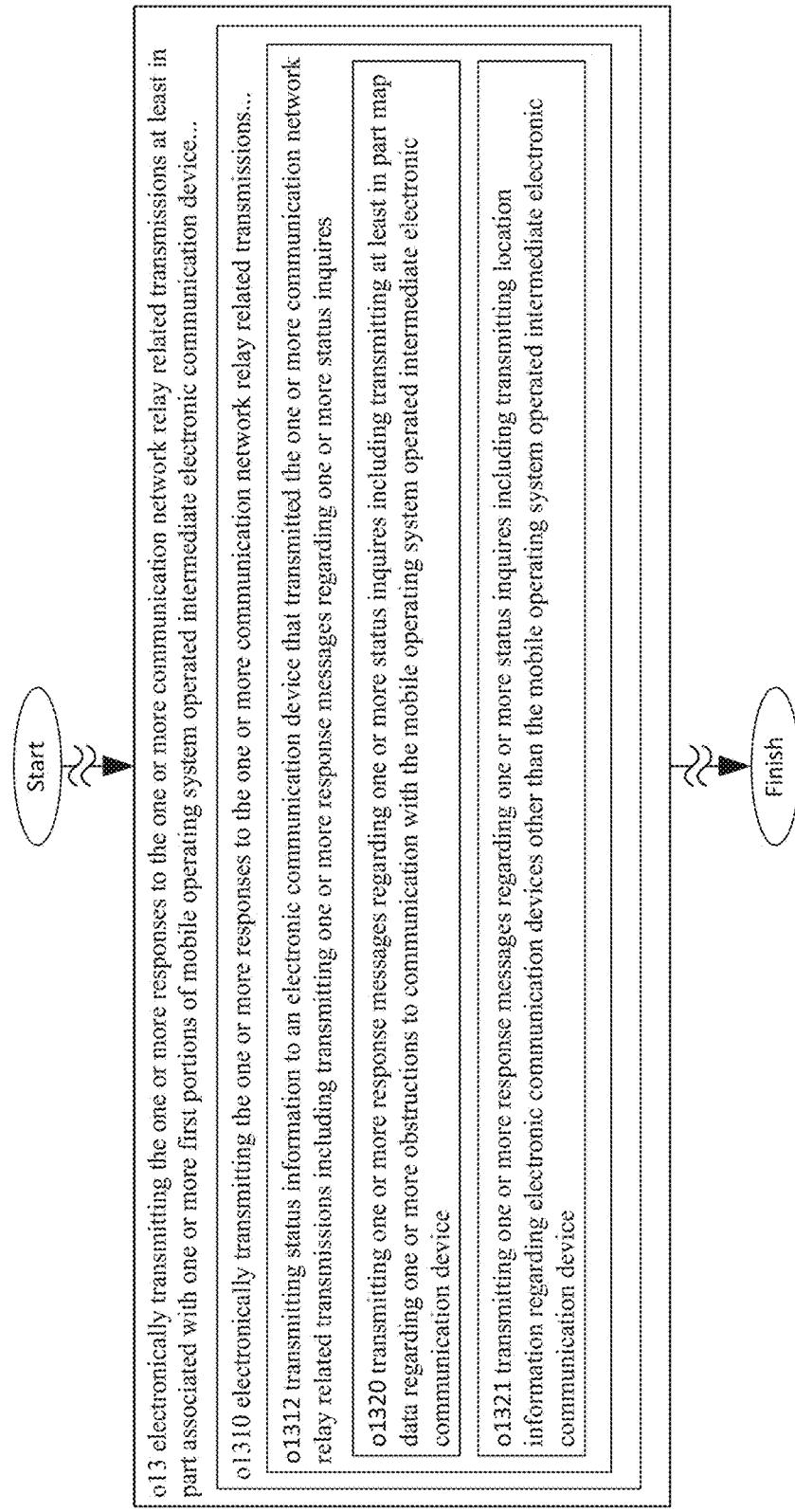

In one or more implementations, as shown in FIG. 11E, the operation o1312 can include operation o1320 for transmitting one or more response messages regarding one or more status inquires including transmitting at least in part map data regarding one or more obstructions to communication with the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1320 of the operation o1320, for performance of the operation o1320 by an electrical circuitry arrangement e1320 as activated thereto, and/or otherwise fulfillment of the operation o1320. One or more non-transitory signal bearing physical media can bear the one or more instructions i1320 that when executed can direct performance of the operation o1320. Furthermore, transmitting map data regarding obstructions to communication with the mobile operating system operated intermediate electronic communication device module m1320 depicted in FIG. 7B as being included in the module m1312, when executed and/or activated, can direct performance of and/or perform the operation o1320. Illustratively, in one or more implementations, the operation o1320 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting at least in part map data regarding one or more obstructions to communication with the mobile operating system operated intermediate electronic communication device (e.g. taking into consideration locations of historical obstructions to point-to-point communication, locations of standby communication and historical performance data, etc. map data associated with communication obstructions with intermediate electronic communication devices can be determined, etc.).

In one or more implementations, as shown in FIG. 11E, the operation o1312 can include operation o1321 for transmitting one or more response messages regarding one or more status inquires including transmitting location information regarding electronic communication devices other than the mobile operating system operated intermediate electronic communication device. Origination of a physically tangible component group can be accomplished through skilled in the art design choice selection including use of one or more components and/or subsystems explicitly and/or implicitly referred to herein for at least in part implementing execution of one or more instructions i1321 of the operation o1321, for performance of the operation o1321 by an electrical circuitry arrangement e1321 as activated thereto, and/or otherwise fulfillment of the operation o1321. One or more non-transitory signal bearing physical media can bear the one or more instructions i1321 that when executed can direct performance of the operation o1321. Furthermore, transmitting location information regarding electronic communication devices other than the mobile operating system operated intermediate electronic communication device module m1321 depicted in FIG. 7B as being included in the module m1312, when executed and/or activated, can direct performance of and/or perform the operation o1321. Illustratively, in one or more implementations, the operation o1321 can be carried out, for example, by transmitting one or more response messages (e.g. information regarding performance characteristics of the intermediate device such as reliability factors, etc.) regarding one or more status inquires (e.g. inquiring into performance characteristics of intermediate device, etc.) transmitting location information (e.g. map data, etc.) regarding electronic communication devices (e.g. Samsung smartphones, etc.) other than the mobile operating system operated intermediate electronic communication device (e.g. Apple smartphone, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A computationally-implemented method, comprising:
    electronically receiving one or more communication network relay related transmissions from a mobile operating system operated intermediate electronic communication device, the one or more communication network relay related transmissions containing information related to use of the intermediate electronic communication device as at least momentarily activatable as one or more standby communication network relays from non-network-relay operation thereof,
    wherein the electronically receiving one or more communication network relay related transmissions from a mobile operating system operated intermediate electronic communication device, the one or more communication network relay related transmissions containing information related to use of the intermediate electronic communication device as at least momentarily activatable as one or more standby communication network relays from non-network-relay operation thereof includes:
    receiving wireless packetized communication,
    wherein the receiving wireless packetized communication includes:
    receiving one or more inquiry messages as to status of the mobile operating system operated intermediate electronic communication device,
    wherein the receiving one or more inquiry messages as to status of the mobile operating system operated intermediate electronic communication device includes:
    receiving at least in part service quality ratings regarding the mobile operating system operated intermediate electronic communication device;
    electronically establishing one or more responses to the one or more communication network relay related transmissions; and
    electronically transmitting the one or more responses to the one or more communication network relay related transmissions.

2. The computationally-implemented method of claim 1 wherein the receiving one or more inquiry messages as to status of the mobile operating system operated intermediate electronic communication device comprises:
    receiving at least in part availability forecast ratings involved with one or more standby networks associated with the mobile operating system operated intermediate electronic communication device.

3. The computationally-implemented method of claim 1 wherein the receiving one or more inquiry messages as to status of the mobile operating system operated intermediate electronic communication device comprises:
    receiving at least in part duration of connection ratings involved with the mobile operating system operated intermediate electronic communication device.

4. The computationally-implemented method of claim 1 wherein the receiving one or more inquiry messages as to status of the mobile operating system operated intermediate electronic communication device comprises:
    receiving at least in part map data related to the mobile operating system operated intermediate electronic communication device.

5. The computationally-implemented method of claim 4, wherein the receiving at least in part map data related to the mobile operating system operated intermediate electronic communication device comprises:
  receiving at least in part map data regarding one or more obstructions to communication with the mobile operating system operated intermediate electronic communication device.

6. The computationally-implemented method of claim 4, wherein the receiving at least in part map data related to the mobile operating system operated intermediate electronic communication device comprises:
  receiving at least in part map data regarding location data of the mobile operating system operated intermediate electronic communication device.

7. The computationally-implemented method of claim 4, wherein the receiving at least in part map data related to the mobile operating system operated intermediate electronic communication device comprises:
  receiving at least in part map data regarding location data of one or more destination electronic communication devices.

8. The computationally-implemented method of claim 1 wherein the receiving one or more inquiry messages as to status of the mobile operating system operated intermediate electronic communication comprises:
  receiving inquiry as to future availability of the mobile operating system operated intermediate electronic communication device.

9. The computationally-implemented method of claim 1 wherein the receiving one or more inquiry messages as to status of the mobile operating system operated intermediate electronic communication device comprises:
  receiving inquiry as to the mobile operating system operated intermediate electronic communication device satisfying one or more device battery energy level ratings.

10. The computationally-implemented method of claim 1 wherein the receiving one or more inquiry messages as to status of the mobile operating system operated intermediate electronic communication device comprises:
  receiving inquiry as to requirements of the mobile operating system operated intermediate electronic communication device serving a toll gate position to circumnavigate around one or more fixed position communication obstacles.

11. The computationally-implemented method of claim 1 wherein the receiving one or more inquiry messages as to status of the mobile operating system operated intermediate electronic communication device comprises:
  receiving inquiry as to whether a proposed cost structure is sufficient to support use of the mobile operating system operated intermediate electronic communication device as a communication relay in one or more standby communication networks.

12. The computationally-implemented method of claim 1 wherein the receiving one or more inquiry messages as to status of the mobile operating system operated intermediate electronic communication device comprises:
  receiving inquiry as to whether the mobile operating system operated intermediate electronic communication device is an aerial drone.

13. The computationally-implemented method of claim 1, wherein the receiving one or more inquiry messages as to status of the mobile operating system operated intermediate electronic communication device comprises:
  receiving information involving receiving one or more 60 GHz wireless transmissions.

14. A computationally-implemented method, comprising:
  electronically receiving one or more communication network relay related transmissions from a mobile operating system operated intermediate electronic communication device, the one or more communication network relay related transmissions containing information related to use of the intermediate electronic communication device as at least momentarily activatable as one or more standby communication network relays from non-network-relay operation thereof;
  electronically establishing one or more responses to the one or more communication network relay related transmissions,
  wherein the electronically establishing one or more responses to the one or more communication network relay related transmissions includes:
  electronically establishing one or more responses to the one or more communication network relay related transmissions including establishing through receiving information,
  wherein the electronically establishing one or more responses to the one or more communication network relay related transmissions including establishing through receiving information includes:
  receiving information regarding one or more potential obstructions to electronic network relay communication located proximate to the mobile operating system operated intermediate electronic communication device; and
  electronically transmitting the one or more responses to the one or more communication network relay related transmissions.

15. The computationally-implemented method of claim 14 wherein the electronically establishing one or more responses to the one or more communication network relay related transmissions including establishing through receiving information comprises:
  receiving information regarding one or more statistical probabilities of remaining in communication with the mobile operating system operated intermediate electronic communication device for a projected travel itinerary of one or more origination electronic communication devices.

16. The computationally-implemented method of claim 14, wherein the receiving information regarding one or more potential obstructions to electronic network relay communication located proximate to the mobile operating system operated intermediate electronic communication device comprises:
  receiving information regarding one or more potential obstructions to electronic network relay communication as one or more architectural structures.

17. The computationally-implemented method of claim 14, wherein the receiving information regarding one or more potential obstructions to electronic network relay communication located proximate to the mobile operating system operated intermediate electronic communication device comprises:
  receiving information from one or more fixed position communication network base stations.

18. The computationally-implemented method of claim 14 wherein the receiving information regarding one or more potential obstructions to electronic network relay communication located proximate to the mobile operating system operated intermediate electronic communication device comprises:

receiving at least in part communication bandwidth ratings involved with potential one or more standby communication networks associated with the mobile operating system operated intermediate electronic communication device.

19. A computationally-implemented method, comprising:
electronically receiving one or more communication network relay related transmissions from a mobile operating system operated intermediate electronic communication device, the one or more communication network relay related transmissions containing information related to use of the intermediate electronic communication device as at least momentarily activatable as one or more standby communication network relays from non-network-relay operation thereof;
electronically establishing one or more responses to the one or more communication network relay related transmissions; and
electronically transmitting the one or more responses to the one or more communication network relay related transmissions,
wherein the electronically transmitting the one or more responses to the one or more communication network relay related transmissions includes:
transmitting status information to an electronic communication device that transmitted the one or more communication network relay related transmissions,
wherein the transmitting status information to an electronic communication device that transmitted the one or more communication network relay related transmissions includes:
transmitting one or more response messages regarding one or more status inquires,
wherein the transmitting one or more response messages regarding one or more status inquires comprises:
transmitting at least in part reliability ratings involved with one or more potential standby networks associated with the mobile operating system operated intermediate electronic communication device.

20. The computationally-implemented method of claim 19, wherein the electronically transmitting one or more response messages regarding one or more status inquires comprises:
transmitting at least in part cost ratings involved with standby network service plans associated with the mobile operating system operated intermediate electronic communication device.

21. The computationally-implemented method of claim 19 wherein the transmitting one or more response messages regarding one or more status inquires comprises:
transmitting at least in part map data regarding one or more obstructions to communication with the mobile operating system operated intermediate electronic communication device.

* * * * *